US007510118B2

(12) United States Patent
Ralph et al.

(10) Patent No.: US 7,510,118 B2
(45) **Date of Patent: *Mar. 31, 2009**

(54) BAR CODE SYMBOL SCANNING SYSTEM EMPLOYING TIME-DIVISION MULTIPLEXED LASER SCANNING AND SIGNAL PROCESSING TO AVOID OPTICAL CROSS-TALK AND OTHER UNWANTED LIGHT INTERFERENCE

(75) Inventors: Joseph Ralph, Los Angeles, CA (US); Mark Lucera, Pine Hill, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 131 days.

This patent is subject to a terminal disclaimer.

(21) Appl. No.: 11/285,752

(22) Filed: Nov. 21, 2005

(65) Prior Publication Data

US 2006/0283954 A1 Dec. 21, 2006

Related U.S. Application Data

(63) Continuation of application No. 10/207,731, filed on Jul. 26, 2002, now Pat. No. 6,969,004, which is a continuation-in-part of application No. 10/045,577, filed on Jan. 11, 2002, now Pat. No. 6,918,540, and a continuation-in-part of application No. 10/045,605, filed on Jan. 11, 2002, now Pat. No. 6,830,190.

(51) Int. Cl.
*G06K 7/10* (2006.01)

(52) U.S. Cl. ............................ 235/462.25; 235/462.01

(58) Field of Classification Search ............................... 235/462.01–462.45, 472.01, 472.02, 472.03, 235/454, 455, 494

See application file for complete search history.

(56) References Cited

U.S. PATENT DOCUMENTS 3,774,014 A 11/1973 Berier (Continued)

FOREIGN PATENT DOCUMENTS

BE 899-019 6/1984

(Continued)

OTHER PUBLICATIONS

Product Brochure for the Magellan SL 360-Degree Scanner/Scale by PSC Inc., Webster, NY, Feb. 2000, pp. 1-2.

PCT Search Report for PCT/Dk89/00190, 1989.

*Primary Examiner*—Thien M Le

(74) *Attorney, Agent, or Firm*—Thomas J. Perkowski, Esq., P.C.

(57) ABSTRACT

A laser scanning system that employs synchronous time-division-multiplexed laser scanning operations and signal processing operations (for bar code detection). A plurality of successive non-overlapping time slots are defined and logically assigned to a unique laser scanning beam and corresponding photosensor. During a given time slot, the laser scanning beam logically assigned thereto is selectively generated (or selectively projected) into the scanning volume while generation (or projection) of the other laser scanning beam is disabled. Moreover, during the given time slot, the photosensor logically assigned thereto is operably coupled to signal processing circuitry that performs bar code detection operations on the data signals derived therefrom while the other photosensor is operably decoupled from such signal processing circuitry. The frequency of time slots logically assigned to a given laser scanning beam and corresponding photosensor is preferably greater than at least two times the highest frequency component expected in the scan data signal received at the photosensor. In other embodiments, the time slots logically assigned to a given laser scanning beam and corresponding photosensor correspond to scanning planes (or scanning plane groups) generated by the given laser scanning beam during revolution of at least one rotating polygonal mirror. In the preferred embodiment, such synchronous time-division-multiplexed laser scanning operations and signal processing operations (for bar code detection) are embodied in a bioptical laser scanning system comprising a plurality of laser scanning stations, each of which produces a plurality of groups of quasi-orthogonal laser scanning planes that are projected within predetermined regions of space contained within a 3-D scanning volume defined between the bottom and side-scanning windows of the system.

26 Claims, 110 Drawing Sheets

U.S. PATENT DOCUMENTS

| | | | |
|---|---|---|---|
| 3,796,863 | A | 3/1974 | Nickl et al. |
| 3,902,048 | A | 8/1975 | Fleischer et al. |
| 3,947,816 | A | 3/1976 | Rabedeau |
| 3,958,104 | A | 5/1976 | Zuckerman |
| 4,007,377 | A | 2/1977 | Simon et al. |
| 4,093,865 | A | 6/1978 | Nickl |
| 4,333,006 | A | 6/1982 | Gorin et al. |
| 4,360,798 | A | 11/1982 | Swartz et al. |
| 4,570,057 | A | 2/1986 | Chadima, Jr. et al. |
| 4,587,407 | A | 5/1986 | Ahmed et al. |
| 4,628,493 | A | 12/1986 | Nelson et al. |
| 4,647,143 | A | 3/1987 | Yamazaki et al. |
| 4,652,732 | A | 3/1987 | Nicki |
| 4,687,282 | A | 8/1987 | Ferrante |
| 4,766,300 | A | 8/1988 | Chadima, Jr. et al. |
| 4,794,237 | A | 12/1988 | Ferrante |
| 4,794,240 | A | 12/1988 | Schorr et al. |
| 4,795,224 | A | 1/1989 | Goto |
| 4,799,164 | A | 1/1989 | Hellekson et al. |
| 4,805,175 | A | 2/1989 | Knowles |
| 4,839,507 | A | 6/1989 | May |
| 4,848,862 | A | 7/1989 | Yamazaki et al. |
| 4,851,667 | A | 7/1989 | Mergenthaler et al. |
| 4,861,973 | A | 8/1989 | Hellekson et al. |
| 4,867,257 | A | 9/1989 | Kuchler |
| 4,879,456 | A | 11/1989 | Cherry et al. |
| 4,894,523 | A | 1/1990 | Chadima, Jr. et al. |
| 4,939,355 | A | 7/1990 | Rando et al. |
| 4,960,985 | A | 10/1990 | Knowles |
| 4,968,883 | A | 11/1990 | Leyshon et al. |
| 5,000,529 | A | 3/1991 | Katoh et al. |
| 5,019,694 | A | 5/1991 | Collins, Jr. |
| 5,019,714 | A | 5/1991 | Knowles |
| 5,025,477 | A | 6/1991 | Baitz et al. |
| 5,026,975 | A | 6/1991 | Guber et al. |
| 5,028,772 | A | 7/1991 | Lapinski et al. |
| 5,039,184 | A | 8/1991 | Murakawa et al. |
| 5,042,619 | A | 8/1991 | Kohno |
| 5,073,702 | A | 12/1991 | Schuhmacher |
| 5,081,364 | A | 1/1992 | Wike, Jr. |
| 5,124,538 | A | 6/1992 | Lapinski et al. |
| 5,128,520 | A | 7/1992 | Rando et al. |
| 5,132,524 | A | 7/1992 | Singh et al. |
| 5,202,557 | A | 4/1993 | Robertson |
| 5,206,491 | A | 4/1993 | Katoh et al. |
| 5,229,588 | A | 7/1993 | Detwiler et al. |
| 5,239,169 | A | 8/1993 | Thomas |
| 5,252,814 | A | 10/1993 | Tooley |
| 5,256,864 | A | 10/1993 | Rando et al. |
| 5,266,788 | A | 11/1993 | Yamazaki et al. |
| 5,268,565 | A | 12/1993 | Katoh et al. |
| 5,286,961 | A | 2/1994 | Saegusa |
| 5,291,008 | A | 3/1994 | Havens et al. |
| 5,293,033 | A | 3/1994 | Yamashita |
| 5,296,691 | A | 3/1994 | Waldron et al. |
| 5,331,118 | A | 7/1994 | Jensen |
| 5,361,158 | A | 11/1994 | Tang |
| 5,396,054 | A | 3/1995 | Krichever et al. |
| 5,410,108 | A | 4/1995 | Williams et al. |
| 5,451,771 | A | 9/1995 | Robertson |
| 5,457,308 | A | 10/1995 | Spitz et al. |
| 5,459,308 | A | 10/1995 | Detwiler et al. |
| 5,466,921 | A | 11/1995 | Lapinski et al. |
| RE35,117 | E | 12/1995 | Rando et al. |
| 5,475,207 | A | 12/1995 | Bobba et al. |
| 5,491,328 | A | 2/1996 | Rando |
| 5,493,108 | A | 2/1996 | Cherry et al. |
| 5,495,097 | A | 2/1996 | Katz et al. |
| 5,504,316 | A | 4/1996 | Bridgelall et al. |
| 5,519,198 | A | 5/1996 | Plesko |
| 5,525,786 | A | 6/1996 | Dumont |
| 5,541,419 | A | 7/1996 | Arackellian |
| 5,557,093 | A | 9/1996 | Knowles et al. |
| 5,572,007 | A | 11/1996 | Aragon et al. |
| 5,591,952 | A | 1/1997 | Krichever et al. |
| 5,594,231 | A | 1/1997 | Pellicori et al. |
| 5,629,511 | A | 5/1997 | Iwaguchi et al. |
| 5,677,522 | A | 10/1997 | Rice et al. |
| 5,684,289 | A | 11/1997 | Detwiler et al. |
| 5,689,102 | A | 11/1997 | Schonenberg et al. |
| 5,693,930 | A | 12/1997 | Katoh et al. |
| 5,705,802 | A | 1/1998 | Bobba et al. |
| 5,717,195 | A | 2/1998 | Feng et al. |
| 5,723,852 | A | 3/1998 | Rando et al. |
| 5,744,815 | A | 4/1998 | Gurevich et al. |
| 5,777,314 | A | 7/1998 | Roustaei |
| 5,778,133 | A | 7/1998 | Plesko |
| 5,801,370 | A | 9/1998 | Katoh et al. |
| 5,821,519 | A | 10/1998 | Lee et al. |
| 5,834,708 | A | 11/1998 | Svetal et al. |
| 5,837,988 | A | 11/1998 | Bobba et al. |
| 5,869,827 | A | 2/1999 | Rando |
| 5,886,336 | A | 3/1999 | Tang et al. |
| 5,892,214 | A | 4/1999 | Lindacher et al. |
| 5,909,300 | A | 6/1999 | Araki et al. |
| 5,975,417 | A | 11/1999 | Spencer et al. |
| 5,978,772 | A | 11/1999 | Mold |
| 6,045,046 | A | 4/2000 | Detwiler |
| 6,059,189 | A | 5/2000 | Detwiler et al. |
| 6,069,700 | A | 5/2000 | Rudnick et al. |
| 6,098,885 | A | 8/2000 | Knowles et al. |
| 6,112,857 | A | 9/2000 | Schwartz |
| 6,117,080 | A | 9/2000 | Schwartz |
| 6,189,795 | B1 | 2/2001 | Ohkawa et al. |
| 6,213,397 | B1 | 4/2001 | Rando |
| RE37,166 | E | 5/2001 | Rando et al. |
| 6,223,986 | B1 | 5/2001 | Bobba et al. |
| 6,237,852 | B1 | 5/2001 | Svetal et al. |
| 6,285,383 | B1 | 9/2001 | Klement et al. |
| 6,325,290 | B1 | 12/2001 | Walter et al. |
| 6,330,973 | B1 | 12/2001 | Bridgelall et al. |
| 6,330,974 | B1 | 12/2001 | Ackley |
| 6,462,880 | B1 | 10/2002 | Ohkawa et al. |
| 6,491,224 | B2 | 12/2002 | Ohkawa et al. |
| 6,536,668 | B1 | 3/2003 | Detwiler et al. |
| 6,568,598 | B1 | 5/2003 | Bobba et al. |
| 6,588,973 | B1 | 7/2003 | Chan et al. |
| 6,631,845 | B2 | 10/2003 | Barkan |
| 6,706,036 | B2 | 3/2004 | Lai |
| 6,830,190 | B2 * | 12/2004 | Lucera et al. .......... 235/462.25 |
| 6,918,540 | B2 * | 7/2005 | Good .................... 235/462.01 |
| 6,969,004 | B2 * | 11/2005 | Ralph et al. ............ 235/462.25 |
| 6,974,084 | B2 | 12/2005 | Bobba et al. |
| 6,991,169 | B2 | 1/2006 | Bobba et al. |
| 2001/0017320 | A1 | 8/2001 | Knowles et al. |
| 2002/0043564 | A1 | 4/2002 | Ohkawa et al. |
| 2002/0162887 | A1 | 11/2002 | Detwiler |
| 2003/0102377 | A1 | 6/2003 | Good |

FOREIGN PATENT DOCUMENTS

| | | | |
|---|---|---|---|
| EP | 0 260 912 | A2 | 3/1988 |
| EP | 0 360 250 | A2 | 3/1990 |
| EP | 0 644 504 | A1 | 3/1995 |
| EP | 0 663 643 | A2 | 7/1995 |
| EP | 0 325 469 | B1 | 11/1995 |
| EP | 0 458 334 | B1 | 12/1996 |
| EP | 0 444 958 | B1 | 6/1997 |
| EP | 0 535 905 | B1 | 12/1997 |
| FR | 2 367 320 | | 5/1978 |
| GB | 1 445 100 | | 8/1976 |
| JP | 63-109590 | | 5/1988 |
| JP | 63-146198 | | 6/1988 |
| JP | 63-178376 | | 7/1988 |

| | | |
|---|---|---|
| JP | 63-189981 | 8/1988 |
| JP | 63-192175 | 8/1988 |
| JP | 2-85983 | 3/1990 |
| JP | 2-231688 | 9/1990 |
| JP | 3-129583 | 6/1991 |
| JP | 3-167683 | 7/1991 |
| JP | 3-253811 | 11/1991 |
| JP | 3-257691 | 11/1991 |
| JP | 3-257692 | 11/1991 |
| JP | 3-265079 | 11/1991 |
| JP | 3-266195 | 11/1991 |
| JP | 5-6484 | 1/1993 |
| NL | 7713933 | 6/1979 |
| WO | WO 90/01715 | 2/1990 |
| WO | WO 99/01839 | 1/1999 |

* cited by examiner

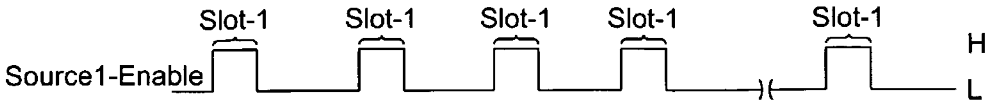

FIG. 1C1

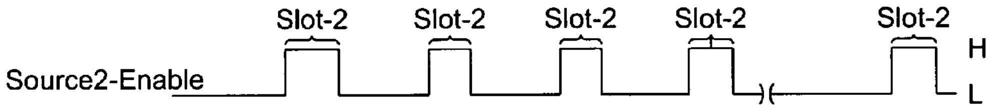

FIG. 1C2

| | Active (H Logic Level) | Inactive (L Logic Level) |
|---|---|---|
| | | |
| Source1_ Enable | Slot_1<br><br>Enable generation and/or projection of scanning laser beam from Laser Source LS1 into the scanning volume;<br><br>operably couple corresponding photosensor (e.g., PD1) to signal-processing circuitry that performs bar code detection and decoding operations on data signals derived from the output of photosensor | Disable generation and/or projection of scanning laser beam from Laser Source LS1 into the scanning volume;<br><br>operably de-couple (e.g., electrically isolate) corresponding photosensor (e.g., PD1) from signal processing circuitry that performs bar code detection and decoding operations on data signals derived from the output of photosensor |
| | | |
| Source2_ Enable | Slot_2<br><br>Enable generation and/or projection of scanning laser beam from Laser Source LS2 into the scanning volume;<br><br>operably couple corresponding photosensor (e.g., PD2) to signal-processing circuitry that performs bar code detection and decoding operations on data signals derived from the output of photosensor | Disable generation and/or projection of scanning laser beam from Laser Source LS2 into the scanning volume;<br><br>operably de-couple (e.g., electrically isolate) corresponding photosensor (e.g., PD2) from signal processing circuitry that performs bar code detection and decoding operations on data signals derived from the output of photosensor |

FIG. 1D

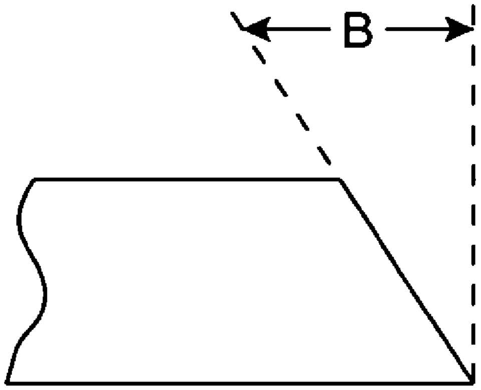
First Polygon PM1
$B_1 = 11.6°$
$B_2 = 13.3°$
$B_3 = 14.9°$
$B_4 = 16.6°$
Second Polygon PM2
$B_1 = 10°$
$B_2 = 12°$
$B_3 = -10°$
$B_4 = -12°$
FIG. 2N1

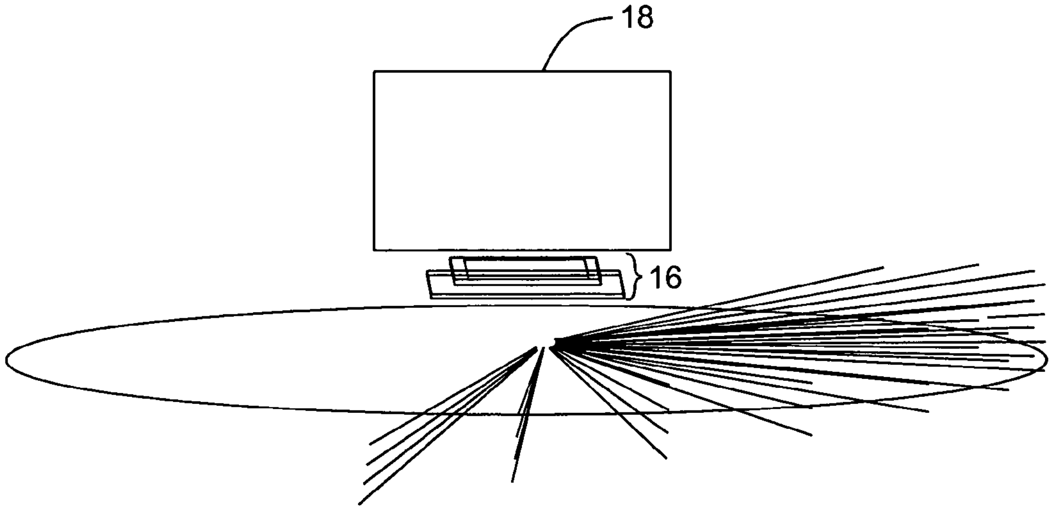
FIG. 2N2

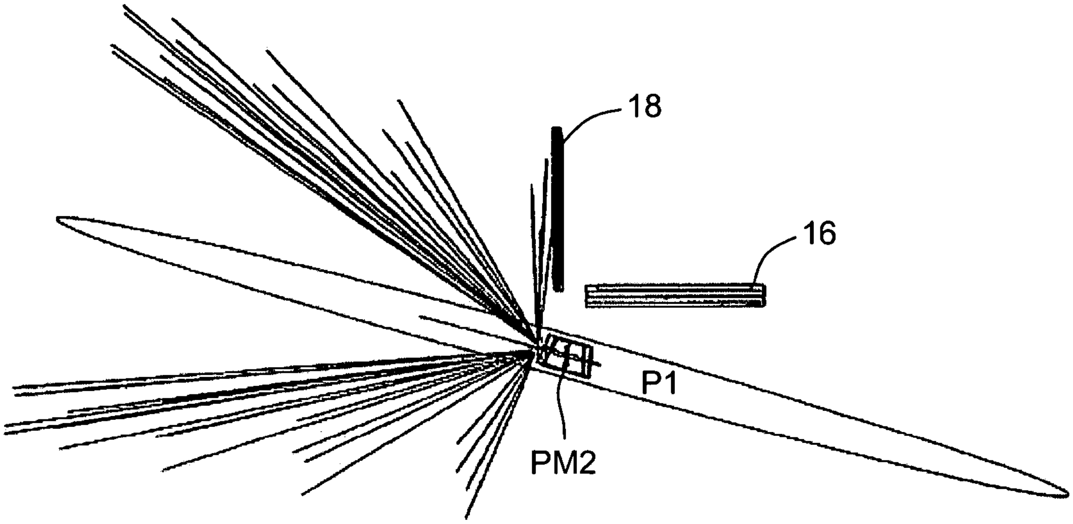
FIG. 2N3

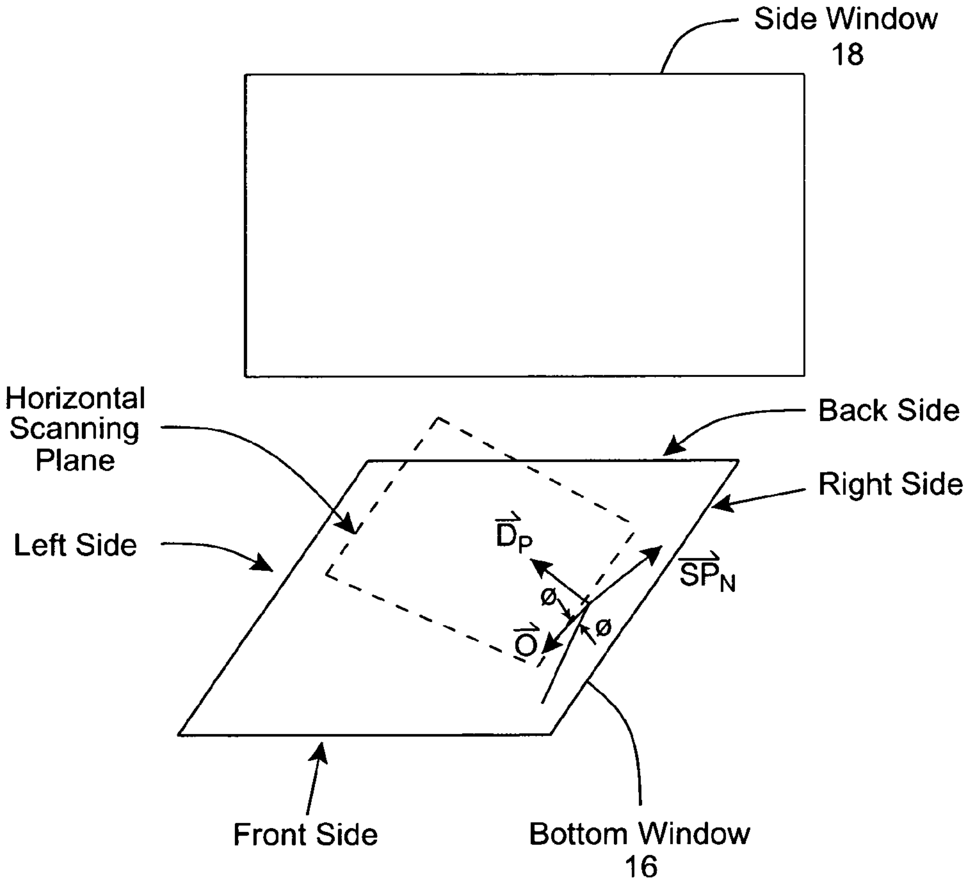
FIG. 3B1

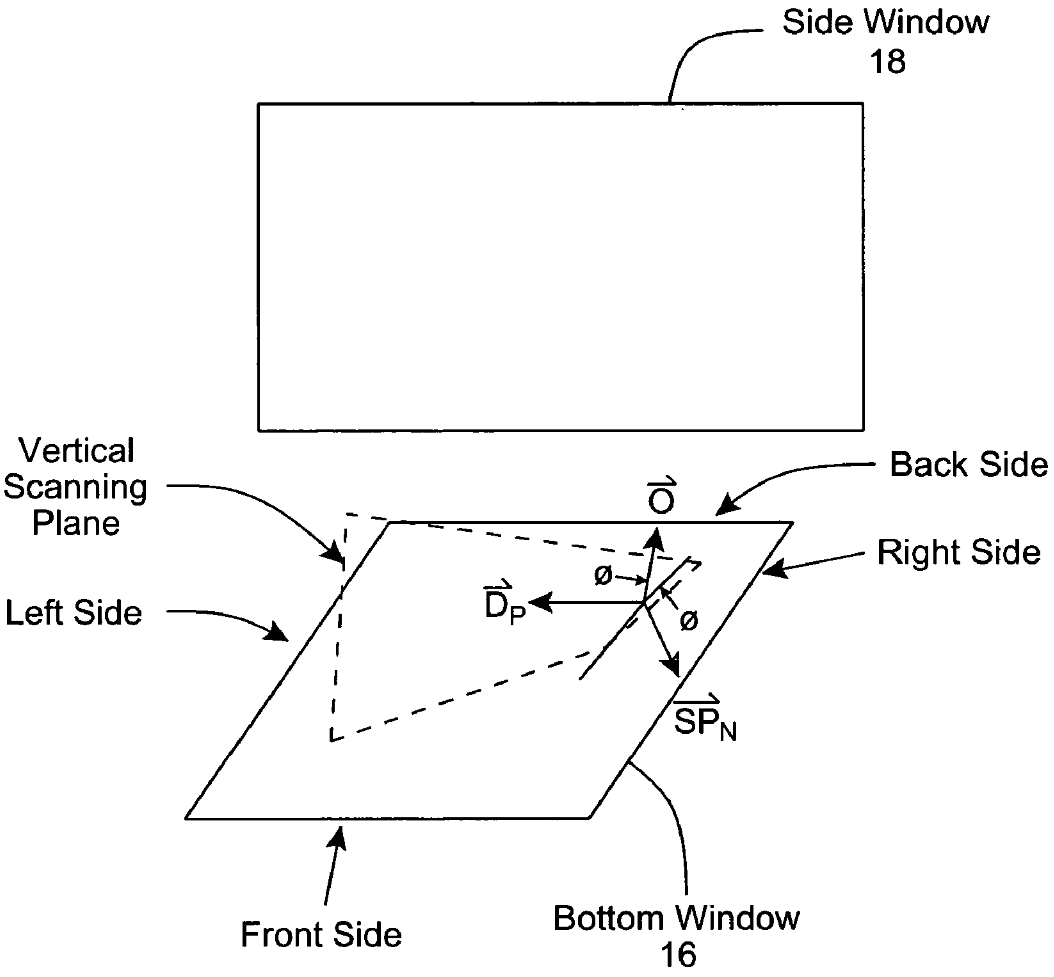
FIG. 3B2

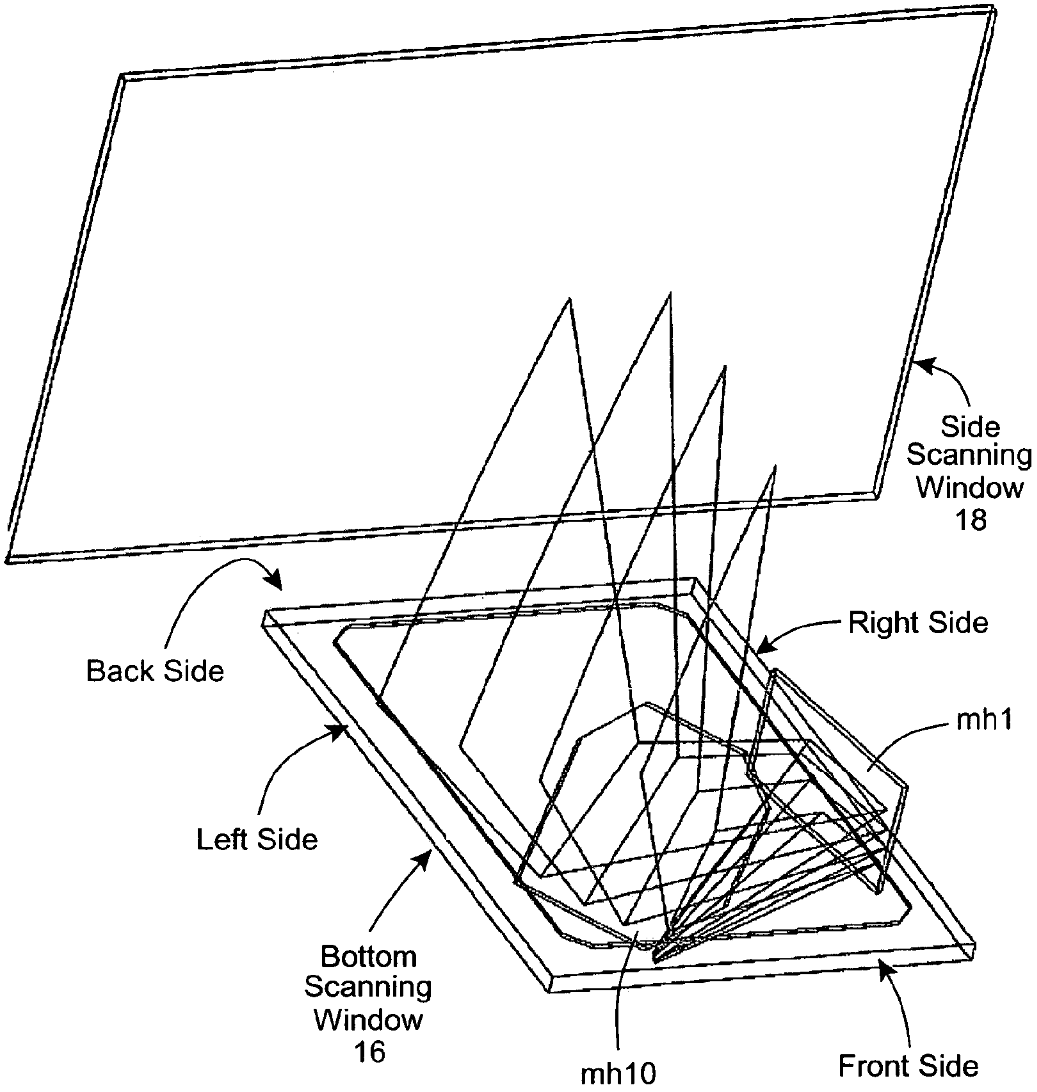
FIG. 3C1

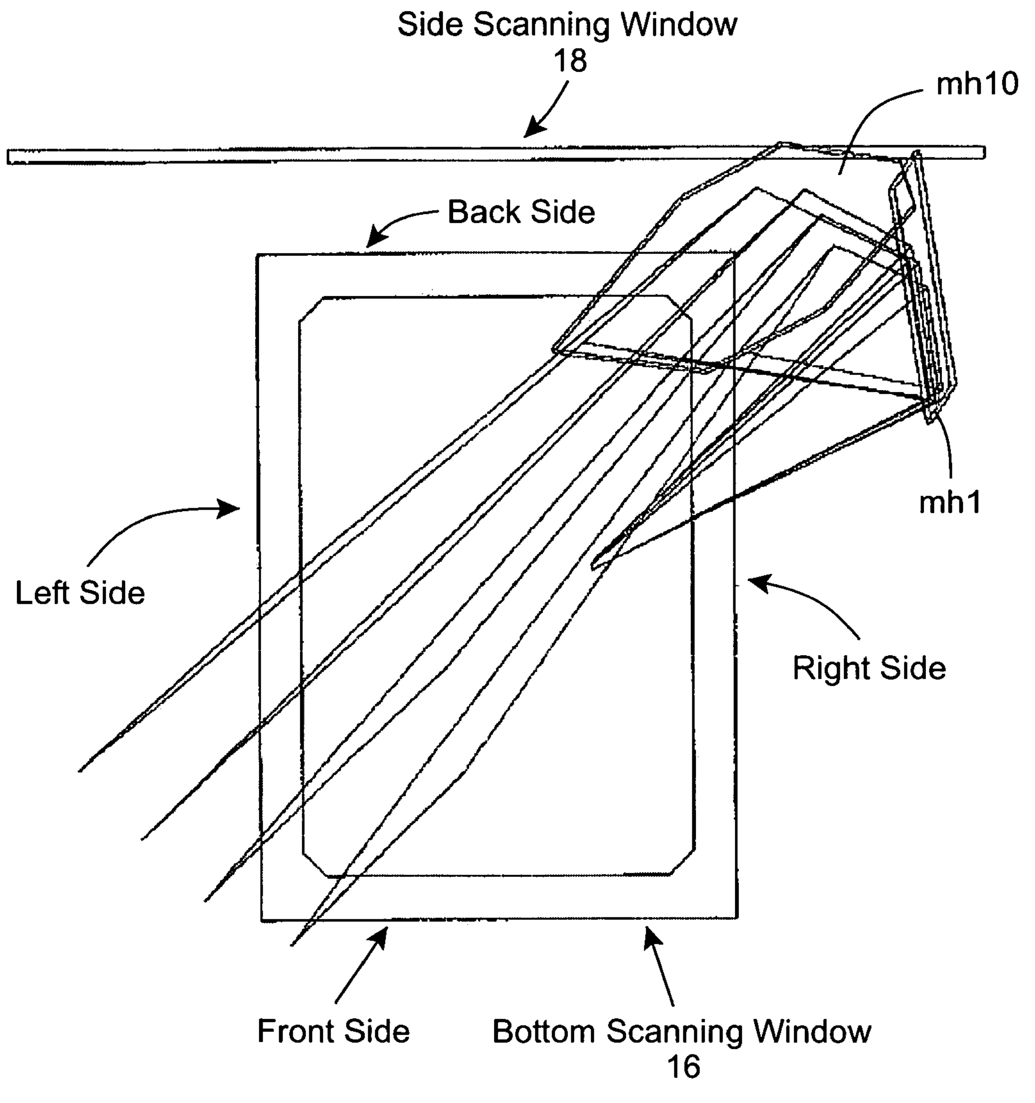
FIG. 3C2

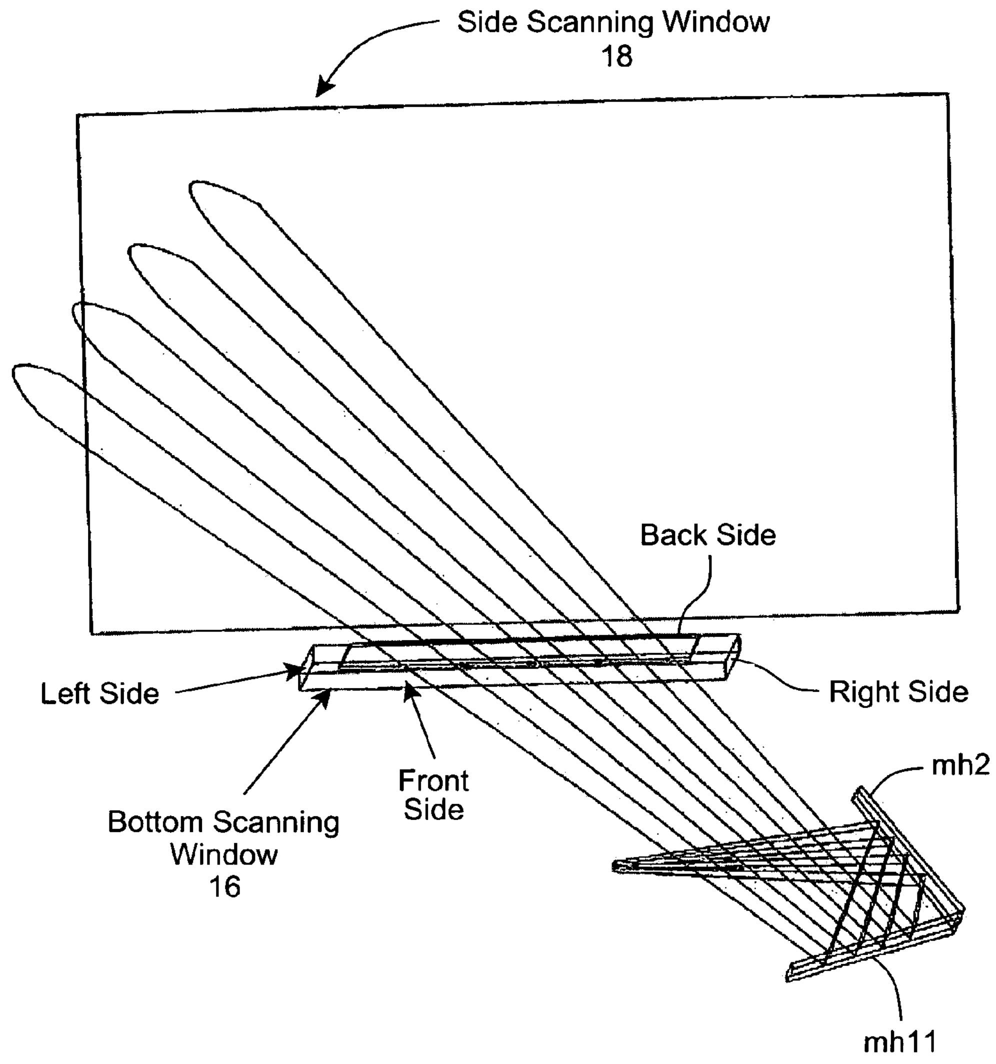
FIG. 3D1

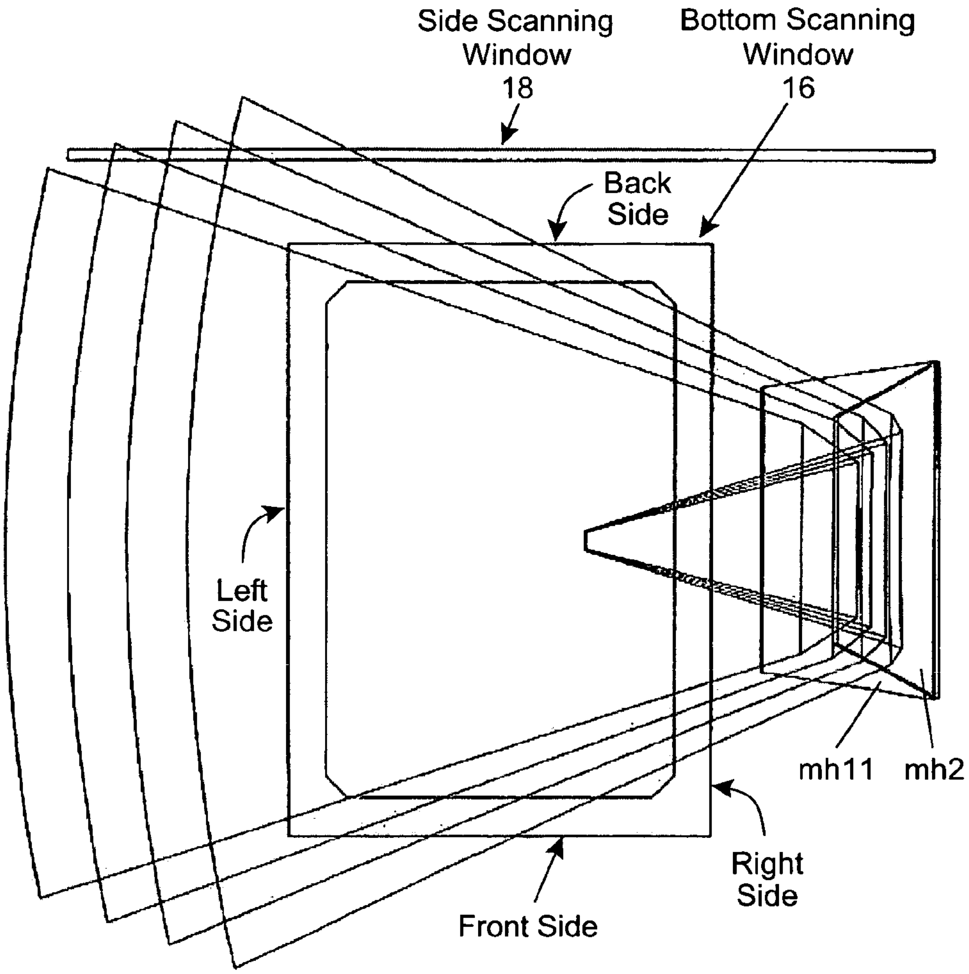
FIG. 3D2

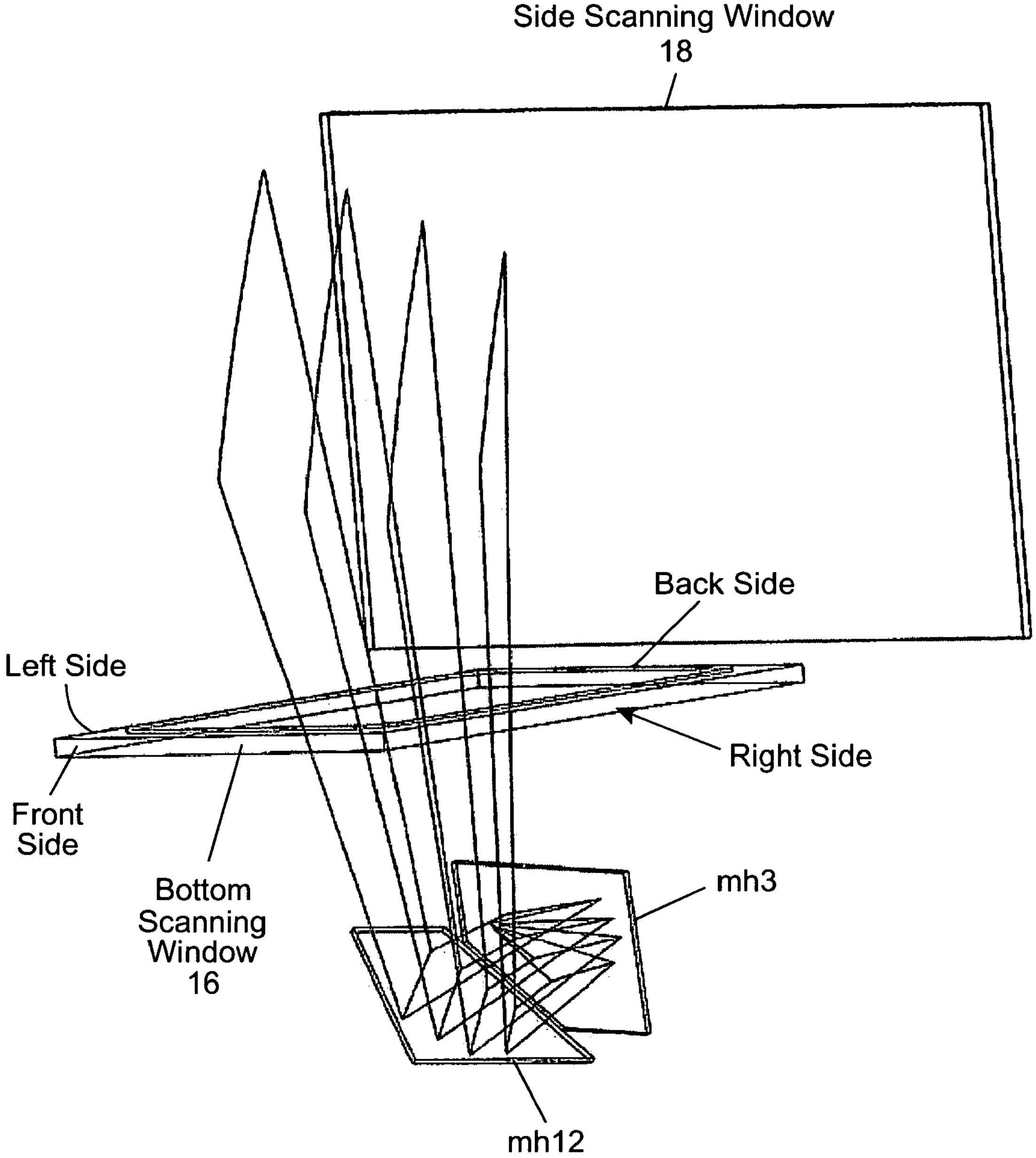
FIG. 3E1

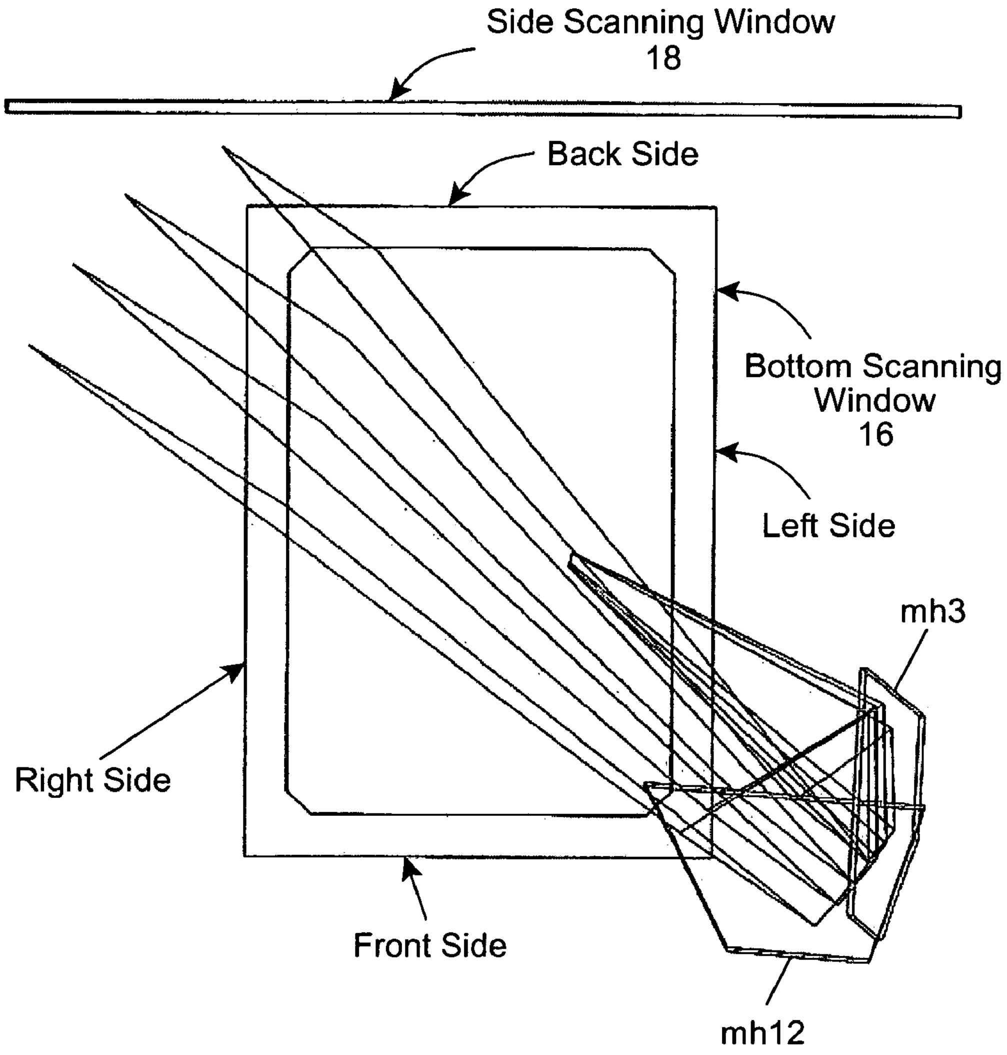
FIG. 3E2

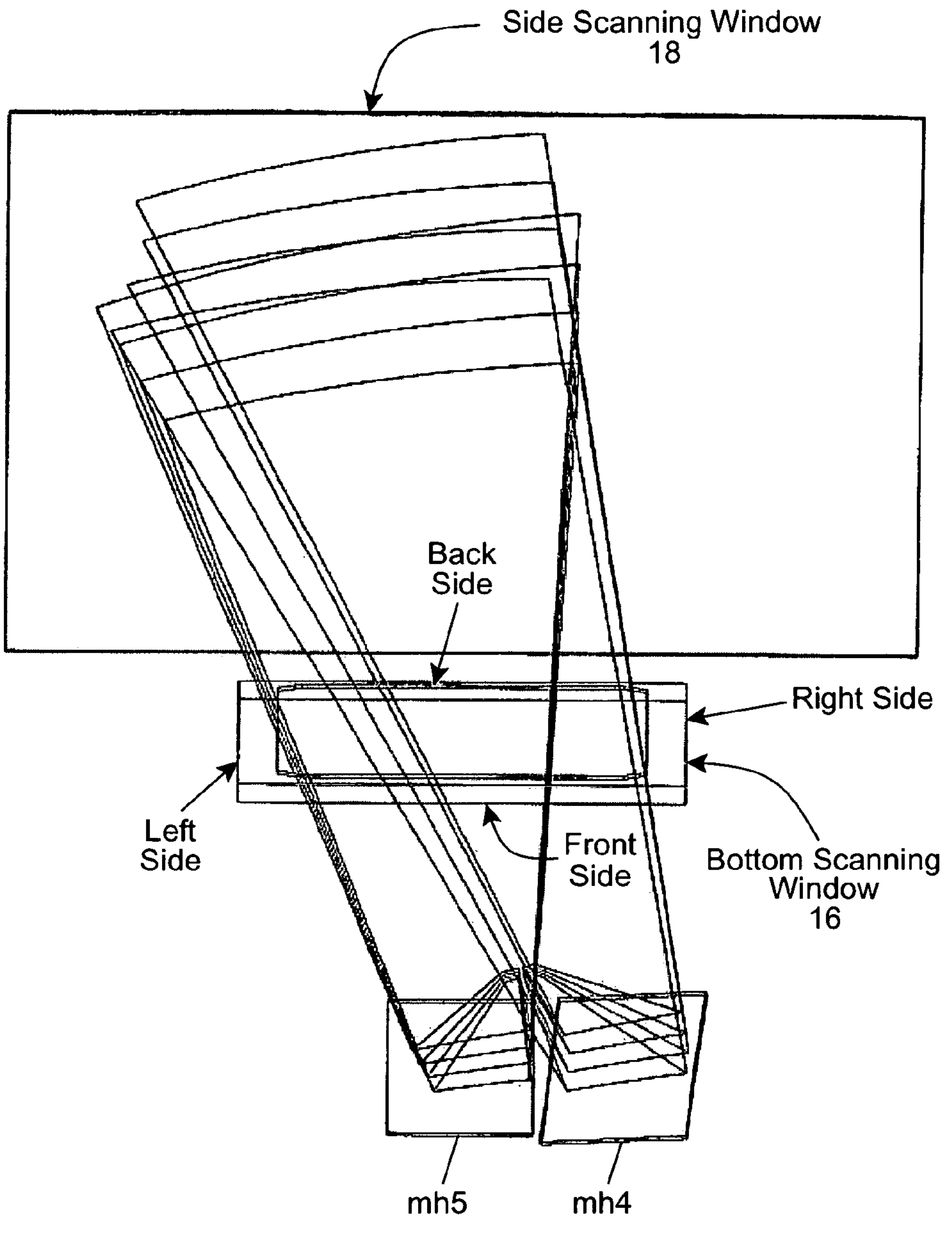
FIG. 3F1

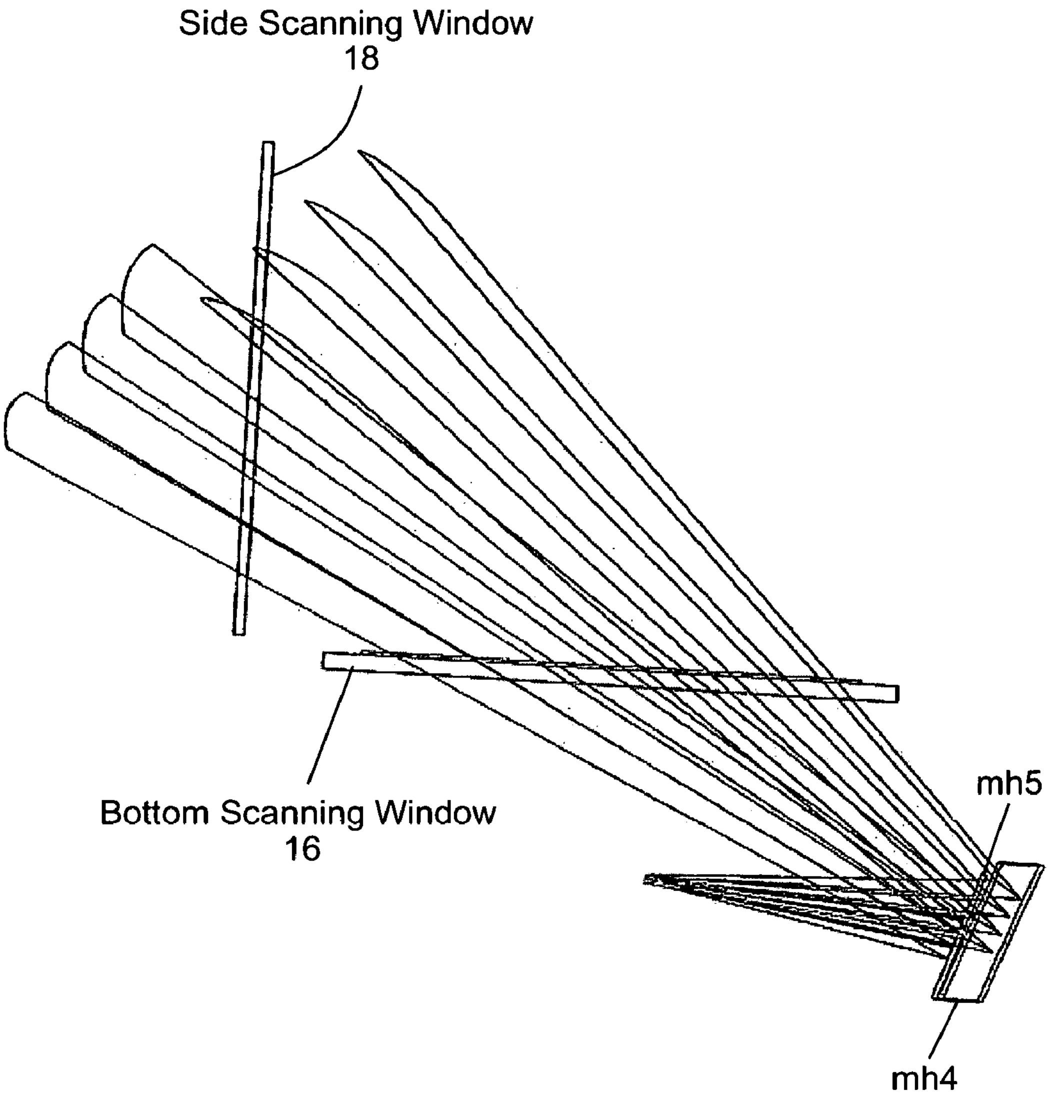
FIG. 3F2

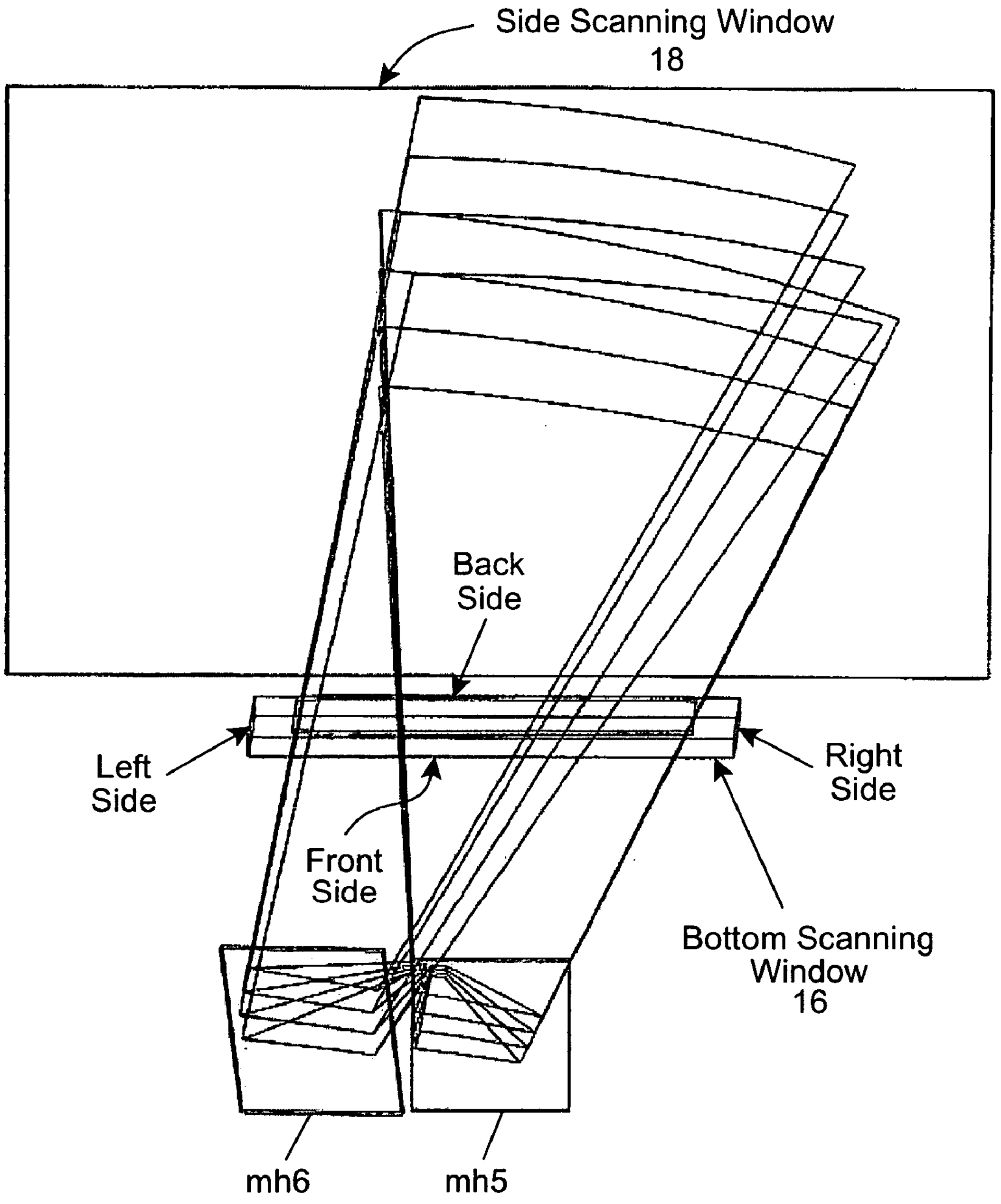
FIG. 4B1

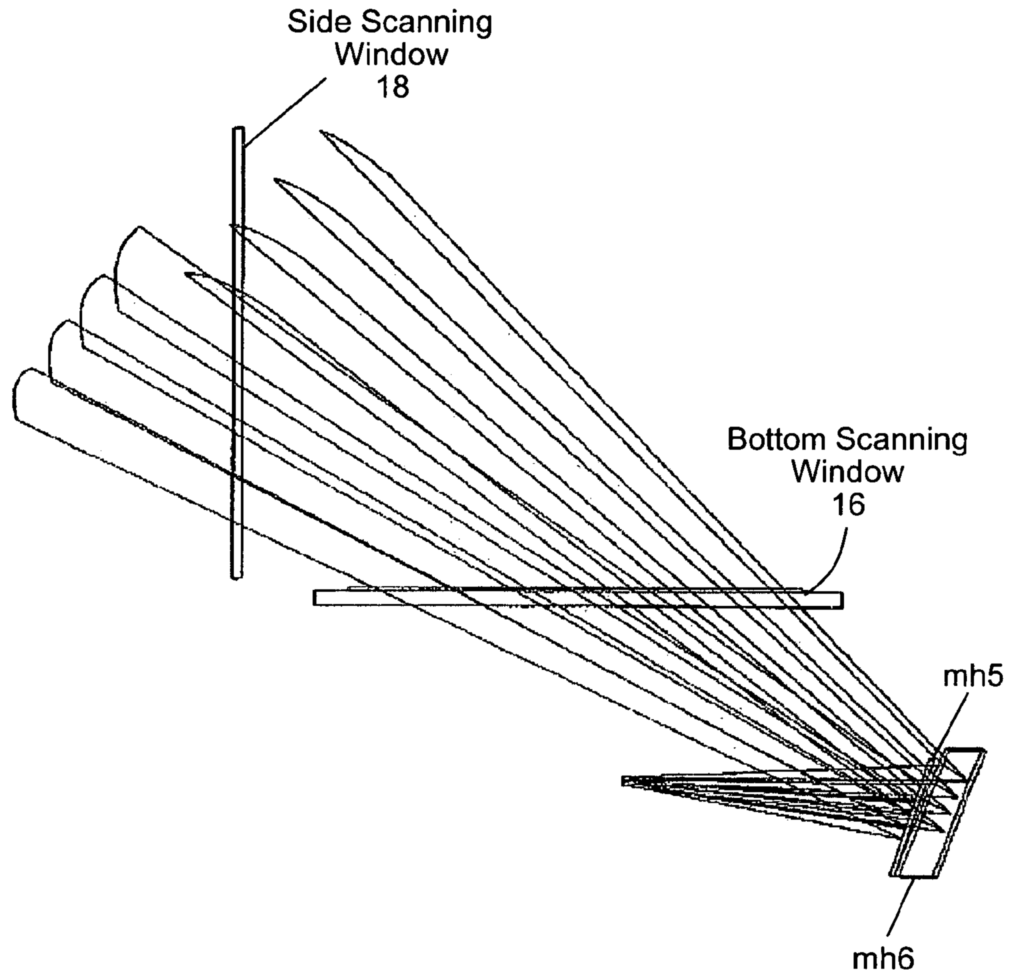
FIG. 4B2

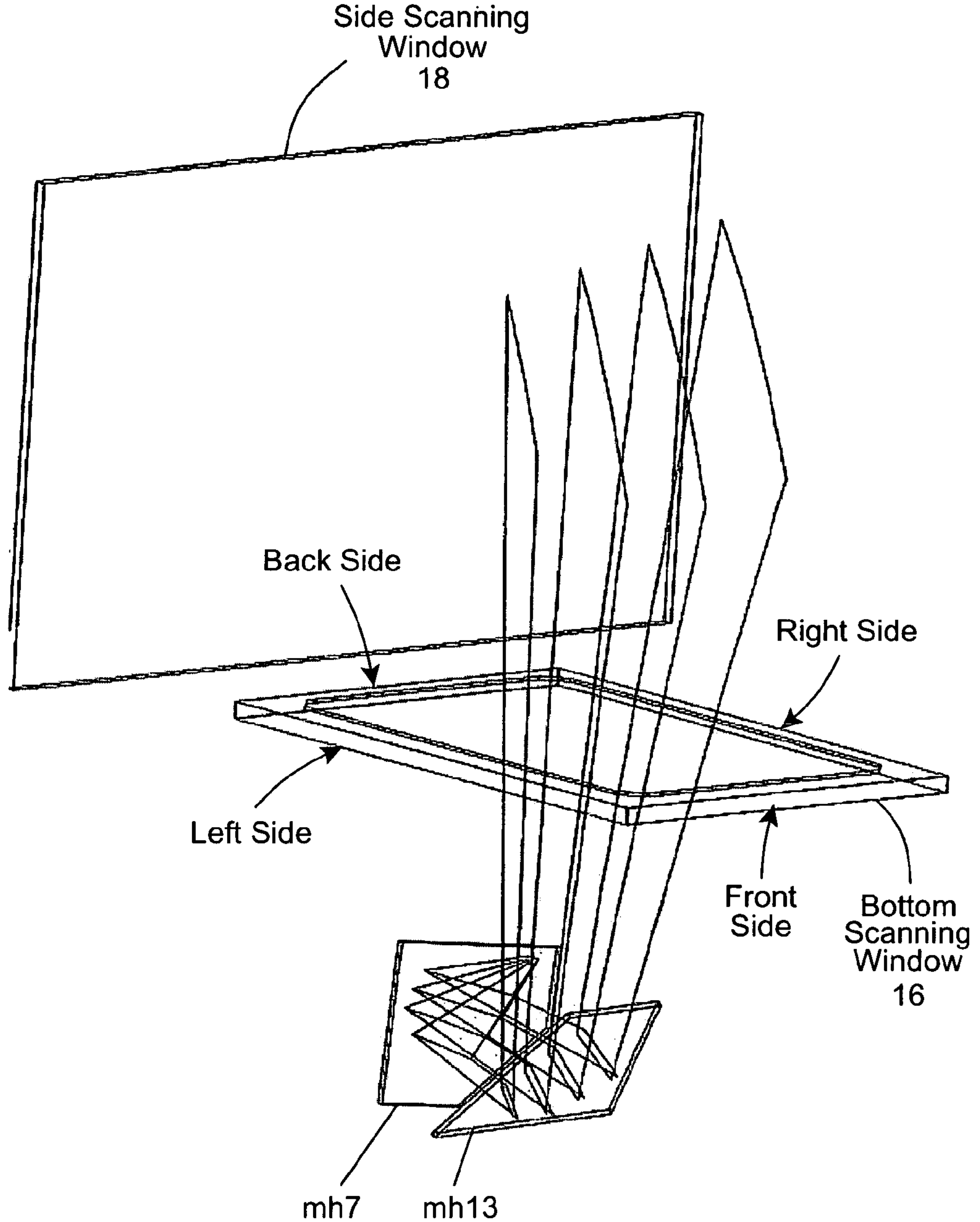
FIG. 4C1

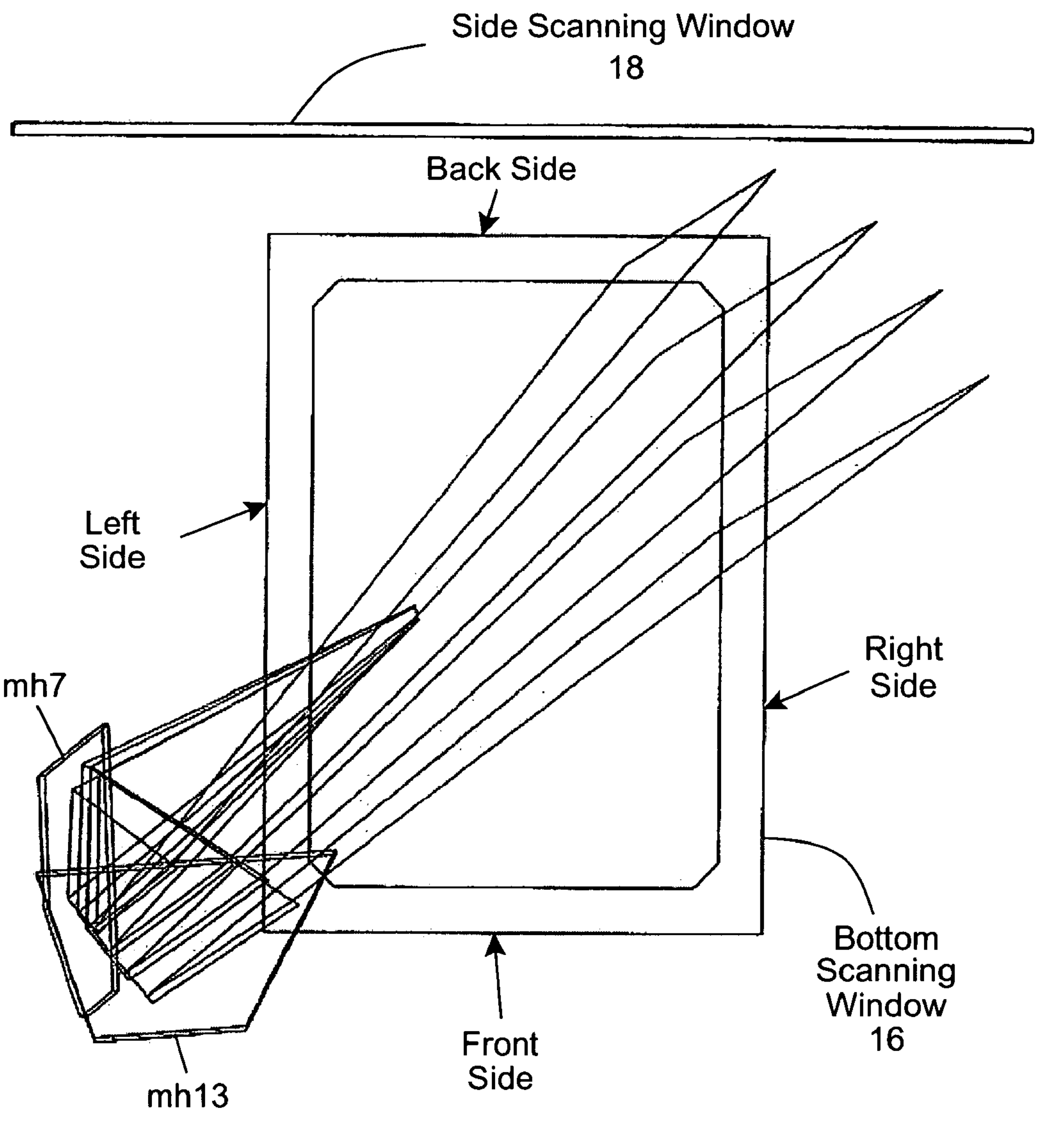
FIG. 4C2

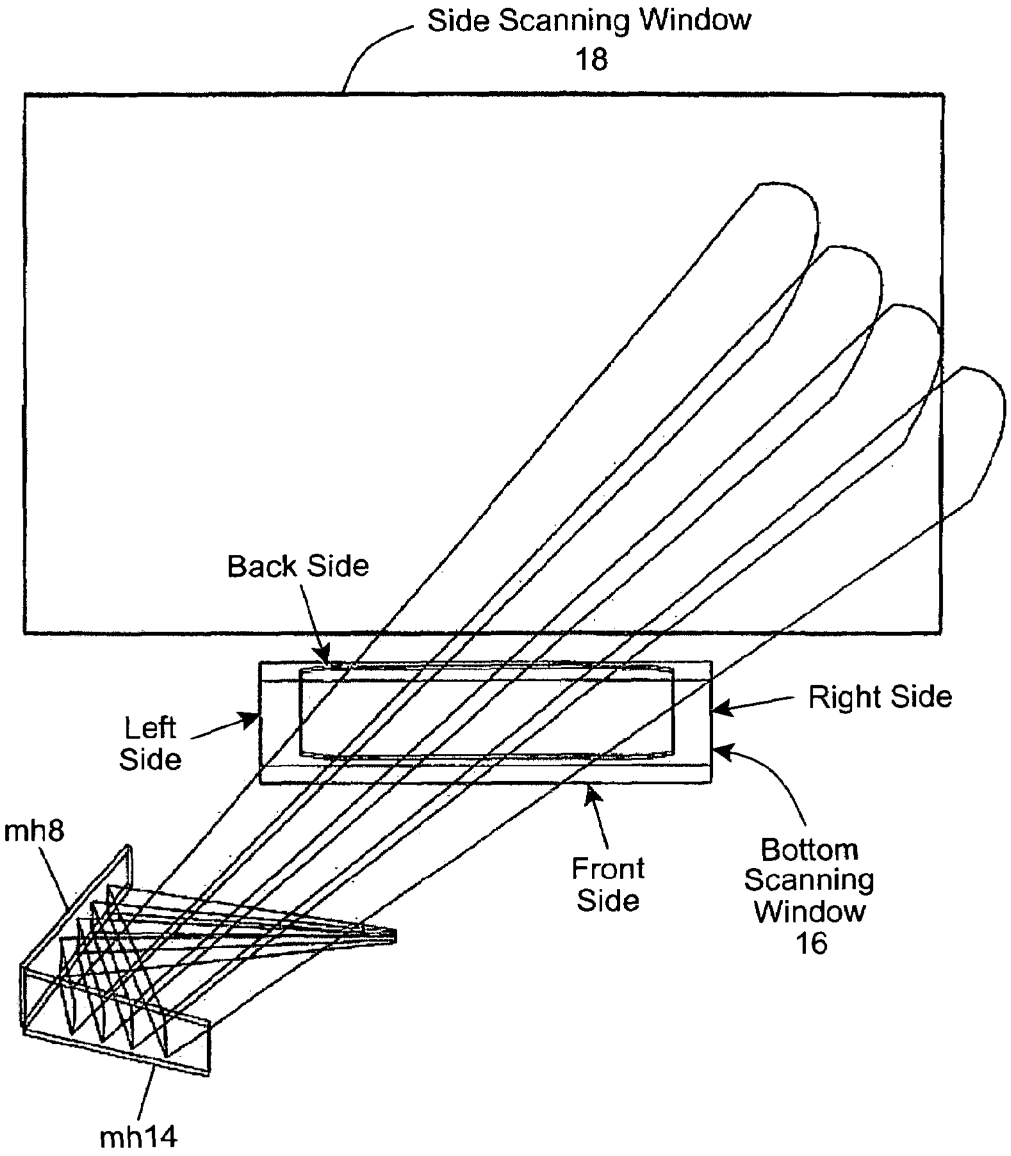
FIG. 4D1

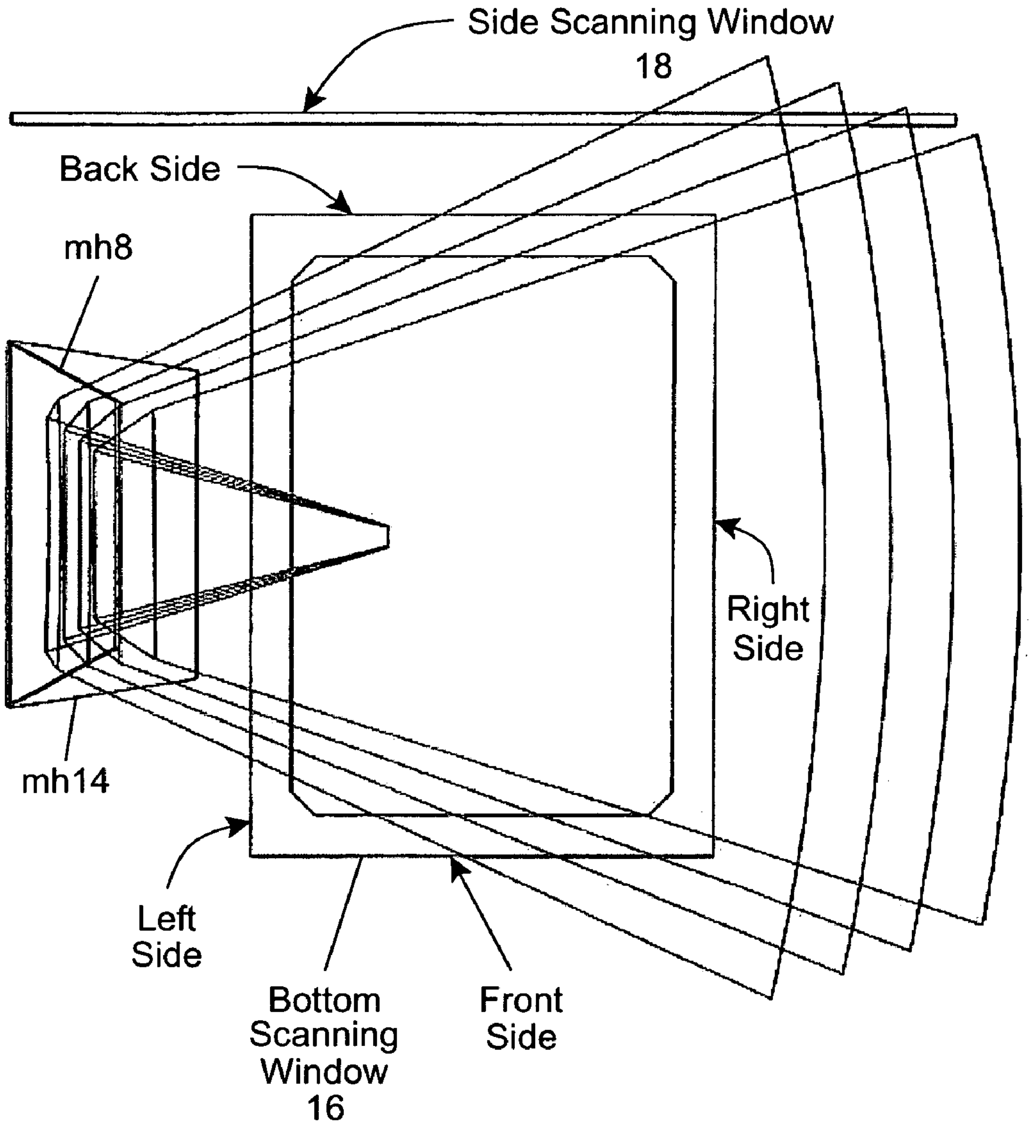
FIG. 4D2

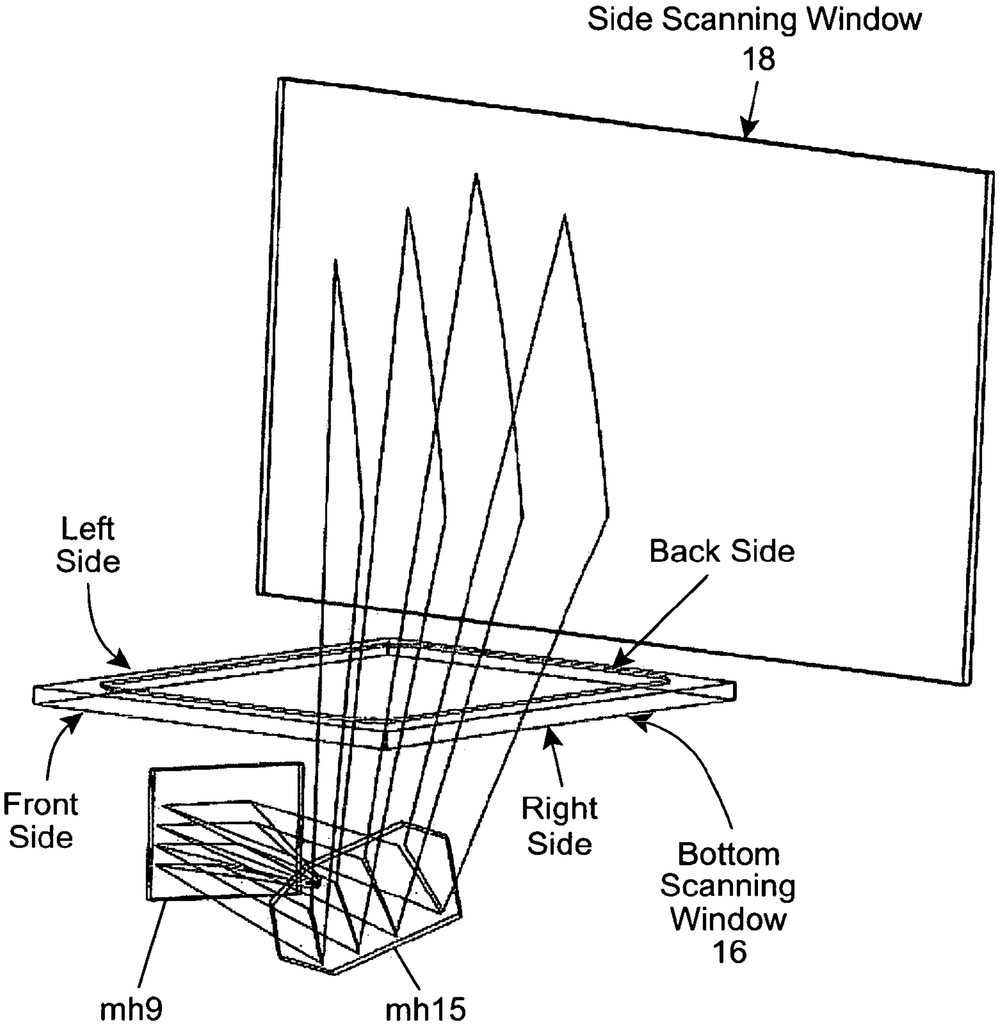
FIG. 4E1

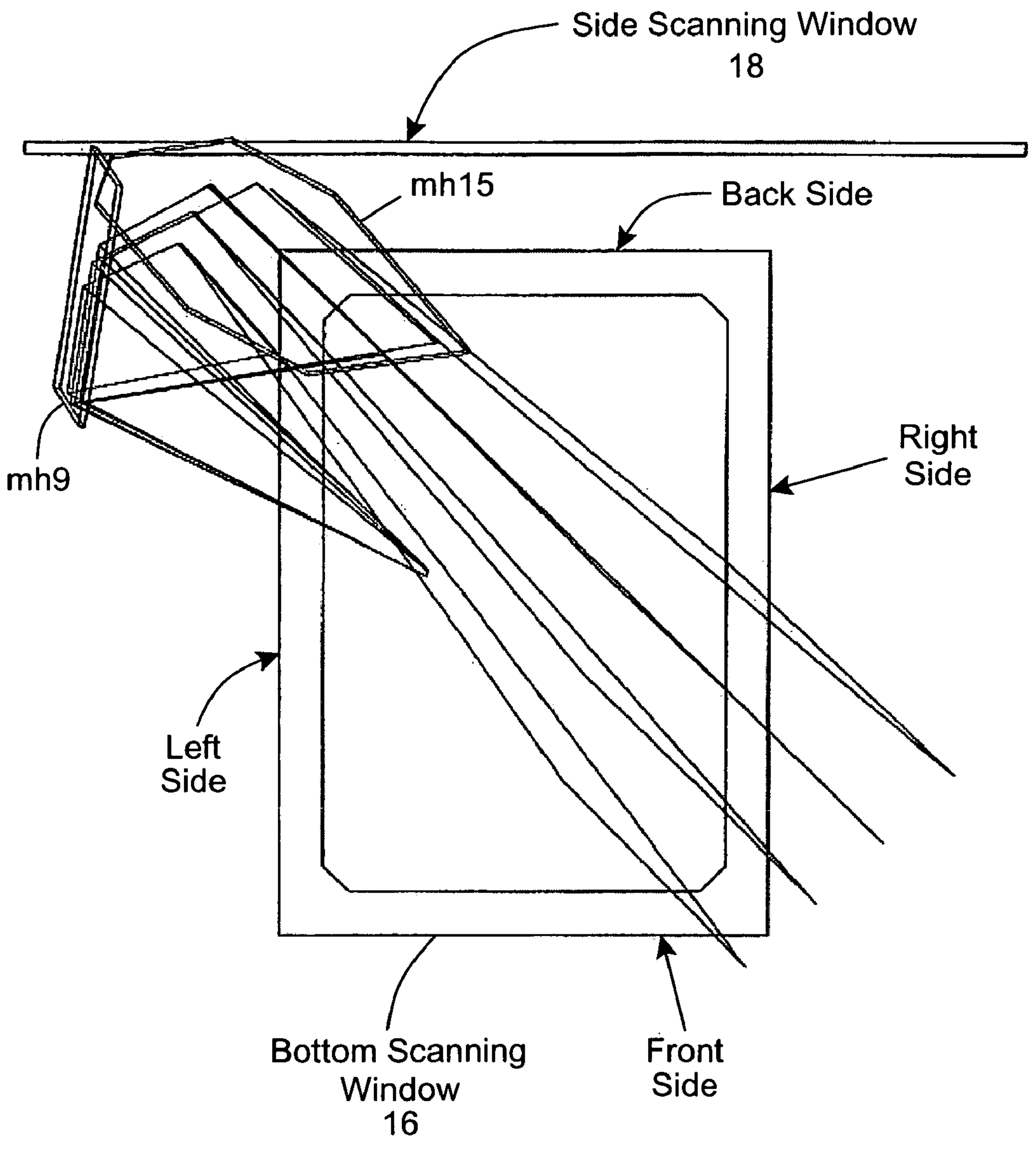
FIG. 4E2

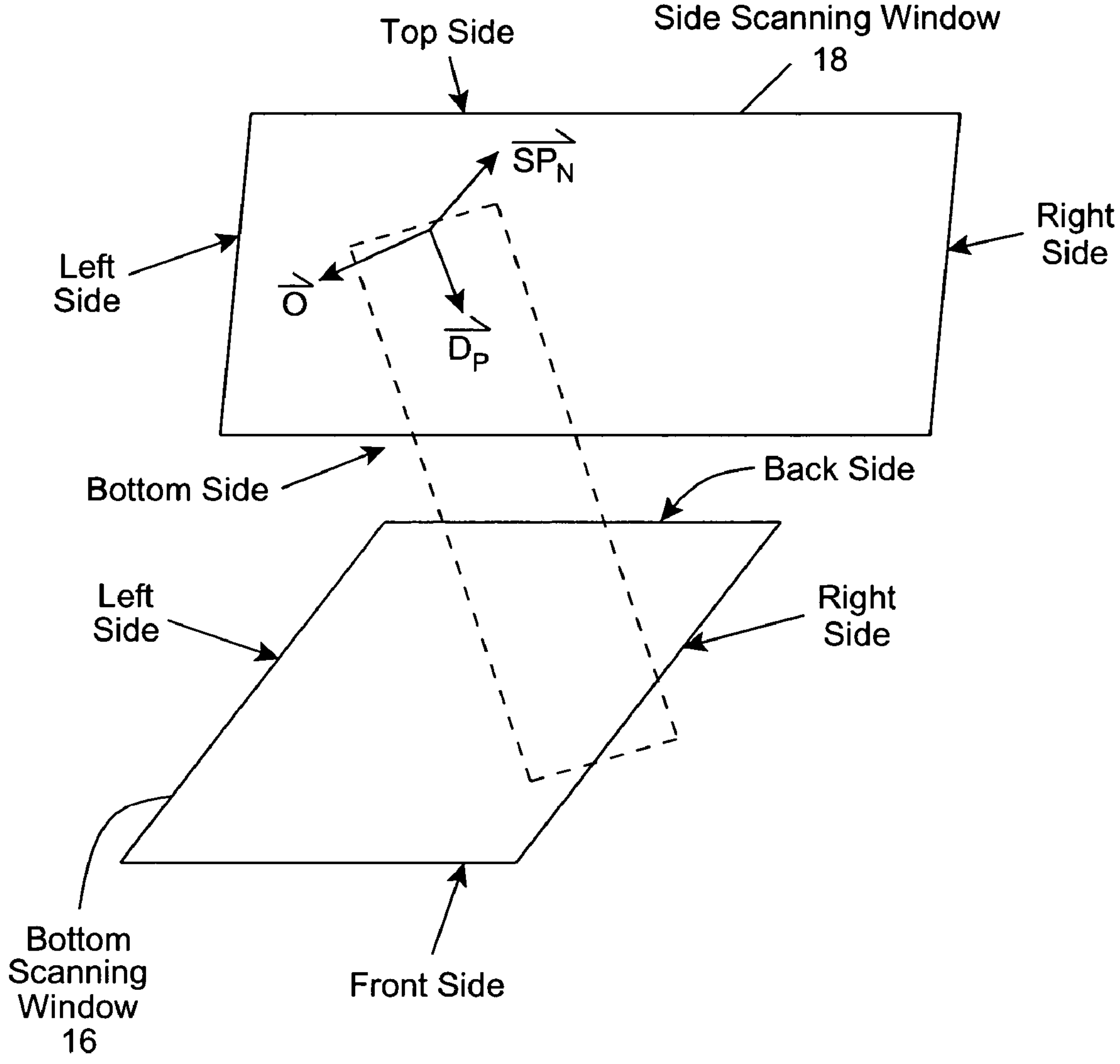
FIG. 5B1

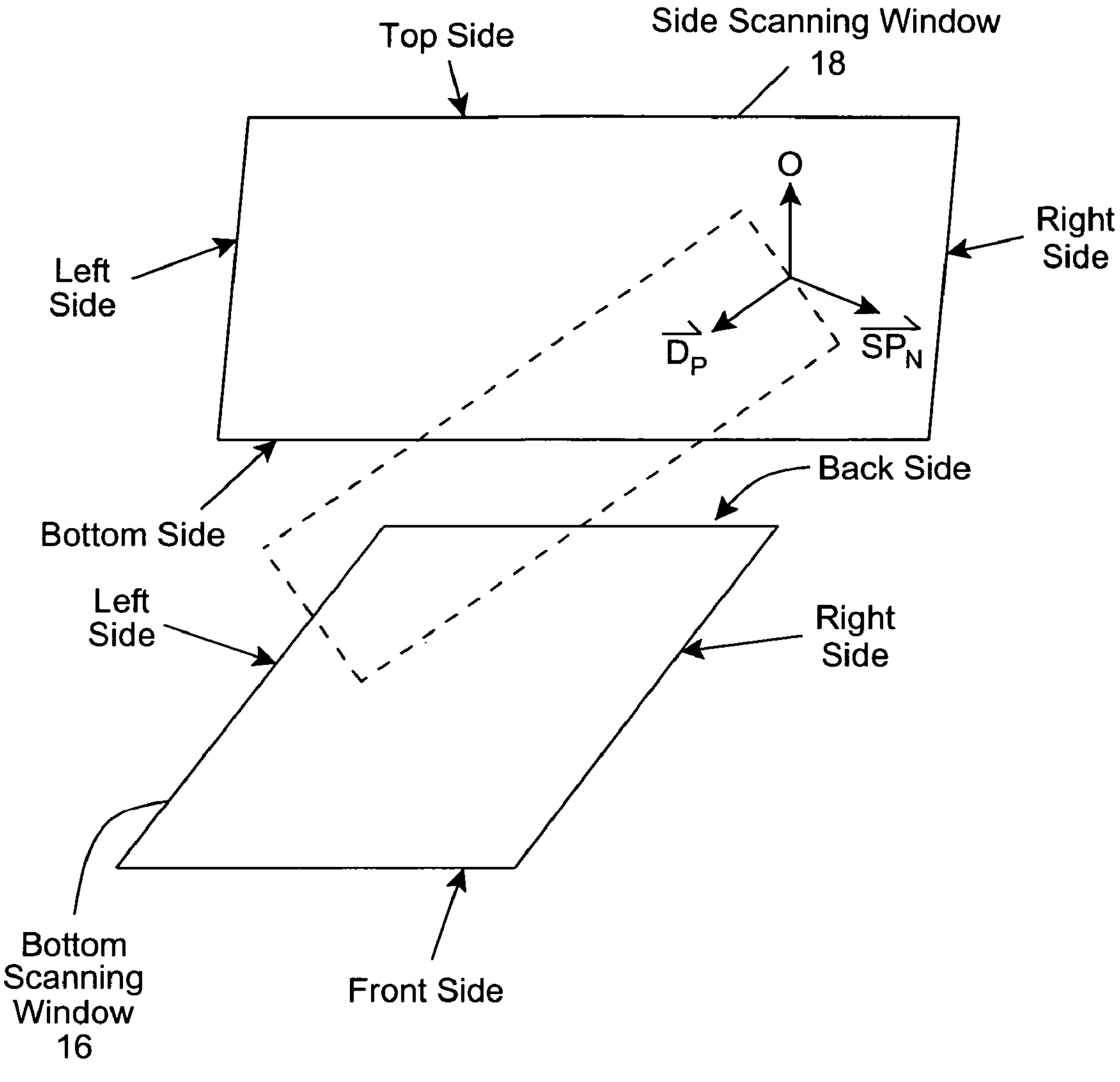
FIG. 5B2

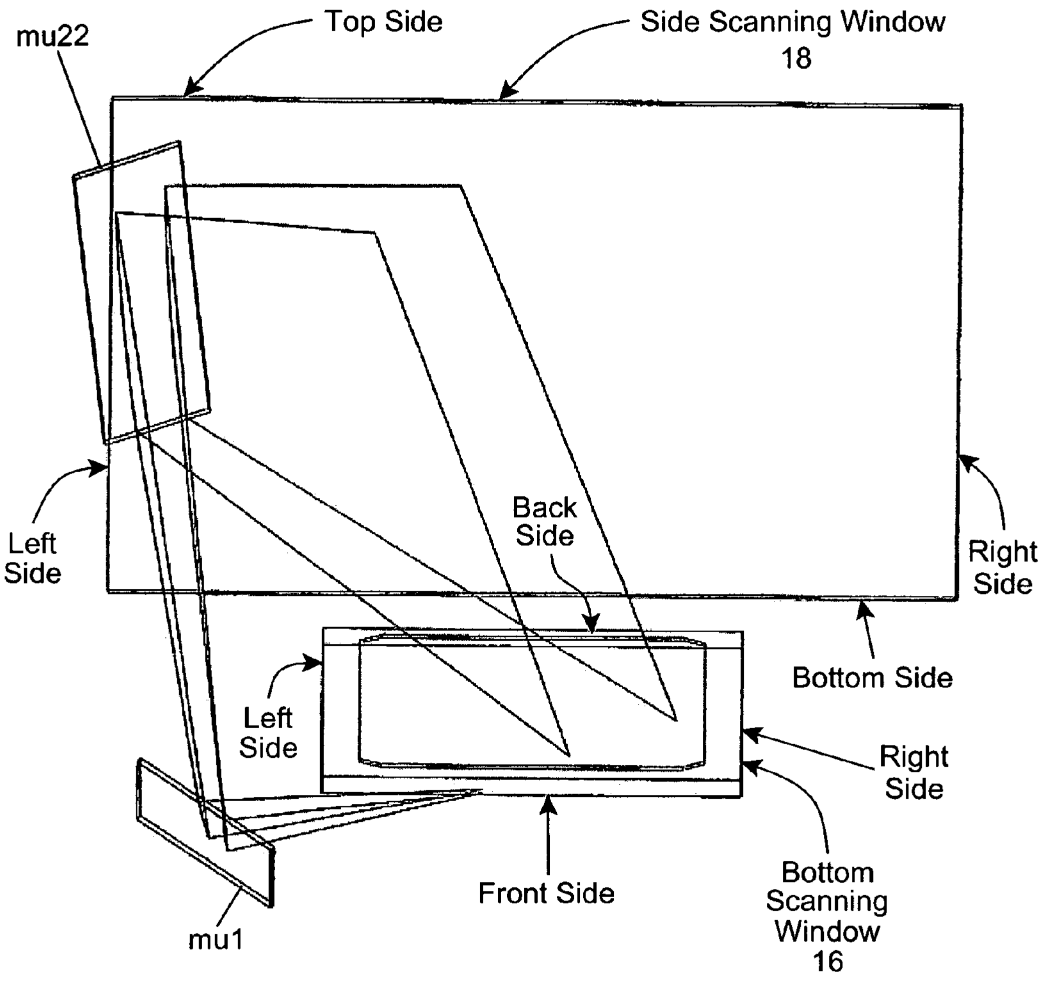
FIG. 5C1

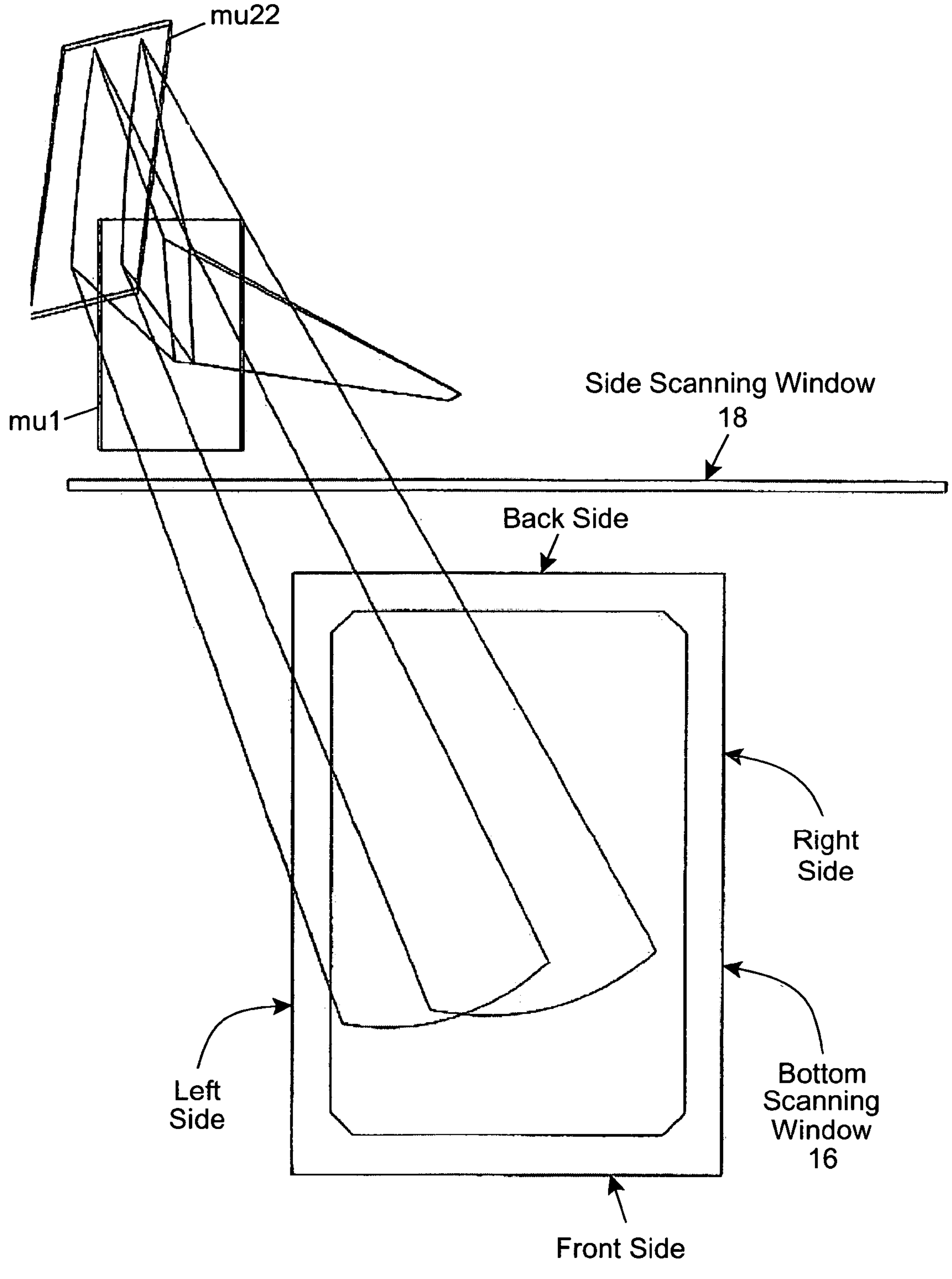
FIG. 5C2

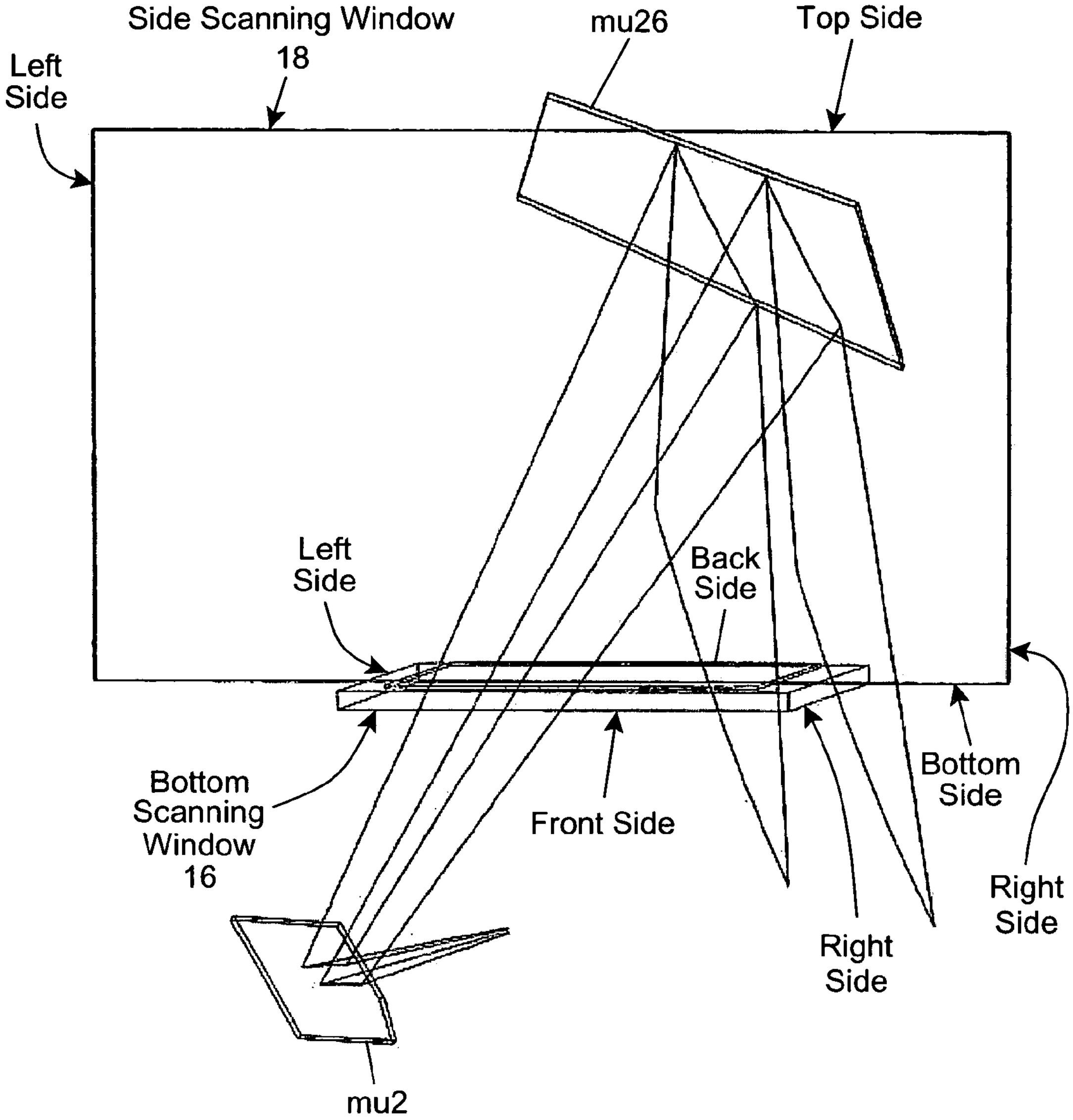
FIG. 5D1

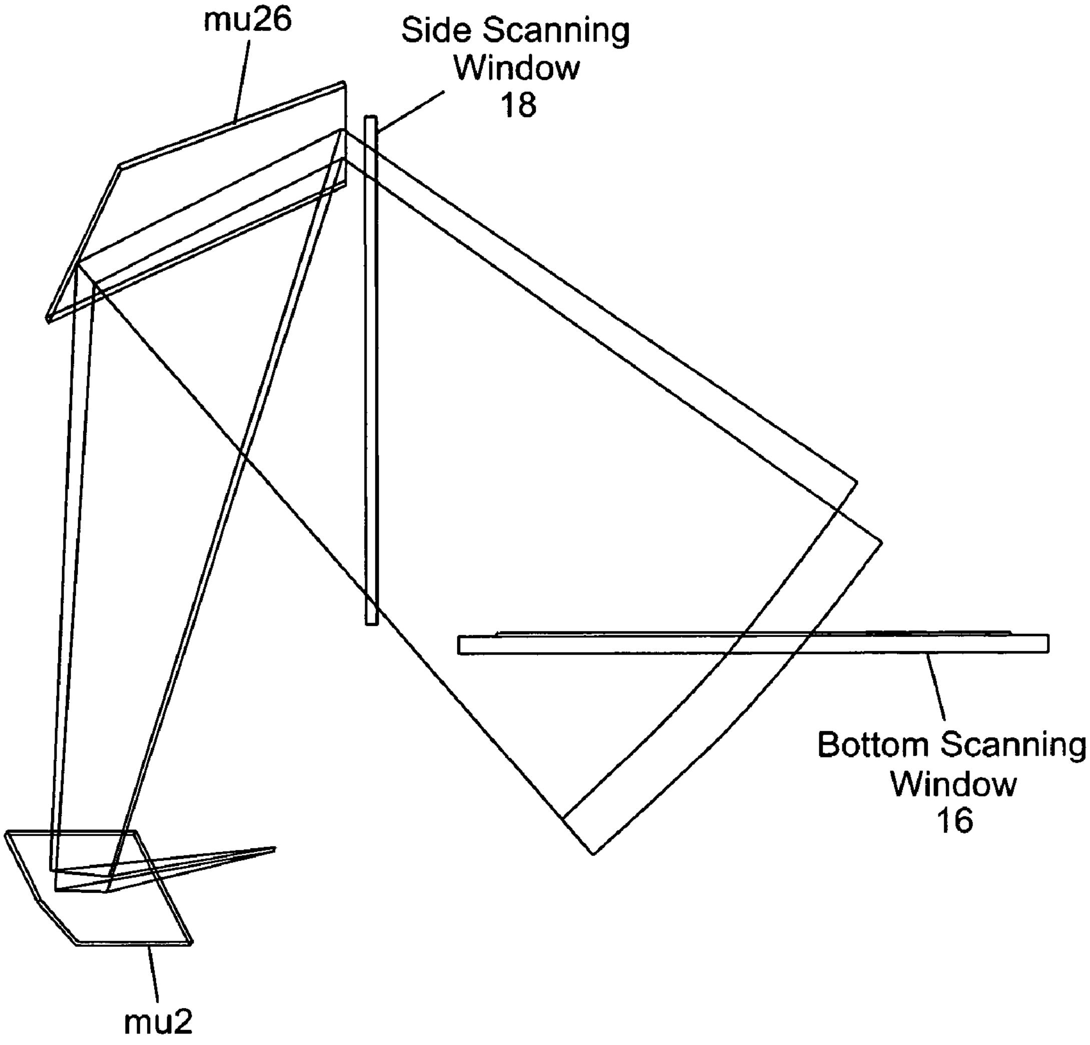
FIG. 5D2

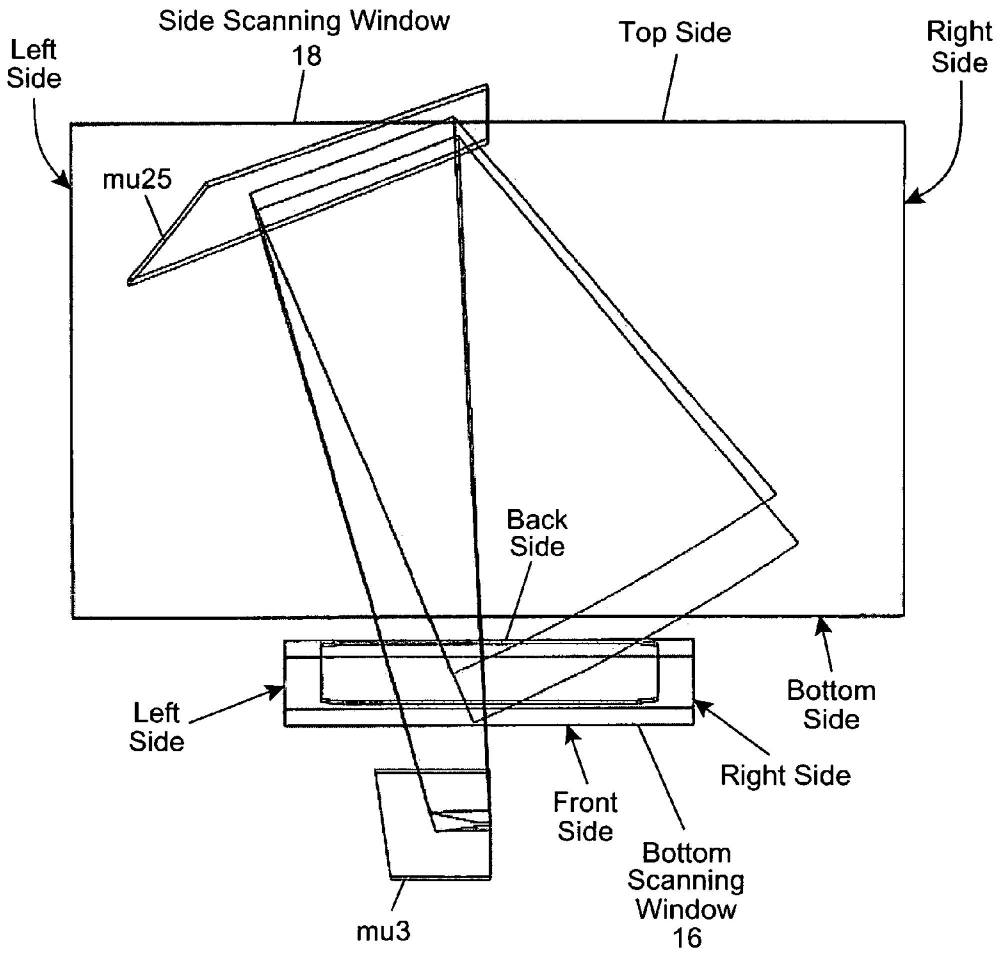
FIG. 5E1

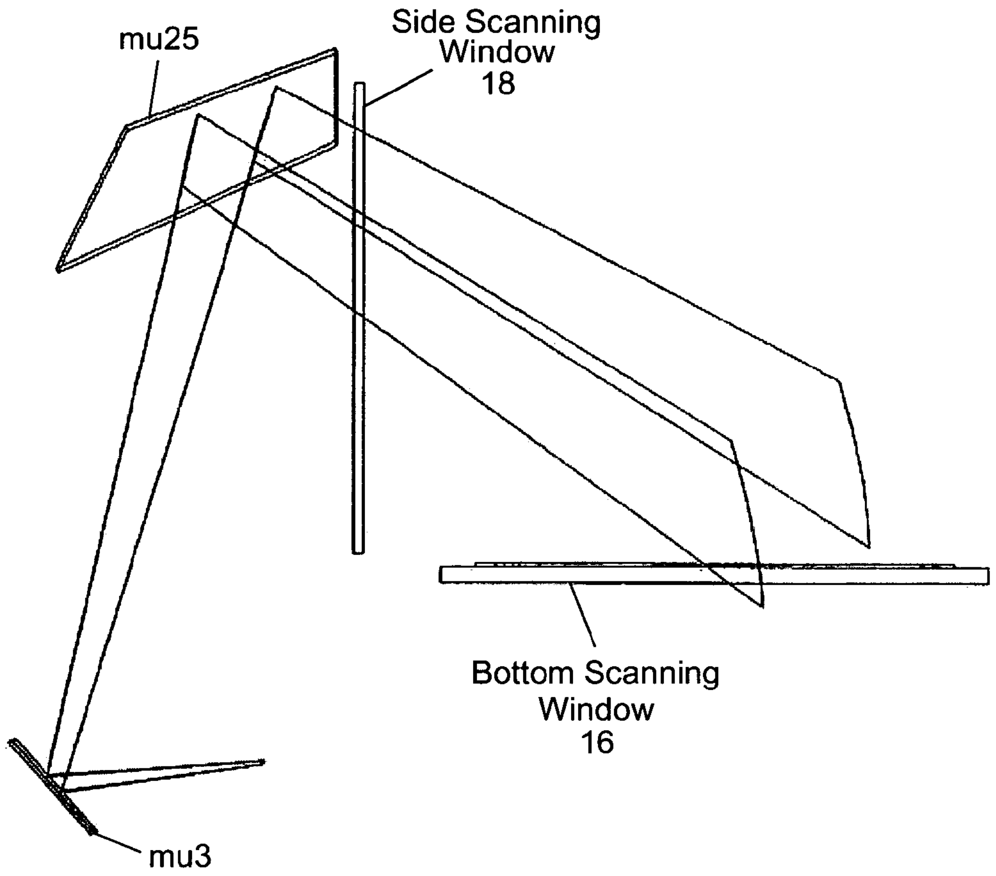
FIG. 5E2

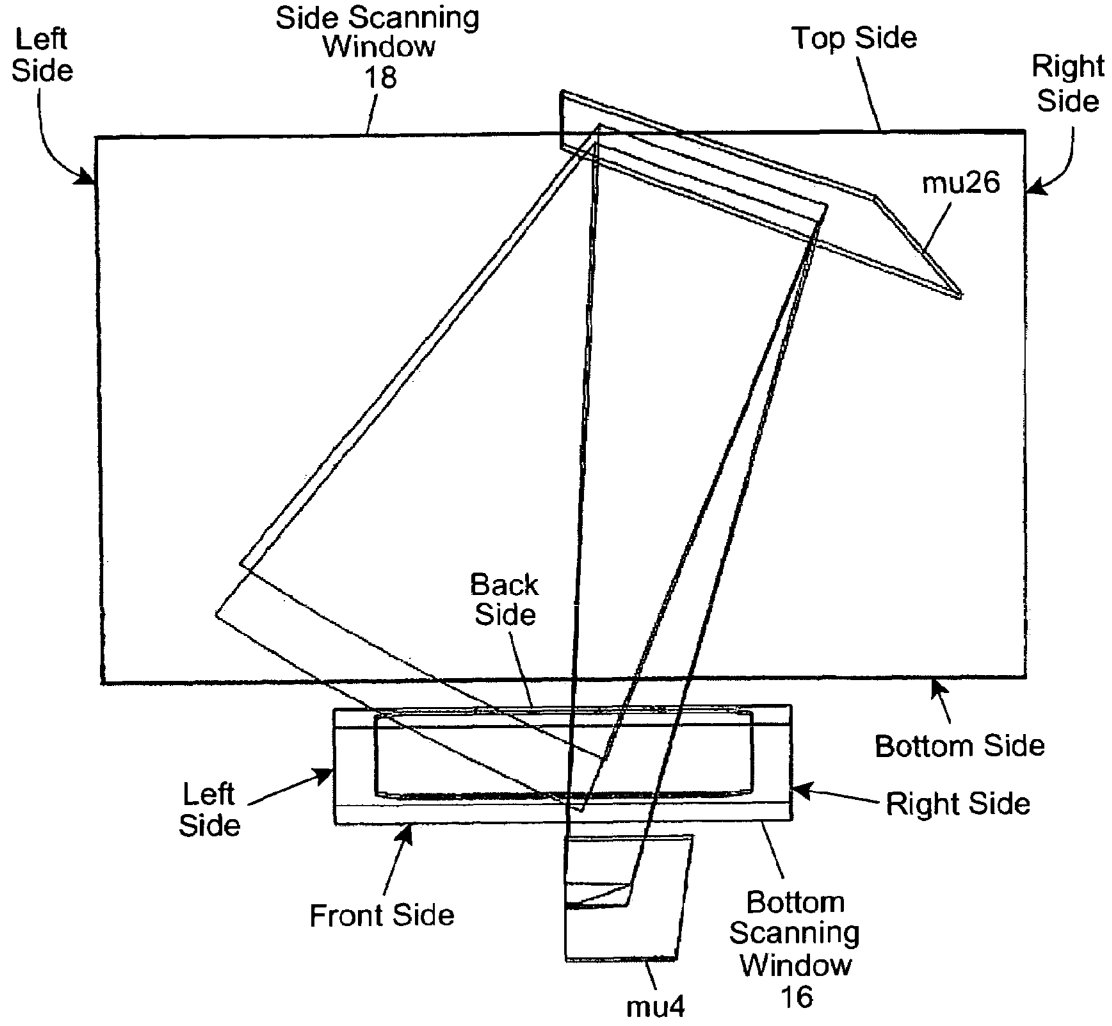
FIG. 5F1

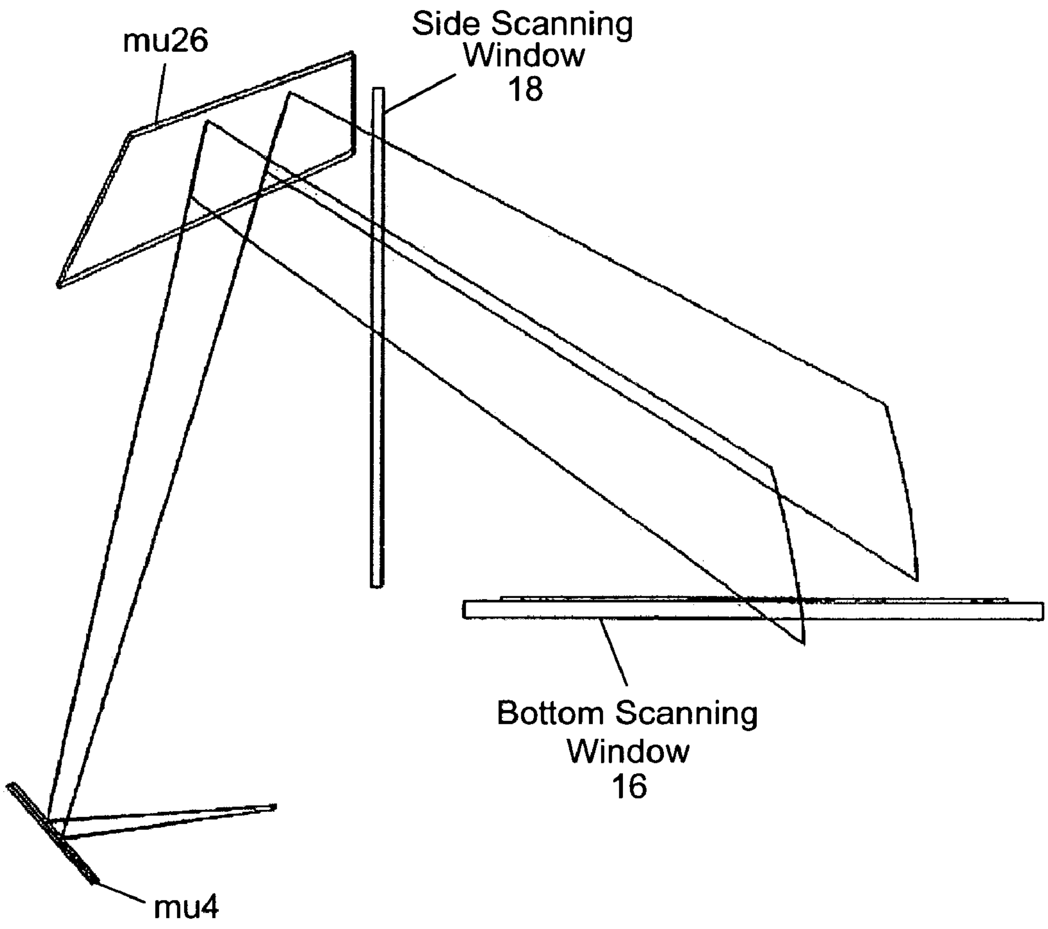
FIG. 5F2

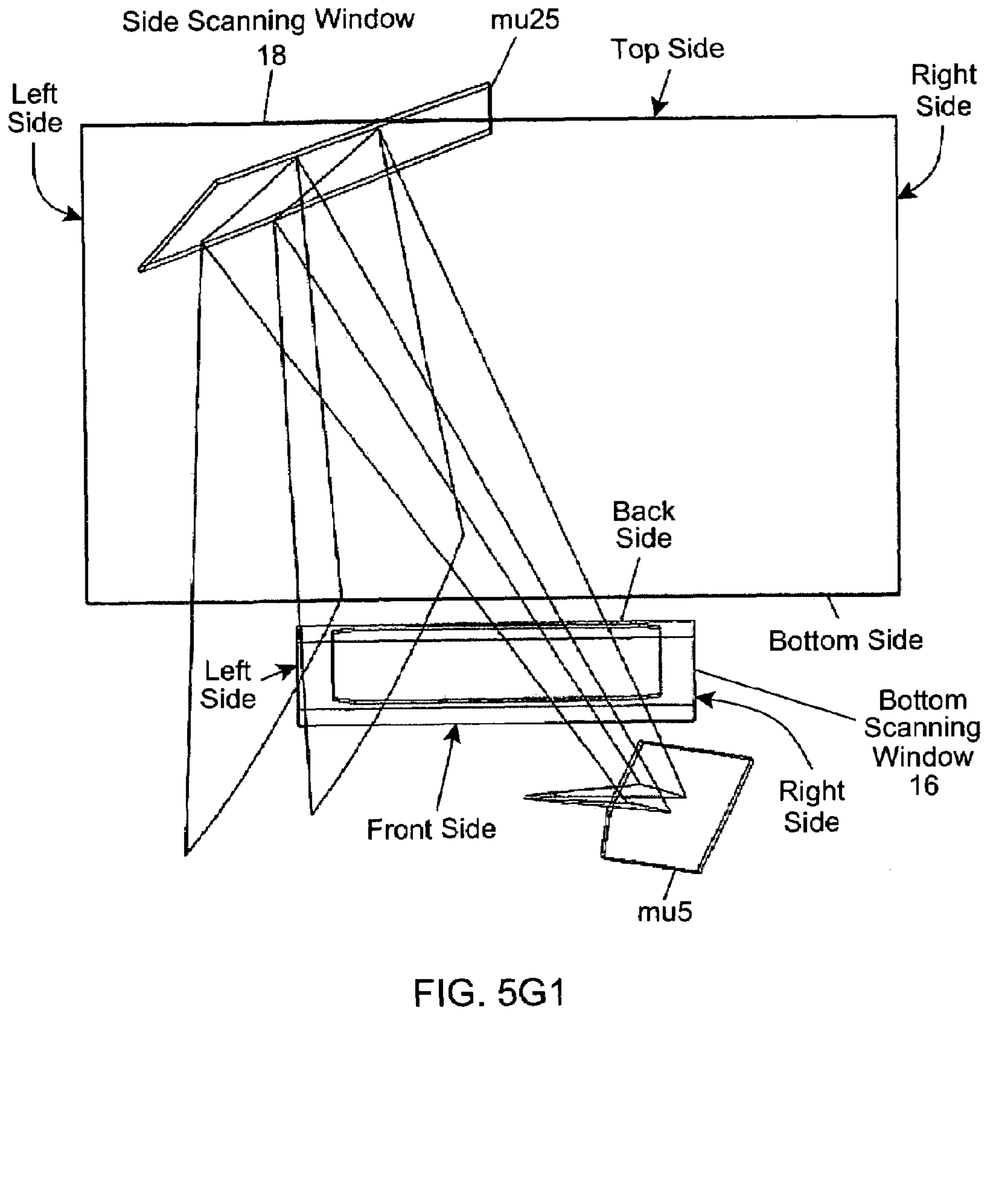
FIG. 5G1

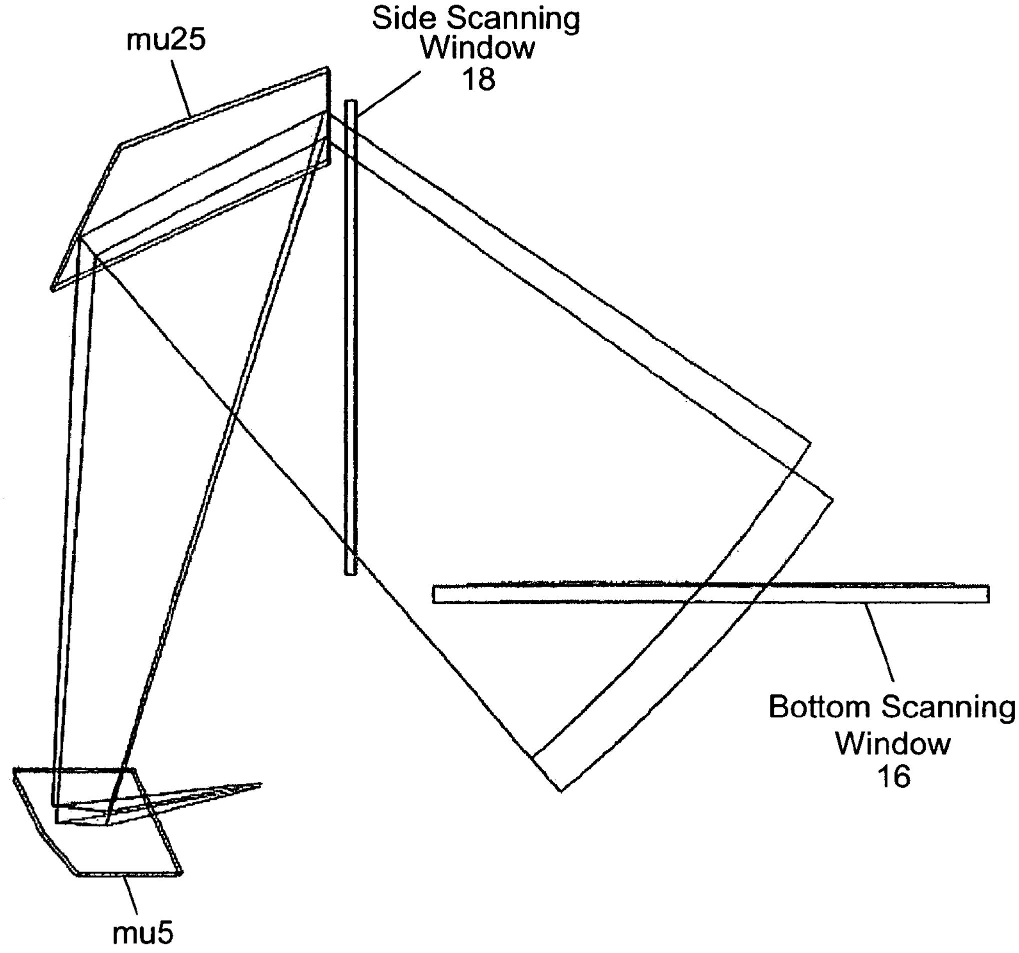
FIG. 5G2

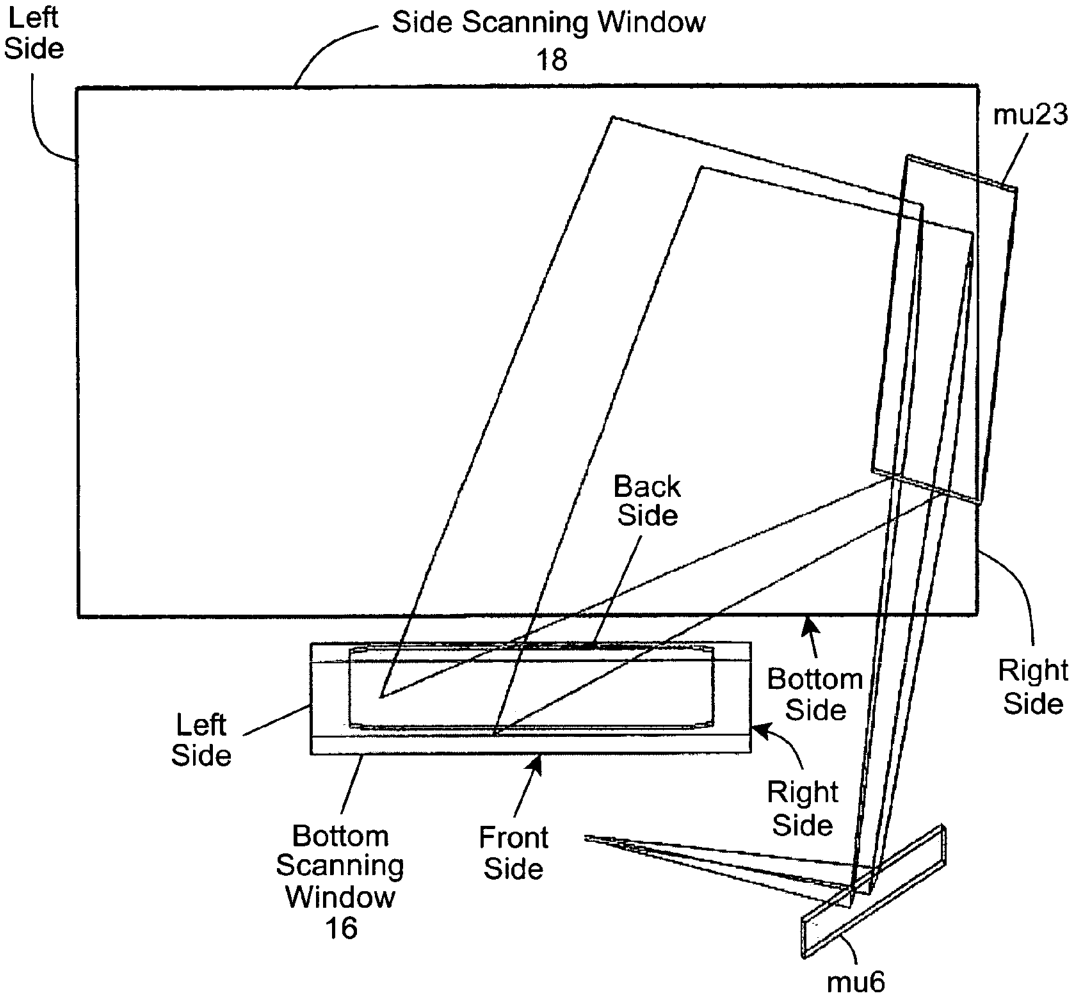
FIG. 5H1

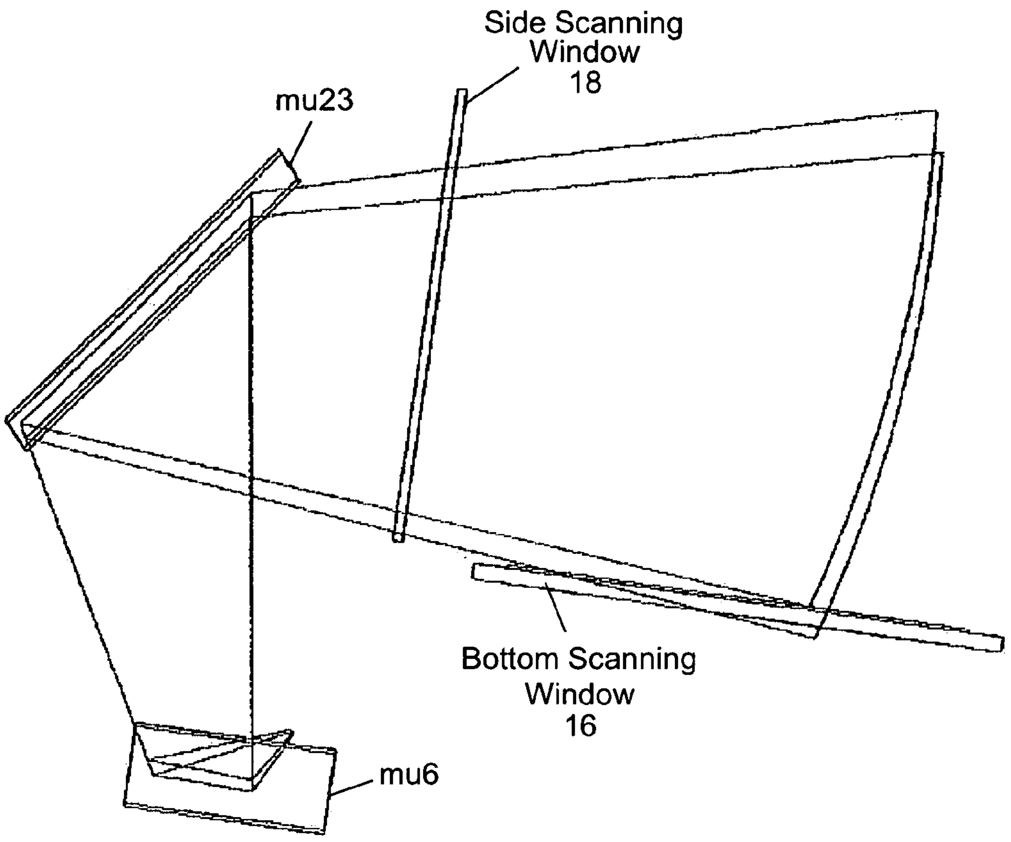
FIG. 5H2

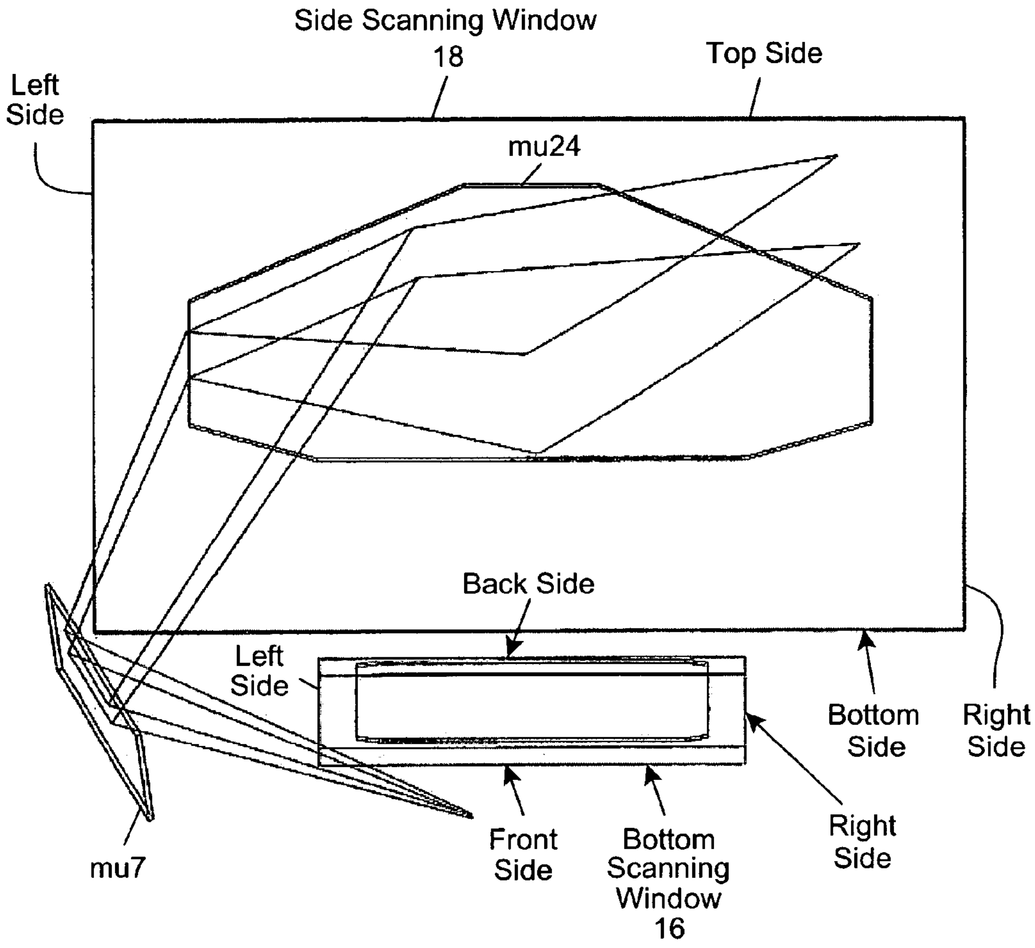
FIG. 5I1

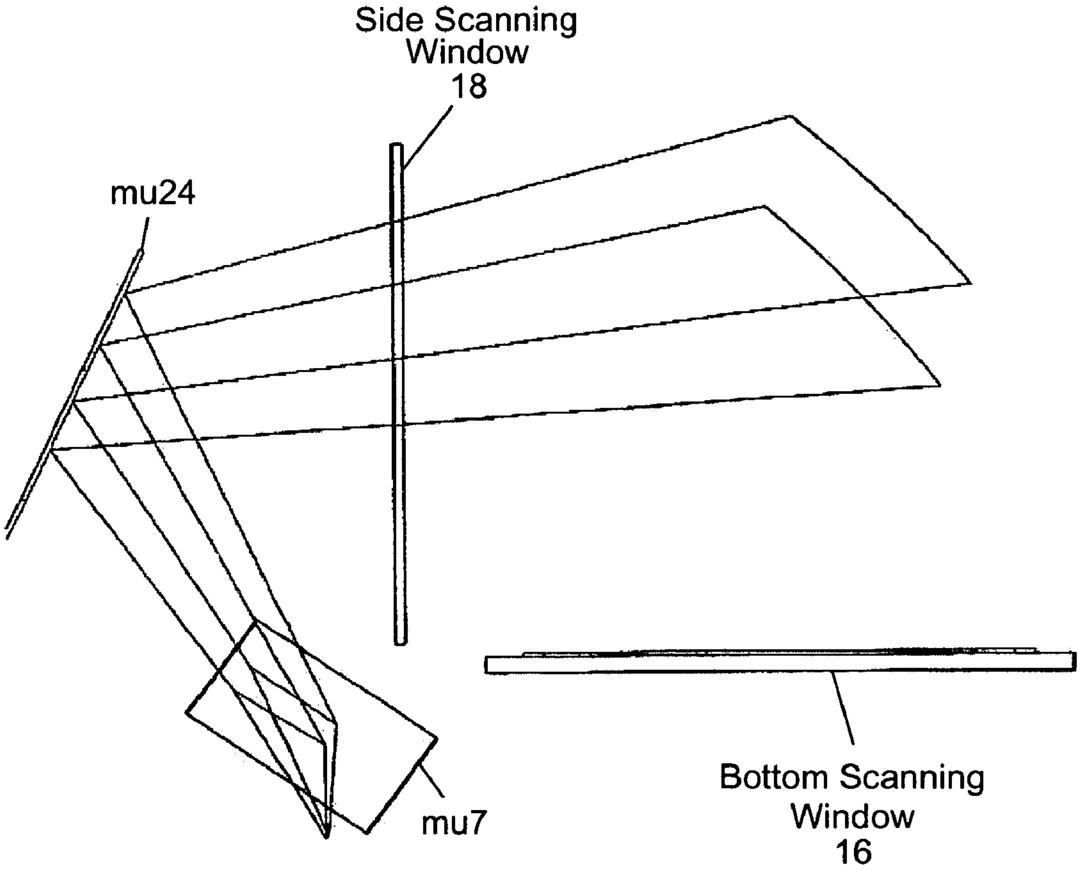
FIG. 5I2

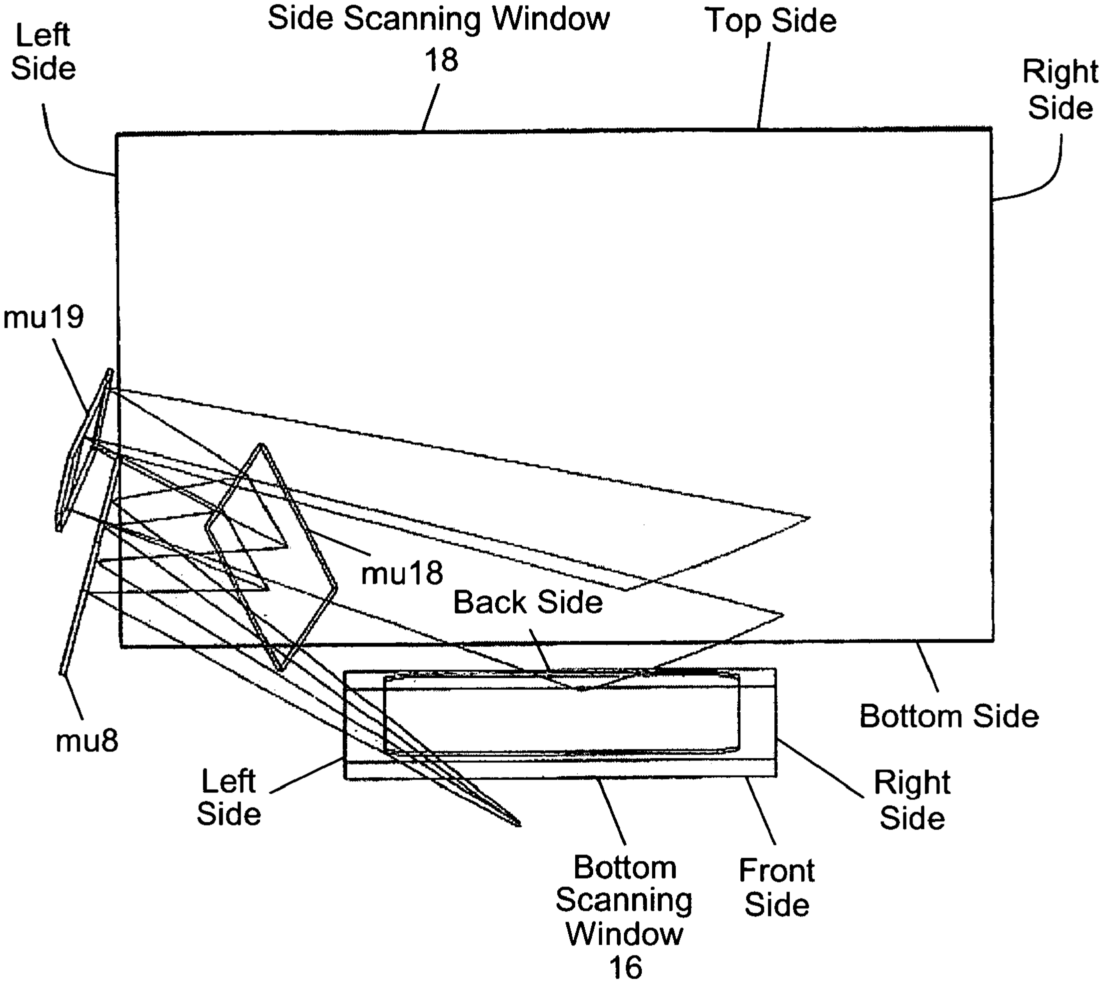
FIG. 5J1

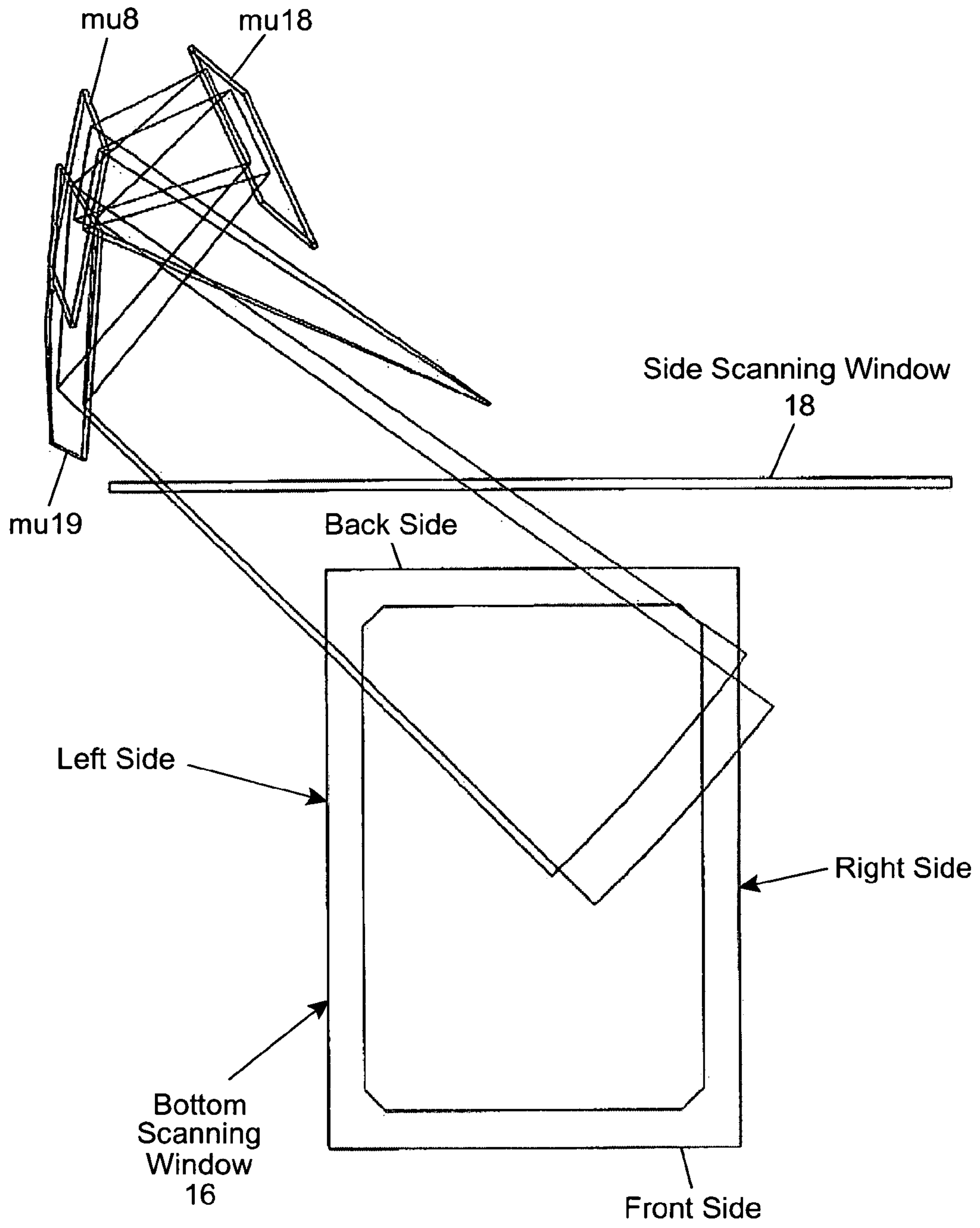
FIG. 5J2

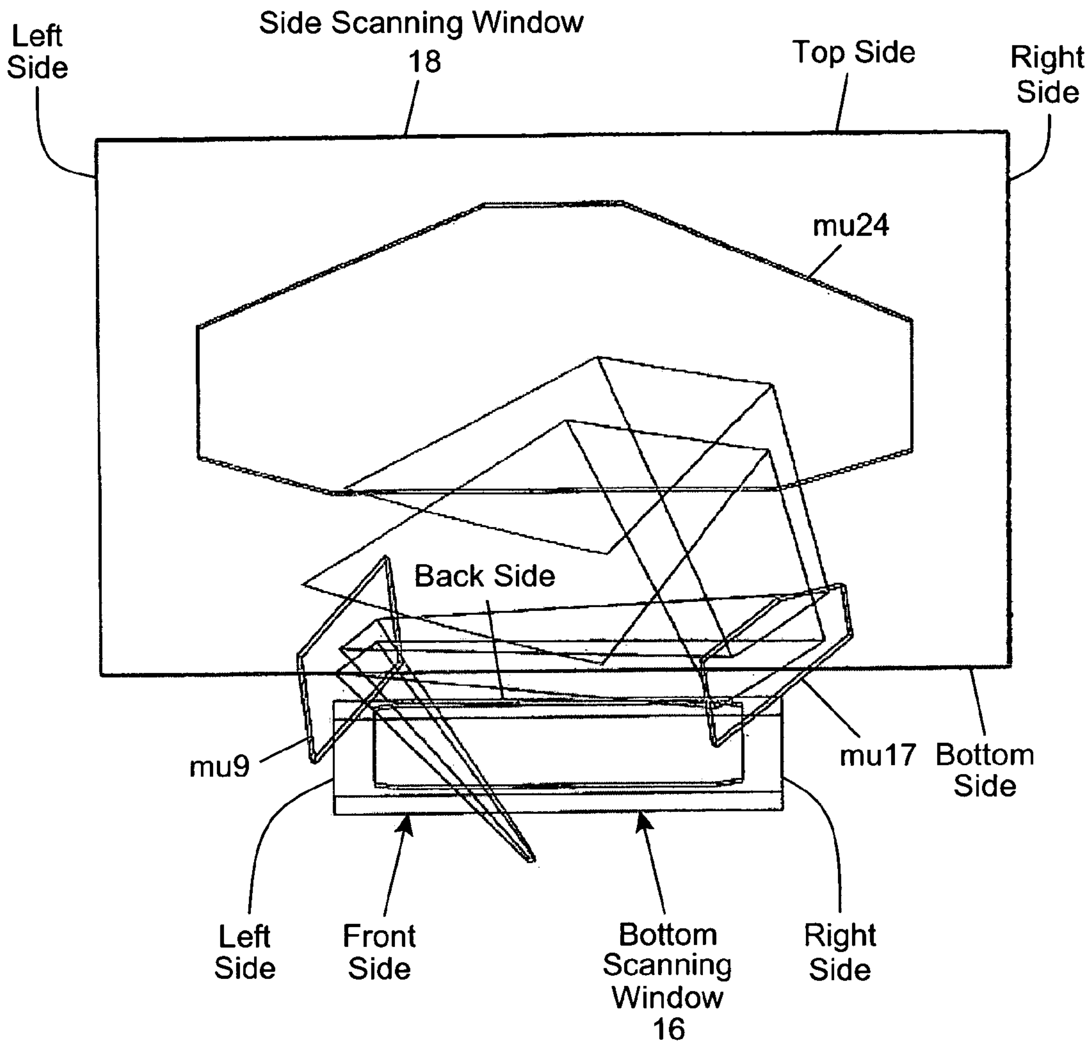
FIG. 5K1

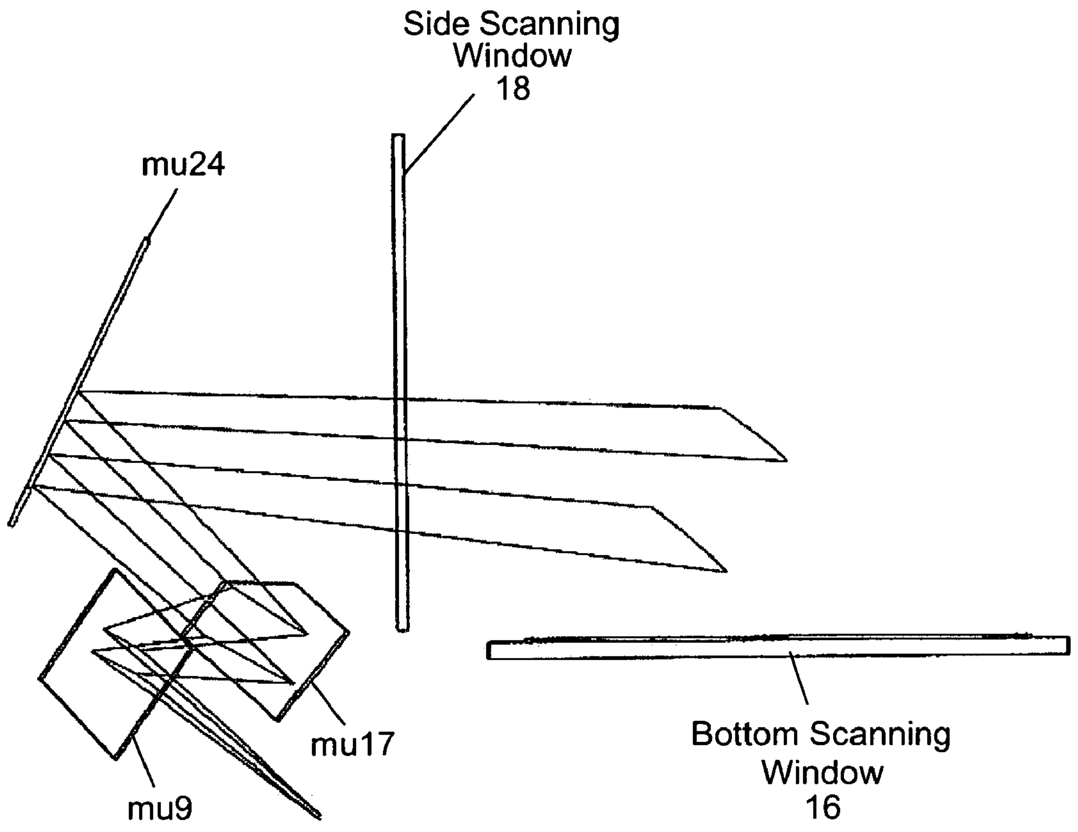
FIG. 5K2

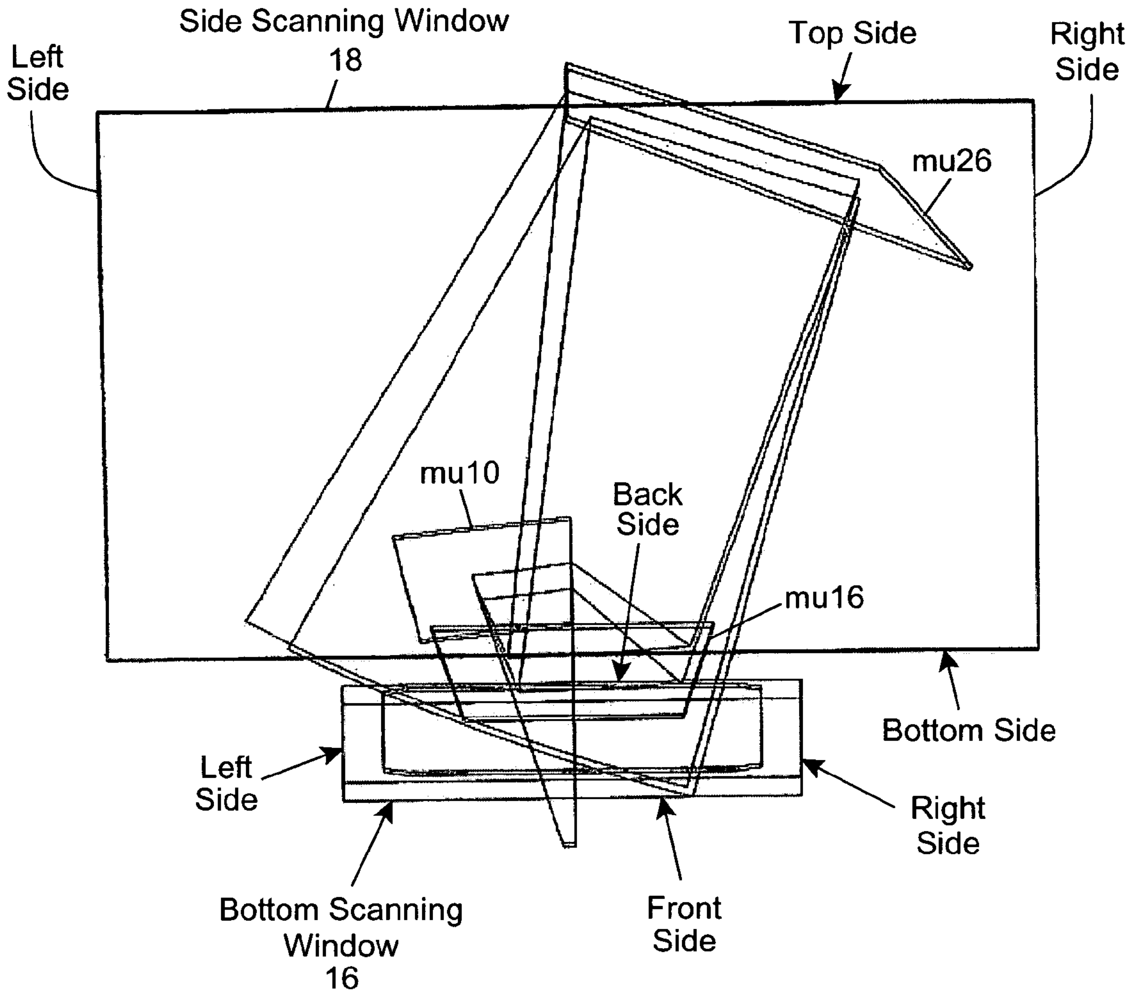
FIG. 5L1

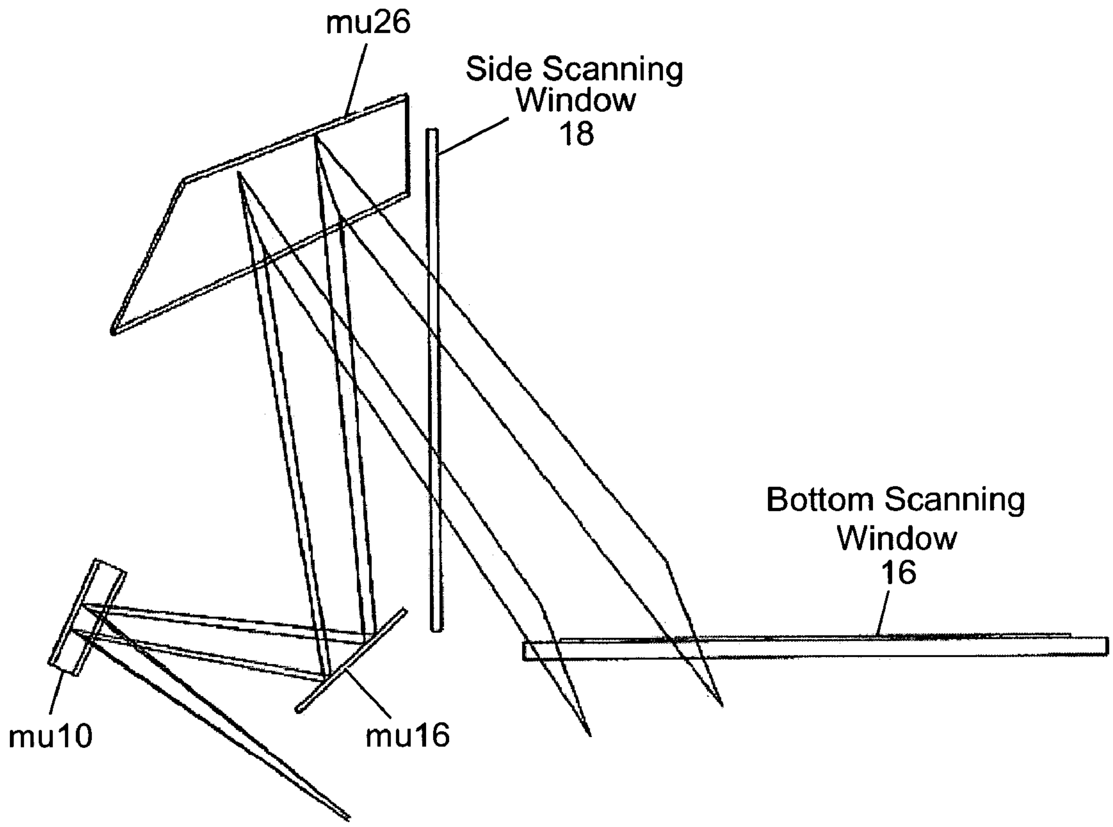
FIG. 5L2

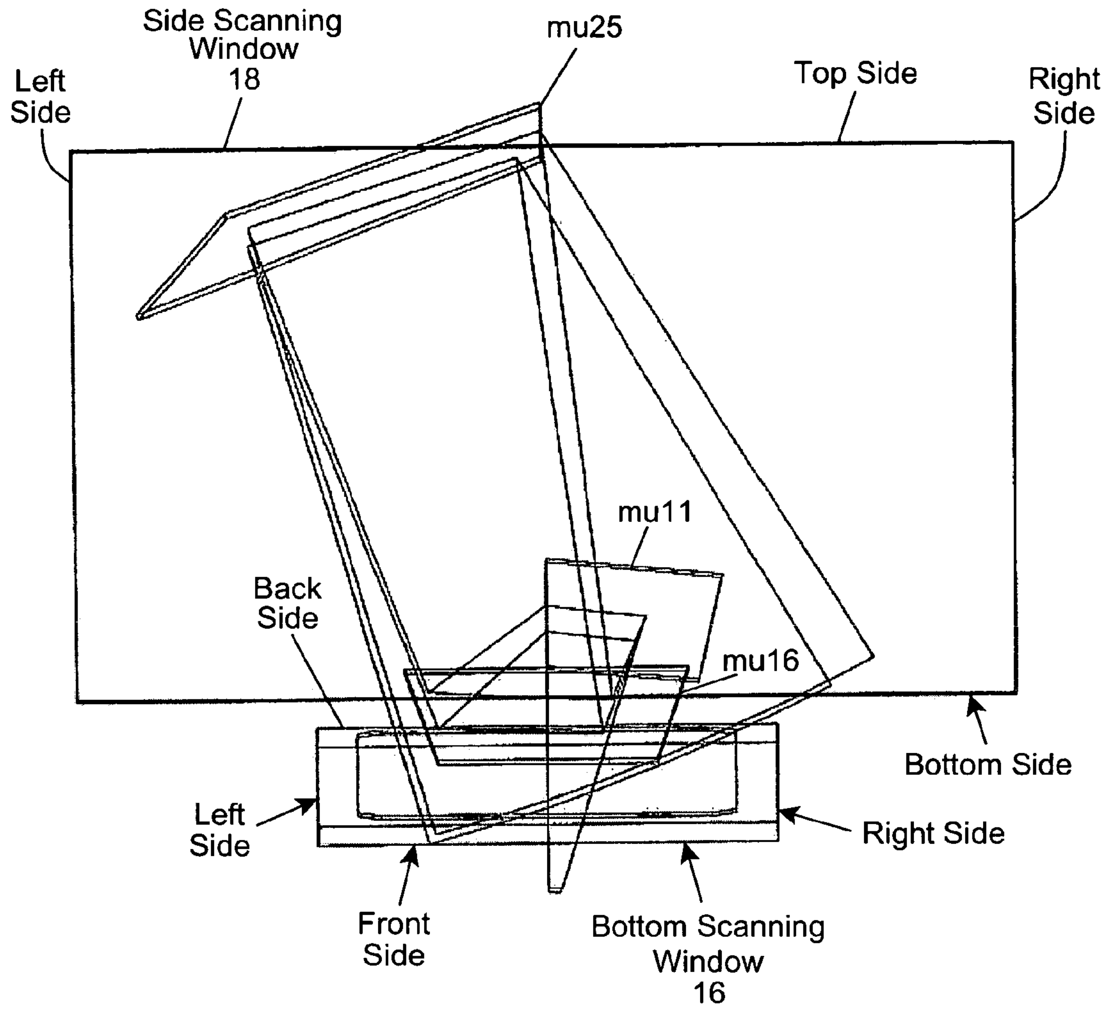
FIG. 5M1

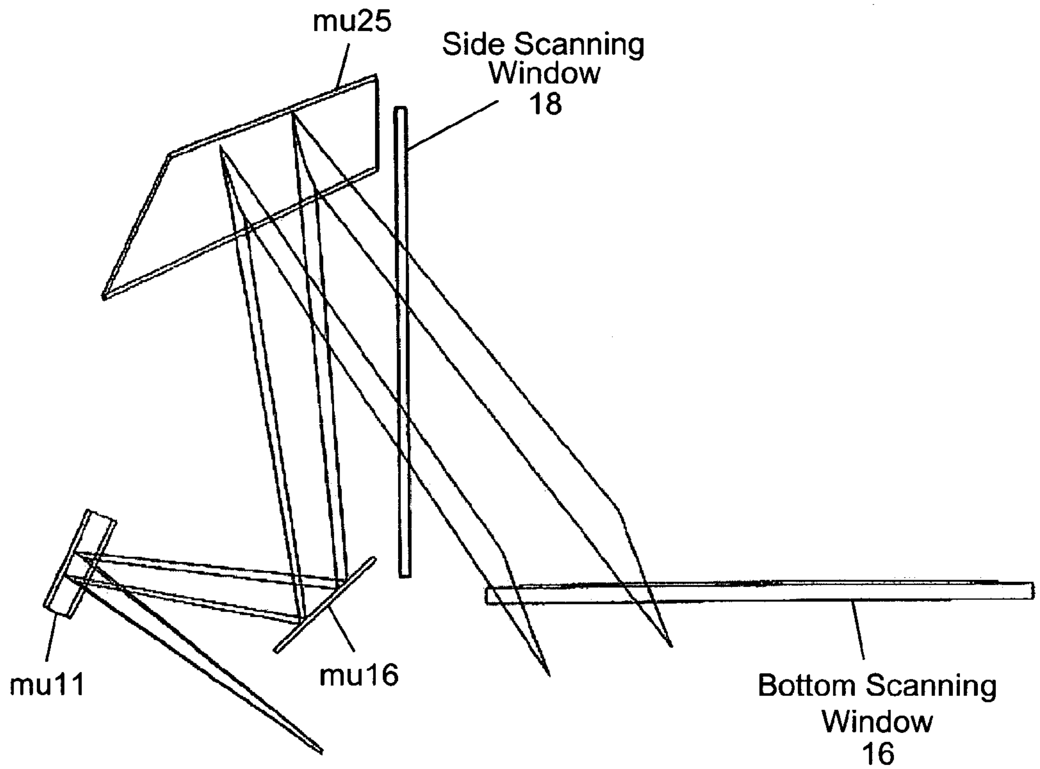
FIG. 5M2

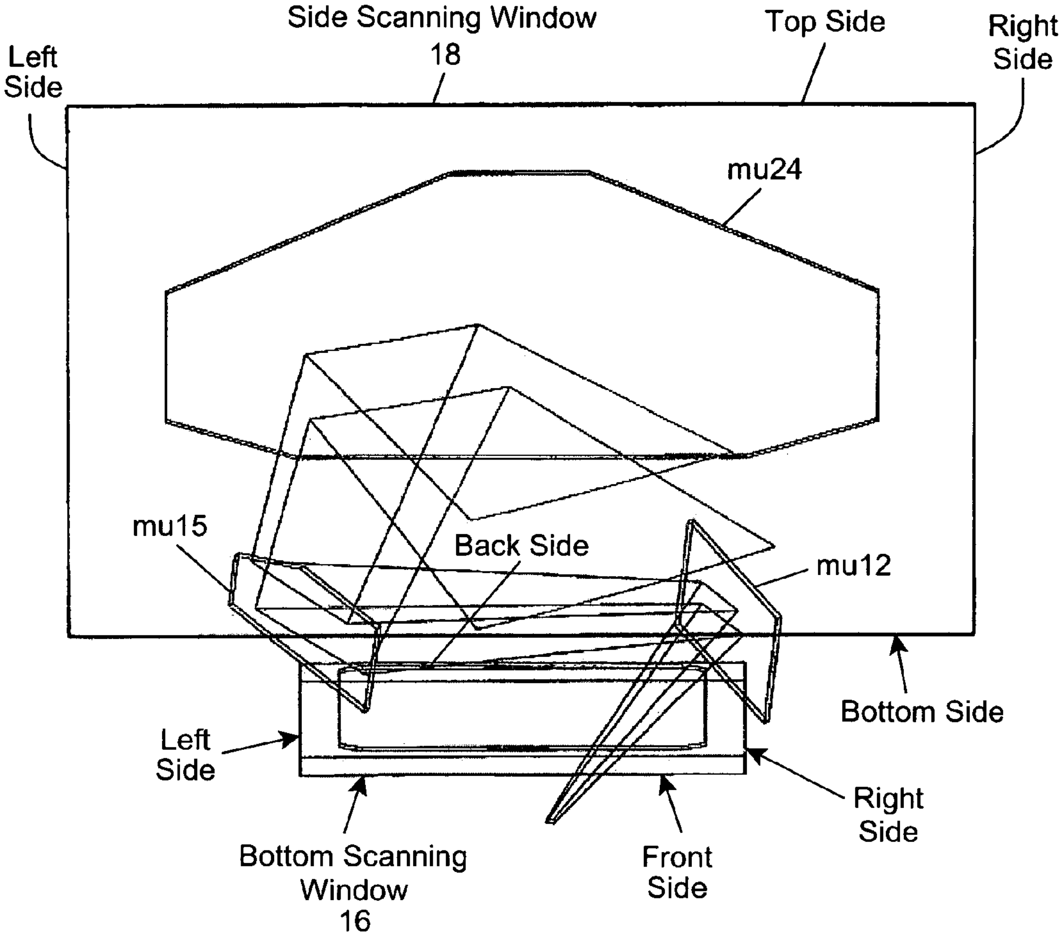
FIG. 5N1

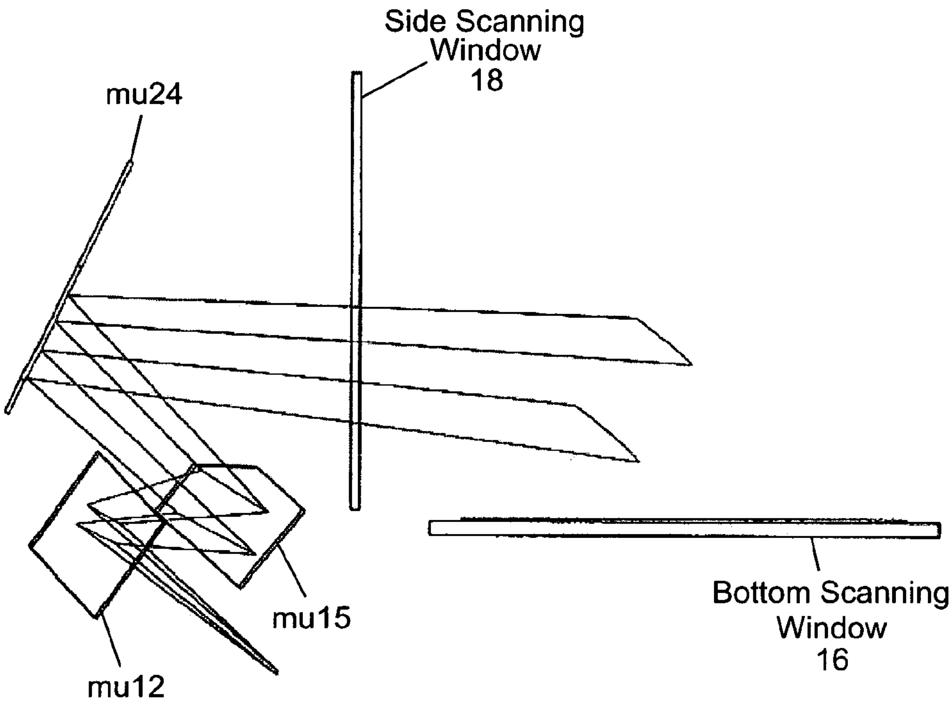
FIG. 5N2

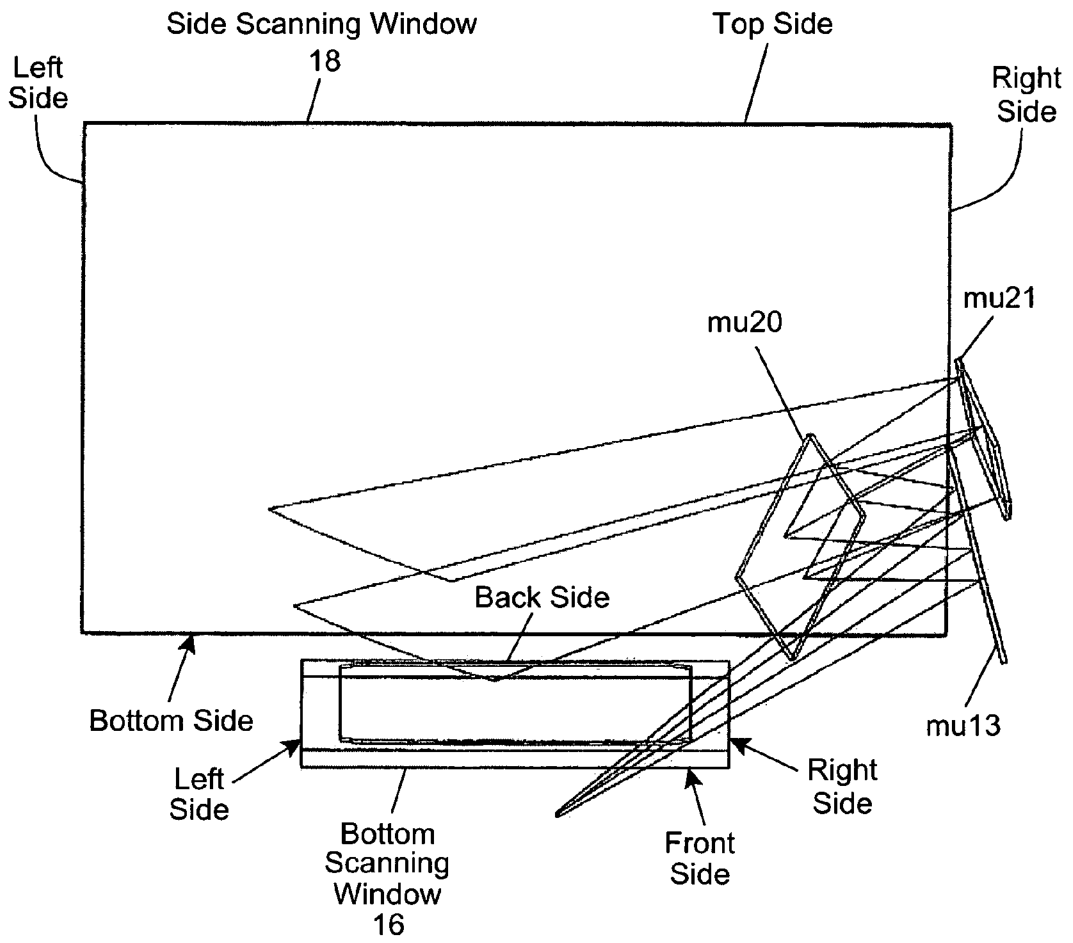
FIG. 5O1

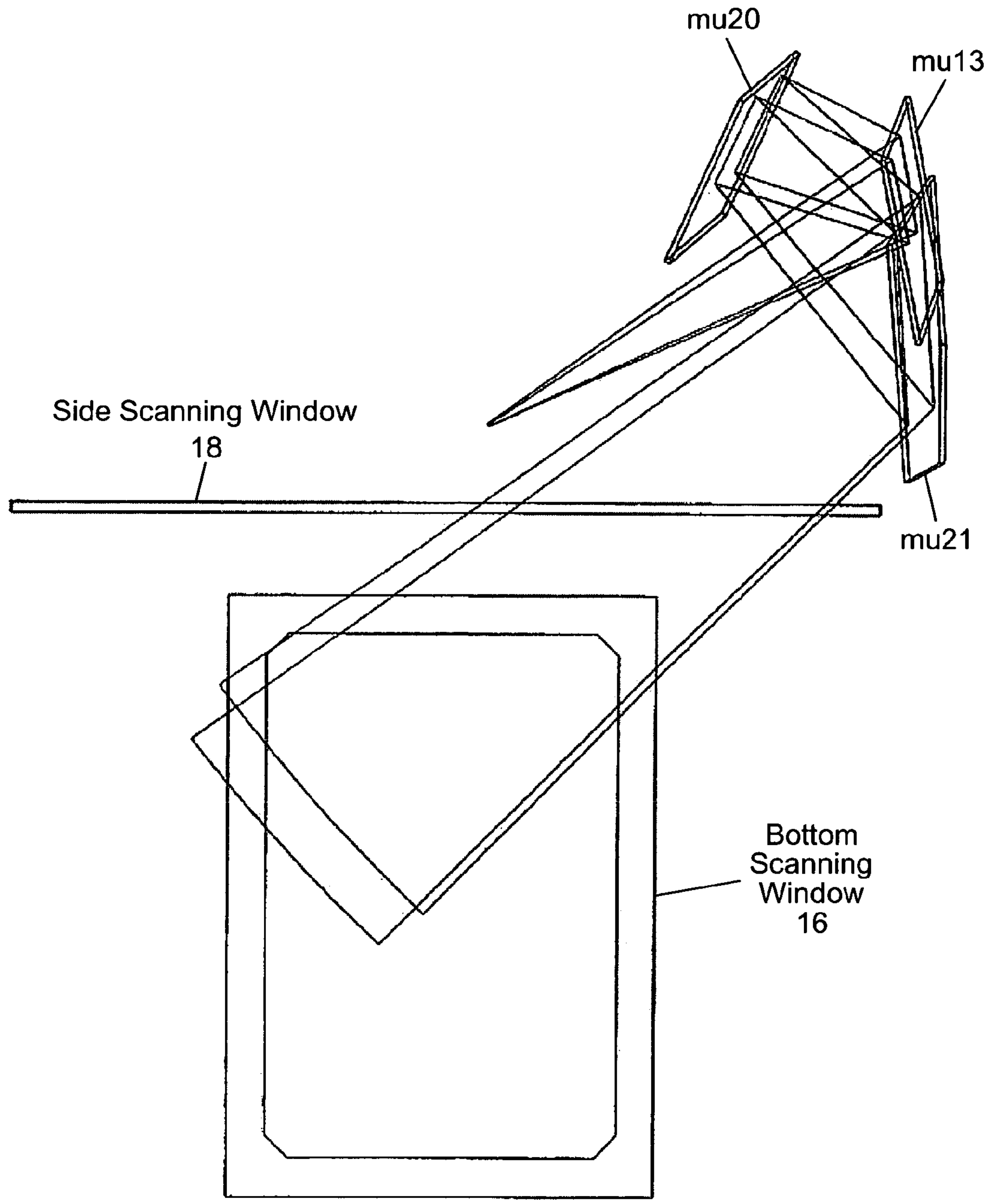
FIG. 5O2

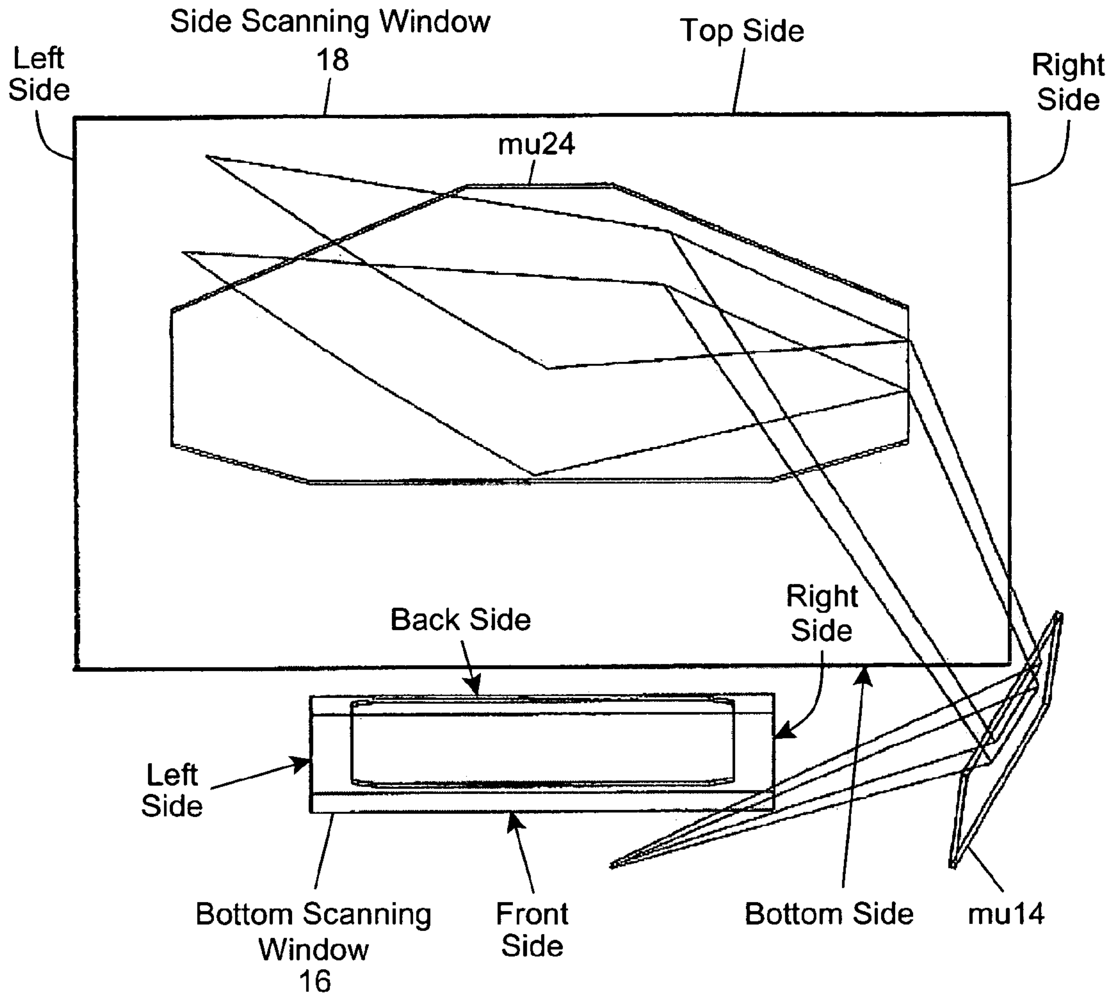
FIG. 5P1

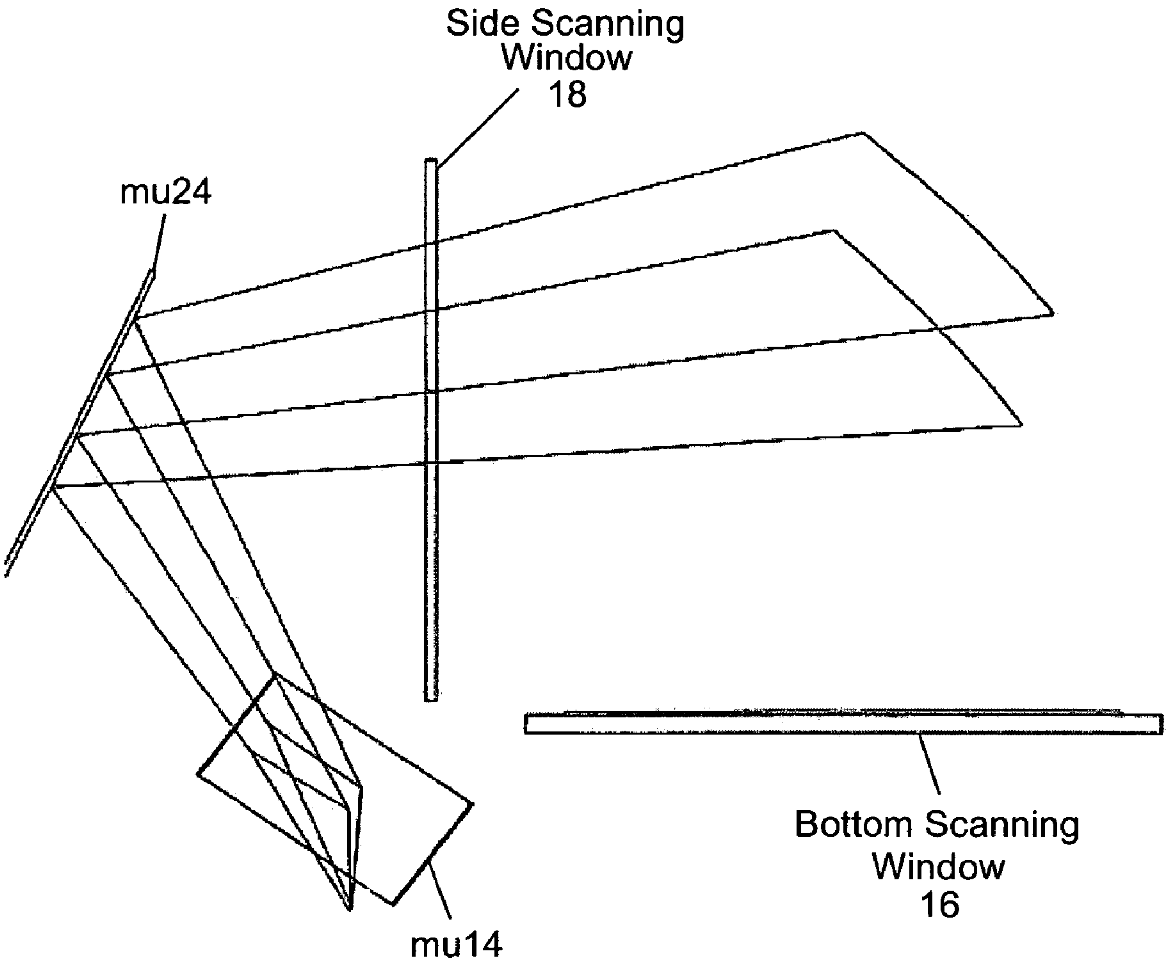
FIG. 5P2

TDM over Scanning Plane Groups for HST1/HST2 (Time Slots correspond to Scanning Plane Groups produced by 1/4 revolution of polygon PM1)

First Rev of Polygonal Mirror PM1

| ← 1/2 Revolution of PM1 → | | | | | | | | ← 1/2 Revolution of PM1 → | | | | | | | |
|---|---|---|---|---|---|---|---|---|---|---|---|---|---|---|---|
| GH1 | GH2 | GH3 | GH4 | OFF | OFF | OFF | OFF | GH1 | GH2 | GH3 | GH4 | OFF | OFF | OFF | OFF |
| OFF | OFF | OFF | OFF | GH4 | GH5 | GH6 | GH7 | OFF | OFF | OFF | OFF | GH4 | GH5 | GH6 | GH7 |

| ← 1/2 Revolution of PM2 → | | | | | | | | | | | | | | ← 1/2 Revolution of PM2 → | | | | | | | | | | | | | |
|---|---|---|---|---|---|---|---|---|---|---|---|---|---|---|---|---|---|---|---|---|---|---|---|---|---|---|---|
| gv 1 | gv 2 | gv 3 | gv 4 | gv 5 | gv 6 | gv 7 | gv 8 | gv 9 | gv 10 | gv 11 | gv 12 | gv 13 | gv 14 | gv 1 | gv 2 | gv 3 | gv 4 | gv 5 | gv 6 | gv 7 | gv 8 | gv 9 | gv 10 | gv 11 | gv 12 | gv 13 | gv 14 |

Next Rev of Polygonal Mirror PM1

| ← 1/2 Revolution of PM1 → | | | | | | | | ← 1/2 Revolution of PM1 → | | | | | | | |
|---|---|---|---|---|---|---|---|---|---|---|---|---|---|---|---|
| OFF | OFF | OFF | OFF | GH1 | GH2 | GH3 | GH4 | OFF | OFF | OFF | OFF | GH1 | GH2 | GH3 | GH4 |
| GH4 | GH5 | GH6 | GH7 | OFF | OFF | OFF | OFF | GH4 | GH5 | GH6 | GH7 | OFF | OFF | OFF | OFF |

| ← 1/2 Revolution of PM2 → | | | | | | | | | | | | | | ← 1/2 Revolution of PM2 → | | | | | | | | | | | | | |
|---|---|---|---|---|---|---|---|---|---|---|---|---|---|---|---|---|---|---|---|---|---|---|---|---|---|---|---|
| gv 1 | gv 2 | gv 3 | gv 4 | gv 5 | gv 6 | gv 7 | gv 8 | gv 9 | gv 10 | gv 11 | gv 12 | gv 13 | gv 14 | gv 1 | gv 2 | gv 3 | gv 4 | gv 5 | gv 6 | gv 7 | gv 8 | gv 9 | gv 10 | gv 11 | gv 12 | gv 13 | gv 14 |

-can also TDM between active HST plane and active VST1 plane

FIG. 6C1

TDM over Scanning Plane Groups for HST1/HST2 (Time Slots correspond to Scanning Plane Groups produced by 1/2 revolution of polygon PM1)

First Rev of Polygonal Mirror PM1

First Rev of Polygonal Mirror

|← 1/2 Revolution of PM1 →|← 1/2 Revolution of PM1 →|

| | | | | | | | | | | | | | | | |
|---|---|---|---|---|---|---|---|---|---|---|---|---|---|---|---|
| GH1 | GH2 | GH3 | GH4 | GH1 | GH2 | GH3 | GH4 | OFF | OFF | OFF | OFF | OFF | OFF | OFF | OFF |
| OFF | OFF | OFF | OFF | OFF | OFF | OFF | OFF | GH4 | GH5 | GH6 | GH7 | GH4 | GH5 | GH6 | GH7 |

|← 1/2 Revolution of PM2 →|← 1/2 Revolution of PM2 →|

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| gv 1 | gv 2 | gv 3 | gv 4 | gv 5 | gv 6 | gv 7 | gv 8 | gv 9 | gv 10 | gv 11 | gv 12 | gv 13 | gv 14 | gv 1 | gv 2 | gv 3 | gv 4 | gv 5 | gv 6 | gv 7 | gv 8 | gv 9 | gv 10 | gv 11 | gv 12 | gv 13 | gv 14 |

Second Rev of Polygonal Mirror PM1

|← 1/2 Revolution of PM1 →|← 1/2 Revolution of PM1 →|

| | | | | | | | | | | | | | | | |
|---|---|---|---|---|---|---|---|---|---|---|---|---|---|---|---|
| OFF | OFF | OFF | OFF | OFF | OFF | OFF | OFF | GH1 | GH2 | GH3 | GH4 | GH1 | GH2 | GH3 | GH4 |
| GH4 | GH5 | GH6 | GH7 | GH4 | GH5 | GH6 | GH7 | OFF | OFF | OFF | OFF | OFF | OFF | OFF | OFF |

|← 1/2 Revolution of PM2 →|← 1/2 Revolution of PM2 →|

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| gv 1 | gv 2 | gv 3 | gv 4 | gv 5 | gv 6 | gv 7 | gv 8 | gv 9 | gv 10 | gv 11 | gv 12 | gv 13 | gv 14 | gv 1 | gv 2 | gv 3 | gv 4 | gv 5 | gv 6 | gv 7 | gv 8 | gv 9 | gv 10 | gv 11 | gv 12 | gv 13 | gv 14 |

-can also TDM between active HST plane and active VST1 plane

FIG. 6C2

TDM over Scanning Plane Groups for HST1/HST2 (Time Slots correspond to Scanning Plane Groups produced by full revolution of polygon PM1)

First Rev of Polygonal Mirror PM1

|← 1/2 Revolution of PM1 →|← 1/2 Revolution of PM1 →|

| | | | | | | | | | | | | | | | |
|---|---|---|---|---|---|---|---|---|---|---|---|---|---|---|---|
| GH1 | GH2 | GH3 | GH4 | GH1 | GH2 | GH3 | GH4 | GH1 | GH2 | GH3 | GH4 | GH1 | GH2 | GH3 | GH4 |
| OFF | OFF | OFF | OFF | OFF | OFF | OFF | OFF | OFF | OFF | OFF | OFF | OFF | OFF | OFF | OFF |

|← 1/2 Revolution of PM2 →|← 1/2 Revolution of PM2 →|

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| gv 1 | gv 2 | gv 3 | gv 4 | gv 5 | gv 6 | gv 7 | gv 8 | gv 9 | gv 10 | gv 11 | gv 12 | gv 13 | gv 14 | gv 1 | gv 2 | gv 3 | gv 4 | gv 5 | gv 6 | gv 7 | gv 8 | gv 9 | gv 10 | gv 11 | gv 12 | gv 13 | gv 14 |

Second Rev of Polygonal Mirror PM1

|← 1/2 Revolution of PM1 →|← 1/2 Revolution of PM1 →|

| | | | | | | | | | | | | | | | |
|---|---|---|---|---|---|---|---|---|---|---|---|---|---|---|---|
| OFF | OFF | OFF | OFF | OFF | OFF | OFF | OFF | OFF | OFF | OFF | OFF | OFF | OFF | OFF | OFF |
| GH4 | GH5 | GH6 | GH7 | GH4 | GH5 | GH6 | GH7 | GH4 | GH5 | GH6 | GH7 | GH4 | GH5 | GH6 | GH7 |

|← 1/2 Revolution of PM2 →|← 1/2 Revolution of PM2 →|

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| gv 1 | gv 2 | gv 3 | gv 4 | gv 5 | gv 6 | gv 7 | gv 8 | gv 9 | gv 10 | gv 11 | gv 12 | gv 13 | gv 14 | gv 1 | gv 2 | gv 3 | gv 4 | gv 5 | gv 6 | gv 7 | gv 8 | gv 9 | gv 10 | gv 11 | gv 12 | gv 13 | gv 14 |

-can also TDM between active HST plane and active VST1 plane

FIG. 6C3

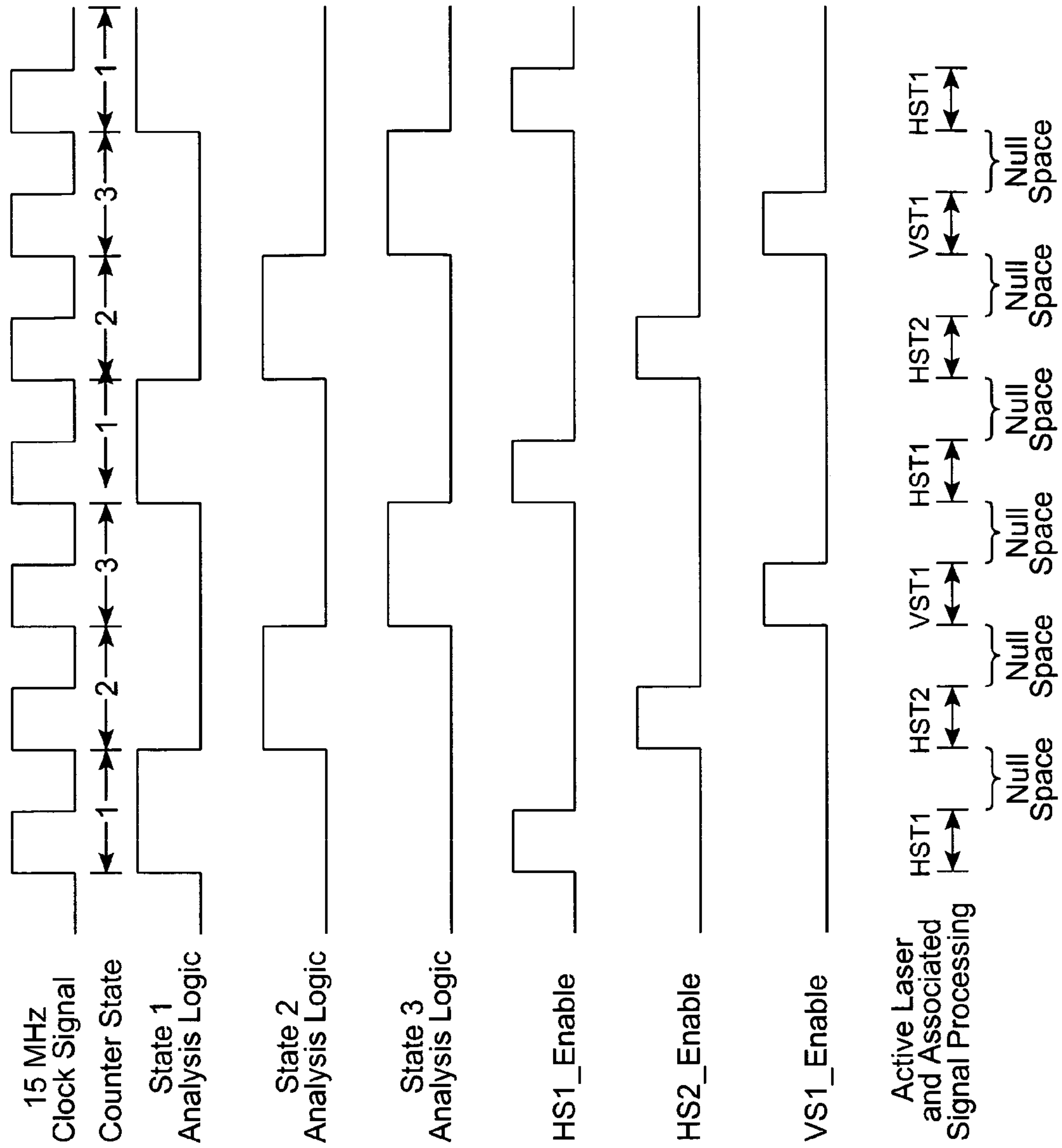
FIG. 8B1
FIG. 8B2
FIG. 8B3
FIG. 8B4
FIG. 8B5
FIG. 8B6
FIG. 8B7
FIG. 8B8
FIG. 8B9

| | Active (H Logic Level) | Inactive (L Logic Level) |
|---|---|---|
| | | |
| HST1_Enable | turn ON Laser Source for HST1 | turn OFF (or substantially OFF) Laser Source for HST1 |
| | operably couple $PD_{HST1}$ to signal processing circuitry that performs bar code detection and decoding operations on data signals derived from the output of $PD_{HST1}$ | operably de-couple (e.g., electrically isolate) $PD_{HST1}$ from signal processing circuitry that performs bar code detection and decoding operations on data signals derived from the output of $PD_{HST1}$ |
| | | |
| HST2_Enable | turn ON Laser Source for HST2 | turn OFF (or substantially OFF) Laser Source for HST2 |
| | operably couple $PD_{HST2}$ to signal processing circuitry that performs bar code detection and decoding operations on data signals derived from the output of $PD_{HST2}$ | operably de-couple (e.g., electrically isolate) $PD_{HST2}$ from signal processing circuitry that performs bar code detection and decoding operations on data signals derived from the output of $PD_{HST2}$ |
| | | |
| VST1_Enable | turn ON Laser Source for VST1 | turn OFF (or substantially OFF) Laser Source for VST1 |
| | operably couple $PD_{VST1}$ to signal processing circuitry that performs bar code detection and decoding operations on data signals derived from the output of $PD_{VST1}$ | operably de-couple (e.g., electrically isolate) $PD_{VST1}$ from signal processing circuitry that performs bar code detection and decoding operations on data signals derived from the output of $PD_{VST1}$ |

FIG. 8C

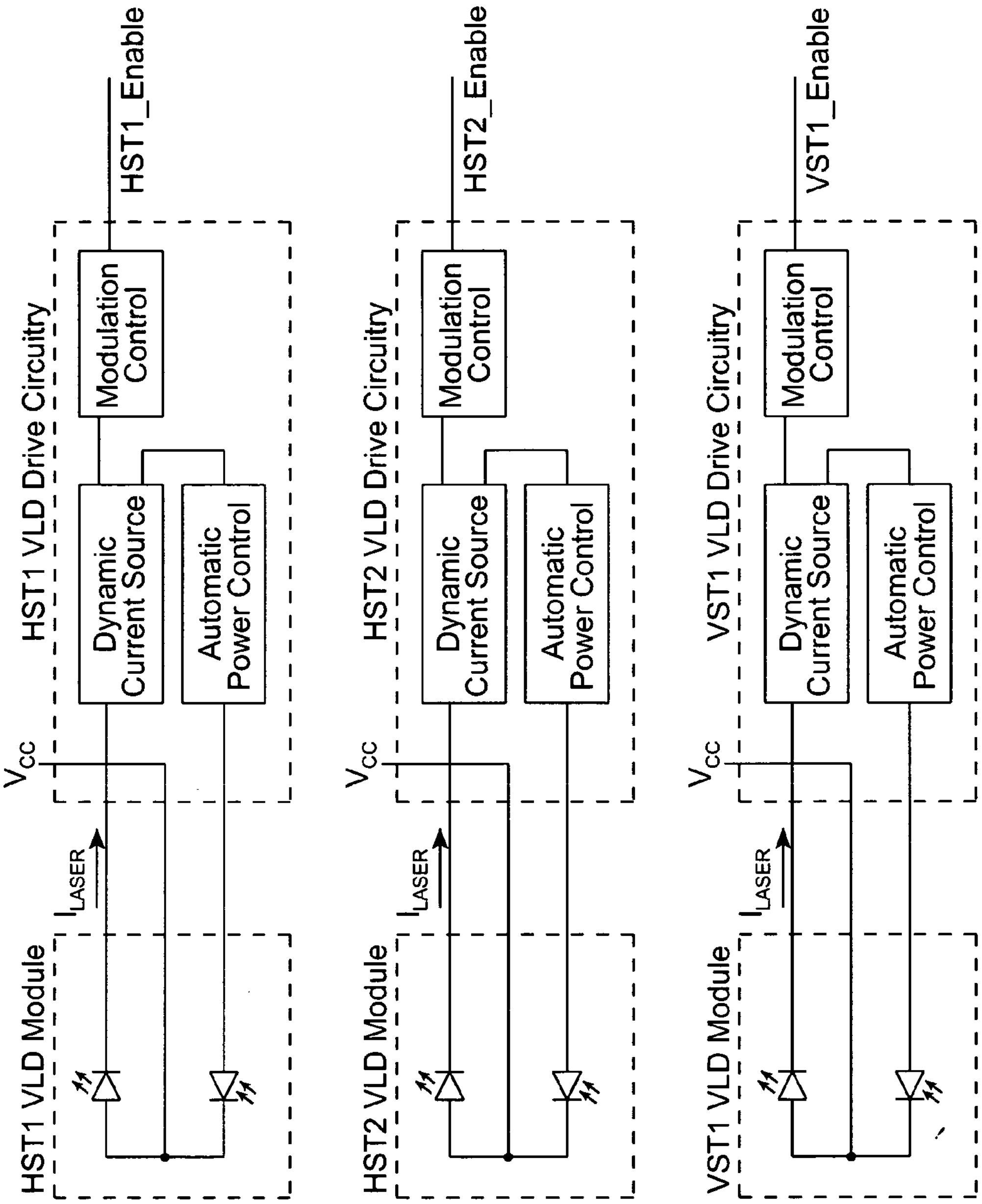
FIG. 8E1

| HST1_Enable | Control Operations |
|---|---|
| On (Logic level = H) | Modulation Control Circuitry and Automatic Power Control Circuitry control Dynamic Current Source to provide current level to HST1 VLD such that HST1 VLD operates within a predetermined optical power level range $P_{ON}$ (where range $P_{ON}$ consists of optical power level(s) substantially greater than zero). |
| On (Logic level = L) | Modulation Control Circuitry and Automatic Power Control Circuitry control Dynamic Current Source to provide current level to HST1 VLD such that HST1 VLD operates within a predetermined optical power level range $P_{OFF}$ (where range $P_{OFF}$ consists of optical power level(s) substantially less than $P_{ON}$, preferably at or substantially near zero). |

FIG. 8E2

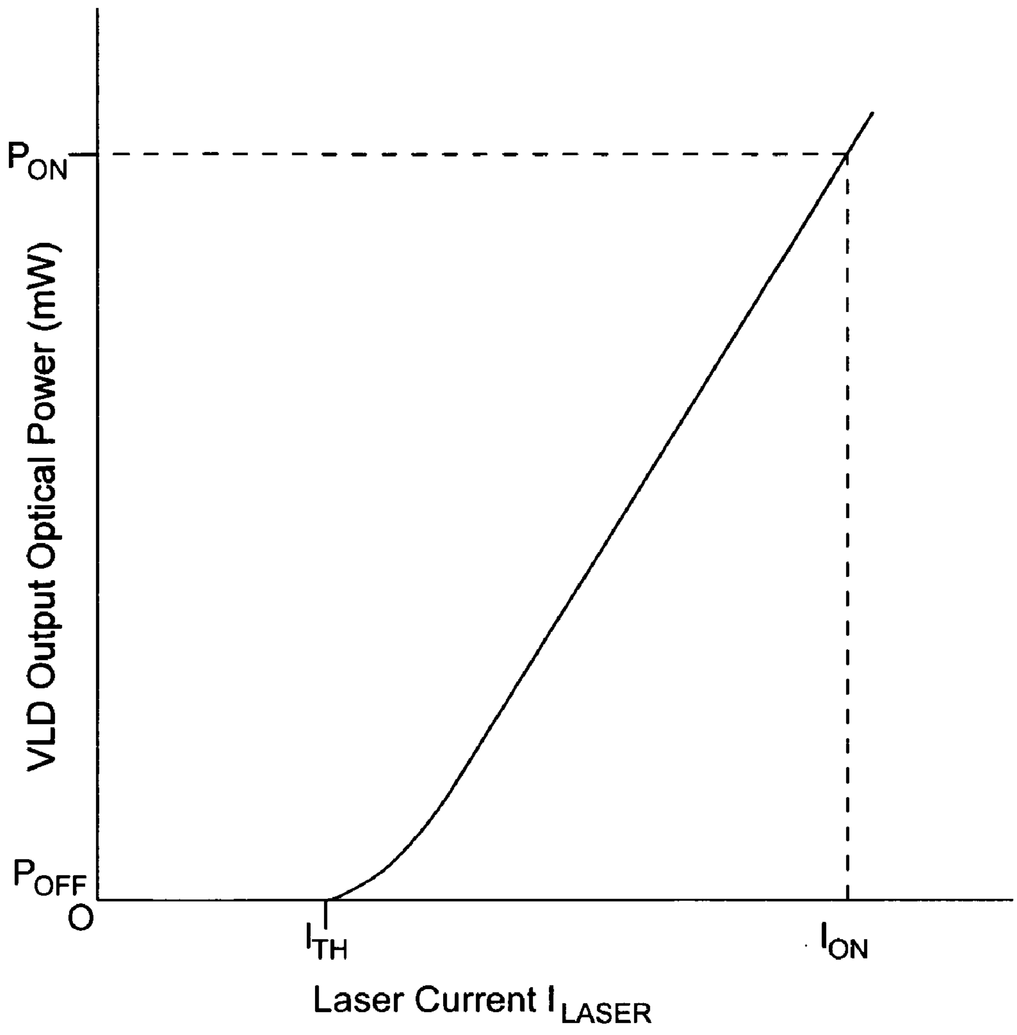
FIG. 8E3

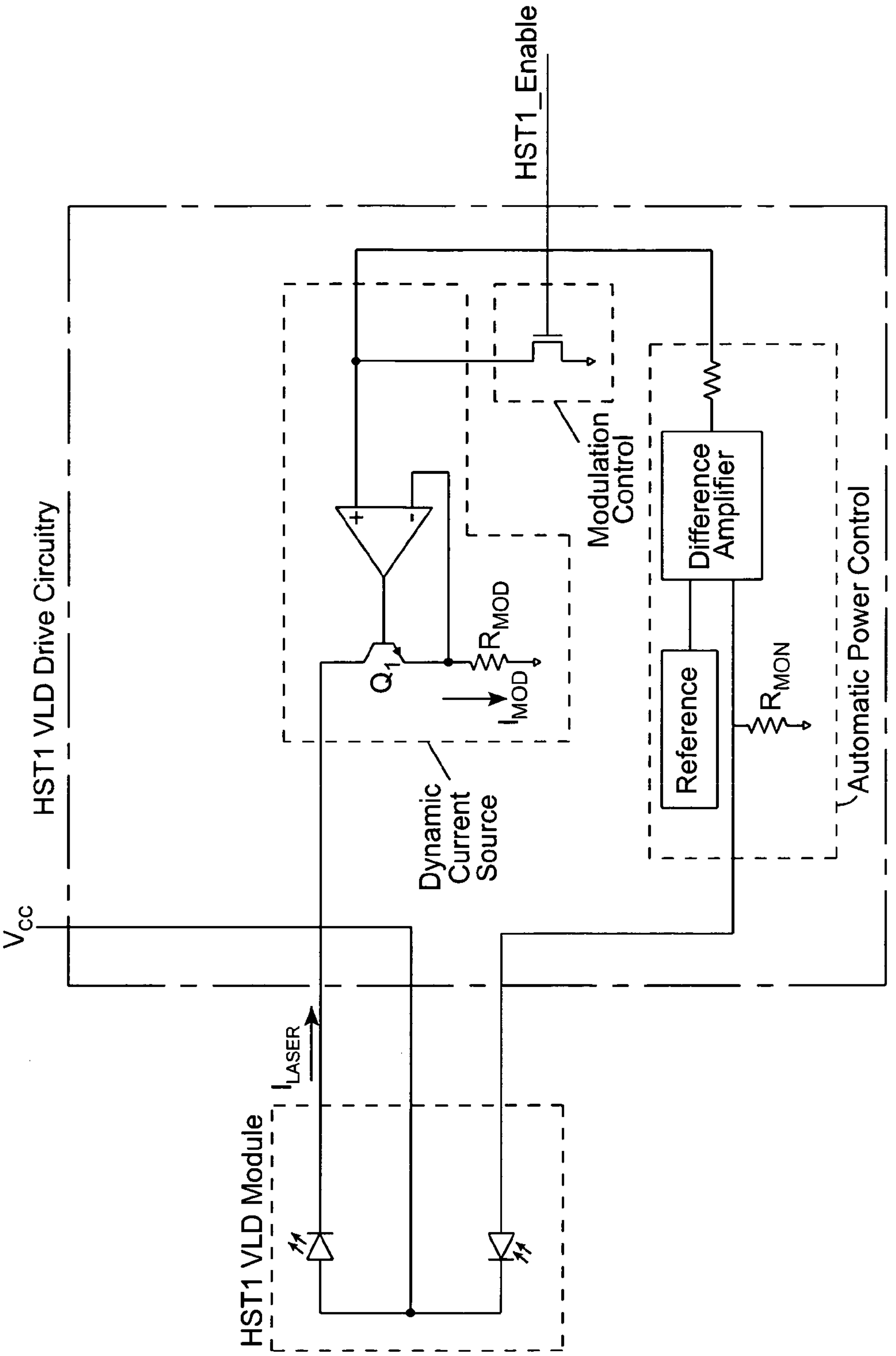
FIG. 8F1

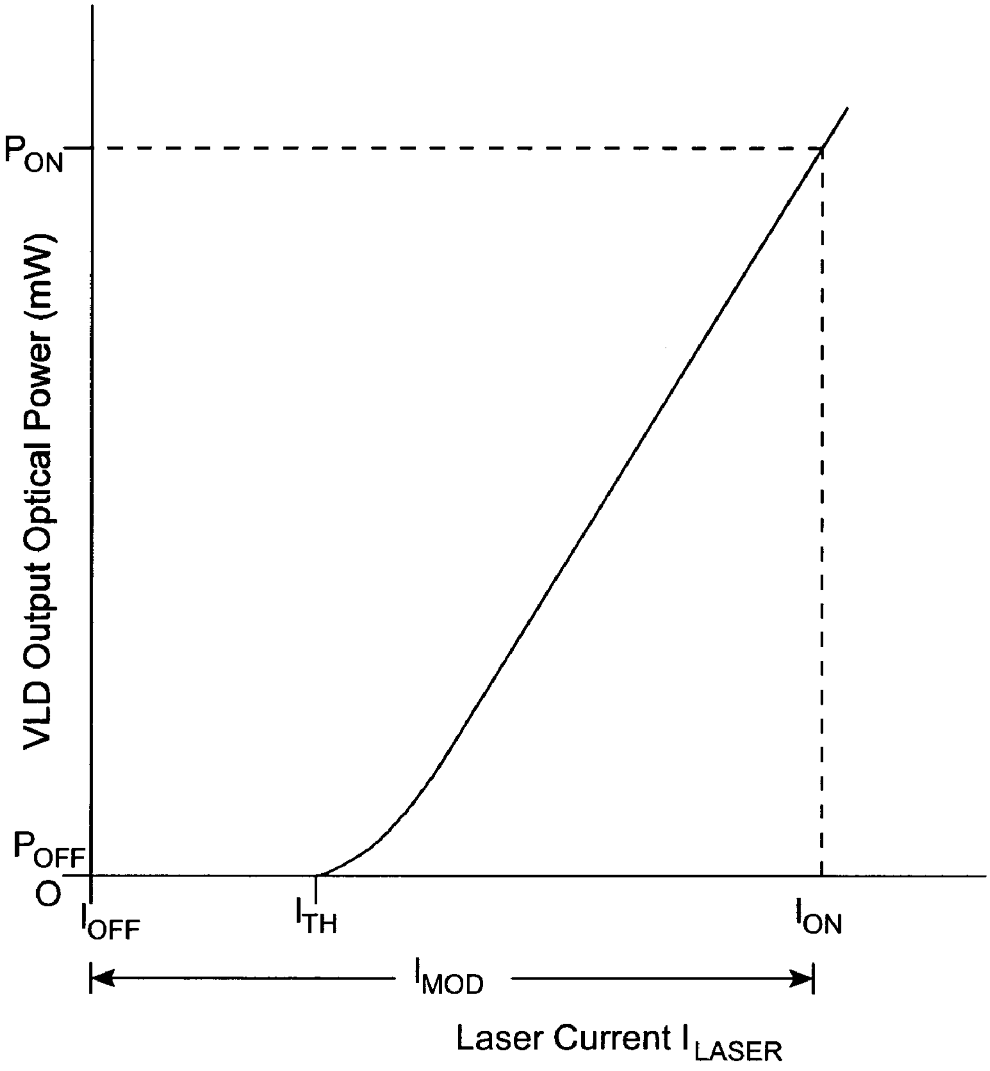
FIG. 8F2

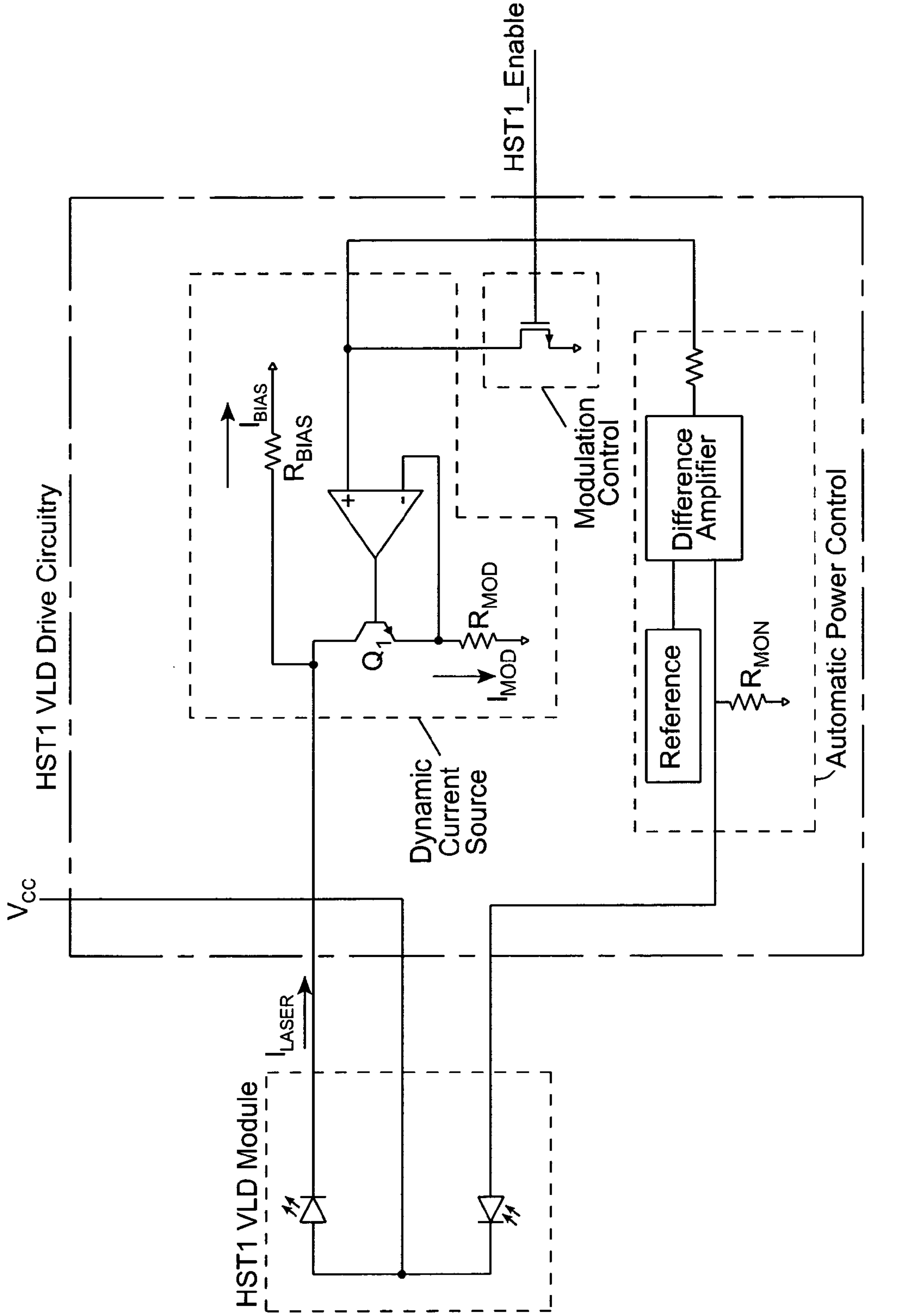
FIG. 8G1

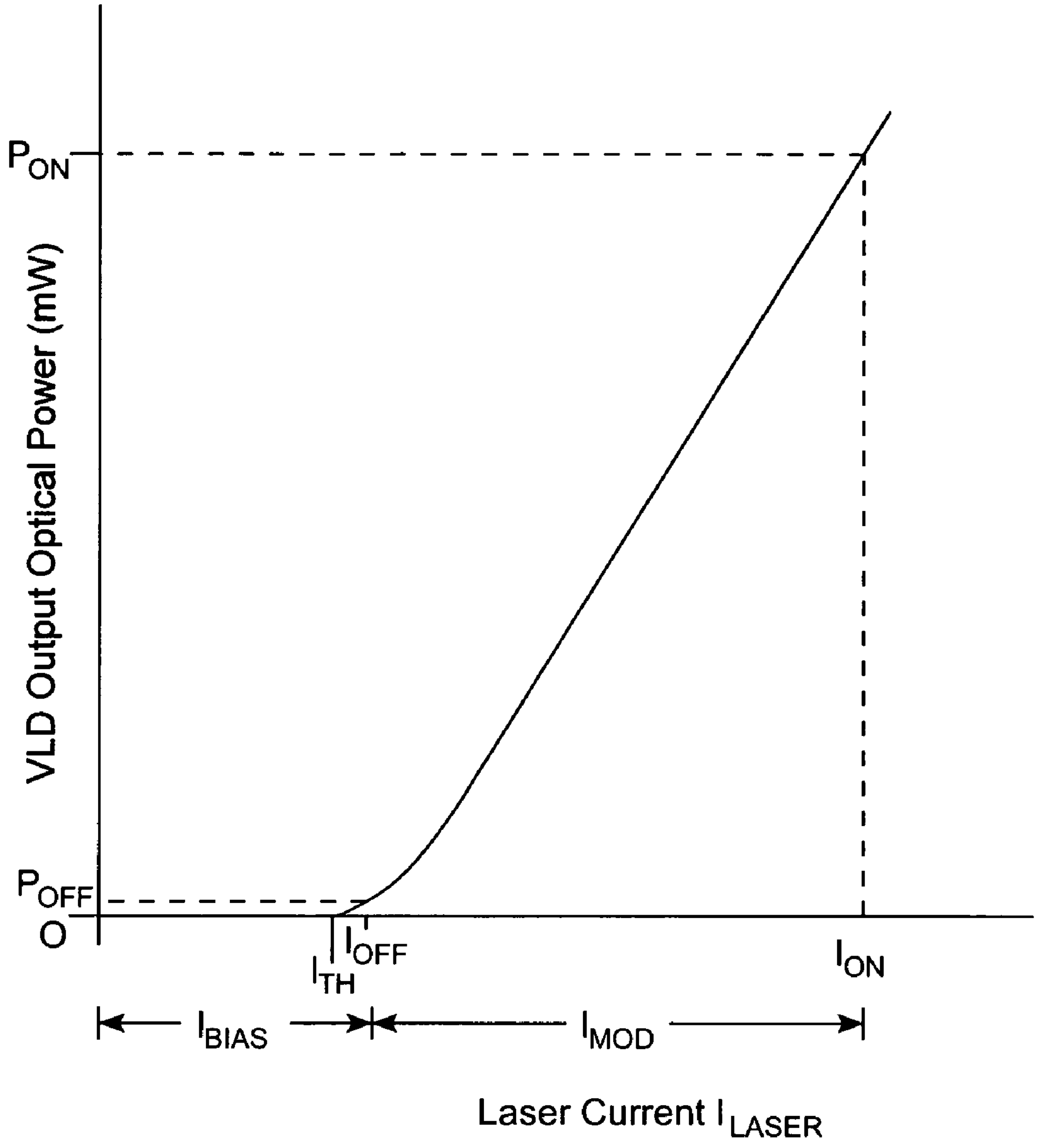
FIG. 8G2

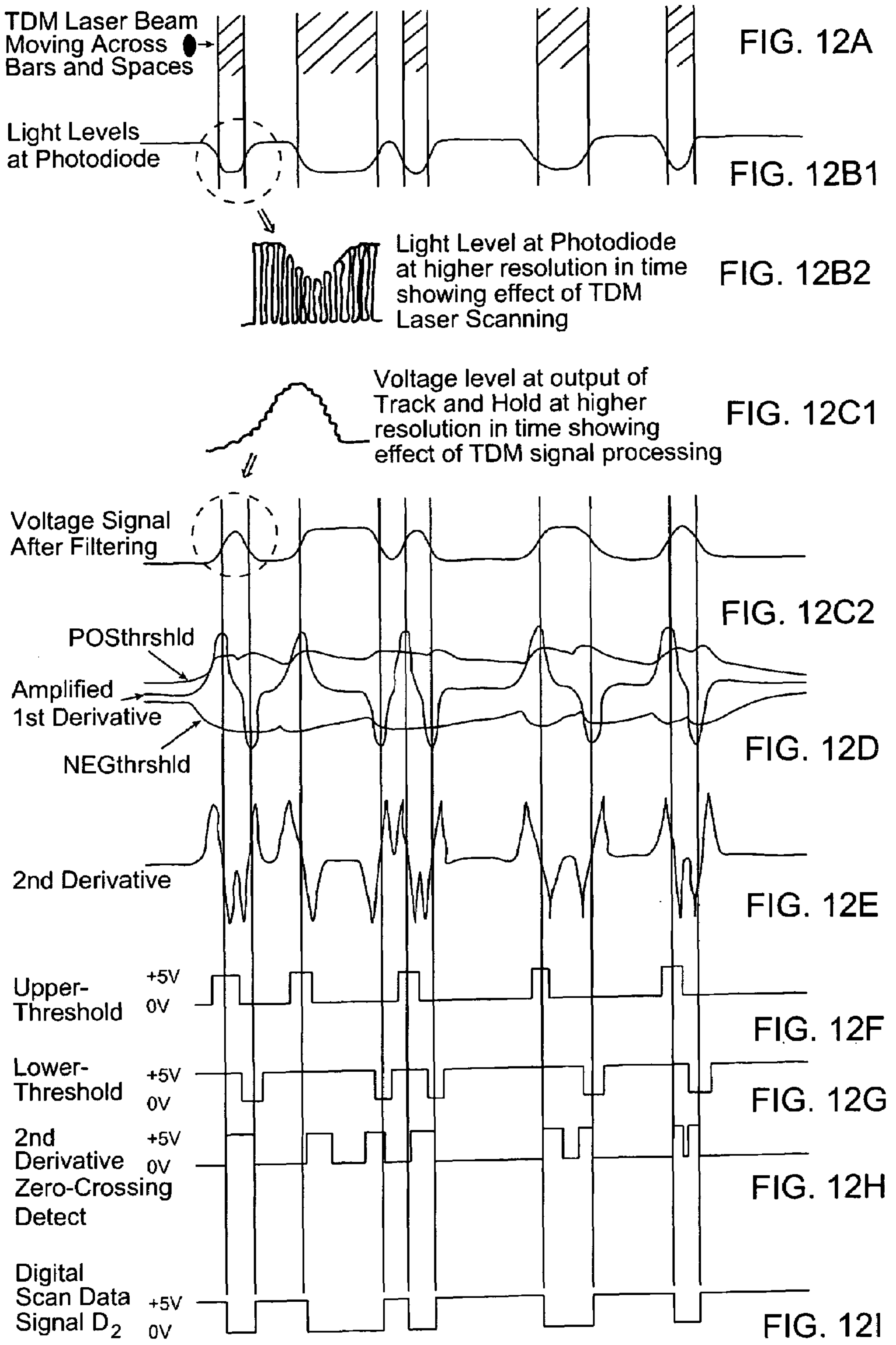
TDM Laser Beam
Moving Across
Bars and Spaces
FIG. 12A
Light Levels
at Photodiode
FIG. 12B1
Light Level at Photodiode
at higher resolution in time
showing effect of TDM
Laser Scanning
FIG. 12B2
Voltage level at output of
Track and Hold at higher
resolution in time showing
effect of TDM signal processing
FIG. 12C1
Voltage Signal
After Filtering
FIG. 12C2
POSthrshld
Amplified
1st Derivative
NEGthrshld
FIG. 12D
2nd Derivative
FIG. 12E
Upper-
Threshold
+5V
0V
FIG. 12F
Lower-
Threshold
+5V
0V
FIG. 12G
2nd
Derivative
Zero-Crossing
Detect
+5V
0V
FIG. 12H
Digital
Scan Data
Signal D2
+5V
0V
FIG. 12I

BAR CODE SYMBOL SCANNING SYSTEM EMPLOYING TIME-DIVISION MULTIPLEXED LASER SCANNING AND SIGNAL PROCESSING TO AVOID OPTICAL CROSS-TALK AND OTHER UNWANTED LIGHT INTERFERENCE

RELATED CASES

The present application is a Continuation of U.S. application Ser. No. 10/207,731 filed Jul. 26, 2002 now U.S. Pat. No. 6,969,004; which is a Continuation-in-Part (CIP) of: U.S application Ser. No. 10/045,577, filed on Jan. 11, 2002 now U.S. Pat. No. 6,918,540 and U.S. application Ser. No. 10/045,605, filed on Jan. 11, 2002 now U.S. Pat. No. 6,830,190. Each said patent application is assigned to and commonly owned by Metrologic Instruments, Inc. of Blackwood, N.J., and is incorporated herein by reference in its entirety.

BACKGROUND OF THE INVENTION

1. Field of Invention

The present invention relates generally to laser scanners of ultra-compact design capable of reading bar code symbols in point-of-sale (POS) and other demanding scanning environments.

2. Brief Description of the Prior Art

The use of bar code symbols for product and article identification is well known in the art. Presently, various types of bar code symbol scanners have been developed. In general, these bar code symbol readers can be classified into two distinct classes.

The first class of bar code symbol reader simultaneously illuminates all of the bars and spaces of a bar code symbol with light of a specific wavelength(s) in order to capture an image thereof for recognition and decoding purposes. Such scanners are commonly known as CCD scanners because they use CCD image detectors to detect images of the bar code symbols being read.

The second class of bar code symbol reader uses a focused light beam, typically a focused laser beam, to sequentially scan the bars and spaces of a bar code symbol to be read. This type of bar code symbol scanner is commonly called a “flying spot” scanner as the focused laser beam appears as “a spot of light that flies” across the bar code symbol being read. In general, laser bar code symbol scanners are sub-classified further by the type of mechanism used to focus and scan the laser beam across bar code symbols.

Such flying spot scanners generally employ at least one laser diode, the light from which is focused and collimated to produce a scanning beam. The scanning beam is directed to a scanning element (such as a rotating polygonal mirror or rotating holographic disk), which redirects the scanning beam across a plurality of stationary beam folding mirrors. Light reflected from a bar code label returns to the stationary beam folding mirrors and scanning element. A light collecting optical element collects this returning light and directs it to a photodetector. The electrical signals generated by the photodetector are processed to detect and decode bar code symbols therein.

The bar code symbols are formed from bars or elements typically rectangular in shape with a variety of possible widths. The specific arrangement of elements defines the character represented according to a set of rules and definitions specified by the code or “symbology” used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character being represented by its own corresponding group of elements. In some symbologies, a unique “start” and “stop” character is used to indicate when the bar code begins and ends. A number of different bar code symbologies exist, including UPC Symbologies, EAN Symbologies, Code 39, Code 128, Code 93, Codabar and Interleaved 2 of 5, etc.

In order to produce a successful scan, an object’s bar code symbol must be oriented with respect to a given scanning beam so that the angle therebetween is not so oblique so as to cause an insufficient amount of reflected light to return back to the scanner. Therefore, to achieve a successful scan, the bar code symbol must be positioned sufficiently close to this desired orientation for the given scanning beam.

Thus, to improve the performance of such optical bar code scanners, modern scanners have been developed that employ aggressive scan patterns (i.e., a large number of scanning beams that project into a scan volume at different orientations), which enable such scanners to successfully scan bar code labels over a large number of orientations thereby providing increased scanning throughput. Such modem optical scanners may emit light through a single aperture (such as a horizontal or vertical aperture) or through multiple apertures. Modem optical scanners that emit a large number of scan lines through both a horizontal and vertical aperture are commonly referred to as bioptical scanners. Examples of polygon-based bioptical laser scanning systems are disclosed in U.S. Pat. No. 4,229,588 and U.S. Pat. No. 4,652,732, assigned to NCR, Inc., each incorporated herein by reference in its entirety. In general, bioptical laser scanning systems are generally more aggressive that conventional single scanning window systems. For this reason, bioptical scanning systems are often deployed in demanding retail environments, such as supermarkets and high-volume department stores, where high check-out throughput is critical to achieving store profitability and customer satisfaction.

Such modem high performance optical scanners typically scan multiple scanning beams though the scanning volume and employ a corresponding number of photodetectors for detecting reflection from the multiple scanning beams. In such systems, optical crosstalk degrades performance. More specifically, optical crosstalk occurs when light from multiple laser scanning beams meet at a target (or any surface in the scanning system). The light reflected therefrom follows a return path to the corresponding multiple photodetectors, which creates an undesirable signal spike in the output of the corresponding multiple photodetectors that can make a bar code symbol unreadable at that point.

In addition, light interference from ambient light and unwanted reflections degrades performance. More specifically, ambient light that is received at a photodetector in addition to reflections (i.e., scattered light) from laser scanning beams that are not intended to be received by the photodetector can create an undesirable signal spike in the output of the photodetector that can make a bar code symbol unreadable.

Thus, there remains a need in the art for improved optical scanning systems that scan multiple scanning beams though the scanning volume and employ a corresponding number of photodetectors for detecting reflection from the multiple scanning beams, which do not suffer from degraded performance due to optical crosstalk and light interference from ambient light and unwanted reflections.

OBJECTS AND SUMMARY OF THE PRESENT INVENTION

Accordingly, a primary object of the present invention is to provide a novel laser scanning system which is free of the shortcomings and drawbacks of prior art laser scanning systems and methodologies.

Another object of the present invention is to provide a laser scanning system employing time-division-multiplexed laser scanning operations utilizing a plurality of multi-direction laser scanning beams in addition to synchronous time-division-multiplexed signal processing operations (for bar code detection) in order to avoid optical cross talk and other unwanted light interference.

Another object of the present invention is to provide such time-division-multiplexed laser scanning operations and signal processing operation by generating timing signals that define time slots logically assigned to a given laser scanning beam and corresponding photosensor, selectively generating and/or projecting the laser scanning beams into the scan volume of the system such that only one laser scanning beam is active (e.g., actively scanning the scan volume of the system) during time slots logically assigned to the one laser scanning beam, and operably coupling/de-coupling the photosensors from signal processing circuitry (that performs bar code detection on scan data signals derived therefrom) such that only one photosensor is operably coupled to such signal processing circuitry during time slots logically assigned to the one photosensor.

Another object of the present invention is to provide such time-division-multiplexed laser scanning operations and signal processing operation by generating timing signals that define time slots logically assigned to a given laser light source (e.g., visible laser diode) and corresponding photosensor, modulating the power level provided to the laser light sources such that only one laser light source is active (e.g., ON) during time slots logically assigned to the one laser light source, and operably coupling/de-coupling the photosensors from signal processing circuitry (that performs bar code detection on scan data signals derived therefrom) such that only one photosensor is operably coupled to such signal processing circuitry during time slots logically assigned to the one photosensor.

A further object of the present invention is to provide such time-division-multiplexed laser scanning operations wherein frequency of time slots logically assigned to a given laser scanning beam and corresponding photosensor is greater than at least two times the highest frequency component expected in the scan data signal received at the photosensor.

A further object of the present invention is to provide such time-division-multiplexed laser scanning operations wherein time slots logically assigned to a given laser scanning beam and corresponding photosensor correspond to scanning planes generated by the given laser scanning beam during revolution of one or more rotating polygonal mirrors.

A further object of the present invention is to provide such time-division-multiplexed laser scanning operations wherein time slots logically assigned to a given laser scanning beam and corresponding photosensor correspond to scanning plane groups generated by the given laser scanning beam during revolution of one or more rotating polygonal mirrors.

Another object of the present invention is to provide such time-division-multiplexed laser scanning operations by modulating a dynamic current source that supplies current to a given visible laser diode.

Another object of the present invention is to provide such time-division-multiplexed laser scanning operations through modulation of the power level supplied to a given visible laser diode whereby the given visible laser diode is turned OFF by operating the given visible laser diode at an optical power level near its threshold optical power level, thereby enabling quick turn on of the visible laser diode.

Another object of the present invention is to provide such time-division-multiplexed laser scanning operations and signal processing operations in a bioptical laser scanning system that scans with a plurality of pairs of quasi-orthogonal laser scanning planes produced by at least two rotating polygonal mirrors, wherein a first rotating polygonal mirror produces laser scanning planes that project from the bottom-scanning window, and wherein a second rotating polygonal mirror produces laser scanning planes that project from the side-scanning window.

Another object of the present invention is to provide such time-division-multiplexed laser scanning operations and signal processing operations in a bioptical laser scanning system comprising a plurality of laser scanning stations, each of which produces a plurality of groups of quasi-orthogonal laser scanning planes that are projected within predetermined regions of space contained within a 3-D scanning volume defined between the bottom and side-scanning windows of the system.

Another object of the present invention is to provide such time-division-multiplexed laser scanning operations and signal processing operations in a bioptical laser scanning system wherein two visible laser diodes (VLDs) disposed on opposite sides of a rotating polygonal mirror are used to create a plurality of groups of quasi-orthogonal laser scanning planes that project through the bottom-scanning window.

Another object of the present invention is to provide such time-division-multiplexed laser scanning operations and signal processing operations in a bioptical laser scanning system wherein a single VLD is used to create the scan pattern projected through the side-scanning window.

Another object of the present invention is to provide such time-division-multiplexed laser scanning operations and signal processing operations in a bioptical laser scanning system which generates a plurality of quasi-orthogonal laser scanning planes that project through the bottom-scanning window and side-scanning window to provide 360 degrees of scan coverage at a POS station.

Another object of the present invention is to provide such time-division-multiplexed laser scanning operations and signal processing operations in a bioptical laser scanning system which generates a plurality of horizontal and vertical laser scanning planes that project from the top of the side-scanning window downward, which are useful for reading ladder type and picket-fence type bar code symbols on top-facing surfaces.

Another object of the present invention is to provide such time-division-multiplexed laser scanning operations and signal processing operations in a bioptical laser scanning system in which an independent signal processing channel is provided for each laser diode and light collection/detection subsystem in order to improve the signal processing speed of the system.

Another object of the present invention is to provide such time-division-multiplexed laser scanning operations and signal processing operations in a bioptical laser scanning system which a plurality of signal processors are used for simultaneously processing the scan data signals produced from each of the photodetectors within the laser scanner.

Another object of the present invention is to provide such time-division-multiplexed laser scanning operations and signal processing operations in a bioptical laser scanning system that provides improved scan coverage over the volume disposed between the two scanning windows of the system.

A further object of the present invention is to provide such time-division-multiplexed laser scanning operations and signal processing operations in a laser scanning system having a scan data signal processor with improved dynamic range.

A further object of the present invention is to provide such time-division-multiplexed laser scanning operations and signal processing operations in a laser scanning system having a multi-path scan data signal processor that employs different operational characteristics (such as different filter cutoff frequencies, peak thresholds, etc) in distinct signal processing paths.

A further object of the present invention is to provide such time-division-multiplexed laser scanning operations and signal processing operations in a laser scanning system having a multi-path scan data signal processor that concurrently performs distinct signal processing operations that employ different operational characteristics (such as different filter cutoff frequencies, peak thresholds, etc).

A further object of the present invention is to provide such time-division-multiplexed laser scanning operations and signal processing operations in a laser scanning system employing a scan data signal processor having a plurality of processing paths each processing the same data signal derived from the output of a photodetector to detect bar code symbols therein and generate data representing said bar code symbols, wherein the plurality of processing paths have different operational characteristics (such as different filter cutoff frequencies, peak thresholds, etc).

These and other objects of the present invention will become apparent hereinafter and in the Claims to Invention.

BRIEF DESCRIPTION OF THE DRAWINGS

In order to more fully understand the Objects of the Present Invention, the following Detailed Description of the Illustrative Embodiments should be read in conjunction with the accompanying Figure Drawings in which:

FIGS. 1C1 and 1C2 illustrate timing signals that define time slots during the overlap period of FIG. 1B; time-division multiplexed laser scanning and signal processing operations are performed (as set forth in the table of FIG. 1D) during such time slots in accordance with the present invention.

FIG. 1D is a table that describes time-division multiplexed laser scanning and signal processing operations performed by the exemplary bar code symbol scanning system of FIG. 1A in accordance with the present invention; such time-division multiplexed laser scanning and signal processing operations are performed during time slots defined by the timing signals of FIGS. 1C1 and 1C2.

FIG. 2D also depicts the orientation of a horizontal (ladder-type) bar code symbol and vertical (picket-fence type) bar code symbol on exemplary surfaces of the article.

FIG. 2N1 depicts the angle of each facet of the rotating polygonal mirrors PM1 and PM2 with respect to the rotational axis of the respective rotating polygonal mirrors in the illustrative bioptical laser scanning system described herein.

FIG. 2N2 is a pictorial illustration of the scanning ray pattern produced by the four facets of the first polygonal mirror PM1 in conjunction with the laser beam source provided by the first laser scanning station HST1 in the illustrative bioptical laser scanning system. A similar scanning ray pattern is produced by the four facets of the first polygonal mirror PM1 in conjunction with the laser beam source provided by the second laser scanning station HST2.

FIG. 2N3 is a pictorial illustration of the scanning ray pattern produced by the four facets of the second polygonal mirror PM2 in conjunction with the laser beam source provided by the third laser scanning station VST1 in the illustrative bioptical laser scanning system. The facets of the second polygonal mirror PM2 can be partitioned into two classes: a first class of facets (corresponding to angles $\beta_1$ and $\beta_2$) have High Elevation (HE) angle characteristics, and a second class of facets (corresponding to angles $\beta_3$ and $\beta_4$) have Low Elevation (LE) angle characteristics; high and low elevation angle characteristics are referenced by the plane P1 that contains the incoming laser beam and is normal to the rotational axis of the second polygonal mirror PM2; each facet in the first class of facets (having high beam elevation angle characteristics) produces an outgoing laser beam that is directed above the plane P1 as the facet sweeps across the point of incidence of the third laser scanning station VST1; whereas each facet in the second class of facets (having low beam elevation angle characteristics) produces an outgoing laser beam that is directed below the plane P1 as the facet sweeps across the point of incidence of the third laser scanning station VST1.

FIGS. 3B1 and 3B2 graphically depict a vector-based nomenclature that may be used to define horizontal and vertical scanning planes, respectively, that project through the bottom-scanning window 16.

FIGS. 3C1 and 3C2 is a perspective view and top view, respectively, of a wire frame model that illustrates the first group GH1 of laser beam folding mirrors of the first laser scanning station (HST1), which cooperate with the four scanning facets of the first rotating polygonal mirror PM1 so as to generate four different vertical laser scanning planes that project from the right back corner of the bottom-scanning window 16 diagonally outward and upward above the front left side (and front left corner) of the bottom-scanning window 16 as shown.

FIGS. 3D1 and 3D2 is a front view and top view, respectively, of a wire frame model that illustrates the second group GH2 of laser beam folding mirrors of the first laser scanning station (HST1), which cooperate with the four scanning facets of the first rotating polygonal mirror PM1 so as to generate four different horizontal laser scanning planes that project from the right side of the bottom-scanning window 16 diagonally outward and upward above the left side of the bottom-scanning window 16 as shown.

FIGS. 3E1 and 3E2 is a perspective view and top view, respectively of a wire frame model that illustrates the third group GH3 of laser beam folding mirrors of the first laser scanning station (HST1), which cooperate with the four scanning facets of the first rotating polygonal mirror PM1 so as to generate four different vertical laser scanning planes that project from the right front corner of the bottom-scanning window 16 diagonally outward and upward above the back left side and back left corner of the bottom-scanning window 16 as shown.

FIGS. 3F1 and 3F2 is a front view and side view, respectively, of a wire frame model that illustrates the fourth group GH4 of laser beam folding mirrors of the first laser scanning station (HST1), which cooperate with the four scanning facets of the first rotating polygonal mirror PM1 so as to generate eight different horizontal laser scanning planes that project from the front side of the bottom-scanning window 16 diagonally outward and upward above the back side of the bottom-scanning window 16 as shown; note that the first laser scanning station HST1 utilizes mirrors MH4 and MH5 (and not MH6) of group GH4 to produce eight different scan planes there from.

FIGS. 4B1 and 4B2 is a front view and side view, respectively, of a wire frame model that illustrates the first group (GH4) of laser beam folding mirrors of the second laser scanning station (HST2), which cooperate with the four scanning facets of the first rotating polygonal mirror PM1 so as to generate eight different horizontal laser scanning planes that project from the front side of the bottom-scanning window 16 diagonally outward and upward above the back side of the bottom-scanning window 16 as shown; note that the second laser scanning station HST2 utilizes mirrors MH5 and MH6 (and not MH4) of group GH4 to produce eight different scan planes there from.

FIGS. 4C1 and 4C2 is a perspective view and top view, respectively, of a wire frame model that illustrates the second group (GH5) of laser beam folding mirrors of the second laser scanning station (HST2), which cooperate with the four scanning facets of the first rotating polygonal mirror PM1 so as to generate four different vertical laser scanning planes that project from the left front corner of the bottom-scanning window 16 diagonally outward and upward above the back right side and back right corner of the bottom-scanning window 16 as shown.

FIGS. 4D1 and 4D2 is a front view and top view, respectively, of a wire frame model that illustrates the third group (GH6) of laser beam folding mirrors of the second laser scanning station (HST2), which cooperate with the four scanning facets of the first rotating polygonal mirror PM1 so as to generate four different horizontal laser scanning planes that project from the left side of the bottom-scanning window 16 diagonally outward and upward above the right side of the bottom-scanning window 16 as shown.

FIGS. 4E1 and 4E2 is a perspective view and top-view, respectively, of a wire frame model that illustrates the fourth group (GH7) of laser beam folding mirrors of the second laser scanning station (HST2), which cooperate with the four scanning facets of the first rotating polygonal mirror PM1 so as to generate four different vertical laser scanning planes that project from the left back corner of the bottom-scanning window 16 diagonally outward and upward above the front right side and front right corner of the bottom-scanning window 16 as shown.

FIGS. 5B1 and 5B2 graphically depict a vector-based nomenclature that may be used to define horizontal and vertical scanning planes, respectively, that project through the side-scanning window 18.

FIGS. 5C1 and 5C2 is a front view and top view, respectively, of a wire frame model that illustrates the first group (GV1) of laser beam folding mirrors of the third laser scanning station (VST1), which cooperate with the two low-elevation (LE) scanning facets of the second rotating polygonal mirror PM2 (corresponding to angles $\beta_3$ and $\beta_4$ of the second polygonal mirror PM2 in FIG. 2N1) so as to generate two different vertical laser scanning planes that project from the left side of the side-scanning window 18 diagonally down and out across the bottom-scanning window 16 above the front right corner of the bottom-scanning window 16 as shown.

FIGS. 5D1 and 5D2 is a perspective view and side view, respectively, of a wire frame model that illustrates the second group (GV2) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2N1) so as to generate two different vertical laser scanning planes that project from the top left corner of the side-scanning window 18 downward toward the bottom-scanning window 16 substantially along the left side of the bottom-scanning window 16 as shown.

FIGS. 5E1 and 5E2 is a front view and side view, respectively, of a wire frame model that illustrates the third group (GV3) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2N1) so as to generate two different horizontal laser scanning planes that project from the top left quadrant of the side-scanning window 18 diagonally down across the bottom-scanning window 16 as shown.

FIGS. 5F1 and 5F2 is a front view and side view, respectively, of a wire frame model that illustrates the fourth group (GV4) of laser beam folding mirrors of the third laser scanning station (VST1), which cooperate with the two low elevation scanning facets of the second rotating polygonal mirror PM2 (corresponding to angles $\beta_3$ and $\beta_4$ of the second polygonal mirror PM2 in FIG. 2N1) so as to generate two different horizontal laser scanning planes that project from the top right quadrant of the side-scanning window 18 diagonally down across the bottom-scanning window 16 as shown.

FIGS. 5G1 and 5G2 is a front view and side view, respectively, of a wire frame model that illustrates the fifth group (GV5) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2N1) so as to generate two different vertical laser scanning planes that project from the top right corner of the side-scanning window 18 downward toward the bottom-scanning window 16 substantially along the right side of the bottom-scanning window 16 as shown.

FIGS. 5H1 and 5H2 is a front view and side view, respectively, of a wire frame model that illustrates the sixth group (GV6) of laser beam folding mirrors of the third laser scanning station (VST1), which cooperate with the two low elevation scanning facets of the second rotating polygonal mirror PM2 (corresponding to angles $\beta_3$ and $\beta_4$ of the second polygonal mirror PM2 in FIG. 2N1) so as to generate two different vertical laser scanning planes that project from the right side of the side-scanning window 18 diagonally out across the bottom-scanning window 16 above the front left corner of the bottom-scanning window 16 as shown.

FIGS. 5I1 and 5I2 is a front view and side view, respectively, of a wire frame model that illustrates the seventh group (GV7) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the top left quadrant of the side-scanning window 18 outwardly across the bottom-scanning window 16 (substantially parallel to the bottom-scanning window 16) as shown.

FIGS. 5J1 and 5J2 is a front view and top view, respectively, of a wire frame model that illustrates the eighth group (GV8) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the left side of the side-scanning window 18 outwardly across the bottom-scanning window 16 (substantially parallel to the bottom-scanning window 16) as shown; in the illustrative embodiment, the characteristic direction of propagation of such scanning planes has a non-vertical component whose orientation relative to the normal of the side-scanning window 18 is greater than 35 degrees.

FIGS. 5K1 and 5K2 is a front view and side view, respectively, of a wire frame model that illustrates the ninth group (GV9) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the central portion of the side-scanning window 18 outwardly and downward across the bottom-scanning window 16 as shown.

FIGS. 5L1 and 5L2 is a front view and side view, respectively, of a wire frame model, that illustrates the tenth group (GV10) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the central portion of the side-scanning window 18 outwardly and sharply downward across the bottom-scanning window 16 as shown.

FIGS. 5M1 and 5M2 is a front view and side view, respectively, of a wire frame model that illustrates the eleventh group (GV11) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the central portion of the side-scanning window 18 outwardly and sharply downward across the bottom-scanning window 16 as shown.

FIGS. 5N1 and 5N2 is a front view and side view, respectively, of a wire frame model that illustrates the twelfth group (GV12) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the central portion of the side-scanning window 18 outwardly across the bottom-scanning window 16 (substantially parallel to the bottom-scanning window 16) as shown.

FIGS. 5O1 and 5O2 is a front view and top view, respectively, of a wire frame model that illustrates the thirteenth group (GV13) of laser beam folding mirrors of the third laser scanning station (VST1), which cooperate with the two high elevation scanning facets of the second rotating polygonal mirror (corresponding to angles $\beta_1$ and $\beta_2$ of the second polygonal mirror PM2 in FIG. 2N1) so as to generate two different horizontal laser scanning planes that project from the right side of the side-scanning window 18 outwardly across the bottom-scanning window 16 (substantially parallel to the bottom-scanning window 16) as shown; in the illustrative embodiment, the characteristic direction of propagation of such scanning planes has a non-vertical component whose orientation relative to the normal of the side-scanning window 18 is greater than 35 degrees.

FIGS. 5P1 and 5P2 is a front view and side view, respectively, of a wire frame model that illustrates the fourteenth group (GV14) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the top right quadrant of the side-scanning window 18 outwardly across the bottom-scanning window 16 (substantially parallel to the bottom-scanning window 16) as shown.

FIGS. 6C1 through 6C3 illustrates alternate timing schemes for controlling the bioptical laser scanner of the illustrative embodiment to cyclically generate a complex omni-directional TDM laser scanning pattern from both the bottom and side-scanning windows 16 and 18 thereof during the revolutions of the scanning polygonal mirrors PM1 and PM2; as is similar to the timing schemes of FIGS. 6A and 6B, four sets of scan plane groups (4* [GH1 . . . GH7]) are produced by stations HST1 and HST2 during each revolution of the polygonal mirror PM1, and two sets of TDM scan plane groups (2*[GV1 . . . GV14]) are produced by station VST1 during a single revolution of the polygonal mirror PM2; in contrast, the TDM laser scanning operations (and corresponding signal processing operations) are defined by time slots uniquely assigned to scanning stations HST1 and HST2 which correspond to scanning plane groups produced by stations HST1 and HST2, respectively. In FIG. 6B1, the TDM timeslots are logically assigned to scanning plane groups produced by HST1 and HST2 during a_revolution of the polygonal mirror PM1. In FIG. 6B2, the TDM timeslots are logically assigned to scanning plane groups produced by HST1 and HST2 during a_revolution of the polygonal mirror PM1. And in FIG. 6B3, the TDM timeslots are logically assigned to scanning plane groups produced by HST1 and HST2 during a full revolution of the polygonal mirror PM1.

FIGS. 8B1 through 8B9 illustrate the timing signals generated by the circuit elements of FIG. 8A; the timing signals define time slots during which time-division multiplexed laser scanning and signal processing operations are performed in accordance with the present invention.

FIG. 8C is a table that describes time-division multiplexed laser scanning and signal processing operations performed by the illustrative bioptical laser scanning system described herein in accordance with the present invention; such time-division multiplexed laser scanning and signal processing operations are performed during time slots defined by the timing signals of FIGS. 8B1 through 8B9.

FIG. 8E1 is a functional block diagram of exemplary electronic circuitry that performs time-division multiplexed laser scanning operations in response to the timing signals of FIGS. 8B6 through 8B9.

FIG. 8E2 is a table that describes VLD modulation operations performed by the electronic circuitry of FIG. 8E1 for one laser light source (e.g., the VLD of laser scanning station HST1) in response to the timing signal HST1_ENABLE of FIG. 8B6; analogous VLD modulation operation are performed by the electronic circuitry of FIG. 8E1 for other laser light sources (e.g., the VLDs of laser scanning stations HST2 and VST1) in response to the timing signals HST2_ENABLE and VST1_ENABLE of FIGS. 8B7 and 8B8, respectively, to perform the time-division multiplexed laser scanning operations in accordance with the present invention.

FIG. 8E3 is a graphical representation of the optical power characteristics output from an exemplary visible laser diode in response to current supplied thereto; in addition the graphical representation shows the output power levels $P_{ON}$ and $P_{OFF}$ of the exemplary visible laser diode in response to the logic levels H and L, respectively, of the enable timing signal (e.g., HST1_ENABLE) during the time-division multiplexed laser scanning operations of FIG. 8E2.

FIG. 8F1 is a functional block diagram of an illustrative embodiment of HST1 VLD Drive Circuitry and HST1 VLD Module in accordance with the present invention, such circuitry carries out time-division multiplexed laser scanning operations for HST1 in response to the timing signals of FIGS. 8B6 through 8B8, in accordance with the table of FIG. 8E2 and graph of FIG. 8E3; analogous circuitry may be embodied as part of the HST2 Drive Circuitry and HST2 VLD Module as well as the VST1 Drive Circuitry and VST1 VLD Module, which carries out time-division multiplexed laser scanning operations for HST2 and VST1, respectively, in response to the timing signals of FIGS. 8E6 through 8E8.

FIG. 8F2 is a graphical representation of the optical power characteristics output from an exemplary visible laser diode (which is part of the HST1 VLD Module, HST2 VLD Module, or VST1 Module shown in FIG. 8F1) in response to current supplied thereto; in addition, the graph shows the output power levels $P_{ON}$ and $P_{OFF}$ of the visible laser diode in response to the logic levels H and L, respectively, of the corresponding enable timing signal (e.g., HST1_ENABLE, HST2_ENABLE, or VST1_ENABLE) during time-division multiplexed laser scanning operations; note that in the illustrative embodiment of FIGS. 8F1 and 8F2, the current level $I_{Laser}$ that is supplied to the visible laser diode is near zero ($I_{Laser}=I_{MOD}=I_{Off}\approx 0$) in response to the "L" logic level of the enable timing signal in order to produce the $P_{OFF}$ output power level (e.g., near zero output power level), and that the current level $I_{Laser}$ that is supplied to the visible laser diode is substantially greater than the threshold current $I_{TH}$ ($I_{Laser}=I_{MOD}=I_{ON}>>I_{TH}$) in response to the "H" logic level of the enable timing signal in order to produce the $P_{ON}$ output power level (which is substantially greater than near zero, e.g., on the order of 1 to 5 mW for typical bar code reading applications).

FIG. 8G1 is a functional block diagram of an alternate embodiment of HST1 VLD Drive Circuitry and HST1 VLD Module in accordance with the present invention, such circuitry carries out time-division multiplexed laser scanning operations for HST1 in response to the timing signals of FIGS. 8B through 8B8, in accordance with the table of FIG. 8E2 and graph of FIG. 8E3; analogous circuitry may be embodied as part of the HST2 Drive Circuitry and HST2 VLD Module as well as the VST1 Drive Circuitry and VST1 VLD Module, which carries out time-division multiplexed laser scanning operations for HST2 and VST1, respectively, in response to the timing signals of FIGS. 8B6 through 8B8.

FIG. 8G2 is a graphical representation of the optical power characteristics output from an exemplary visible laser diode (which is part of the HST1 VLD Module, HST2 VLD Module, or VST1 Module shown in FIG. 8G1) in response to current supplied thereto; in addition, the graph shows the output power levels $P_{ON}$ and $P_{OFF}$ of the visible laser diode in response to the logic levels H and L, respectively, of the corresponding enable timing signal (e.g., HST1_ENABLE, HST2_ENABLE, or VST1_ENABLE) during time-division multiplexed laser scanning operations; note that in the illustrative embodiment of FIG. 8G1 and 8G2, the current level $I_{Laser}$ that is supplied to the visible laser diode is near the threshold current $I_{TH}$ ($I_{Laser}=I_{BIAS}=I_{Off}\approx I_{TH}$) in response to the "L" logic level of the enable timing signal in order to produce the $P_{OFF}$ output power level (e.g., near zero output power level), and that the current level $I_{Laser}$ that is supplied to the visible laser diode is substantially greater than the threshold current $I_{TH}$ ($I_{Laser}=(I_{BIAS}+I_{MOD})=I_{ON}>>I_{TH}$) in response to the "H" logic level of the enable timing signal in order to produce the $P_{ON}$ output power level (which is substantially greater than near zero, e.g., on the order of 1 to 5 mW for typical bar code reading applications).

FIGS. 12A through 12I are signal diagrams that illustrate the operation of the TDM-enabled multi-path scan data signal processor 901 of the illustrative embodiment of FIG. 11C; FIG. 12A depicts the TDM scanning laser beam moving across bar and spaces of a bar code; FIG. 12B1 depicts the light level received at the photodetector 902; FIG. 12B2 depicts the light level received at the photodetector at high resolution in time, which shows the effect of TDM laser scanning; FIG. 12C1 depicts the voltage level produced at the output node of the track and hold circuit at a high resolution in time, which shows the effect of TDM signal processing operations; FIG. 12C2 depicts the voltage level of the scan data signal produced at the output of filter 912; and FIGS. 12D through 12I depict the processing performed in one of the respective paths of the multi-path scan data signal processor 901; Similar processing operations with different operations characteristics are performed in other paths of the multi-path scan data signal processor 901.

FIG. 19B illustrates exemplary digital signal processing operations that identify a data frame (e.g., a portion of the discrete scan data signal levels stored in memory 1709) that potentially represents a bar code symbol (block 1723) and stores the data frame in a working buffer (block 1725); FIG. 19C illustrates exemplary digital signal processing operations that carry out multi-path scan data signal processing according to the present invention; and FIG. 19D illustrates alternative digital signal processing operations that carry out multi-subpath scan data signal processing (with different first derivative threshold processing performed in each subpath) according to the present invention.

DETAILED DESCRIPTION OF THE ILLUSTRATIVE EMBODIMENTS OF THE PRESENT INVENTION

Referring to the figures in the accompanying Drawings, the various illustrative embodiments of the bioptical laser scanner of the present invention will be described in great detail.

Figure 1A:
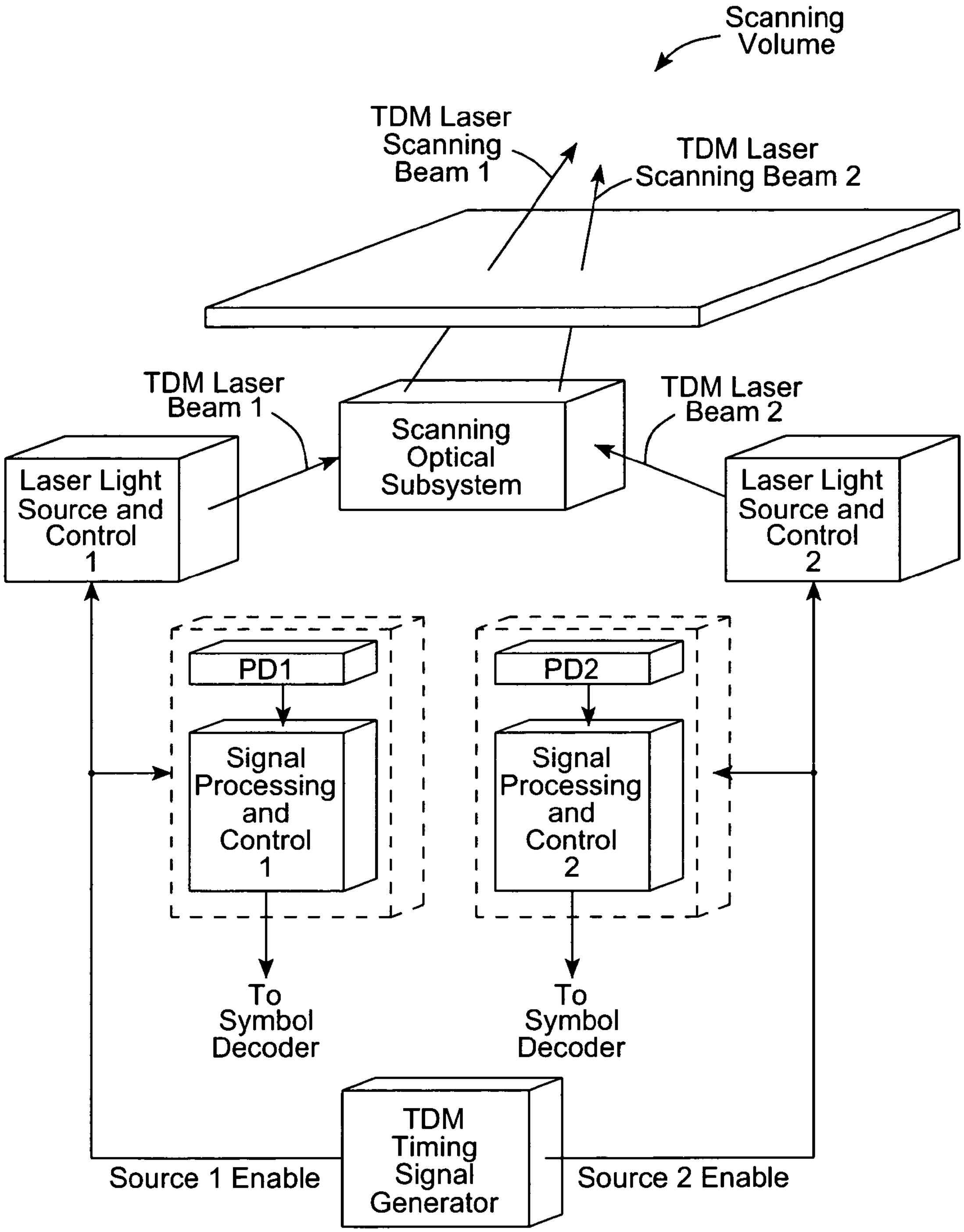
FIG. 1A is a pictorial illustration of an exemplary bar code symbol scanning system employing time-division multiplexed laser scanning and signal processing operations in accordance with the present invention. In the illustrative embodiment shown, two time-division multiplexed laser scanning beams cyclically scan through the scanning volume for detecting and decoding bar code labels disposed on surfaces therein.

FIG. 1A is a pictorial illustration of an exemplary bar code symbol scanning system employing time-division multiplexed laser scanning and signal processing operations in accordance with the present invention. In the illustrative embodiment shown, two time-division multiplexed laser scanning beams cyclically scan through the scanning volume of the system for detecting and decoding bar code labels disposed on surfaces therein. However, the present invention is not limited in this respect and can be employed in bar code systems that cyclically scan through the scanning volume of the system with a larger number of time-division multiplexed laser scanning beams (for example, the illustrative bioptical laser scanning system described below).

Figure 1B:
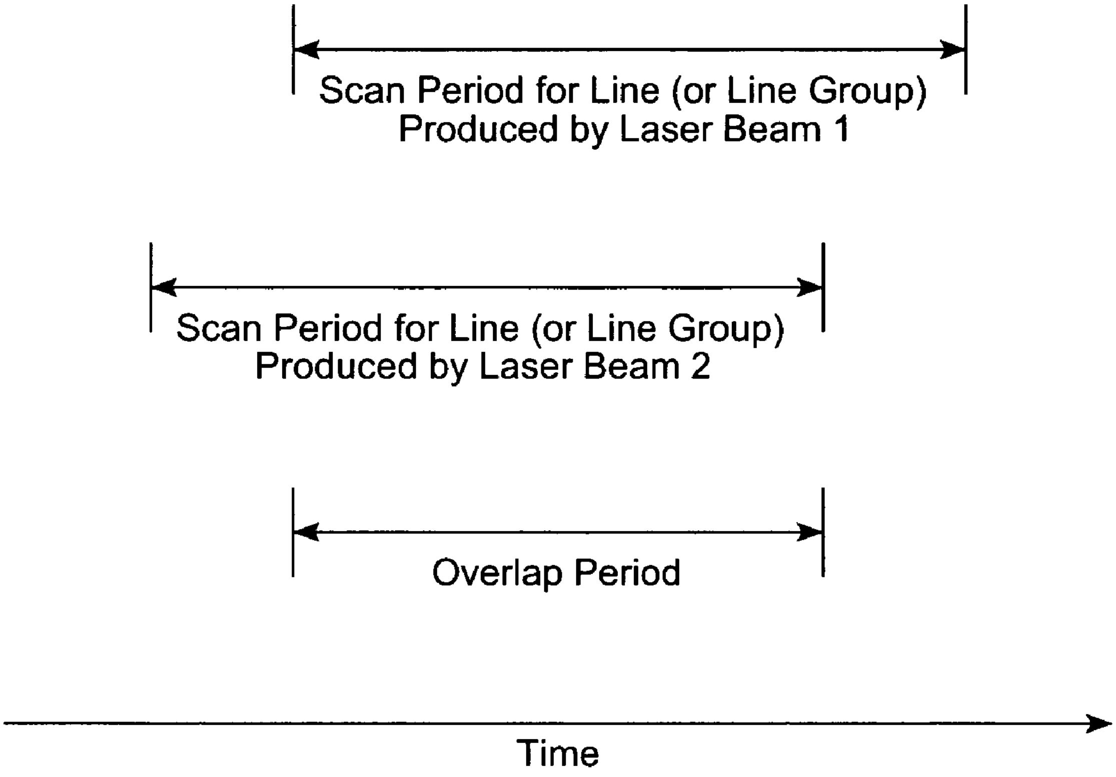
FIG. 1B is a timing diagram that illustrates the overlap period between scan periods for two representative scan lines (or scan line groups) produced by the two laser scanning beams of FIG. 1A. In accordance with the present invention, time-division multiplexed laser scanning operations and signal processing operations are performed during this overlap period whereby a plurality of successive non-overlapping time slots (that occur during this overlap period) are logically assigned to a unique laser scanning beam and corresponding photosensor. During a given time slot, the laser scanning beam logically assigned thereto (e.g., Laser Scanning Beam 1) is selectively generated (or selectively projected) into the scanning volume while generation (or projection) of the other laser scanning beam (e.g., Laser Scanning Beam 2) is disabled. Moreover, during the given time slot (or during a portion of the given time slot), the photosensor logically assigned thereto (e.g., PD1) is operably coupled to signal processing circuitry that performs bar code detection operations on the data signals derived therefrom. Furthermore, during the given time slot, the other photosensor (e.g., PD2) is operably decoupled (e.g., electrically isolated) from signal processing circuitry that performs bar code detection operations on data signals derived therefrom. The frequency of such time-division-multiplexed laser scanning operations and corresponding signal processing operations may be greater than two times the Nyquist frequency (and preferably performed at a frequency greater than four times the Nyquist frequency). In such embodiments, when a given photosensor is operably decoupled (e.g., electrically isolated) from bar code detection signal processing circuitry, such bar code detection signal processing circuitry operates on a sample of the data signals derived from the given photosensor during the previous time slot logically assigned to the given photosensor. Preferably, this sample is stored on a hold capacitor that is operably coupled to such bar code detection signal processing circuitry.

More specifically, during each scan cycle through the scanning volume, each laser scanning beam forms a plurality of multi-dimensional scan lines that project through the scanning volume such that there is an overlap period between scan periods for scan line pairs (or scan line groups) produced by the two laser scanning beams. FIG. 1B is a timing diagram that illustrates the overlap period between scan periods for two representative scan lines (or scan line groups) produced by the two laser scanning beams of FIG. 1A. In accordance with the present invention, time-division multiplexed laser scanning operations and signal processing operations are performed during this overlap period whereby a plurality of successive non-overlapping time slots (that occur during this overlap period) are logically assigned to a unique laser scanning beam and corresponding photosensor. During a given time slot, the laser scanning beam logically assigned thereto (e.g., Laser Scanning Beam 1) is selectively generated (or selectively projected) into the scanning volume while generation (or projection) of the other laser scanning beam (e.g., Laser Scanning Beam 2) is disabled. Moreover, during the given time slot (or during a portion of the given time slot), the photosensor logically assigned thereto (e.g., PD1) is operably coupled to signal processing circuitry that performs bar code detection operations on the data signals derived therefrom. Furthermore, during the given time slot, the other photosensor (e.g., PD2) is operably decoupled (e.g., electrically isolated) from bar code detection signal processing circuitry that performs bar code detection operations on the data signals derived therefrom.

Such time-division-multiplexed laser scanning operations and corresponding signal processing operations may be performed at high frequencies (for example, frequencies greater than two times the Nyquist frequency, and possibly at frequencies greater than four times the Nyquist frequency as described herein). In such embodiments, when a given photosensor is operably decoupled (e.g., electrically isolated) from bar code detection signal processing circuitry, such bar code detection signal processing circuitry operates on a sample of the data signals derived from the given photosensor during the previous time slot logically assigned to the given photosensor. Such operations are preferably provided by track and hold circuitry (or sample and hold circuitry which is well known in the electronic arts) which operably couples/decouples (e.g., electrically isolates) the output of a given photosensor from bar code detection signal processing circuitry, and stores a sample of the data signals derived from the given photosensor during the previous time slot logically assigned to the given photosensor on a hold capacitor that is operably coupled to bar code detection signal processing circuitry.

Alternatively, such time-division-multiplexed laser scanning operations and corresponding signal processing operations may be performed at lower frequencies (e.g., much less than the Nyquist frequency, such as at frequencies corresponding to scan lines or scan line groups as described herein). In such embodiments, a multiplexing switch may be used to operably couple/decouple (e.g., electrically isolate) the output of a given photosensor from bar code detection signal processing circuitry, and there is no need to store (and process) a sample of the data signals derived from the given photosensor during the previous time slot logically assigned to the given photosensor. It should be noted that in such embodiments, the bar code detection signal processing circuitry operates at frequencies at least two times greater than the Nyquist frequency in sampling and processing the scan data signals supplied thereto over a given TDM time slot to detect and decode bar code symbols therein.

FIGS. 1C1 and 1C2 illustrate timing signals that define time slots during the overlap period of FIG. 1B whereby time-division multiplexed laser scanning and signal processing operations are performed (as set forth in the table of FIG. 1D) during such time slots in accordance with the present invention. As shown, the active state (e.g., H logic level) of the SOURCE1_ENABLE signal defines a set of time slots (denoted "slot_1") that are logically assigned to laser source LS1 and corresponding photosensor (e.g. PD1) of FIG. 1A. Similarly, the active state (e.g., H logic level) of the SOURCE2_ENABLE signal defines a set of time slots (denoted "slot_2") that are logically assigned to Laser Source LS2 and corresponding photosensor (e.g. PD2) of FIG. 1A. The "slot_1" time slots do not temporally overlap the "slot_2" time slots as shown.

As summarized in the table of FIG. 1D, the following operations are performed during the "slot_1" time slots when the Source1_Enable Signal is active:

i) during the "slot_1" time slots, generation and/or projection of the scanning laser beam from Laser Source LS1 into the scanning volume is enabled; and ii) during a portion of the "slot_1" time slots, photosensor PD1 is operably coupled to signal processing circuitry that performs bar code detection and decoding operations on data signals derived from the output of photosensor PD1.

Note that during the "slot_1" time slots, the Source2_Enable Signal is inactive. As summarized in the table of FIG. 1D, the following operations are performed during the "slot_1" time slots when the Source2_Enable Signal is inactive:

i) generation and/or projection of the scanning laser beam from Laser Source LS2 into the scanning volume is disabled; and ii) photosensor PD2 is operably decoupled (e.g., electrically isolated) from bar code detection signal processing circuitry.

In the event that the time-division-multiplexed laser scanning operations of Laser Source LS2 and corresponding signal processing operations performed on the output of photosensor PD2 are performed at a high frequency (e.g., at a frequency greater than two times the Nyquist frequency and possibly greater than four times the Nyquist frequency as described herein), which is determined by the frequency of Source2_Enable Signal, bar code detection signal processing circuitry operates on a sample of the data signals derived from the photosensor PD2 during the previous "slot_2" time slot. Such operations are preferably provided by track and hold circuitry (or sample and hold circuitry which is well known in the electronic arts) which operably couples/decouples (e.g., electrically isolates) the output of a photosensor PD2 from bar code detection signal processing circuitry, and stores a sample of the data signals derived from the photosensor PD2 during the previous "slot_2" time slot on a hold capacitor that is operably coupled to bar code detection signal processing circuitry when the Source2_Enable Signal is inactive (which is during the "slot_1" time slots).

In the event that the time-division-multiplexed laser scanning operations of Laser Source LS2 and corresponding signal processing operations performed on the output of photosensor PD2 are performed at a lower frequency (e.g., at a frequency much less than the Nyquist frequency as described herein), which is determined by the frequency of Source2_Enable Signal), bar code detection signal processing circuitry does not operate on samples of data signals derived from the photosensor PD2 during the "slot_1" time slots. It should be noted that in such embodiments, the bar code detection signal processing circuitry operates at frequencies at least two times greater than the Nyquist frequency in sampling and processing the data signals derived from the photosensor PD1 and supplied thereto during the "slot_1" time slots in order to detect and decode bar code symbols therein.

Similar time-division multiplexed scanning and signal processing operations are performed by Laser Source LS2 and the output of PD2 during the "slot_2" time slots. More specifically, as summarized in the table of FIG. 1D, the following operations are performed during the "slot_2" time slots when the Source2_Enable Signal is active:

i) during the "slot_2" time slots, generation and/or projection of the scanning laser beam from Laser Source LS2 into the scanning volume is enabled; and ii) during a portion of the "slot_2" time slots, photosensor PD2 is operably coupled to signal processing circuitry that performs bar code detection and decoding operations on data signals derived from the output of photosensor PD2.

Note that during the "slot_2" time slots, the Source1_Enable Signal is inactive. As summarized in the table of FIG. 1D, the following operations are performed during the "slot_2" time slots when the Source1_Enable Signal is inactive:

i) generation and/or projection of the scanning laser beam from Laser Source LS1 into the scanning volume is disabled; and ii) photosensor PD1 is operably decoupled (e.g., electrically isolated) from bar code detection signal processing circuitry.

In the event that the time-division-multiplexed laser scanning operations of Laser Source LS1 and corresponding signal processing operations performed on the output of photosensor PD1 are performed at a high frequency (e.g., at a frequency greater than two times the Nyquist frequency and possibly greater than four times the Nyquist frequency as described herein), which is determined by the frequency of Source1_Enable Signal), bar code detection signal processing circuitry operates on a sample of the data signals derived from the photosensor PD1 during the previous "slot_1" time slot. Such operations are preferably provided by track and hold circuitry (or sample and hold circuitry which is well known in the electronic arts) which operably couples/decouples (e.g., electrically isolates) the output of a photosensor PD1 from bar code detection signal processing circuitry, and stores a sample of the data signals derived from the photosensor PD1 during the previous "slot_1" time slot on a hold capacitor that is operably coupled to bar code detection signal processing circuitry when the Source1_Enable Signal is inactive (which is during the "slot_2" time slots).

In the event that the time-division-multiplexed laser scanning operations of Laser Source LS1 and corresponding signal processing operations performed on the output of photosensor PD1 are performed at a lower frequency (e.g., at a frequency much less than the Nyquist frequency as described herein), which is determined by the frequency of Source1_Enable Signal, bar code detection signal processing circuitry does not operate on samples of data signals derived from the photosensor PD1 during the "slot_2" time slots. It should be noted that in such embodiments, the bar code detection signal processing circuitry operates at frequencies at least two times greater than the Nyquist frequency in sampling and processing the data signals derived from the photosensor PD2 and supplied thereto during the "slot_2" time slots in order to detect and decode bar code symbols therein.

Advantageously, both the higher frequency and lower frequency synchronous time-division multiplexed laser scanning and signal processing operations as described herein enable a bar code symbol scanning system of the present invention to scan the scanning volume with a plurality of multi-dimensional laser scanning beams to detect and decode bar code symbols on surfaces disposed therein while avoiding optical crosstalk in addition to light interference from ambient light and unwanted reflections. In addition, the lower frequency synchronous time-division multiplexed laser scanning and signal processing mechanisms as described herein are less complex and less costly to implement as compared to the higher frequency mechanisms, yet such lower frequency mechanisms may suffer from decreased throughput because the bar code detection signal processing operations is inactive during portions of the scan cycle.

The synchronous time-division multiplexed laser scanning and signal processing operations described herein are well suited for a point of sale (POS) presentation scanner (where a label to be scanned is moved through the scanning region for data acquisition); however such features can be used in other bar code reading and imaging systems, including handheld scanners and other POS scanners in addition to hold-under scanners and other industrial scanners.

Point-of-sale (POS) scanners are typically designed to be used at a retail establishment to determine the price of an item being purchased. POS scanners are generally smaller than industrial scanner models, with more artistic and ergonomic case designs. Small size, low weight, resistance to damage from accident drops and user comfort, are all major design factors for the POS scanner. POS scanners include hand-held scanners, hands-free presentation scanners and combination-type scanners supporting both hands-on and hands-free modes of operation. These scanner categories will be described in greater detail below.

As described above, hand-held scanners are designed to be picked up by the operator and aimed at the label to be scanned. In addition, hand-held scanners have many uses outside POS applications such as inventory management and portable data acquisition and object identification.

Hands-free presentation scanners are designed to remain stationary and have the item to be scanned picked up and passed in front of the scanning device. Presentation scanners can be mounted on counters looking horizontally, embedded flush with the counter looking vertically, or partially embedded in the counter looking vertically, but having a "tower" portion which rises out above the counter and looks horizontally to accomplish multiple-sided scanning. If necessary, presentation scanners that are mounted in a counter surface can also include a scale to measure weights of items.

Some POS scanners can be used as handheld units or mounted in stands to serve as presentation scanners, depending on which is more convenient for the operator based on the item that must be scanned.

An industrial scanner is a scanner that has been designed for use in a warehouse or shipping application where large numbers of packages must be scanned in rapid succession. Industrial scanners include conveyor-type scanners (which scan packages as they move by on a conveyor belt) and hold-under scanners (which scan packages that are picked up and held underneath it). The package is then manually routed or otherwise handled, perhaps based on the result of the scanning operation. Hold-under scanners are generally mounted so that its viewing optics are oriented in a downward direction, like a library bar code scanner.

Figure 2A:
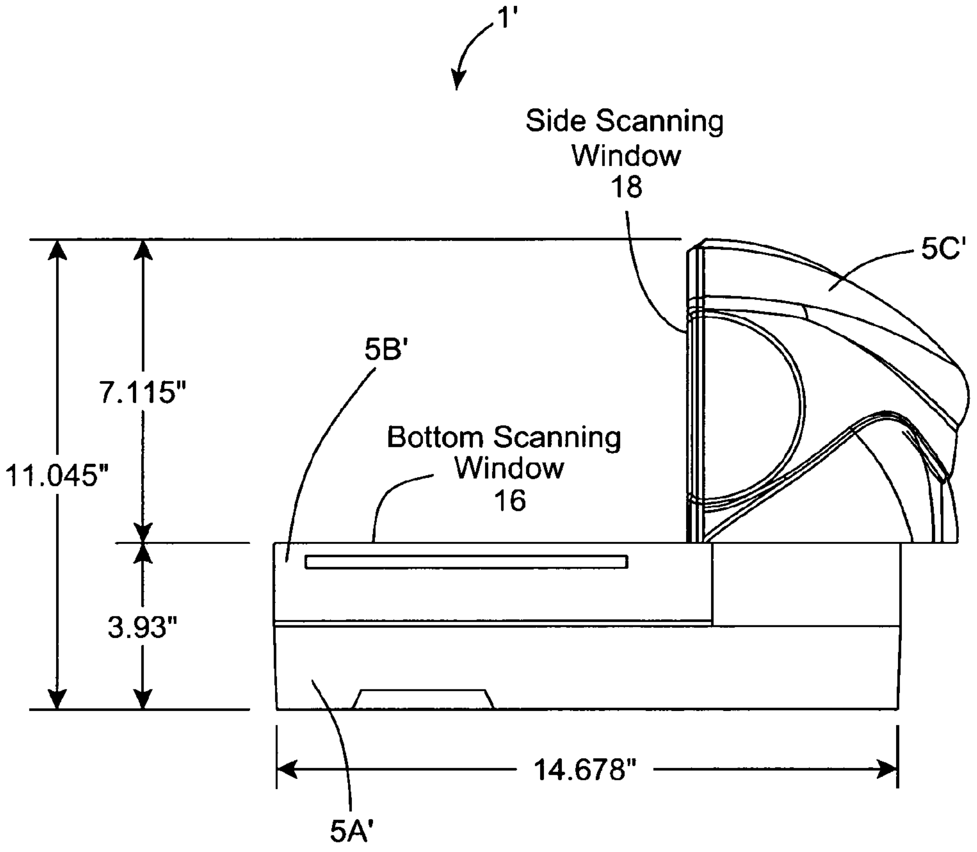
FIG. 2A is a side view of an illustrative bioptical laser scanning system in accordance with the present invention, showing bottom-scanning and side-scanning windows formed with its compact scanner housing.
Figure 2B:
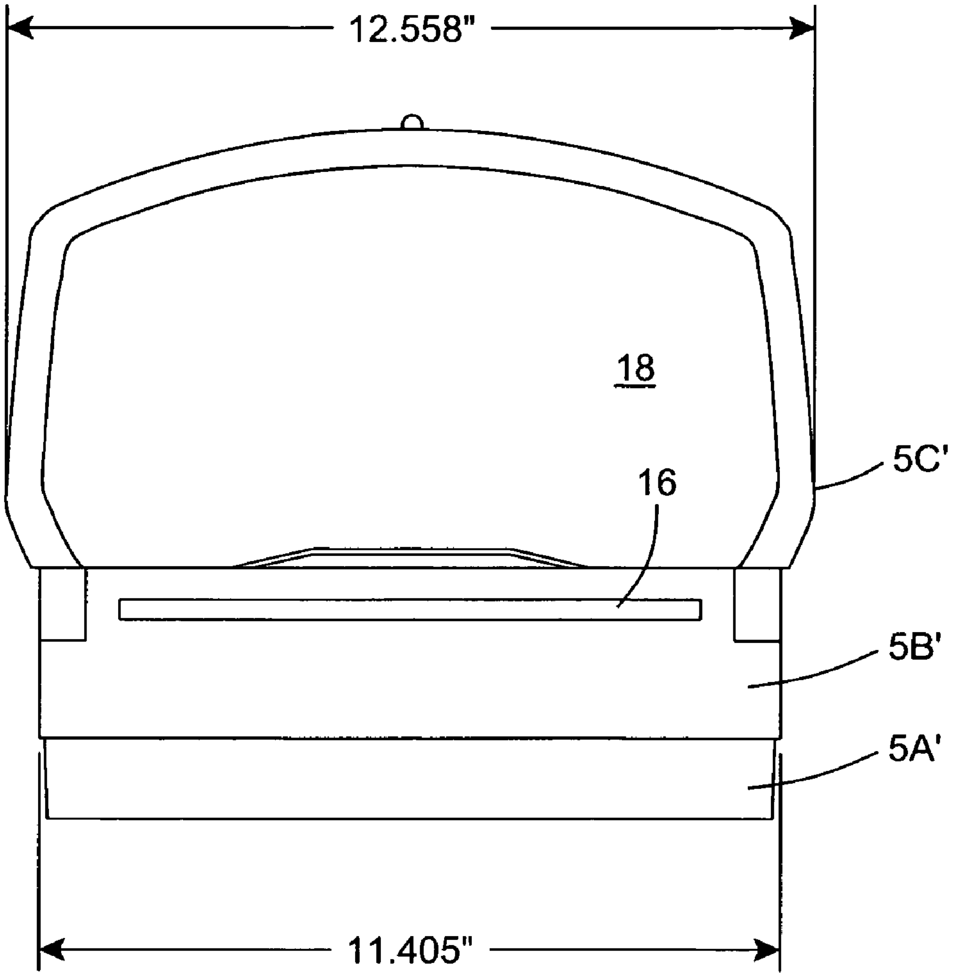
FIG. 2B is a front view of the illustrative bioptical laser scanning system of FIG. 2A.
Figure 2C:
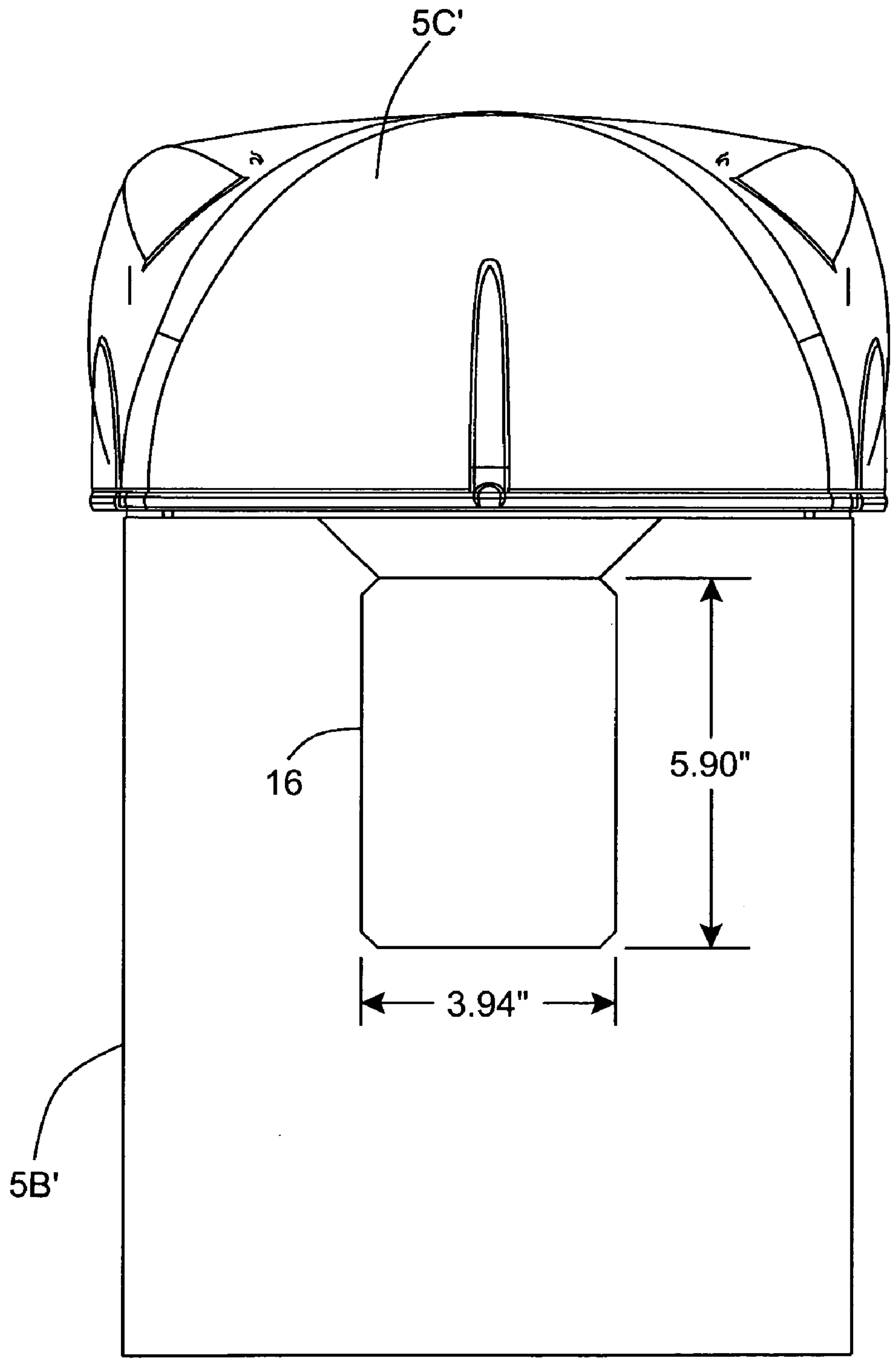
FIG. 2C is a top view of the illustrative bioptical laser scanning system of FIGS. 2A and 2B.

An illustrative bioptical scanning system (presentation-type) in accordance with the present invention is illustrated in FIGS. 2A through 7. As shown in FIGS. 2A-2C, the housing 5' of the scanner has multiple parts (a bottom portion 5A', a top portion 5B' and a hood portion 5C') that are preferably mated together with screws and posts as shown. The top portion 5B' includes a first scanning window 16 (referred to below as the "bottom scanning window"), while the hood portion 5C' includes a second scanning window 18 (referred to below as "side scanning window") which is preferably oriented substantially orthogonal to the bottom scanning window 16 as shown. When the scanning system is installed within a counter-top surface, as shown in FIG. 2D, the top portion 5B' (and the bottom scanning window 16 integral thereto is oriented horizontally, whereas the hood portion 5C' (and the side scanning window 18 integral thereto) is oriented vertically with respect to the POS station. Thus throughout the Specification and Claims hereof, the terms "bottom scanning window" and "horizontal window" may be used interchangeably but refer to the same structure; likewise, the terms "side scanning window" and "vertical window" may be used interchangeably but refer to the same structure.

The bottom housing portion 5A' and top housing portion 5B' together (which include the bottom scanning window 16)

have width, length and height dimensions of approximately 11.405, 14.678 and 3.93 inches, respectively, whereas the hood housing portion 5C' (which includes the side scanning window 18) has width and height dimensions of 12.558 inches and 7.115 inches, respectively. The total height of the scanner housing 5' is approximately 11.044 inches. In addition, the bottom-scanning window 16 has width and length dimensions of approximately 3.94 inches (100 mm) and 5.9 inches (150 mm), respectively, to provide a window with a square area of approximately 15,000 square mm. And, the side-scanning window 18 has width and height dimensions of approximately 9.8 inches (248 mm) and 5.9 inches (150 mm), respectively, to provide a window with a square area of approximately 37,200 square mm. As will be described in greater detail below, the bioptical laser scanning mechanism housed within this housing produces an omnidirectional TDM laser scanning pattern within the three-dimensional volume above the bottom-scanning window 16 and in front of the side-scanning window 18.

Figure 2D:
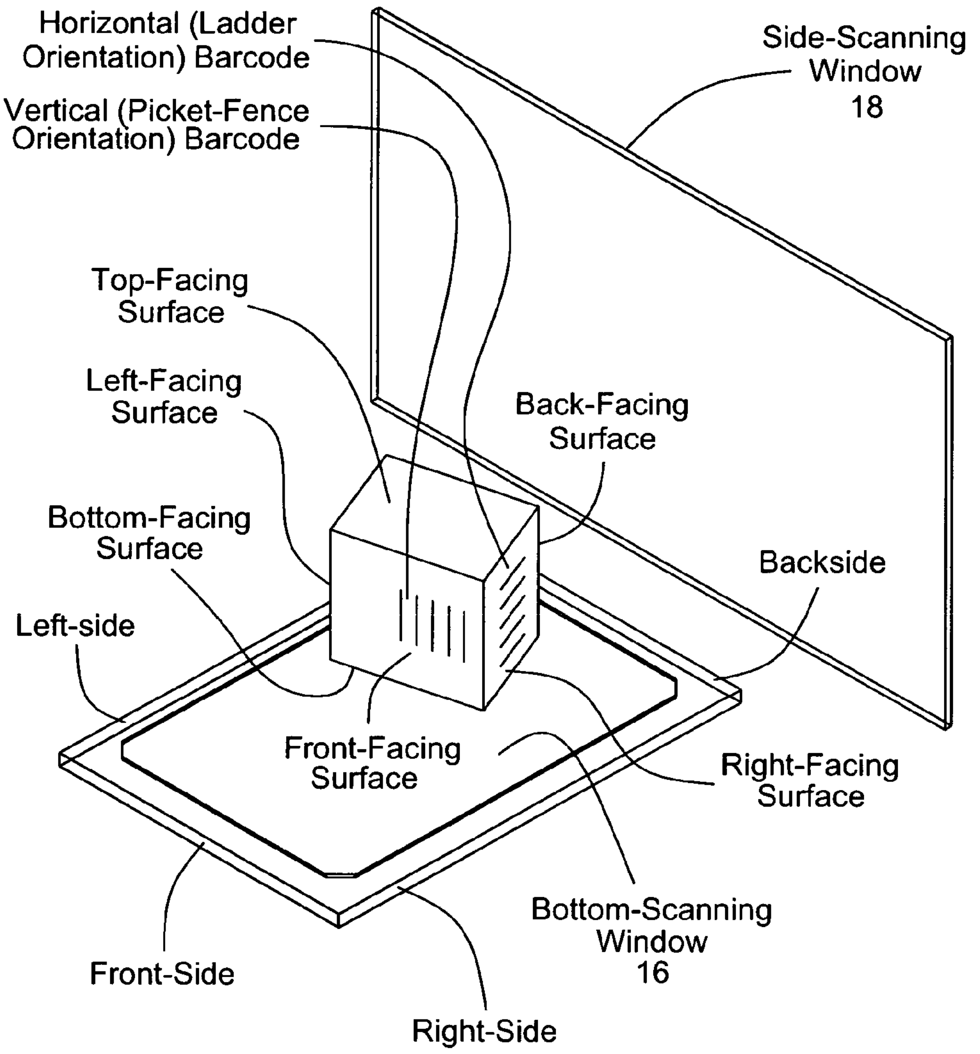
FIG. 2D is a pictorial illustration depicting bottom-facing, top-facing, back-facing, front-facing, left-facing and right-facing surfaces of a rectangular shaped article oriented within the scanning volume (disposed between the bottom-scanning and side-scanning windows) of the illustrative bioptical laser scanning system in accordance with the present invention.
Figure 2E:
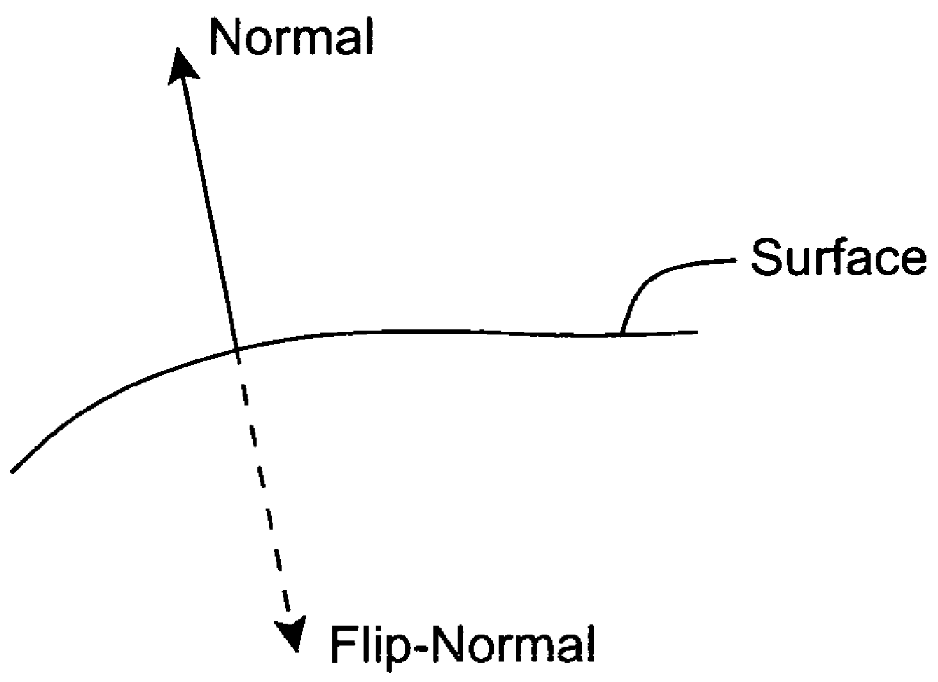
FIG. 2E is a pictorial illustration depicting a normal of a surface and the "flip-normal" of the surface as used herein.

The omnidirectional TDM scanning pattern is capable of reading picket-fence type bar code symbols on bottom-facing surfaces (i.e., a surface whose normal is directed toward the bottom-scanning window 16 of the scanner), top-facing surfaces (i.e., a surface whose "flip-normal" is directed toward the bottom-scanning window 16 of the scanner), back-facing surfaces (i.e., a surface whose normal is directed toward the side-scanning window 18 of the scanner), front-facing surfaces (i.e., a surface whose "flip-normal" is directed toward the side-scanning window 18 of the scanner), left-facing surfaces (i.e., a surface whose normal is directed toward or above the left side of the scanner), and right-facing surfaces (i.e., a surface whose normal is directed toward or above the right side of the scanner). A "flip-normal" as used above is a direction co-linear to the normal of a surface yet opposite in direction to this normal as shown in FIG. 2E. An example of such bottom-facing, top-facing, back-facing, front-facing surfaces, left-facing surfaces, and right-facing surfaces of a rectangular shaped article oriented in the scan volume of the bioptical laser scanning system 1' disposed between bottom-scanning and side-scanning windows 16, 18 of the system is illustrated in FIG. 2D.

Figure 2F:
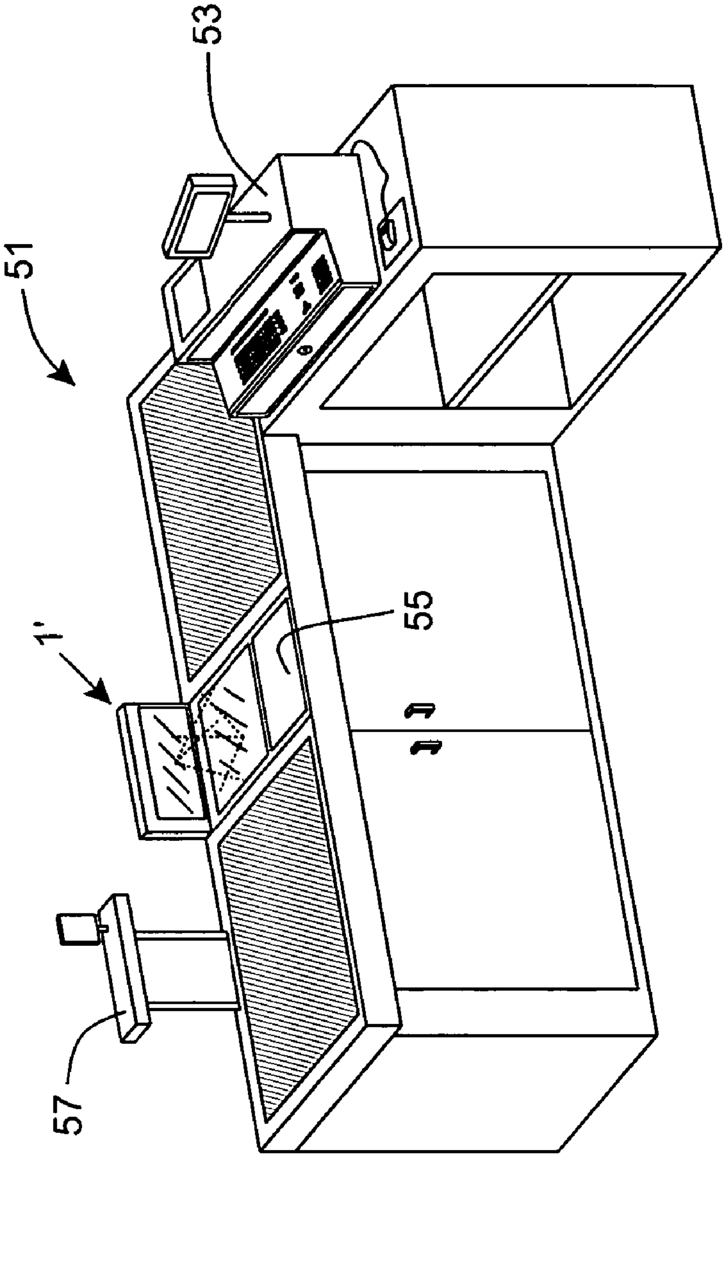
FIG. 2F is a perspective view of the illustrative bioptical laser scanning system according to the present invention shown installed in a Point-Of-Sale (POS) retail environment.
Figure 2G:
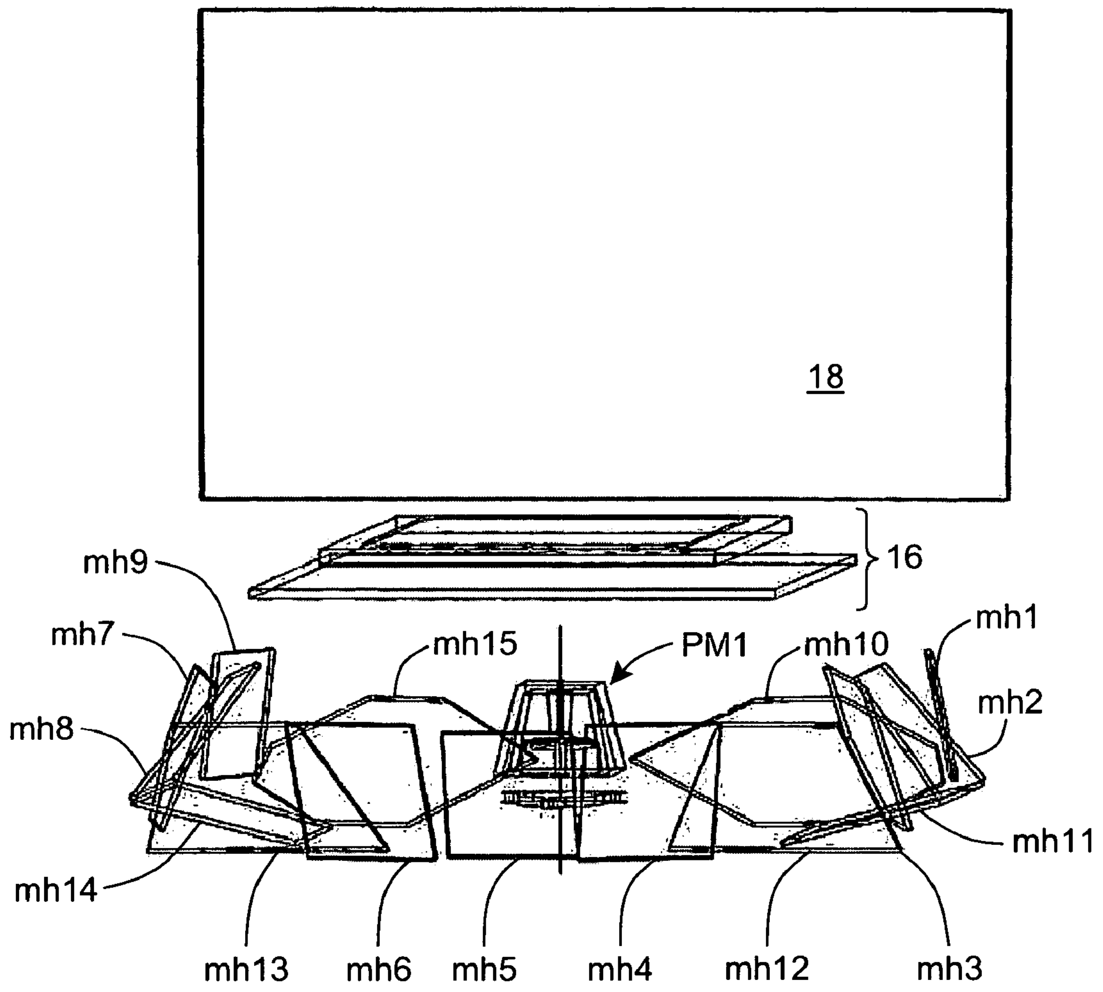
FIG. 2G is a perspective view of a wire frame model of portions of the horizontal section of the illustrative bioptical laser scanning system, including the bottom-scanning window (e.g., horizontal window), first rotating polygonal mirror PM1, and the first and second scanning stations HST1 and HST2 disposed thereabout, wherein each laser scanning station includes a set of laser beam folding mirrors disposed about the first rotating polygon PM1.
Figure 2H:
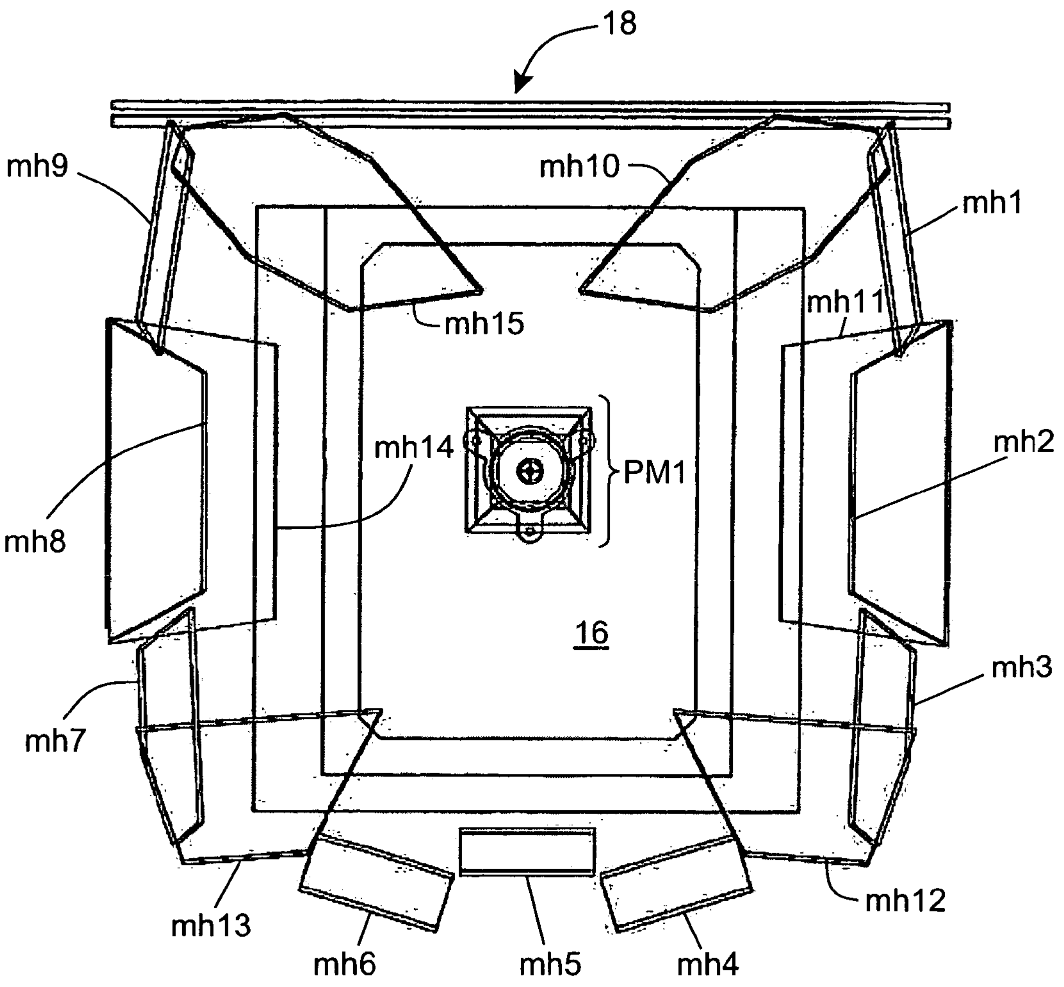
FIG. 2H is a top view of the wire frame model of FIG. 2G.

The illustrative bioptical laser scanning system 1' can be used in a diverse variety of bar code symbol scanning applications. For example, the bioptical laser scanner 1' can be installed within the countertop of a point-of-sale (POS) station as shown in FIG. 2F. In this application, it is advantageous to integrate a weight scale with the laser scanning mechanism. Such a device is described in detail in U.S. patent application Ser. No. 10/045,577, incorporated by reference above in its entirety. As shown in FIG. 2F, the bioptical laser scanner 1' can be installed within the countertop of a point-of-sale (POS) station 51, having a computer-based cash register 53, a weigh-scale 55 mounted within the counter adjacent the laser scanner 1' (or integral to the scanner), and an automated transaction terminal (ATM) 57 supported upon a courtesy stand in a conventional manner.

As shown in FIGS. 2G through 2M, the illustrative bioptical scanning system 1' includes two sections: a first section (sometimes referred to as the horizontal section) disposed within the bottom housing portion 5A' and top housing portion 5B' and a second section (sometimes referred to as the vertical section) substantially disposed within the bottom housing portion 5A' and the hood housing portion 5C'. It should be noted that in the illustrative embodiment, parts of the vertical section are disposed within the back of the bottom housing portion 5A' as will become evident from the figures and accompanying description that follows. Also note that horizontal section includes components mounted on the first scan module insert 3A' as set forth above, while the vertical section includes components mounted on the second scan module insert 3B' as set forth above.

As shown in FIGS. 2G through 2J (and in tables I and II below), the first section includes a first rotating polygonal mirror PM1, and first and second scanning stations (indicated by HST1 and HST2, respectively) disposed thereabout. The first and second laser scanning stations HST1 and HST2 each include a laser beam production module (not shown), a set of laser beam folding mirrors, a light collecting/focusing mirror; and a photodetector. The first and second laser scanning stations HST1 and HST2 are disposed opposite one another about the first rotating polygonal mirror PM1. Each laser scanning station generates a laser scanning beam (shown as SB1 and SB2 in FIGS. 2L and 2M) that is directed to a different point of incidence on the first rotating polygonal mirror PM1. The incident laser beams (produced by the first and second laser scanning stations HST1 and HST2) are reflected by each facet (of the first polygonal mirror PM1) at varying angles as the first polygonal mirror PM1 rotates to produce two scanning beams (SB1 and SB2) whose direction varies over the rotation cycle of the first polygonal mirror PM1. The first and second laser scanning stations HST1 and HST2 include groups of laser beam folder mirrors arranged about the first polygonal mirror PM1 so as to redirect the two scanning beams SB1 and SB2 to thereby generate and project different groups of laser scanning planes through the bottom-scanning window 16 in the top housing portion 5B'.

TABLE I

Mirror Positions - Horizontal Section (mm):

| | Vertex | X | Y | Z |
|---|---|---|---|---|
| mh1 | 1 | 115.25 | 18.87 | 3.06 |
| | 2 | 109.09 | 9.19 | 42.85 |
| | 3 | 99.81 | 69.42 | 40.73 |
| | 4 | 105.97 | 79.10 | 0.94 |
| | 5 | | | |
| | 6 | | | |
| | 7 | | | |
| | 8 | | | |
| mh2 | 1 | 123.91 | −78.90 | 2.61 |
| | 2 | 95.43 | −62.89 | 39.73 |
| | 3 | 95.43 | 3.57 | 39.73 |
| | 4 | 123.91 | 19.57 | 2.61 |
| | 5 | | | |
| | 6 | | | |
| | 7 | | | |
| | 8 | | | |
| mh3 | 1 | 103.74 | −140.29 | 25.40 |
| | 2 | 96.02 | −133.84 | 47.43 |
| | 3 | 99.04 | −68.09 | 37.13 |
| | 4 | 114.48 | −80.98 | −6.92 |
| | 5 | 112.97 | −113.85 | −1.78 |
| | 6 | | | |
| | 7 | | | |
| | 8 | | | |
| mh4 | 1 | 62.08 | −136.87 | −11.25 |
| | 2 | 66.99 | −152.92 | 31.34 |
| | 3 | 26.71 | −165.23 | 31.34 |
| | 4 | 21.80 | −149.19 | −11.25 |
| | 5 | | | |
| | 6 | | | |
| | 7 | | | |
| | 8 | | | |
| mh5 | 1 | −20.00 | −135.31 | −11.19 |
| | 2 | −20.00 | −148.24 | 27.91 |
| | 3 | −20.00 | −148.24 | 27.91 |
| | 4 | −20.00 | −135.31 | −11.19 |
| | 5 | | | |
| | 6 | | | |

TABLE I-continued

| Mirror Positions - Horizontal Section (mm): | | | | |
|---|---|---|---|---|
| | Vertex | X | Y | Z |
| | 7 | | | |
| | 8 | | | |
| mh6 | 1 | −62.08 | −136.87 | −11.25 |
| | 2 | −66.99 | −152.92 | 31.34 |
| | 3 | −26.71 | −165.23 | 31.34 |
| | 4 | −21.80 | −149.19 | −11.25 |
| | 5 | | | |
| | 6 | | | |
| | 7 | | | |
| | 8 | | | |
| mh7 | 1 | −96.02 | −133.84 | 47.43 |
| | 2 | −99.04 | −68.09 | 37.13 |
| | 3 | −114.48 | −80.98 | −6.92 |
| | 4 | −112.97 | −113.85 | −1.78 |
| | 5 | −103.74 | −140.29 | 25.40 |
| | 6 | | | |
| | 7 | | | |
| | 8 | | | |
| mh8 | 1 | −123.91 | −78.90 | 2.61 |
| | 2 | −95.43 | −62.89 | 39.73 |
| | 3 | −95.43 | 3.57 | 39.73 |
| | 4 | −123.91 | 19.57 | 2.61 |
| | 5 | | | |
| | 6 | | | |
| | 7 | | | |
| | 8 | | | |
| mh9 | 1 | −115.25 | 18.87 | 3.06 |
| | 2 | −109.09 | 9.19 | 42.85 |
| | 3 | −99.81 | 69.42 | 40.73 |
| | 4 | −105.97 | 79.10 | 0.94 |
| | 5 | | | |
| | 6 | | | |
| | 7 | | | |
| | 8 | | | |
| mh10 | 1 | 53.69 | 23.10 | −11.94 |
| | 2 | 14.23 | 28.69 | 8.47 |
| | 3 | 47.54 | 67.87 | 24.47 |
| | 4 | 72.59 | 81.43 | 24.47 |
| | 5 | 102.20 | 77.24 | 9.16 |
| | 6 | 106.06 | 65.68 | −1.17 |
| | 7 | 83.67 | 39.33 | −11.94 |
| | 8 | | | |
| mh11 | 1 | 123.91 | −79.28 | 2.61 |
| | 2 | 75.02 | −71.42 | −10.49 |
| | 3 | 75.02 | 11.97 | −10.49 |
| | 4 | 123.91 | 19.83 | 2.61 |
| | 5 | | | |
| | 6 | | | |
| | 7 | | | |
| | 8 | | | |
| mh12 | 1 | 116.06 | −105.01 | −10.87 |
| | 2 | 43.62 | −99.13 | −10.90 |
| | 3 | 65.09 | −142.38 | 30.61 |
| | 4 | 101.96 | −145.37 | 30.63 |
| | 5 | | | |
| | 6 | | | |
| | 7 | | | |
| | 8 | | | |
| mh13 | 1 | −101.96 | −145.37 | 30.63 |
| | 2 | −65.09 | −142.38 | 30.61 |
| | 3 | −43.62 | −99.13 | −10.90 |
| | 4 | −116.06 | −105.01 | −10.87 |
| | 5 | | | |
| | 6 | | | |
| | 7 | | | |
| | 8 | | | |
| mh14 | 1 | −75.02 | 11.97 | −10.49 |
| | 2 | −75.02 | −71.42 | −10.49 |
| | 3 | −123.91 | −79.28 | 2.61 |
| | 4 | −123.91 | 19.83 | 2.61 |
| | 5 | | | |
| | 6 | | | |
| | 7 | | | |
| | 8 | | | |
| mh15 | 1 | −54.15 | 22.24 | −10.80 |

TABLE I-continued

| Mirror Positions - Horizontal Section (mm): | | | | |
|---|---|---|---|---|
| | Vertex | X | Y | Z |
| | 2 | −84.14 | 38.47 | −10.80 |
| | 3 | −106.53 | 64.81 | −0.04 |
| | 4 | −102.66 | 76.38 | 10.30 |
| | 5 | −73.05 | 80.57 | 25.61 |
| | 6 | −48.00 | 67.01 | 25.61 |
| | 7 | −14.70 | 27.83 | 9.60 |
| | 8 | | | |

TABLE II

| Scan Line Groups - Horizontal Section | | | |
|---|---|---|---|
| Group Identifier | Mirrors in Group | Scanning Station/ Scan Lines | Type |
| gh1 | mh1, mh10 | HST1/4 | vertical |
| gh2 | mh2, mh11 | HST1/4 | horizontal |
| gh3 | mh3, mh12 | HST1/4 | vertical |
| gh4 | mh4 | HST1/4 | horizontal |
| | mh5 | HST1, HST2/8 | |
| | mh6 | HST2/4 | |
| gh5 | mh7, mh13 | HST2/4 | vertical |
| gh6 | mh8, mh14 | HST2/4 | horizontal |
| gh7 | mh9, mh15 | HST2/4 | vertical |

Figure 2I:
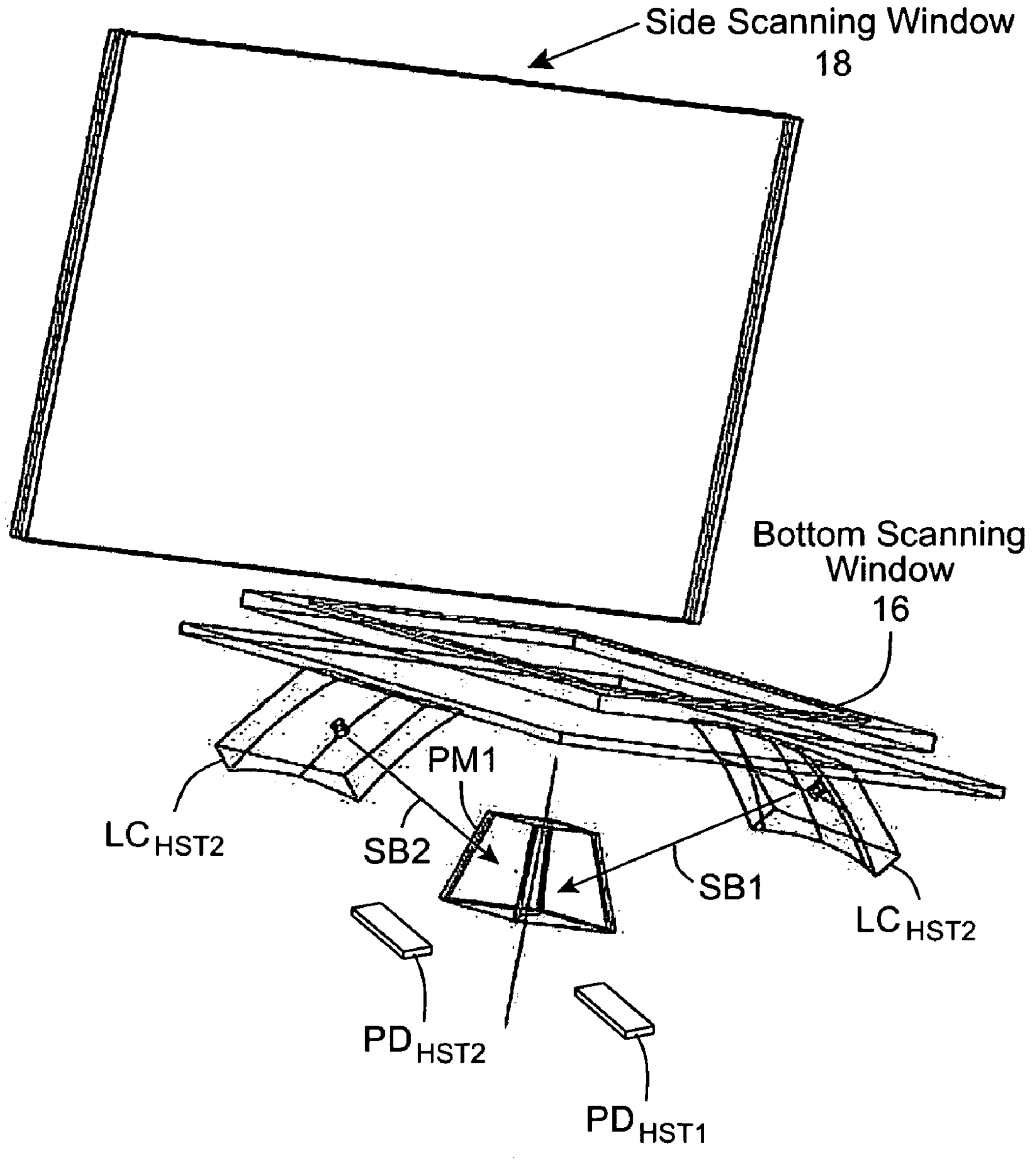
FIG. 2I is a perspective view of a wire frame model of portions of the horizontal section of the illustrative bioptical laser scanning system, including the bottom-scanning window 16 (e.g., horizontal window), first rotating polygonal mirror PM1, and the first and second scanning stations HST1 and HST2 disposed thereabout, wherein each laser scanning station includes a light collecting/focusing optical element (labeled $LC_{HST1}$ and $LC_{HST2}$) that collects light from a scan region that encompasses the outgoing scanning planes and focuses such collected light onto a photodetector (labeled $PD_{HST1}$ and $PD_{HST2}$), which produces an electrical signal whose amplitude is proportional to the intensity of light focused thereon. The electrical signal produced by the photodetector is supplied to analog/digital signal processing circuitry, associated with the first and second laser scanning station HST1 and HST2, that process analog and digital scan data signals derived there from to perform bar code symbol reading operations. Preferably, the first and second laser scanning stations HST1 and HST2 each include a laser beam production module (not shown) that generates a laser scanning beam (labeled SB1 and SB2) that is directed to a small light directing mirror disposed in the interior of the light collecting/focusing element $LC_{HST1}$ and $LC_{HST2}$, respectively, as shown, which redirects the laser scanning beams SB1 and SB2 to corresponding points of incidence on the first rotating polygonal mirror PM1.
Figure 2J:
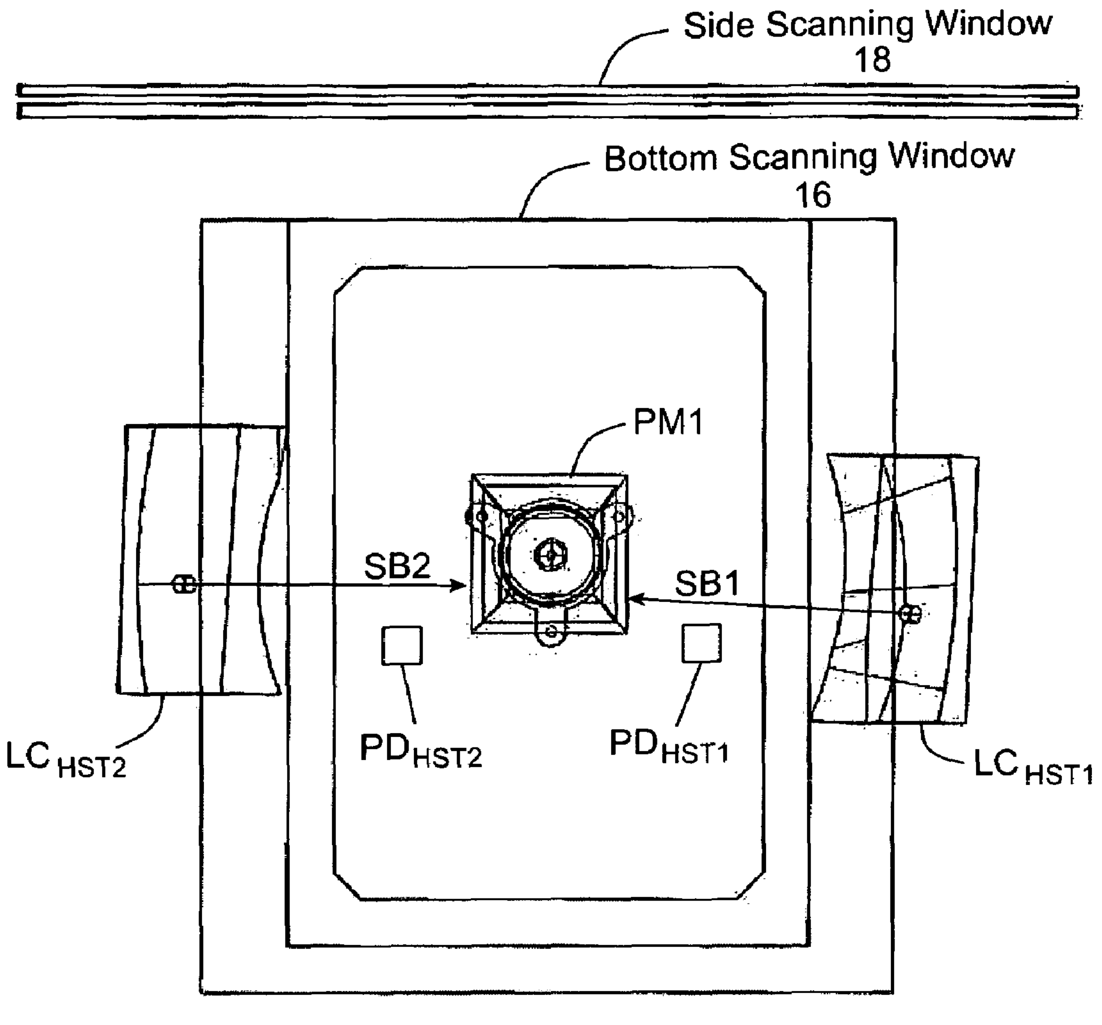
FIG. 2J is a top view of the wire frame model of FIG. 2I.

In addition, as shown in FIGS. 2I and 2J, the first and second laser scanning stations HST1 and HST2 each include a light collecting/focusing optical element, e.g. parabolic light collecting mirror or parabolic surface emulating volume reflection hologram (labeled $LC_{HST1}$ and $LC_{HST2}$), that collects light from a scan region that encompasses the outgoing scanning planes (produced by the first and second laser scanning stations HST1 and HST2) and focuses such collected light onto a photodetector (labeled $PD_{HST1}$ and $PD_{HST2}$), which produces an electrical signal whose amplitude is proportional to the intensity of light focused thereon. The electrical signal produced by the photodetector is supplied to analog/digital signal processing circuitry, associated with the first and second laser scanning station HST1 and HST2, that process analog and digital scan data signals derived there from to perform bar code symbol reading operations as described herein. Preferably, the first and second laser scanning stations HST1 and HST2 each include a laser beam production module (not shown) that generates a laser scanning beam (labeled SB1 and SB2) that is directed (preferably by a small light directing mirror disposed in the interior of the light collecting/focusing element $LC_{HST1}$ and $LC_{HST2}$, respectively, as shown in FIGS. 2I and 2J), to a point of incidence on the first rotating polygonal mirror PM1.

Figure 2K:
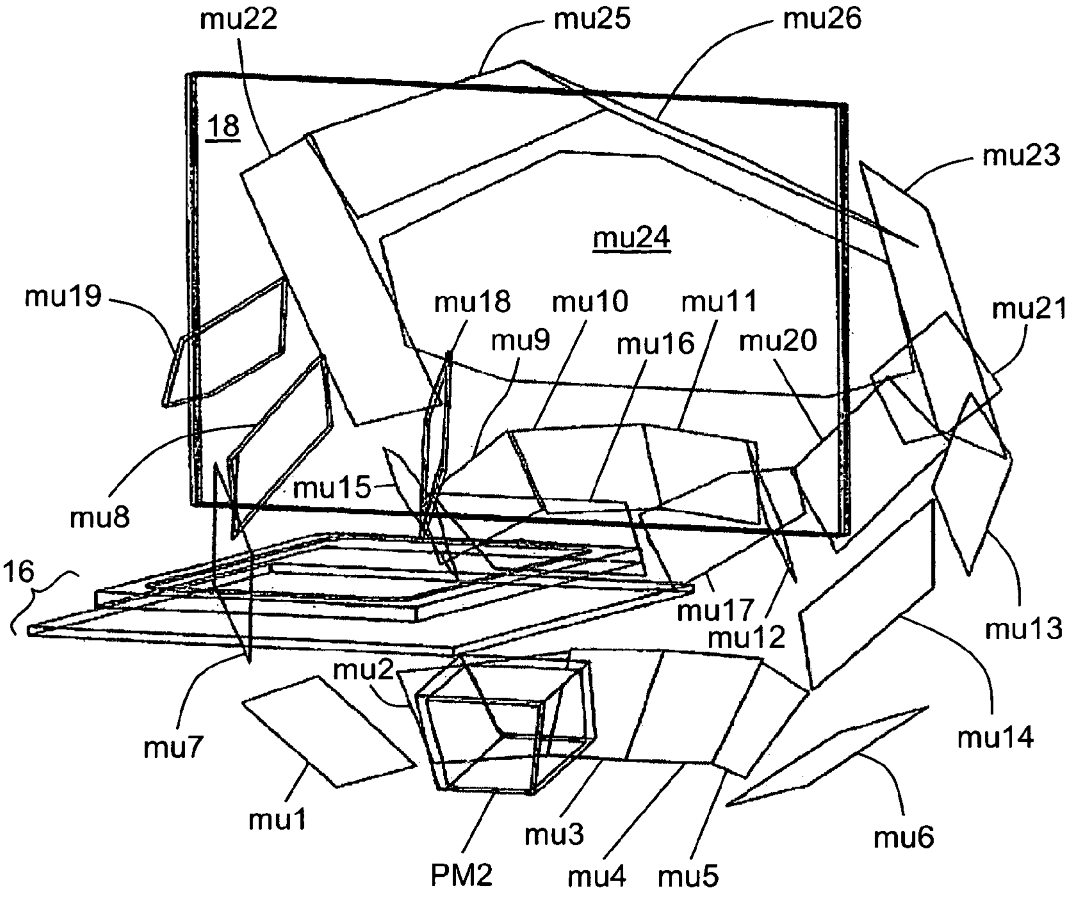
FIG. 2K is a perspective view of a wire frame model of portions of the vertical section of the illustrative bioptical laser scanning system, including the side-scanning window (e.g., vertical window), second rotating polygonal mirror PM2, and the third scanning station VST1 disposed thereabout; the third laser scanning station includes a set of laser beam folding mirrors disposed about the second rotating polygon PM2.
Figure 2L:
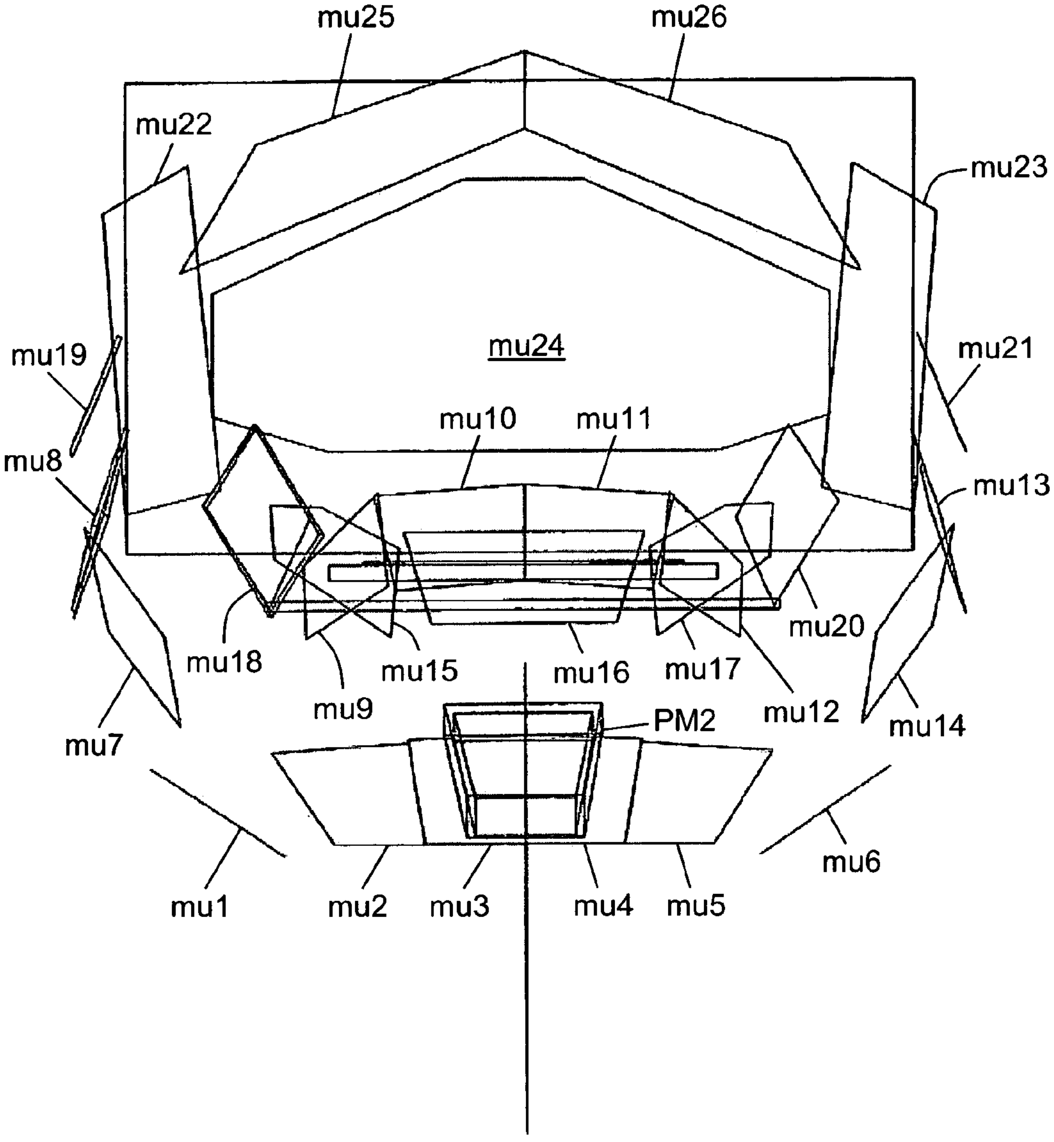
FIG. 2L is a front view of the wire frame model of FIG. 2K.

As shown in FIGS. 2K and 2L and in tables III and IV below, the second section includes a second rotating polygonal mirror PM2 and a third scanning station (denoted VST1) that includes a laser beam production module (not shown), a set of laser beam folding mirrors, a light collecting/focusing mirror, and a photodetector. The third laser scanning station VST1 generates a laser scanning beam (labeled as SB3 in FIG. 2M) that is directed to a point of incidence on the second rotating polygonal mirror PM2. The incident laser beam is reflected by each facet (of the second polygonal mirror PM2) at varying angles as the second polygonal mirror PM2 rotates to produce a scanning beam whose direction varies over the rotation cycle of the second polygonal mirror PM2. The third laser scanning station VST1 includes a set of laser beam folder mirrors arranged about the second rotating polygonal mirror PM2 so as to redirect the scanning beam to thereby generate and project different groups of laser scanning planes through the side-scanning window 18.

TABLE III

| Mirror Positions - Vertical Section (mm): | | | | |
|---|---|---|---|---|
| | Vertex | X | Y | Z |
| mv1 | 1 | −74.79 | 88.94 | −10.38 |
| | 2 | −114.09 | 88.94 | 16.17 |
| | 3 | −114.09 | 154.82 | 16.17 |
| | 4 | −74.79 | 154.82 | −10.38 |
| | 5 | | | |
| | 6 | | | |
| | 7 | | | |
| | 8 | | | |
| mv2 | 1 | −61.12 | 131.03 | −6.76 |
| | 2 | −77.92 | 146.42 | 25.78 |
| | 3 | −43.75 | 183.72 | 25.78 |
| | 4 | −33.41 | 174.24 | 5.74 |
| | 5 | −31.44 | 163.43 | −6.76 |
| | 6 | | | |
| | 7 | | | |
| | 8 | | | |
| mv3 | 1 | −29.78 | 160.24 | −1.35 |
| | 2 | −34.38 | 185.43 | 27.65 |
| | 3 | −0.04 | 184.24 | 27.65 |
| | 4 | −0.04 | 159.21 | −1.35 |
| | 5 | | | |
| | 6 | | | |
| | 7 | | | |
| | 8 | | | |
| mv4 | 1 | 0.04 | 159.21 | −1.35 |
| | 2 | 0.04 | 184.24 | 27.65 |
| | 3 | 34.38 | 185.43 | 27.65 |
| | 4 | 29.78 | 160.24 | −1.35 |
| | 5 | | | |
| | 6 | | | |
| | 7 | | | |
| | 8 | | | |
| mv5 | 1 | 61.12 | 131.03 | −6.76 |
| | 2 | 31.44 | 163.43 | −6.76 |
| | 3 | 33.41 | 174.24 | 5.74 |
| | 4 | 43.75 | 183.72 | 25.78 |
| | 5 | 77.92 | 146.42 | 25.78 |
| | 6 | | | |
| | 7 | | | |
| | 8 | | | |
| mv6 | 1 | 74.79 | 88.94 | −10.38 |
| | 2 | 74.79 | 154.82 | −10.38 |
| | 3 | 114.09 | 154.82 | 16.17 |
| | 4 | 114.09 | 88.94 | 16.17 |
| | 5 | | | |
| | 6 | | | |
| | 7 | | | |
| | 8 | | | |
| mv7 | 1 | −107.52 | 89.35 | 30.99 |
| | 2 | −110.94 | 68.34 | 59.03 |
| | 3 | −136.32 | 120.65 | 95.14 |
| | 4 | −132.90 | 141.66 | 67.10 |
| | 5 | | | |
| | 6 | | | |
| | 7 | | | |
| | 8 | | | |
| mv8 | 1 | −129.50 | 196.36 | 99.91 |
| | 2 | −139.66 | 144.56 | 68.88 |
| | 3 | −133.18 | 126.69 | 96.58 |
| | 4 | −123.02 | 178.48 | 127.62 |
| | 5 | | | |
| | 6 | | | |
| | 7 | | | |
| | 8 | | | |
| mv9 | 1 | −42.26 | 185.73 | 73.40 |
| | 2 | −65.99 | 163.92 | 49.03 |
| | 3 | −69.45 | 141.18 | 82.25 |
| | 4 | −45.72 | 162.99 | 106.62 |
| | 5 | | | |
| | 6 | | | |
| | 7 | | | |
| | 8 | | | |
| mv10 | 1 | 0.00 | 190.18 | 78.00 |
| | 2 | −40.33 | 183.35 | 74.96 |
| | 3 | −46.98 | 168.27 | 105.79 |
| | 4 | 0.00 | 176.23 | 109.33 |
| | 5 | | | |
| | 6 | | | |
| | 7 | | | |
| | 8 | | | |
| mv11 | 1 | 0.00 | 176.23 | 109.33 |
| | 2 | 46.98 | 168.27 | 105.79 |
| | 3 | 40.33 | 183.35 | 74.96 |
| | 4 | 0.00 | 190.18 | 78.00 |
| | 5 | | | |
| | 6 | | | |
| | 7 | | | |
| | 8 | | | |
| mv12 | 1 | 42.26 | 185.73 | 73.40 |
| | 2 | 45.72 | 162.99 | 106.62 |
| | 3 | 69.45 | 141.18 | 82.25 |
| | 4 | 65.99 | 163.92 | 49.03 |
| | 5 | | | |
| | 6 | | | |
| | 7 | | | |
| | 8 | | | |
| mv13 | 1 | 139.66 | 144.56 | 68.88 |
| | 2 | 129.50 | 196.36 | 99.91 |
| | 3 | 123.02 | 178.48 | 127.62 |
| | 4 | 133.18 | 126.69 | 96.58 |
| | 5 | | | |
| | 6 | | | |
| | 7 | | | |
| | 8 | | | |
| mv14 | 1 | 132.90 | 141.66 | 67.10 |
| | 2 | 136.32 | 120.65 | 95.14 |
| | 3 | 110.94 | 68.34 | 59.03 |
| | 4 | 107.52 | 89.35 | 30.99 |
| | 5 | | | |
| | 6 | | | |
| | 7 | | | |
| | 8 | | | |
| mv15 | 1 | −59.72 | 111.27 | 102.01 |
| | 2 | −38.96 | 95.77 | 87.32 |
| | 3 | −42.25 | 116.98 | 60.28 |
| | 4 | −79.46 | 144.76 | 86.61 |
| | 5 | −77.49 | 132.11 | 102.74 |
| | 6 | | | |
| | 7 | | | |
| | 8 | | | |
| mv16 | 1 | 37.73 | 88.59 | 93.83 |
| | 2 | 29.22 | 119.90 | 64.12 |
| | 3 | −29.22 | 119.90 | 64.12 |
| | 4 | −37.73 | 88.59 | 93.83 |
| | 5 | | | |
| | 6 | | | |
| | 7 | | | |
| | 8 | | | |
| mv17 | 1 | 42.25 | 116.98 | 60.28 |
| | 2 | 38.96 | 95.77 | 87.32 |
| | 3 | 59.72 | 111.27 | 102.01 |
| | 4 | 79.46 | 144.76 | 86.61 |
| | 5 | 42.25 | 116.98 | 60.28 |
| | 6 | | | |
| | 7 | | | |
| | 8 | | | |
| mv18 | 1 | −63.87 | 149.13 | 93.46 |
| | 2 | −79.68 | 162.64 | 67.06 |
| | 3 | −100.06 | 208.14 | 102.55 |
| | 4 | −84.26 | 194.63 | 128.95 |
| | 5 | | | |
| | 6 | | | |

TABLE III-continued

| Mirror Positions - Vertical Section (mm): | | | | |
|---|---|---|---|---|
| | Vertex | X | Y | Z |
| | 7 | | | |
| | 8 | | | |
| mv19 | 1 | −140.43 | 92.77 | 119.03 |
| | 2 | −140.43 | 126.87 | 119.12 |
| | 3 | −136.72 | 174.44 | 128.44 |
| | 4 | −125.11 | 154.96 | 157.07 |
| | 5 | −130.41 | 87.14 | 143.79 |
| | 6 | | | |
| | 7 | | | |
| | 8 | | | |
| mv20 | 1 | 63.87 | 149.13 | 93.46 |
| | 2 | 79.68 | 162.64 | 67.06 |
| | 3 | 100.06 | 208.14 | 102.55 |
| | 4 | 84.26 | 194.63 | 128.95 |
| | 5 | | | |
| | 6 | | | |
| | 7 | | | |
| | 8 | | | |
| mv21 | 1 | 130.41 | 87.14 | 143.79 |
| | 2 | 125.11 | 154.96 | 157.07 |
| | 3 | 136.72 | 174.44 | 128.44 |
| | 4 | 140.43 | 126.87 | 119.12 |
| | 5 | 140.43 | 92.77 | 119.03 |
| | 6 | | | |
| | 7 | | | |
| | 8 | | | |
| mv22 | 1 | −134.07 | 126.69 | 200.27 |
| | 2 | −103.99 | 134.04 | 208.61 |
| | 3 | −94.62 | 209.63 | 108.20 |
| | 4 | −124.70 | 202.28 | 99.86 |
| | 5 | | | |
| | 6 | | | |
| | 7 | | | |
| | 8 | | | |
| mv23 | 1 | 94.62 | 209.63 | 108.20 |
| | 2 | 103.99 | 134.04 | 208.61 |
| | 3 | 134.07 | 126.69 | 200.27 |
| | 4 | 124.70 | 202.28 | 99.86 |
| | 5 | | | |
| | 6 | | | |
| | 7 | | | |
| | 8 | | | |
| mv24 | 1 | −61.13 | 193.21 | 119.96 |
| | 2 | −97.12 | 187.87 | 131.32 |
| | 3 | −97.12 | 169.38 | 170.59 |
| | 4 | −19.20 | 152.51 | 206.45 |
| | 5 | 19.20 | 152.51 | 206.45 |
| | 6 | 97.12 | 169.38 | 170.59 |
| | 7 | 97.12 | 187.87 | 131.32 |
| | 8 | 61.13 | 193.21 | 119.96 |
| mv25 | 1 | −106.74 | 171.66 | 177.19 |
| | 2 | −83.23 | 85.77 | 217.46 |
| | 3 | 0.00 | 85.77 | 246.33 |
| | 4 | 0.00 | 150.54 | 222.12 |
| | 5 | | | |
| | 6 | | | |
| | 7 | | | |
| | 8 | | | |
| mv26 | 1 | 0.00 | 150.54 | 222.12 |
| | 2 | 0.00 | 150.54 | 222.12 |
| | 3 | 83.23 | 85.77 | 217.46 |
| | 4 | 106.74 | 171.66 | 177.19 |
| | 5 | | | |
| | 6 | | | |
| | 7 | | | |
| | 8 | | | |

TABLE IV

| Scan Line Groups - Vertical Section | | | |
|---|---|---|---|
| Group Identifier | Mirrors in Group | Scanning Station/ Scan Lines | Type |
| gv1 | mv1, mv22 | VST1/4 | vertical left |
| gv2 | mv2, mv26 | VST1/4 | top-down vertical |
| gv3 | mv3, mv25 | VST1/4 | top-down horizontal |
| gv4 | mv4, mv26 | VST1/4 | top-down horizontal |
| gv5 | mv5, mv25 | VST1/4 | top-down vertical |
| gv6 | mv6, mv23 | VST1/4 | vertical right |
| gv7 | mv7, mv24 | VST1/4 | high horizontal left |
| gv8 | mv8, mv18, mv19 | VST1/4 | side horizontal left |
| gv9 | mv9, mv17, mv24 | VST1/4 | low horizontal left |
| gv10 | mv10, mv16, mv26 | VST1/4 | top-down horizontal |
| gv11 | mv11, mv16, mv25 | VST1/4 | top-down horizontal |
| gv12 | mv12, mv15, mv24 | VST1/4 | low horizontal right |
| gv13 | mv13, mv20, mv21 | VST1/4 | side horizontal right |
| gv14 | mv14, mv24 | VST1/4 | high horizontal right |

Figure 2M:
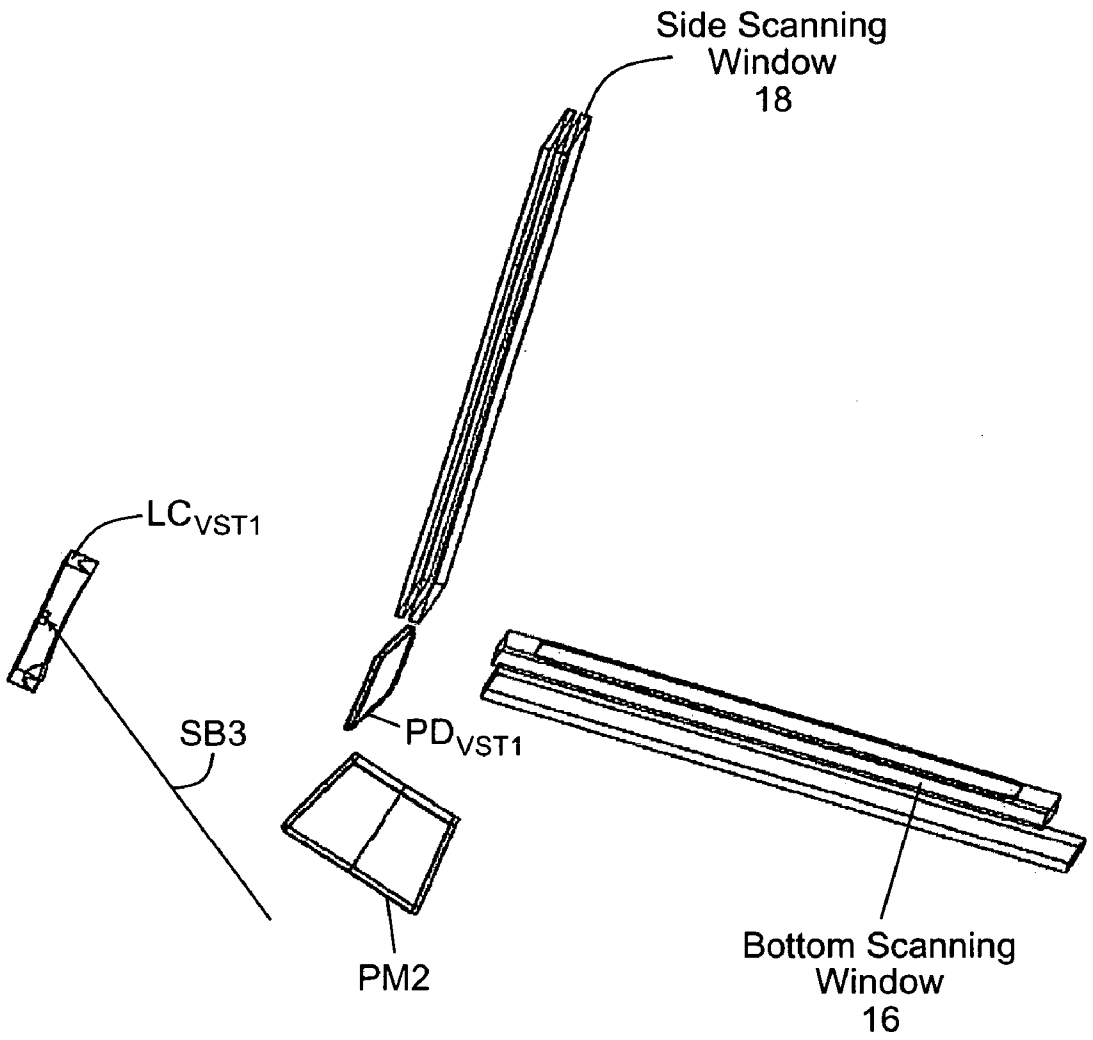
FIG. 2M is a perspective view of a wire frame model of portions of the vertical section of the illustrative bioptical laser scanning system, including the side-scanning window 18(e.g., vertical window), second rotating polygonal mirror PM2, and the third scanning station VST1 disposed thereabout, wherein the third laser scanning station VST1 includes a light collecting/focusing optical element (labeled $LC_{VST1}$) that collects light from a scan region that encompasses the outgoing scanning planes and focuses such collected light onto a photodetector (labeled $PD_{VST1}$), which produces an electrical signal whose amplitude is proportional to the intensity of light focused thereon. The electrical signal produced by the photodetector is supplied to analog/digital signal processing circuitry, associated with the third laser scanning station VST1, that processes analog and digital scan data signals derived there from to perform bar code symbol reading operations. Preferably, the third laser scanning station VST1 includes a laser beam production module (not shown) that generates a laser scanning beam SB3 that is directed to a small light directing mirror disposed in the interior of the light collecting/focusing element $LC_{VST1}$ as shown, which redirects the laser scanning beam SB3 to a point of incidence on the second rotating polygonal mirror PM2.

In addition, as shown in FIG. 2M, the third laser scanning station VST1 includes a light collecting/focusing optical element, e.g. parabolic light collecting mirror or parabolic surface emulating volume reflection hologram (labeled $LC_{VST1}$), that collects light from a scan region that encompasses the outgoing scanning planes (produced by the third laser scanning station VST1) and focuses such collected light onto a photodetector (labeled $PD_{VST1}$), which produces an electrical signal whose amplitude is proportional to the intensity of light focused thereon. The electrical signal produced by the photodetector is supplied to analog/digital signal processing circuitry, associated with the third laser scanning station VST1, that process analog and digital scan data signals derived there from to perform bar code symbol reading operations as described herein. Preferably, the third laser scanning station VST1 includes a laser beam production module (not shown) that generates a laser scanning beam SB3 that is directed to a small light directing mirror disposed in the interior of the light collecting/focusing element $LC_{VST1}$, which redirects the laser scanning beam SB3 to a point of incidence on the second rotating polygonal mirror PM2.

In the illustrative embodiment, the first polygonal mirror PM1 includes 4 facets that are used in conjunction with the two independent laser beam sources provided by the first and second laser scanning stations HST1 and HST2 so as project from the bottom-scanning window 16 an omnidirectional laser scanning pattern consisting of 40 laser scanning planes that are cyclically generated as the first polygonal mirror PM1 rotates. Moreover, the second polygonal mirror PM2 includes 4 facets that are used in conjunction with the independent laser beam source provided by the third laser scanning station VST1 so as to project from the side-scanning window an omnidirectional laser scanning pattern consisting of 28 laser scanning planes cyclically generated as the second polygonal mirror PM2 rotates. Thus, the bioptical laser scanning system of the illustrative embodiment project from the bottom and side-scanning windows 16, 18 an omnidirectional laser scanning pattern consisting of 68 laser scanning planes cyclically generated as the first and second polygonal mirrors PM1 and PM2 rotate. It is understood, however, these number may vary from embodiment to embodiment of the present invention and thus shall not form a limitation thereof.

FIG. 2N1 depicts the angle of each facet of the rotating polygonal mirrors PM1 and PM2 with respect to the rotational axis of the respective rotating polygonal mirrors in this illustrative embodiment. The scanning ray pattern produced by the four facets (as specified in FIG. 2N1) of the first polygonal mirror PM1 in conjunction with the laser beam source provided by the first laser scanning station HST1 is shown in FIG. 2N2. A similar scanning ray pattern is produced by the four facets of the first polygonal mirror PM1 in conjunction with the laser beam source provided by the second laser scanning station HST2. In the illustrative embodiment of the present invention, the second rotating polygonal mirror PM2 has two different types of facets based on beam elevation angle characteristics of the facet. The scanning ray pattern produced by the four facets of the second polygonal mirror PM2 in conjunction with the laser beam source provided by the third laser scanning station VST1 is shown in FIG. 2N3. The facets of the second polygonal mirror PM2 can be partitioned into two classes: a first class of facets (corresponding to angles $\beta_1$ and $\beta_2$) have High Elevation (HE) angle characteristics, and a second class of facets (corresponding to angles $\beta_3$ and $\beta_4$) have Low Elevation (LE) angle characteristics. As shown in FIGS. 2N3, high and low elevation angle characteristics are referenced by the plane P1 that contains the incoming laser beam and is normal to the rotational axis of the second polygonal mirror PM2. Each facet in the first class of facets (having high beam elevation angle characteristics) produces an outgoing laser beam that is directed above the plane P1 as the facet sweeps across the point of incidence of the third laser scanning station VST1. Whereas each facet in the second class of facets (having low beam elevation angle characteristics) produces an outgoing laser beam that is directed below the plane P1 as the facet sweeps across the point of incidence of the third laser scanning station VST1. As will become apparent hereinafter, the use of scanning facets having such diverse elevation angle characteristics enables an efficient design and construction of the second section of the bioptical laser scanning—the plurality of beam folding mirrors used therein can be compactly arranged within a minimized region of volumetric space. Such efficient space saving designs are advantageous in space-constricted POS-type scanning applications.

Figure 2O:
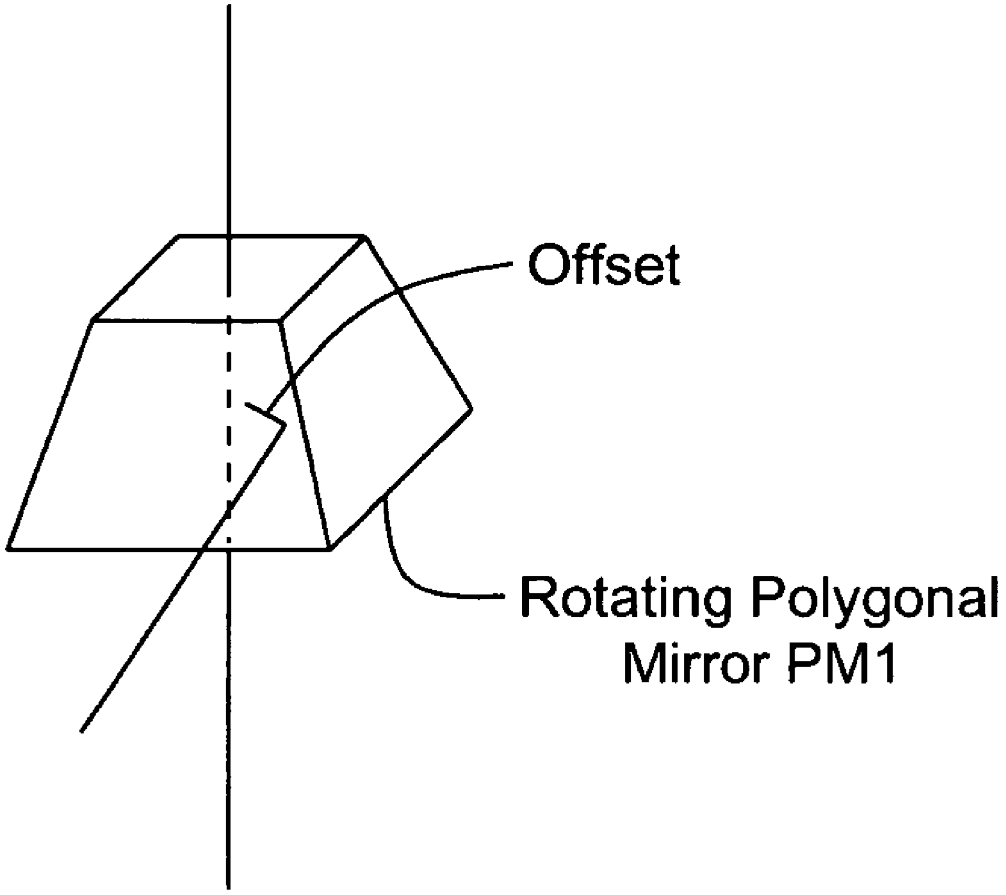
FIG. 2O depicts the offset between the pre-specified direction of incidence of the laser beams produced by the laser beam production modules of the laser scanning stations HST1 and HST2 and the rotational axis of the polygonal mirror PM1. Such offset provides for spatial overlap in the scanning pattern of light beams produced from the polygonal mirror PM1 by these laser beam production modules; such spatial overlap can be exploited such that the overlapping rays are incident on at least one common mirror (mh5 in the illustrative bioptical laser scanning system described herein) to provide a dense scanning pattern projecting there from; in the illustrative embodiment, a dense pattern of horizontal planes (groups GH4) is projected from the front side of the bottom window as is graphically depicted in FIGS. 3F1, 3F2 and 4B1 and 4B2.
Figure 3A:
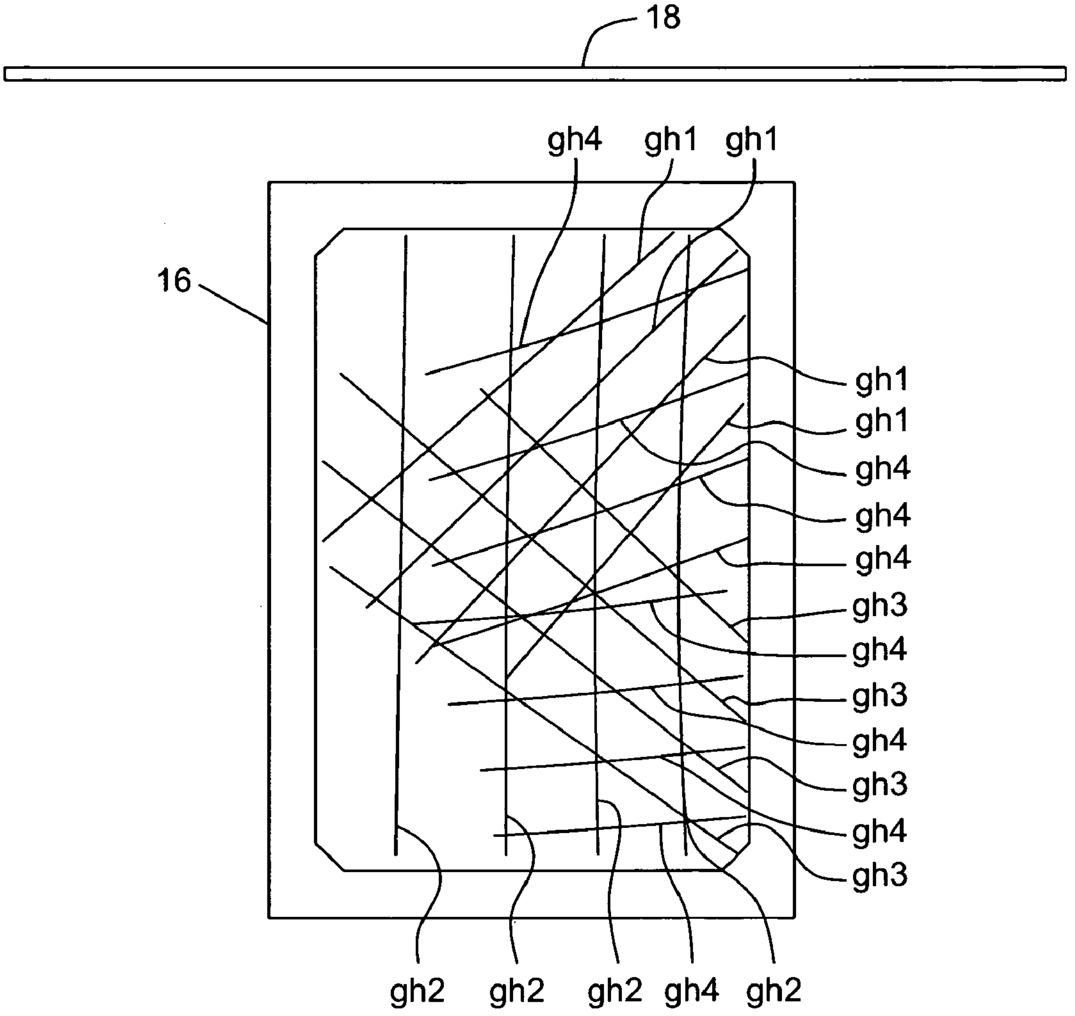
FIG. 3A illustrates the intersection of the four groups of laser scanning planes (with 20 total scanning planes in the four groups) produced by the first laser scanning station HST1 on the bottom-scanning window 16 in the illustrative bioptical laser scanning system described herein.

In the illustrative embodiment of the present invention, the first laser scanning station (HST1) includes four groups of laser beam folding mirrors (GH1, GH2, GH3, and GH4 as depicted in Table II above) which are arranged about the first rotating polygonal mirror PM1, and cooperate with the four scanning facets of the first rotating polygonal mirror PM1 so as to generate and project four different groups of laser scanning planes (with 20 total scanning planes in the four groups) through the bottom-scanning window 16, as graphically illustrated in FIGS. 3A-3F2. Note that the first laser scanning station HST1 utilizes mirrors MH4 and MH5 (and not MH6) of group GH4 to produce 8 different scan planes there from. The second laser scanning station (HST2) includes four groups of laser beam folding mirrors (GH4, GH5, GH6 and GH7 as depicted in Table II) which are arranged about the first rotating polygonal mirror PM1, and cooperate with the four scanning facets of the first rotating polygonal mirror so as to generate and project four different groups of laser scanning planes (with 20 total scanning planes in the four groups) through the bottom-scanning window 16, as graphically illustrated in FIGS. 4A-4F. Note that the second laser scanning station HST2 utilizes mirrors MH5 and MH6 (and not MH4) of group GH4 to produce 8 different scan planes there from. Finally, the third laser scanning station (VST1) includes fourteen groups of laser beam folding mirrors (GV1, GV2 . . . GV14 as depicted in Table IV above) which are arranged about the second rotating polygonal mirror PM2, and cooperate with the four scanning facets of the second rotating polygonal mirror PM2 so as to generate and project fourteen different groups of laser scanning planes (with 28 total scanning planes in the fourteen groups) through the side-scanning window 18, as graphically illustrated in FIGS. 5A-5P2.

For purposes of illustration and conciseness of description, each laser beam folding mirror in each mirror group as depicted in the second column of Tables II and IV, respectively, is referred to in the sequential order that the outgoing laser beam reflects off the mirrors during the laser scanning plane generation process (e.g., the first mirror in the column causes an outgoing laser beam to undergo its first reflection after exiting a facet of the rotating polygonal mirror, the second mirror in the column causes the outgoing laser beam to undergo its second reflection, etc.).

First Laser Scanning Station HST1

As shown in FIGS. 2G, 2H and 3A-3F2, the first laser scanning station (HST1) includes four groups of laser beam folding mirrors (GH1, GH2, GH3 and GH4) which are arranged about the first rotating polygonal mirror PM1, and cooperate with the four scanning facets of the first rotating polygonal mirror PM1 so as to generate and project four different groups of laser scanning planes (with 20 total scanning planes in the four groups) through the bottom-scanning window 16. The intersection of the four groups of laser scanning planes (with 20 total scanning planes in the four groups) on the bottom-scanning window 16 is shown in FIG. 3A. The twenty laser scanning planes (of these four groups projected through the bottom-scanning window 16) can be classified as either vertical scanning planes or horizontal scanning planes, which can be defined as follows.

As shown in FIGS. 3B1 and 3B2, a scanning plane has a characteristic direction of propagation $D_p$ and a normal direction $SP_N$, which define a direction O that is orthogonal thereto (e.g., $O=D_p \times SP_N$). For the sake of description, the characteristic direction of propagation $D_p$ of a scanning plane can be defined as the mean propagation direction for a plurality of rays that make up the scanning plane. A horizontal scanning plane is a scanning plane wherein the angle $\phi$ between the direction O and the plane defined by the bottom-scanning window 16 is in the range between 0 and 45 degrees (and preferably in the range between 0 and 20 degrees, and more preferably in the range between 0 and 10 degrees). An exemplary horizontal scanning plane is shown in FIG. 3B1. A vertical scanning plane is a scanning plane wherein the angle $\phi$ between the direction O and the plane defined by the bottom-scanning window 16 is in the range between 45 and 90 degrees (and preferably in the range between 70 and 90 degrees, and more preferably in the range between 80 and 90 degrees). An exemplary vertical scanning plane is shown in FIG. 3B2.

FIGS. 3C1 and 3C2 illustrate the first group GH1 of laser beam folding mirrors of the first laser scanning station (HST1), which cooperate with the four scanning facets of the first rotating polygonal mirror PM1 so as to generate four different vertical laser scanning planes that project from the right back corner of the bottom-scanning window 16 diagonally outward and upward above the front left side (and front left corner) of the bottom-scanning window 16 as shown. These scanning planes are useful for reading ladder type bar code symbols disposed on bottom-, back-, and right-facing surfaces.

FIGS. 3D1 and 3D2 illustrate the second group GH2 of laser beam folding mirrors of the first laser scanning station (HST1), which cooperate with the four scanning facets of the first rotating polygonal mirror PM1 so as to generate four different horizontal laser scanning planes that project from the right side of the bottom-scanning window 16 diagonally outward and upward above the left side of the bottom-scanning window 16 as shown. These scanning planes are useful for reading picket-fence type bar code symbols disposed on bottom- and right-facing surfaces.

FIGS. 3E1 and 3E2 illustrate the third group GH3 of laser beam folding mirrors of the first laser scanning station (HST1), which cooperate with the four scanning facets of the first rotating polygonal mirror PM1 so as to generate four different vertical laser scanning planes that project from the right front corner of the bottom-scanning window 16 diagonally outward and upward above the back left side and back left corner of the bottom-scanning window 16 as shown. These scanning planes are useful for reading ladder type bar code symbols disposed on bottom-, front-, and right-facing surfaces.

FIGS. 3F1 and 3F2 illustrate the fourth group GH4 of laser beam folding mirrors of the first laser scanning station (HST1), which cooperate with the four scanning facets of the first rotating polygonal mirror PM1 so as to generate eight different horizontal laser scanning planes that project from the front side of the bottom-scanning window 16 diagonally outward and upward above the back side of the bottom-scanning window 16 as shown. Note that the first laser scanning station HST1 utilizes mirrors MH4 and MH5 (and not MH6) of group GH4 to produce eight different scan planes there from. These scanning planes are useful for reading picket-fence type bar code symbols disposed on bottom- and front-facing surfaces.

The position and orientation of each beam folding mirror employed at scanning station HST1 relative to a global coordinate reference system is specified by a set of position vectors pointing from the from the origin of this global coordinate reference system to the vertices of each such beam folding mirror element (i.e. light reflective surface patch). The x,y,z coordinates of these vertex-specifying vectors as set forth above in Table I specify the perimetrical boundaries of these beam folding mirrors employed in the scanning system of the illustrative embodiment.

Second Laser Scanning Station HST2

Figure 4A:
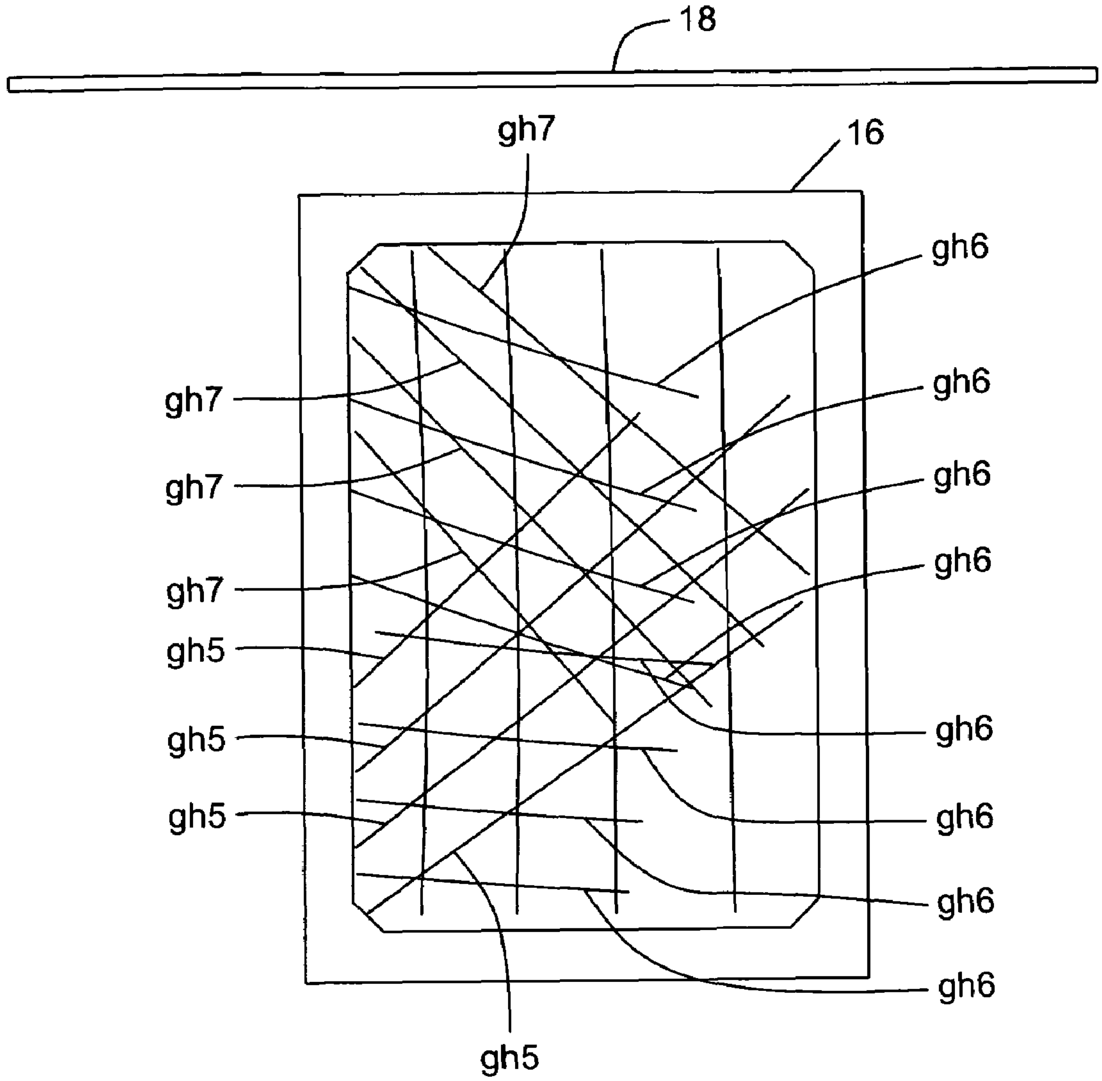
FIG. 4A illustrates the intersection of the four groups of laser scanning planes (with 20 total scanning planes in the four groups) produced by the second laser scanning station HST2 on the bottom-scanning window 16 of the illustrative bioptical laser scanning system described herein.

As shown in FIGS. 2G, 2H and 4A-4E2, the second laser scanning station (HST2) includes four groups of laser beam folding mirrors (GH4, GH5, GH6, and GH7) which are arranged about the first rotating polygonal mirror PM1, and cooperate with the four scanning facets of the first rotating polygonal mirror PM1 so as to generate and project four different groups of laser scanning planes (with 20 total scanning planes in the four groups) through the bottom-scanning window 16. The intersection of the four groups of laser scanning planes (with 20 total scanning planes in the four groups) on the bottom-scanning window 16 is shown in FIG. 4A. The twenty laser scanning planes (of these four groups projected through the bottom-scanning window 16) can be classified as either vertical scanning planes or horizontal scanning planes as defined above.

FIGS. 4B1 and 4B2 illustrate the first group (GH4) of laser beam folding mirrors of the second laser scanning station (HST2), which cooperate with the four scanning facets of the first rotating polygonal mirror PM1 so as to generate eight different horizontal laser scanning planes that project from the front side of the bottom-scanning window 16 diagonally outward and upward above the back side of the bottom-scanning window 16 as shown. Note that the second laser scanning station HST2 utilizes mirrors MH5 and MH6 (and not MH4) of group GH4 to produce eight different scan planes there from. These scanning planes are useful for reading picket-fence type bar code symbols disposed on bottom- and front-facing surfaces.

FIGS. 4C1 and 4C2 illustrate the second group (GH5) of laser beam folding mirrors of the second laser scanning station (HST2), which cooperate with the four scanning facets of the first rotating polygonal mirror PM1 so as to generate four different vertical laser scanning planes that project from the left front corner of the bottom-scanning window 16 diagonally outward and upward above the back right side and back right corner of the bottom-scanning window 16 as shown. These scanning planes are useful for reading ladder type bar code symbols disposed on bottom-, front-, and left-facing surfaces.

FIGS. 4D1 and 4D2 illustrate the third group (GH6) of laser beam folding mirrors of the second laser scanning station (HST2), which cooperate with the four scanning facets of the first rotating polygonal mirror PM1 so as to generate four different horizontal laser scanning planes that project from the left side of the bottom-scanning window 16 diagonally outward and upward above the right side of the bottom-scanning window 16 as shown. These scanning planes are useful for reading picket-fence type bar code symbols disposed on bottom- and left-facing surfaces.

FIGS. 4E1 and 4E2 illustrate the fourth group (GH7) of laser beam folding mirrors of the second laser scanning station (HST2), which cooperate with the four scanning facets of the first rotating polygonal mirror PM1 so as to generate four different vertical laser scanning planes that project from the left back corner of the bottom-scanning window 16 diagonally outward and upward above the front right side and front right corner of the bottom-scanning window 16 as shown. These scanning planes are useful for reading ladder type bar code symbols disposed on bottom-, back-, and left-facing surfaces.

The position and orientation of each beam folding mirror employed at scanning station HST2 relative to a global coordinate reference system is specified by a set of position vectors pointing from the from the origin of this global coordinate reference system to the vertices of each such beam folding mirror element (i.e. light reflective surface patch). The x,y,z coordinates of these vertex-specifying vectors as set forth above in Table I specify the perimetrical boundaries of these beam folding mirrors employed in the scanning system of the illustrative embodiment.

Figure 4F:
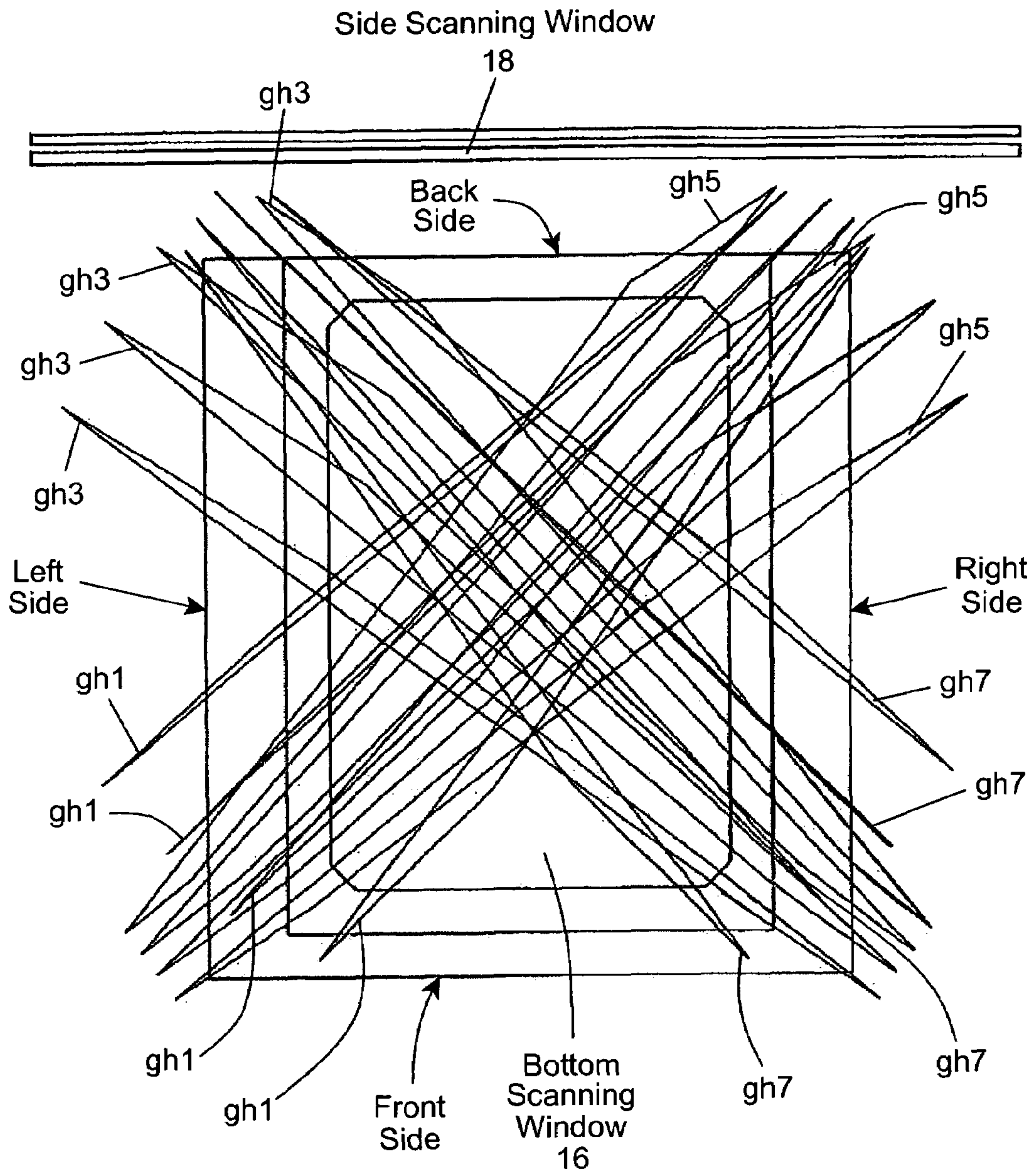
FIG. 4F illustrates the vertical scanning planes that project from the bottom-scanning window 16; including 4 groups (namely, GH1, GH3, GHS and GH7); groups GH1 and GH5 project from opposing portions (e.g., the back-right and front-left corners of the window 16) of the bottom-scanning window 16, and groups GH3 and GH7 project from opposing portions (e.g., front-right and back-left corners of the window 16) of the bottom-scanning window; note that groups GH1 and GH5 are substantially co-planar (i.e., quasi co-planar) and groups GH3 and GH7 are substantially co-planar (i.e., quasi co-planar), while groups GH1 and GH5 are substantially orthogonal (i.e., quasi-orthogonal) to groups GH3 and GH7, respectively, as shown.

As shown in FIG. 4F, the vertical scanning planes that project from the bottom-scanning window 16 include 4 groups (namely, GH1, GH3, GH5 and GH7). Groups GH1 and GH5 project from opposing portions (e.g., the back-right and front-left corners of the window 16) of the bottom-scanning window 16, and groups GH3 and GH7 project from opposing portions (e.g., front-right and back-left corners of the window 16) of the bottom-scanning window. Note that groups GH1 and GH5 are substantially co-planar (i.e., quasi co-planar) and groups GH3 and GH7 are substantially co-planar (i.e., quasi co-planar), while groups GH1 and GH5 are substantially orthogonal (i.e., quasi-orthogonal) to groups GH3 and GH7, respectively, as shown.

Third Laser Scanning Station VST1

Figure 5A:
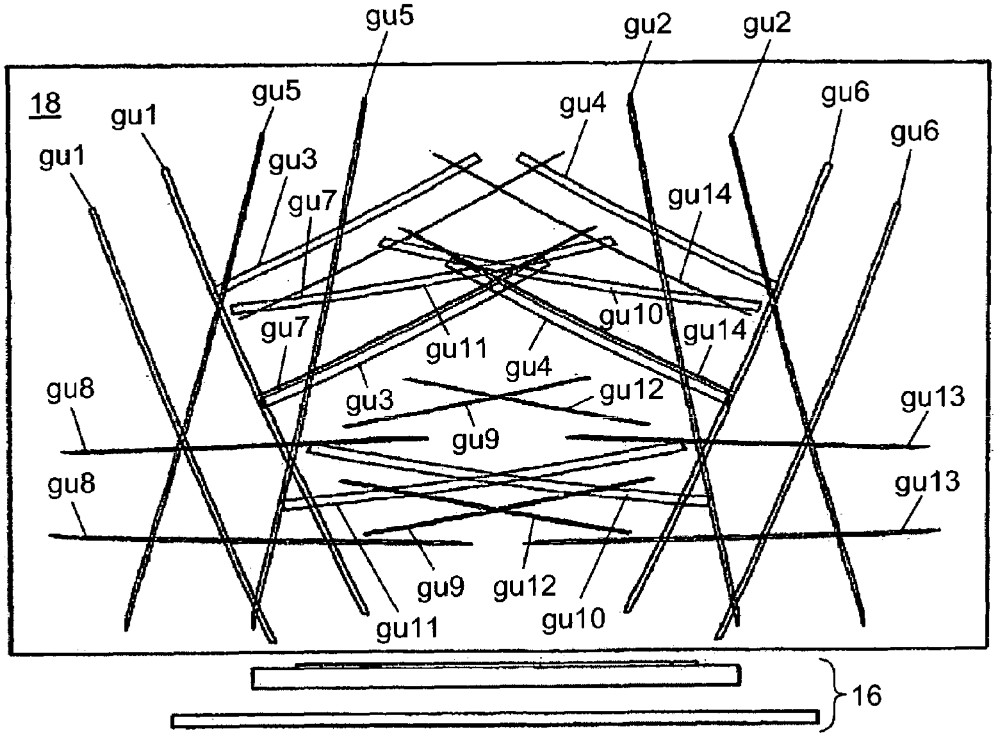
FIG. 5A illustrates the intersection of the fourteen groups of laser scanning planes (with 28 total scanning planes in the fourteen groups) produced by the third laser scanning station VST1 on the side-scanning window 18 of the illustrative bioptical laser scanning system described herein.

As shown in FIGS. 2K, 2L and 5A-5P2, the third laser scanning station (VST1) includes fourteen groups of laser beam folding mirrors (GV1, GV2, GV3 . . . GV14) which are arranged about the second rotating polygonal mirror PM2, and cooperate with the four scanning facets of the second rotating polygonal mirror PM2 so as to generate and project fourteen different groups of laser scanning planes (with 28 total scanning planes in the fourteen groups) through the side-scanning window 18. The intersection of the fourteen groups of laser scanning planes (with 28 total scanning planes in the fourteen groups) on the side-scanning window 18 is shown in FIG. 5A. The twenty-eight laser scanning planes (of these fourteen groups projected through the side-scanning window 18) can be classified as either vertical scanning planes or horizontal scanning planes, which can be defined as follows.

As shown in FIG. 5B1 and 5B2, a scanning plane has a characteristic direction of propagation $D_p$ and a normal direction $SP_N$, which define a direction O that is orthogonal thereto (e.g., $O=D_P \times SP_N$). A horizontal scanning plane is a scanning plane wherein the angle ϕ between the direction O and the plane defined by the bottom-scanning window 16 is in the range between 0 and 45 degrees (and preferably in the range between 0 and 20 degrees, and more preferably in the range between 0 and 10 degrees). An exemplary horizontal scanning plane projected from the side-scanning window 18 is shown in FIG. 5B1. A vertical scanning plane is a scanning plane wherein the angle ϕ between the direction O and the plane defined by the bottom-scanning window 16 is in the range between 45 and 90 degrees (and preferably in the range between 70 and 90 degrees, and more preferably in the range between 80 and 90 degrees). An exemplary vertical scanning plane projected from the side-scanning window 18 is shown in FIG. 5B2.

FIGS. 5C1 and 5C2 illustrate the first group (GV1) of laser beam folding mirrors of the third laser scanning station (VST1), which cooperate with the two low-elevation (LE) scanning facets of the second rotating polygonal mirror PM2 (corresponding to angles $\beta_3$ and $\beta_4$ of the second polygonal mirror PM2 in FIG. 2N1) so as to generate two different vertical laser scanning planes that project from the left side of the side-scanning window 18 diagonally down and out across the bottom-scanning window 16 above the front right corner of the bottom-scanning window 16 as shown. These scanning planes are useful for reading ladder type bar code symbols disposed on left- and back-facing surfaces.

FIGS. 5D1 and 5D2 illustrate the second group (GV2) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2N1) so as to generate two different vertical laser scanning planes that project from the top left corner of the side-scanning window 18 downward toward the bottom-scanning window 16 substantially along the left side of the bottom-scanning window 16 as shown. These scanning planes are useful for reading ladder type bar code symbols disposed on top- and back-facing surfaces.

FIGS. 5E1 and 5E2 illustrate the third group (GV3) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2N1) so as to generate two different horizontal laser scanning planes that project from the top left quadrant of the side-scanning window 18 diagonally down across the bottom-scanning window 16 as shown. These scanning planes are useful for reading picket-fence type bar code symbols disposed on back- and top-facing surfaces.

FIGS. 5F1 and 5F2 illustrate the fourth group (GV4) of laser beam folding mirrors of the third laser scanning station (VST1), which cooperate with the two low elevation scanning facets of the second rotating polygonal mirror PM2 (corresponding to angles $\beta_3$ and $\beta_4$ of the second polygonal mirror PM2 in FIG. 2N1) so as to generate two different horizontal laser scanning planes that project from the top right quadrant of the side-scanning window 18 diagonally down across the bottom-scanning window 16 as shown. These scanning planes are useful for reading picket-fence type bar code symbols disposed on back- and top-facing surfaces.

FIGS. 5G1 and 5G2 illustrate the fifth group (GV5) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2N1) so as to generate two different vertical laser scanning planes that project from the top right corner of the side-scanning window 18 downward toward the bottom-scanning window 16 substantially along the right side of the bottom-scanning window 16 as shown. These scanning planes are useful for reading ladder type bar code symbols disposed on top- and back-facing surfaces.

FIGS. 5H1 and 5H2 illustrate the sixth group (GV6) of laser beam folding mirrors of the third laser scanning station (VST1), which cooperate with the two low elevation scanning facets of the second rotating polygonal mirror PM2 (corresponding to angles $\beta_3$ and $\beta_4$ of the second polygonal mirror PM2 in FIG. 2N1) so as to generate two different vertical laser scanning planes that project from the right side of the side-scanning window 18 diagonally out across the bottom-scanning window 16 above the front left corner of the bottom-scanning window 16 as shown. These scanning planes are useful for reading ladder type bar code symbols disposed on right- and back-facing surfaces.

FIGS. 5I1 and 5I2 illustrate the seventh group (GV7) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the top left quadrant of the side-scanning window 18 outwardly across the bottom-scanning window 16 (substantially parallel to the bottom-scanning window 16) as shown. These scanning planes are useful for reading picket-fence type bar code symbols disposed on back- and left-facing surfaces.

FIGS. 5J1 and 5J2 illustrate the eight group (GV8) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the left side of the side-scanning window 18 outwardly across the bottom-scanning window 16 (substantially parallel to the bottom-scanning window 16) as shown. In the illustrative embodiment, the characteristic direction of propagation of such scanning planes has a non-vertical component (i.e., components in the plane parallel to the bottom-scanning window 16) whose orientation relative to the normal of the side-scanning window 18 is greater than 35 degrees. These scanning planes are useful for reading picket-fence type bar code symbols disposed on back- and left-facing surfaces (including those surfaces whose normals are substantially offset from the normal of the side-scanning window).

FIGS. 5K1 and 5K2 illustrate the ninth group (GV9) of laser beam folding mirrors of the third laser scanning station (VST1), which cooperate with the two high elevation scanning facets of the second rotating polygonal mirror PM2 (corresponding to angles 131 and 132 of the second polygonal mirror PM2 in FIG. 2N1) so as to generate two different horizontal laser scanning planes that project from the central portion of the side-scanning window 18 outwardly and downward across the bottom-scanning window 16 as shown. These scanning planes are useful for reading picket-fence type bar code symbols disposed on back-facing surfaces.

FIGS. 5L1 and 5L2 illustrate the tenth group (GV10) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the central portion of the side-scanning window 18 outwardly and sharply downward across the bottom-scanning window 16 as shown. These scanning planes are useful for reading picket-fence type bar code symbols disposed on top- and back-facing surfaces.

FIGS. 5M1 and 5M2 illustrate the eleventh group (GV11) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the central portion of the side-scanning window 18 outwardly and sharply downward across the bottom-scanning window 16 as shown. These scanning planes are useful for reading picket-fence type bar code symbols disposed on top- and back-facing surfaces.

FIGS. 5N1 and 5N2 illustrate the twelfth group (GV12) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the central portion of the side-scanning window 18 outwardly across the bottom-scanning window 16 (substantially parallel to the bottom-scanning window 16) as shown. These scanning planes are useful for reading picket-fence type bar code symbols disposed on back-facing surfaces.

FIGS. 5O1 and 5O2 illustrate the thirteenth group (GV13) of laser beam folding mirrors of the third laser scanning station (VST1), which cooperate with the two high elevation scanning facets of the second rotating polygonal mirror (corresponding to angles $\beta_1$ and $\beta_2$ of the second polygonal mirror PM2 in FIG. 2N1) so as to generate two different horizontal laser scanning planes that project from the right side of the side-scanning window 18 outwardly across the bottom-scanning window 16 (substantially parallel to the bottom-scanning window 16) as shown. In the illustrative embodiment, the characteristic direction of propagation of such scanning planes has a non-vertical component (i.e., components in the plane parallel to the bottom-scanning window 16) whose orientation relative to the normal of the side-scanning window 18 is greater than 35 degrees. These scanning planes are useful for reading picket-fence type bar code symbols disposed on back- and right-facing surfaces (including those surfaces whose normals are substantially offset from the normal of the side-scanning window).

FIGS. 5P1 and 5P2 illustrate the fourteenth group (GV14) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the top right quadrant of the side-scanning window 18 outwardly across the bottom-scanning window 16 (substantially parallel to the bottom-scanning window 16) as shown. These scanning planes are useful for reading picket-fence type bar code symbols disposed on back- and right-facing surfaces.

The position and orientation of each beam folding mirror employed at scanning station VST1 relative to a global coordinate reference system is specified by a set of position vectors pointing from the from the origin of this global coordinate reference system to the vertices of each such beam folding mirror element (i.e. light reflective surface patch). The x,y,z coordinates of these vertex-specifying vectors as set forth above in Table III specifies the perimetrical boundaries of these beam folding mirrors employed in the scanning system of the illustrative embodiment.

In the illustrative bioptical laser scanning system, the laser beam folding mirrors associated with scanning stations HST1, HST2 and VST1 are physically supported utilizing one or more mirror support platforms, formed with the scanner housing. Preferably, these mirror mounting support structures, as well as the components of the scanning housing are made from a high-impact plastic using injection molding techniques well known in the art.

TDM Laser Scanning

In the illustrative bioptical laser scanning system, the principal function of each facet on the first and second rotating polygonal mirrors PM1 and PM2 is to deflect an incident laser beam along a particular path in 3-D space in order to generate a corresponding scanning plane within the 3-D laser scanning volume produced by the laser scanning system hereof. Collectively, the complex of laser scanning planes produced by the plurality of facets in cooperation with the three laser beam production modules of HST1, HST2 and VST1 creates an omnidirectional scanning pattern within the highly-defined 3-D scanning volume of the scanning system between the space occupied by the bottom and side-scanning windows of the system. As shown in the exemplary timing scheme of FIG. 6A, the illustrative bioptical laser scanner cyclically generates a complex omnidirectional laser scanning pattern from both the bottom and side-scanning windows 16 and 18 thereof in a time-division-multiplexed manner during the revolutions of the scanning polygonal mirrors PM1 and PM2. In this exemplary timing scheme, four sets of scan plane groups (4*[GH1 . . . GH7]) are produced by stations HST1 and HST2 during each revolution of the polygonal mirror PM1. Moreover, two sets of scan plane groups (2*[GV1 . . . GV14]) are produced by station VST1 during a single revolution of the polygonal mirror PM2. The complex omnidirectional TDM scanning pattern is graphically illustrated in FIGS. 3A through 5P2, which consists of 68 different TDM laser scanning planes which cooperate in order to generate a plurality of quasi-orthogonal TDM laser scanning patterns within the 3-D scanning volume of the system, thereby enabling true omnidirectional scanning of bar code symbols. In the TDM timing scheme of FIG. 6A, the TDM laser scanning operations of the scanning planes produced by HST1, HST2 and VST1 are defined by a plurality of time slots uniquely assigned to HST1, HST2, VST1, respectively, over each scanning plane produced therefrom. In other words, the scan period of a given scanning plane includes a plurality of time slots logically assigned to the laser scanning station (HST1 or HST2 or VST1) that produces the given scanning plane. In this manner, the TDM laser scanning operations (and corresponding signal processing operations) over given scanning plane are performed at high frequencies (for example, frequencies greater than two times the Nyquist frequency, and possibly at frequencies greater than four times the Nyquist frequency).

Figure 6A:
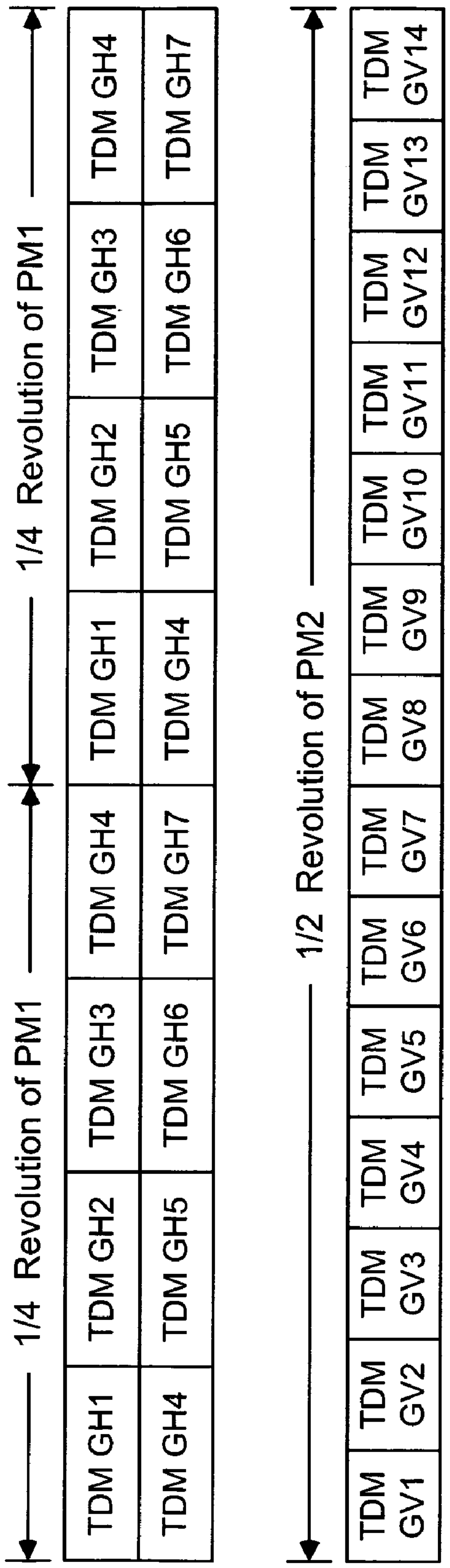
FIG. 6A is an exemplary timing scheme for controlling the illustrative bioptical laser scanner to cyclically generate a complex omnidirectional TDM laser scanning pattern from both the bottom and side-scanning windows 16 and 18 thereof during the revolutions of the scanning polygonal mirrors PM1 and PM2; in this exemplary timing scheme, four sets of scan plane groups (4*[GH1 . . . GH7]) are produced by stations HST1 and HST2 during each revolution of the polygonal mirror PM1; two sets of scan plane groups (2*[GV1 . . . GV14]) are produced by station VST1 during a single revolution of the polygonal mirror PM2; this complex omnidirectional TDM scanning pattern is produced by TDM laser scanning operations (and corresponding signal processing operations) of the scanning planes produced by HST1 and HST2 that are defined by a plurality of time slots uniquely assigned to HST1 and HST2, respectively, over each scanning plane produced therefrom. In other words, the scan period of a given scanning plane includes a plurality of time slots logically assigned to the laser scanning station (HST1 or HST2) that produces the given scanning plane.
Figure 6B:
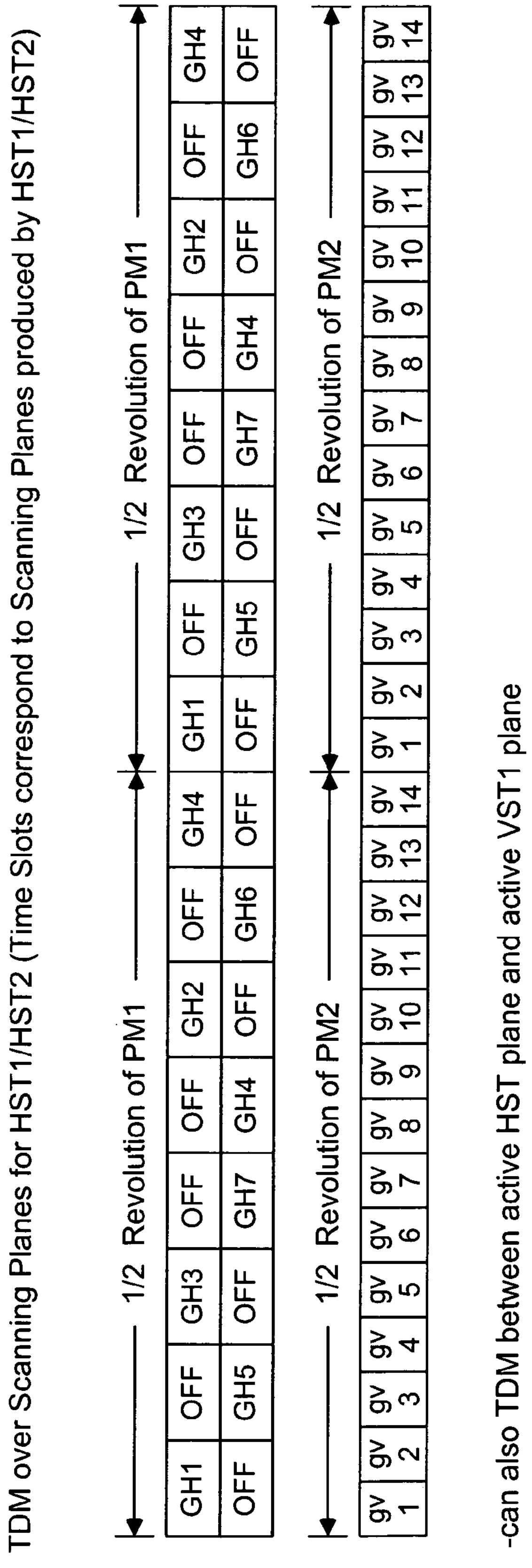
FIG. 6B illustrates an alternate timing scheme for controlling the bioptical laser scanner of the illustrative embodiment to cyclically generate a complex omni-directional laser scanning pattern from both the bottom and side-scanning windows 16 and 18 thereof during the revolutions of the scanning polygonal mirrors PM1 and PM2; as is similar to the timing scheme of FIG. 6A, four sets of scan plane groups (4*[GH1 . . . GH7]) are produced by stations HST1 and HST2 during each revolution of the polygonal mirror PM1, and two sets of TDM scan plane groups (2*[GV1 . . . GV14]) are produced by station VST1 during a single revolution of the polygonal mirror PM2; in contrast, the TDM laser scanning operations (and corresponding signal processing operations) of the scanning planes produced by HST1 and HST2 are defined by time slots uniquely assigned to HST1 and HST2, respectively, that correspond to scanning planes produced by HST1 and HST2. In other words, the scan period of a given scanning plane corresponds to a time slot logically assigned to the laser scanning station (HST1 or HST2) that produces the given scanning plane.

FIG. 6B illustrates an alternate timing scheme for controlling the bioptical laser scanner of the illustrative embodiment to cyclically generate a complex omni-directional TDM laser scanning pattern from both the bottom and side-scanning windows 16 and 18 thereof during the revolutions of the scanning polygonal mirrors PM1 and PM2. This alternative timing scheme is similar to the timing scheme of FIG. 6A in that four sets of scan plane groups (4*[GH1 . . . GH7]) are produced by stations HST1 and HST2 during each revolution of the polygonal mirror PM1, and two sets of TDM scan plane groups (2*[GV1 . . . GV14]) are produced by station VST1 during a single revolution of the polygonal mirror PM2. However, this complex omni-directional scanning pattern is produced in a time-division-multiplexed manner different from FIG. 6A. More specifically, in FIG. 6B, the TDM laser scanning operations of the scanning planes produced by HST1 and HST2 are defined by time slots uniquely assigned to HST1 and HST2, respectively, which correspond to scanning planes produced by HST1 and HST2. In other words, the scan period of a given scanning plane corresponds to a time slot logically assigned to the laser scanning station (HST1 or HST2) that produces the given scanning plane.

The TDM laser scanning operations of FIG. 6B include the following operations. During the time slots (e.g., scanning plane periods) logically assigned to station HST1, the generation and/or projection of the laser scanning planes from station HST1 and the signal processing operations (for bar code detection) on the output of the photosensor $PD_{HST1}$ are synchronously enabled, and the generation and/or projection of the laser scanning planes from station HST2 and the signal processing operations on the output of the photosensor $PD_{HST2}$ are disabled (e.g., turned OFF). Similarly, during the time slots (e.g., scanning plane periods) logically assigned to station HST2, the generation and/or projection of the laser scanning planes from station HST2 and the signal processing operations (for bar code detection) on the output of the photosensor $PD_{HST2}$ are synchronously enabled, and the generation and/or projection of the laser scanning planes from station HST1 and the signal processing operations (for bar code detection) on the output of the photosensor $PD_{HST1}$ are disabled (e.g., turned OFF). In this manner, the TDM laser scanning operations (and corresponding signal processing operation) are performed at lower frequencies (e.g., much less than the Nyquist frequency).

FIGS. 6C1 through 6C3 illustrates alternate timing schemes for controlling the illustrative bioptical laser scanner to cyclically generate a complex omni-directional laser scanning pattern from both the bottom and side-scanning windows 16 and 18 thereof during the revolutions of the scanning polygonal mirrors PM1 and PM2. These alternative timing schemes are similar to the timing scheme of FIGS. 6A and 6B in that four sets of scan plane groups (4*[GH1 . . . GH7]) are produced by stations HST1 and HST2 during each revolution of the polygonal mirror PM1, and two sets of TDM scan plane groups (2*[GV1 . . . GV14]) are produced by station VST1 during a single revolution of the polygonal mirror PM2. However, this complex omni-directional scanning pattern is produced in a time-division-multiplexed manner different from FIGS. 6A and 6B. More specifically, in FIGS. 6C1-6C3, the TDM laser scanning operations of the scanning planes produced by HST1 and HST2 are defined by time slots uniquely assigned to HST1 and HST2, respectively, which correspond to scanning plane groups produced by HST1 and HST2. In other words, the scan period of a given scanning plane group corresponds to a time slot logically assigned to the laser scanning station (HST1 or HST2) that produces the given scanning plane group.

The TDM laser scanning operations of FIGS. 6C1-6C3 include the following operations During the time slots (e.g., scanning plane group periods) logically assigned to station HST1, the generation and/or projection of the laser scanning planes from station HST1 and the signal processing operations (for bar code detection) on the output of the photosensor $P_{DHST1}$ are synchronously enabled, and the generation and/or projection of the laser scanning planes from station HST2 and the signal processing operations (for bar code detection) on the output of the photosensor $PD_{HST2}$ are disabled (e.g., turned OFF). Similarly, during the time slots (e.g., scanning plane group periods) logically assigned to station HST2, the generation and/or projection of the laser scanning planes from station HST2 and the signal processing operations (for bar code detection) on the output of the photosensor $PD_{HST2}$ are synchronously enabled, and the generation and/or projection of the laser scanning planes from station HST1 and the signal processing operations (for bar code detection) on the output of the photosensor $PD_{HST2}$ are disabled (e.g., turned OFF. In this manner, the TDM laser scanning operations (and corresponding signal processing operation) are performed at lower frequencies (e.g., much less than the Nyquist frequency).

In the TDM laser scanning scheme of FIG. 6C1, the TDM time slots are logically assigned to scanning plane groups produced by stations HST1 and HST2 during a_revolution of the polygonal mirror PM1.

In the TDM laser scanning scheme of FIG. 6C2, the TDM time slots are logically assigned to scanning plane groups produced by stations HST1 and HST2 during a_revolution of the polygonal mirror PM1.

And in TDM laser scanning scheme of FIG. 6C3, the TDM time slots are logically assigned to scanning plane groups produced by stations HST1 and HST2 during a full revolution of the polygonal mirror PM1.

Note that in the TDM laser scanning schemes described above with respect to FIGS. 6B, 6C1, 6C2 and 6C3, the third laser scanning station VST1 is not part of the TDM laser scanning and signal processing operations performed by the first and second laser scanning stations HST1 and HST2. In other alternate timing schemes, the third laser scanning station VST1 may perform TDM laser scanning and signal processing operations with respect to the laser scanning and signal processing operations of the first and second laser scanning stations HST1 and HST2. For example, the timing schemes of FIGS. 6B, 6C1, 6C2 and 6C3 may be modified such that time-division-multiplexed laser scanning and signal processing operations (bar code detection) are performed between the third laser scanning station VST1 and the active HST laser scanning station (i.e., station HTS1 or HST2).

In order to allow the illustrative laser scanning system to selectively activate/deactivate the laser scanning operations and signal processing operations between scanning planes (and scanning plane groups), a synchronizing signal can be used to identify the period of time that a particular laser scanning plane/laser scanning plane group is produced. This synchronizing signal can be derived from a position sensor (such as a hall sensor), integrated into the rotating shaft (or other portion) of the rotating polygonal mirror, that generates an electrical signal when the rotating polygonal mirror reaches a predetermined point (such as a start-of-scan position) in its rotation. Alternatively, such synchronization may be derived from a position indicating optical element (e.g., mirror or lens), which is preferably mounted adjacent (or near) the perimeter of one of the light folding mirrors, such that the position indicating optical element is illuminated by the scanning beam when the rotating polygonal mirror reaches a predetermined point (such as a start-of-scan position) in its rotation. The position indicating optical element may be a mirror that directs the illumination of the scanning beam incident thereon to a position indicating optical detector (which generates an electrical signal whose amplitude corresponds to the intensity of light incident thereon). Alternatively, the position indicating optical element may be a light collecting lens that is operably coupled to a light guide (such as a fiber optic bundle) that directs the illumination of the scanning beam incident thereon to a position indicating optical detector (which generates an electrical signal whose amplitude corresponds to the intensity of light incident thereon).

Moreover, in some scanning applications, where omnidirectional scanning cannot be ensured at all regions within a pre-specified scanning volume, it may be useful to use scan data produced either (i) from the same laser scanning plane reproduced many times over a very short time duration while the code symbol is being scanned therethrough, or (ii) from several different scanning planes spatially contiguous within a pre-specified portion of the scanning volume. In the first instance, if the bar code symbol is moved through a partial region of the scanning volume, a number of partial scan data signal fragments associated with the moved bar code symbol can be acquired by a particular scanning plane being cyclically generated over an ultra-short period of time (e.g. 1-3 milliseconds), thereby providing sufficient scan data to read the bar code symbol. In the second instance, if the bar code symbol is within the scanning volume, a number of partial scan data signal fragments associated with the bar code symbol can be acquired by several different scanning planes being simultaneously generated by the three laser scanning stations of the system hereof, thereby providing sufficient scan data to read the bar code symbol, that is, provided such scan data can be identified and collectively gathered at a particular decode processor for symbol decoding operations.

In order to allow the illustrative bioptical scanning system to use symbol decoding algorithms that operate upon partial scan data signal fragments, as described above, the synchronization signal (as described above) can be used to identify a set of digital word sequences $D_3$, (i.e. $\{D_s\}$), associated with a set of time-sequentially generated laser scanning beams produced by a particular facet on the first and second rotating polygonal mirrors. In such applications, each set of digital word sequences can be used to decode a partially scanned code symbol and produce symbol character data representative of the scanned code symbol. In code symbol reading applications where complete scan data signals are used to decode scanned code symbols, the synchronizing signal described above need not be used, as the digital word sequence $D_3$ corresponding to the completely scanned bar code symbol is sufficient to carry out symbol decoding operations using conventional symbol decoding algorithms known in the art.

As each synchronizing pulse in the synchronizing signal is synchronous with a "reference" point on the respective rotating mirror, the symbol decoding circuitry provided with this periodic signal can readily "link up" or relate, on a real-time basis, such partial scan data signal fragments with the particular facet on the respective rotating polygonal mirror that generated the partial scan data fragment. By producing both a scan data signal and a synchronizing signal as described above, the laser scanning system of the present invention can readily carry out a diverse repertoire of symbol decoding processes which use partial scan data signal fragments during the symbol reading process.

In each laser scanning station (HST1, HST2, and VST1) of the illustrative embodiment, a laser beam production module produces a laser beam that is directed at the point of incidence on the facets of the first or second rotating polygonal mirrors at the pre-specified angle of incidence. Preferably, such laser beam production modules comprise a visible laser diode (VLD) and possibly an aspheric collimating lens supported within the bore of a housing mounted upon the optical bench of the module housing.

In the illustrative embodiment described above, the pre-specified angle of incidence of the laser beams produced by the laser beam production modules of the laser scanning stations HST1 and HST2 are offset from the rotational axis of the polygonal mirror PM1 along a direction perpendicular to the rotational axis as shown in FIG. 2O. Such offset provides for spatial overlap in the scanning pattern of light beams produced from the polygonal mirror PM1 by these laser beam production modules. In the illustrative embodiment, the offset between the rotational axis of the rotating polygonal mirror PM1 and the incident directions of the scanning beams SB1 and SB2, respectively, is approximately 5 mm. Such spatial overlap can be exploited such that the overlapping rays are incident on at least one common mirror (mh5 in the illustrative embodiment) to provide a dense scanning pattern projecting there from. In the illustrative embodiment, a dense pattern of horizontal planes (groups GH4) is projected from the front side of the bottom window as is graphically depicted in FIGS. 3F1, 3F2 and 4B1 and 4B2.

Light Collection for the 3 Scanning Stations

When a bar code symbol is scanned by any one of the laser scanning planes projected from the bottom-scanning window 16 (by either the first or second laser scanning stations HST1, HST2), or by any one of the laser scanning planes projected from the side-scanning window 18 by the third laser scanning station VST1, the incident laser light scanned across the object is intensity modulated by the absorptive properties of the scanned object and scattered according to Lambert's Law (for diffuse reflective surfaces). A portion of this laser light is reflected back along the outgoing ray (optical) path, off the same group of beam folding mirrors employed during the corresponding laser beam generation process, and thereafter is incident on the same scanning facet (of the first or second rotating polygonal mirror) that generated the corresponding scanning plane only a short time before. The scanning facet directs the returning reflected laser light towards a light collecting optical element (e.g., parabolic mirror structure) of the respective laser scanning station, which collects the returning light and focuses these collected light rays onto a photodetector, which may be disposed on a planar surface beneath the respective scanning polygon (as shown in FIGS. 2I and 2J), or which may be disposed on a planar surface above the respective scanning polygon (as shown in FIG. 2M). FIGS. 2I and 2J depict the light collection optical elements $LC_{HST1}$ and $LC_{HST2}$, e.g., parabolic mirrors, and photodetectors $PD_{HST1}$ and $PD_{HST2}$ for the two laser scanning stations HST1 and HST2, respectively. FIG. 2M depicts the light collection optical elements $LC_{VST1}$, e.g., parabolic mirror, and photodetector $PD_{VST1}$ for the third laser scanning station VST1. The electrical signal produced by the photodetector for the respective laser scanning stations is supplied to analog/digital signal processing circuitry, associated with the respective laser scanning stations, that process analog and digital scan data signals derived there from to perform bar code symbol reading operations as described herein.

The bottom and side-scanning windows 16 and 18 have light transmission apertures of substantially planar extent. In order to seal off the optical components of the scanning system from dust, moisture and the like, the scanning windows 16 and 18, are preferably fabricated from a high impact plastic material and installed over their corresponding light transmission apertures using a rubber gasket and conventional mounting techniques. In the illustrative embodiment, each scanning window 16 and 18 preferably has spectrally-selective light transmission characteristics which, in conjunction with a spectrally-selective filters installed before each photodetector within the housing, forms a narrow-band spectral filtering subsystem that performs two different functions. The first function of the narrow-band spectral filtering subsystem is to transmit only the optical wavelengths in the red region of the visible spectrum in order to impart a reddish color or semi-transparent character to the scanning window. This makes the internal optical components less visible and thus remarkably improves the external appearance of the bioptical laser scanning system. This feature also makes the bioptical laser scanner less intimidating to customers at point-of-sale (POS) stations where it may be used. The second function of the narrow-band spectral filtering subsystem is to transmit to the photodetector for detection, only the narrow band of spectral components comprising the outgoing laser beam produced by the associated laser beam production module. Details regarding this optical filtering subsystem are disclosed in copending application Ser. No. 08/439,224, entitled "Laser Bar Code Symbol Scanner Employing Optical Filtering With Narrow Band-Pass Characteristics and Spatially Separated Optical Filter Elements" filed on May 11, 1995, which is incorporated herein by reference in its entirety.

Electrical Subsystem

Figure 7:
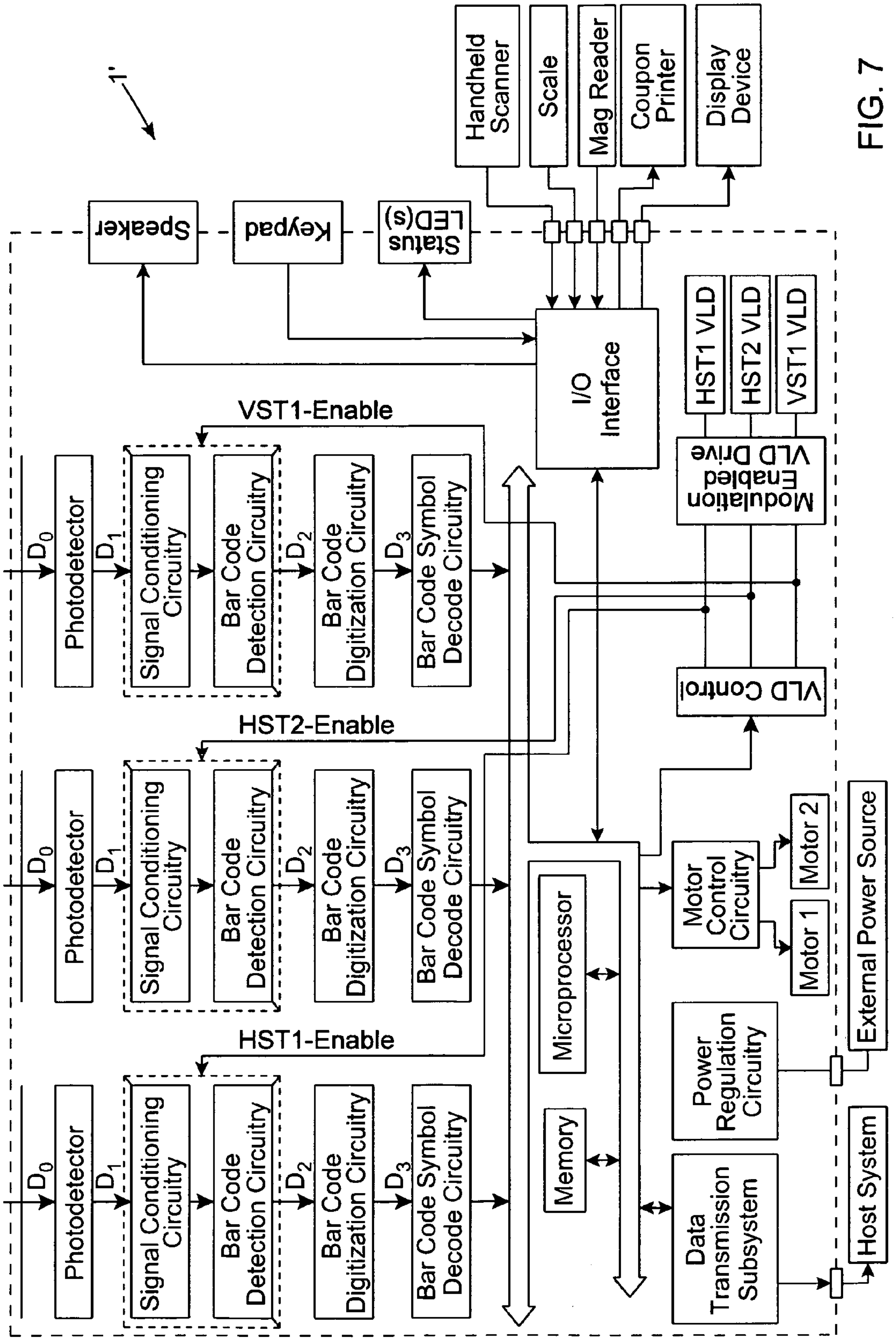
FIG. 7 is a functional block diagram of an illustrative embodiment of the electrical subsystem of the illustrative bioptical laser scanning system in accordance with the present invention, including: photodetectors (e.g. a silicon photocell) for detection of optical scan data signals generated by the respective laser scanning stations; signal conditioning circuitry for conditioning (e.g., preamplification and/or filtering out unwanted noise in) the electrical signals output by the photodetectors; bar code symbol detection circuitry that forms a digitized representation (e.g., a sequence of binary bit values) of a bar code label being read from signals derived from the output of the signal conditioning circuitry; bar code digitization circuitry that converts the digitized representation of the bar code symbol being read into a corresponding digital word value; bar code symbol decode circuitry that decodes the digital word value of the bar code symbol being read to generate character data string values associated therewith; a programmed microprocessor with a system bus and associated program and data storage memory, for controlling the system operation of the bioptical laser scanner and performing other auxiliary functions and for receiving bar code symbol character data (provided by the bar code symbol decoding circuitry); a data transmission subsystem for interfacing with and transmitting symbol character data and other information to host computer system (e.g. central computer, cash register, etc.) over a communication link therebetween; and an input/output interface for providing drive signals to an audio-transducer and/or LED-based visual indicators used to signal successful symbol reading operations to users and the like, for providing user input via interaction with a keypad, and for interfacing with a plurality of accessory devices (such as an external handheld scanner, a display device, a weigh scale, a magnetic card reader and/or a coupon printer as shown). In addition, the system includes VLD control circuitry that operates in response to the laser control signals supplied by the microprocessor to generate timing signals HST1_ENABLE, HST2_ENABLE and VST1_ENABLE that define time slots that are logically assigned to unique VLD modules (HST1 VLD, HST2 VLD or VST1 VLD) and corresponding photosensors ($PD_{HST1}$, $PD_{HST2}$, or $PD_{VST1}$). Modulation enabled VLD drive circuitry operates in response to the timing signals generated by the VLD control circuitry to modulate the output optical power of the three VLD devices (HST1 VLD, HST2 VLD and VST1 VLD) such that, during each given time slot, the VLD logically assigned thereto is turned ON and projected into the scanning volume while the other VLDs (those not logically assigned to the given time slot) are turned substantially OFF. In addition, the signal processing circuitry that performs signal conditioning and/or bar code detection and operations on the data signals derived from the three photosensors ($PD_{HST1}$, $PD_{HST2}$, and $PD_{VST1}$) operates synchronously in response to the timing signals generated by the VLD control circuitry such that, during each given time slot, the photosensor logically assigned thereto is operably coupled to the signal processing circuitry that performs bar code detection operations on the data signals derived therefrom while the other photosensors (those not logically assigned to the given time slot) are operably decoupled (e.g., electrically isolated) from such signal processing circuitry. The frequency of such time-division-multiplexed laser scanning operations and corresponding signal processing operations may be greater than two times the Nyquist frequency (and preferably performed at a frequency greater than four times the Nyquist frequency). In such embodiments, when a given photosensor is operably decoupled (e.g., electrically isolated) from bar code detection signal processing circuitry, such bar code detection signal processing circuitry operates on a sample of the data signals derived from the given photosensor during the previous time slot logically assigned to the given photosensor. Preferably, this sample is stored on a hold capacitor that is operably coupled to such bar code detection signal processing circuitry.

The illustrative bioptical laser scanning system 1' comprises a number of system components as shown in the system diagram of FIG. 7, including: photodetectors (e.g. a silicon photocells) for detection of optical scan data signals generated by the respective laser scanning stations (e.g., HST1, HST2, VST1); signal conditioning circuitry for conditioning (e.g., preamplification and/or filtering out unwanted noise in) the electrical signals out by the photodetectors; bar code symbol detection circuitry (e.g., analog and/or digital circuitry) that forms a digitized representation (e.g., a sequence of binary bit values) of a bar code label being read from signals derived from the output of the signal conditioning circuitry; bar code digitization circuitry that converts the digitized representation of the bar code symbol being read into a corresponding digital word value, and bar code symbol decode circuitry that decodes the digital word value of the bar code symbol being read to generate character data string values associated therewith.

As described above, during laser scanning operations, the optical scan data signal $D_0$ focused and incident on the photodetectors is produced by light rays associated with a diffracted laser beam being scanned across a light reflective surface (e.g. the bars and spaces of a bar code symbol) and scattering thereof, whereupon the polarization state distribution of the scattered light rays is typically altered when the scanned surface exhibits diffuse reflective characteristics. Thereafter, a portion of the scattered light rays are reflected along the same outgoing light ray paths toward the facet which produced the scanned laser beam. These reflected light rays are collected by the scanning facet and ultimately focused onto the photodetector by its parabolic light reflecting mirror. The function of each photodetector is to detect variations in the amplitude (i.e. intensity) of optical scan data signal $D_0$, and produce in response thereto an electrical analog scan data signal $D_1$ which corresponds to such intensity variations. When a photodetector with suitable light sensitivity characteristics is used, the amplitude variations of electrical analog scan data signal $D_1$ will linearly correspond to light reflection characteristics of the scanned surface (e.g. the scanned bar code symbol). The function of the signal conditioning circuitry is to amplify and/or filter the electrical analog scan data signal $D_1$, in order to improve the SNR of the analog signal.

The bar code symbol detection circuitry processes the conditioned $D_1$ signals produced by the signal conditioning circuitry to form a digitized representation (e.g., a sequence of binary bit values) of a bar code label being read from the information encoded in the conditioned $D_1$ signals. In practice, this processing (which may be performed in the analog domain or digital domain) is a thresholding function which converts the conditioned analog scan data signal $D_1$ into a corresponding digital scan data signal $D_2$ having first and second (i.e. binary) signal levels which correspond to the bars and spaces of the bar code symbol being scanned. Thus, the digital scan data signal $D_2$ appears as a pulse-width modulated type signal as the first and second signal levels vary in proportion to the width of bars and spaces in the scanned bar code symbol.

The bar code digitization circuitry processes the digital scan data signal $D_2$, associated with each scanned bar code symbol, to form a corresponding sequence of digital words $D_3$ (i.e., a sequence of digital count values). Notably, in the digital word sequence $D_3$, each digital word represents the time length associated with each first or second signal level in the corresponding digital scan data signal $D_2$. Preferably, these digital count values are in a suitable digital format for use in carrying out various symbol decoding operations which, like the scanning pattern and volume of the present invention, will be determined primarily by the particular scanning application at hand. Reference is made to U.S. Pat. No. 5,343,027 to Knowles, incorporated herein by reference, as it provides technical details regarding the design and construction of microelectronic bar code digitization circuits suitable for use in the illustrative bioptical laser scanning system.

The bar code symbol decoding circuitry receive the digital word sequences $D_3$ produced from the bar code digitization circuits, and subject such words to one or more bar code symbol decoding algorithms in order to determine which bar code symbol is indicated (i.e. represented) by the given digital word sequence $D_3$, originally derived from corresponding scan data signal $D_1$ detected by the photodetector associated therewith. In more general scanning applications, the function of the bar code symbol decoding circuitry is to receive each digital word sequence $D_3$ produced from the digitizing circuit, and subject it to one or more pattern recognition algorithms (e.g. character recognition algorithms) in order to determine which pattern is indicated by the digital word sequence $D_3$. In bar code symbol reading applications, in which scanned code symbols can be any one of a number of symbologies, a bar code symbol decoding algorithm with auto-discrimination capabilities can be used in a manner known in the art. In the preferred embodiment, the bar code symbol decoding function is carried out in software as part of a programmed routine that executes on the programmed microprocessor.

Details of exemplary signal processing circuitry for signal conditioning and bar code detection and decoding is described below.

As shown in FIG. 7, the system also includes a programmed microprocessor (e.g., system controller) with a system bus and associated program and data storage memory, for controlling the system operation of the bioptical laser scanner and performing other auxiliary functions and for receiving bar code symbol character data (provided by the bar code symbol decoding circuitry); a data transmission subsystem for interfacing with and transmitting symbol character data and other information to host computer system (e.g. central computer, cash register, etc.) over a communication link therebetween; and an input/output interface for providing drive signals to an audio-transducer and/or LED-based visual indicators used to signal successful symbol reading operations to users and the like, for providing user input via interaction with a keypad, and for interfacing with a plurality of accessory devices (such as an external handheld scanner that transmits bar code symbol character data to the bioptical laser scanning system, a display device, a weight scale, a magnetic card reader and/or a coupon printer as shown). In addition, the input-output interface may provide a port that enables an external handheld scanner to transmit sequences of digital words $D_3$ (i.e. a sequence of digital count values) generated therein to the bioptical laser scanning system for bar code symbol decoding operations. Details of such an interface port are described in U.S. Pat. No. 5,686,717 to Knowles et al., commonly assigned to the assignee of the present invention, herein incorporated by reference in its entirety.

The microprocessor also produces motor control signals, and laser control signals during system operation. Motor control circuitry operates in response to such motor control signals to drive the two motors (motor 1 and motor 2) that cause rotation of the first and second rotating polygonal mirrors PM1 and PM2, respectively. A power regulation circuit receives 120 Volt, 60 Hz line voltage signal from an external power source (such as a standard power distribution circuit) and provides a regulated supply of electrical power to electrical components of the scanning system.

The communication link between the data transmission subsystem and the host system may be a wireless data link (such as an infra-red link, Bluetooth RF link or IEEE 802.11a or 802.11b RF link) or wired serial data link (such as keyboard wedge link—for example supporting XT-, AT- and PS/2-style keyboard protocols, an RS-232 link, USB link, a Firewire (or IEEE 1394) link, an RS-422 link, and RS-485 link), a wired parallel data bus, or other common wired interface links (such as an OCIA link, IBM 46XX link, Light Pen Emulation link, LTPN link). Similarly, the input/output interface between the external handheld scanner and the bioptical laser scanning system may support a wireless data link (such as an infra-red link, Bluetooth RF link or IEEE 802.11a or 802.11b RF link) or wired serial data link (such as keyboard wedge link—for example supporting XT-, AT- and PS/2-style keyboard protocols, an RS-232 link, USB link, a Firewire (or IEEE 1394) link, an RS-422 link, and RS-485 link), a wired parallel data bus, or other common wired interface links (such as an OCIA link, IBM 46XX link, Light Pen Emulation link, LTPN link).

The VLD control circuitry operates in response to the laser control signals supplied by the microprocessor to generate timing signals HST1_ENABLE, HST2_ENABLE and VST1_ENABLE (as described above) that define time slots that are logically assigned to unique VLD modules (HST1 VLD, HST2 VLD or VST1 VLD) and corresponding photosensors ($PD_{HST1}$, $PD_{HST2}$, or $PD_{VST1}$). One skilled in the electronic arts will understand that there are many different ways to realize such VLD control circuitry. An exemplary implementation of such VLD control circuitry is described below with respect to FIGS. 8A, 8B1 through 8B9, and 8C.

The modulation enabled VLD drive circuitry operates in response to the timing signals generated by the VLD control circuitry to modulate the output optical power of the three VLD devices (HST1 VLD, HST2 VLD and VST1 VLD) such that, during each given time slot, the VLD logically assigned thereto is turned ON and projected into the scanning volume while the other VLDs (those not logically assigned to the given time slot) are turned substantially OFF. One skilled in the art will understand that there are many different ways to realize such modulation enable VLD drive circuitry. Exemplary implementations of such modulation enable VLD drive circuitry is described below with respect to FIGS. 8D through 8G2.

In addition, the signal processing circuitry that performs signal conditioning and/or bar code detection operations on the data signals derived from the three photosensors ($PD_{HST1}$, $PD_{HST2}$, and $PD_{VST1}$) operates in response to the timing signals generated by the VLD control circuitry (in a synchronous manner with the modulation enabled VLD drive circuitry) such that, during each given time slot (or a portion of the given time slot), the photosensor logically assigned thereto is operably coupled to the signal processing circuitry that performs bar code detection operations on the data signals derived therefrom. Furthermore, during the given time slot, the other photosensor is operably decoupled (e.g., electrically isolated) from such bar code detection signal processing circuitry.

The time-division-multiplexed laser scanning operations and corresponding signal processing operations carried out by the bioptical scanner of FIG. 7 may be performed at high frequencies (for example, frequencies greater than two times the Nyquist frequency, and possibly at frequencies greater than four times the Nyquist frequency as described herein). In such embodiments, when a given photosensor is operably decoupled (e.g., electrically isolated) from bar code detection signal processing circuitry, such bar code detection signal processing circuitry operates on a sample of the data signals derived from the given photosensor during the previous time slot logically assigned to the given photosensor. Such operations are preferably provided by track and hold circuitry (or sample and hold circuitry which is well known in the electronic arts) which operably couples/decouples (e.g., electrically isolates) the output of a given photosensor from bar code detection signal processing circuitry, and stores a sample of the data signals derived from the given photosensor during the previous time slot logically assigned to the given photosensor on a hold capacitor that is operably coupled to bar code detection signal processing circuitry.

Alternatively, the time-division-multiplexed laser scanning operations and corresponding signal processing operations carried out by the bioptical scanner of FIG. 7 may be performed at lower frequencies (e.g., much less than the Nyquist frequency as described herein). In such embodiments, a multiplexing switch may be used to operably couple/decouple (e.g., electrically isolate) the output of a given photosensor from bar code detection signal processing circuitry, and there is no need to store (and process) a sample of the data signals derived from the given photosensor during the previous time slot logically assigned to the given photosensor.

One skilled in the art will understand that there are many different ways to realize signal processing circuitry that performs the time-division multiplexed signal processing operations on the data signals derived from the three photosensors. An exemplary implementation of such signal processing circuitry is described below with respect to FIG. 9A, wherein bar code detection is carried out in the analog domain by analog signal processing circuitry. Exemplary implementations of such analog signal processing circuitry is described below with respect to FIGS. 11A through 18.

Figure 9A:
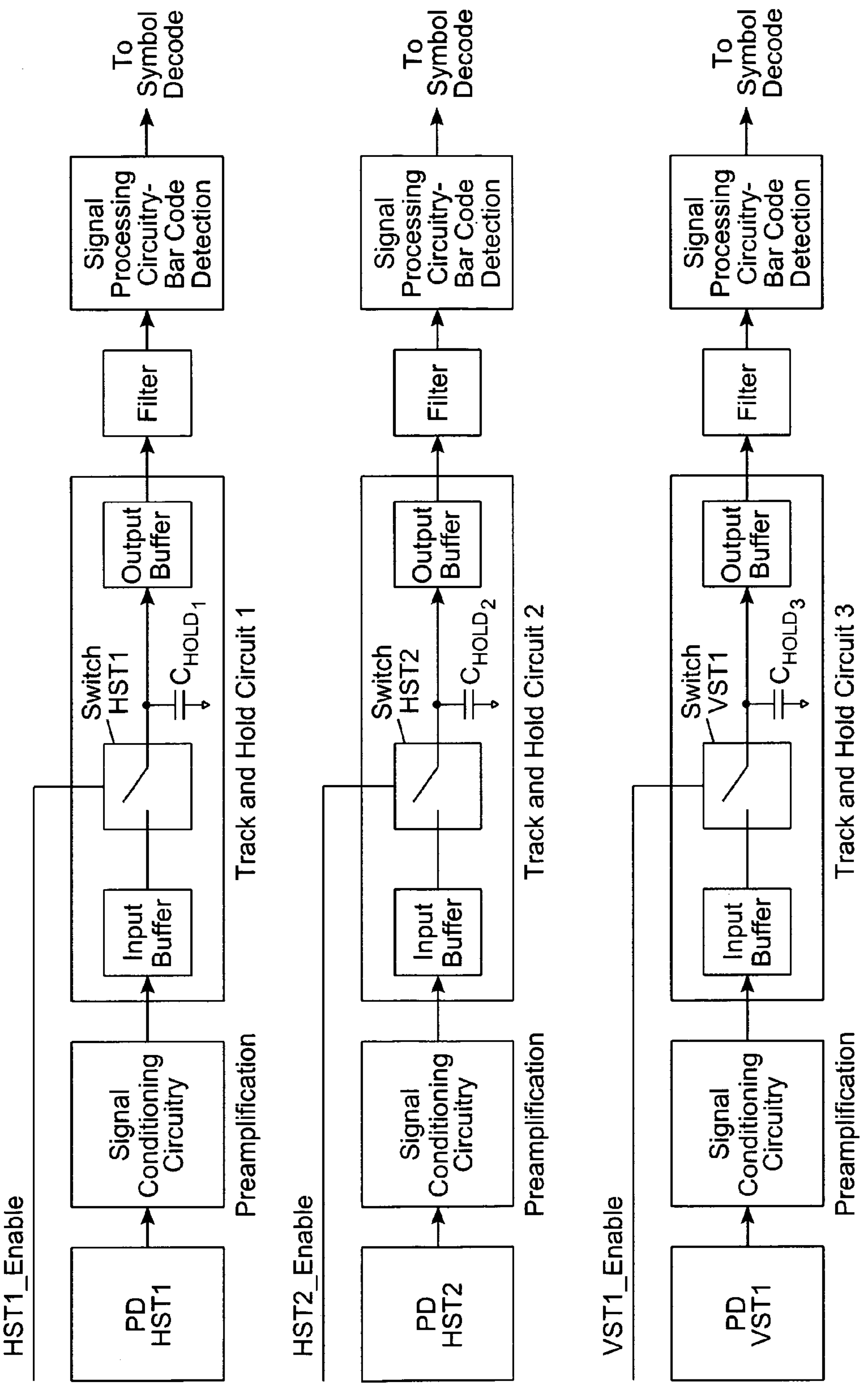
FIG. 9A is a functional block diagram of exemplary electronic circuitry that performs time-division multiplexed signal processing operations in response to the timing signals of FIGS. 8B6 through 8B8 for the illustrative bioptical laser scanning system whose system architecture is shown in FIG. 7; the frequency of such time-division-multiplexed laser scanning operations and corresponding signal processing operations may be greater than two times the Nyquist frequency (and preferably performed at a frequency greater than four times the Nyquist frequency); in this illustrative embodiment, track and hold circuitry operates in response to the timing signals of FIGS. 8B6 through 8B8 to operably couple/de-couple the photosensors $PD_{HST1}$, $PD_{HST2}$ and $PD_{VST1}$ from signal processing circuitry that performs bar code detection and decoding on data signals derived from the output of the photosensors $PD_{HST1}$, $PD_{HST2}$ and $PD_{VST1}$ during the time slot assigned to photosensor $PD_{HST1}$, $PD_{HST2}$, $PD_{VST1}$ (and laser scanning station HST1, HST2 or VST1), respectively; in such embodiments, during the "hold" mode when a given photosensor is operably decoupled (e.g., electrically isolated) from bar code detection signal processing circuitry, such bar code detection signal processing circuitry operates on a sample of the data signals derived from the given photosensor during the previous time slot logically assigned to the given photosensor. Preferably, this sample is stored on a hold capacitor that is operably coupled to such bar code detection signal processing circuitry.
Figure 9B:
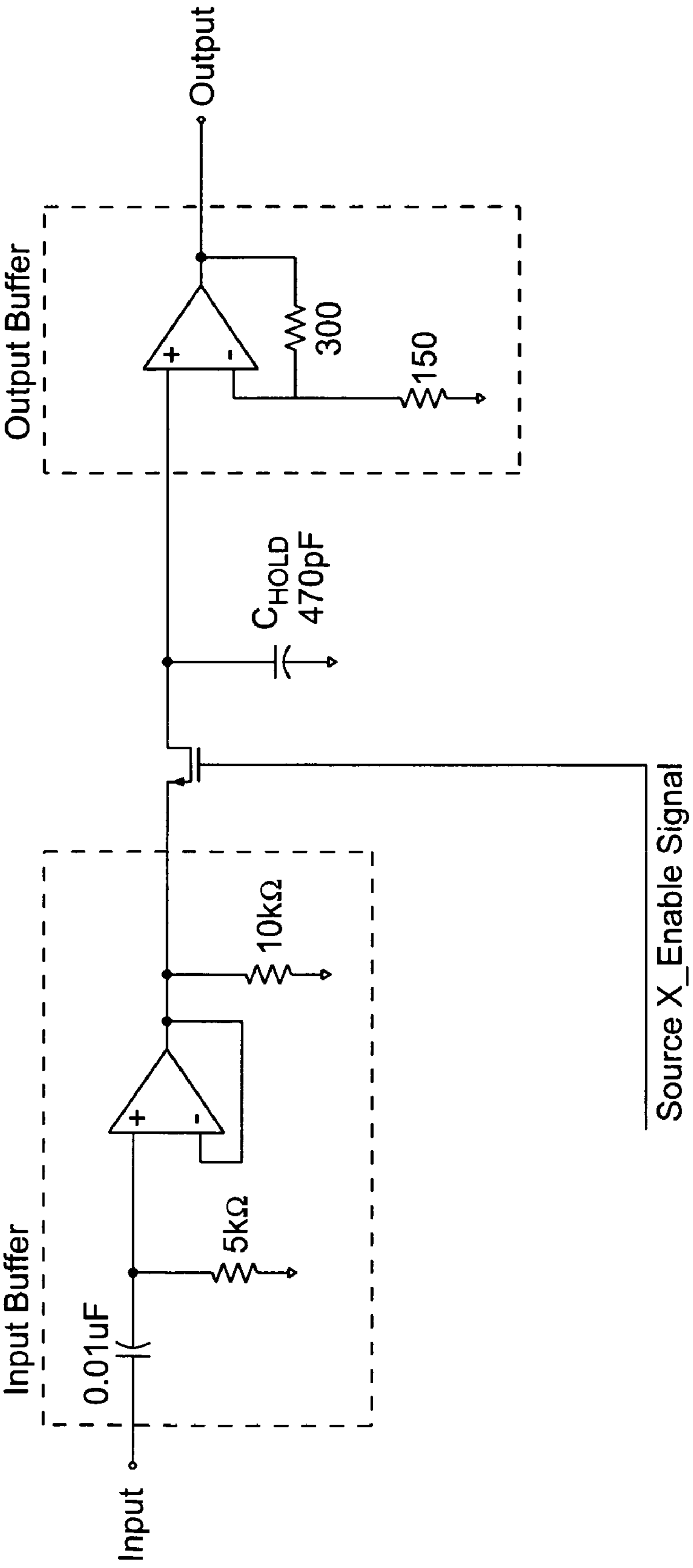
FIG. 9B is a circuit diagram of an exemplary track and hold circuit suitable for use in the time-division multiplexed signal processing circuitry of FIG. 9A; the track and hold circuit includes an input buffer (provided by a 0.01 uF capacitor and 5K ohm resistor for AC coupling, an op-amp configured as a voltage follower, and 10K ohm resistor coupled between the output node of the op-amp and ground), a FET switch whose source/drain is coupled between the output node of the input buffer and input node of an output buffer, and whose gate is coupled to a signal line that carries the SourceX_Enable signal (to switch between "track mode" and "hold mode"), a 470 pF hold capacitor coupled between the input node of the output buffer and ground, and an output buffer (provided an op-amp configured as a non-inverting amplifier with a gain of 3, e.g. 1+300/150).
Figure 9C:
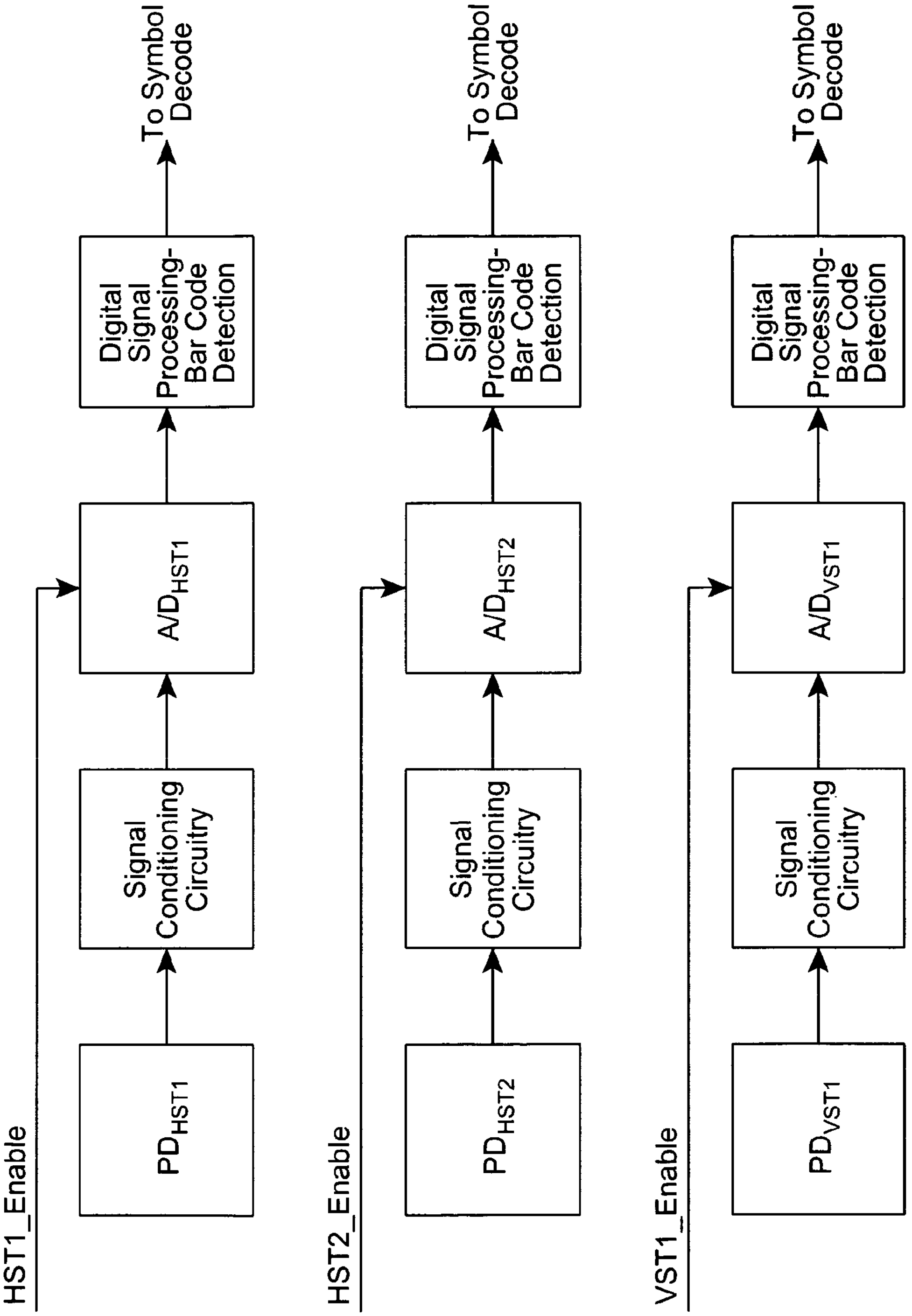
FIG. 9C is a functional block diagram of exemplary electronic circuitry that performs time-division multiplexed signal processing operations in response to the timing signals of FIGS. 8B6 through 8B9; in this illustrative embodiment, three analog to digital signal converters are provided, each processing data signals derived from a different photosensor ($PD_{HST1}$, $PD_{HST2}$ or $PD_{VST1}$). The three analog to digital converters each sample the conditioned analog scan data signals at a sampling frequency at least two times the highest frequency component expected in the analog scan data signal (in accordance with the well known Nyquist criteria) and quantizes each time-sampled scan data signal value into a discrete signal level using a suitable length number representation (e.g. 8 bits) to produce a discrete scan data signal. One or more programmed processors (e.g., a digital signal processor and associated memory) perform digital signal processing functions on the discrete signal levels to generate a sequence of digital words (i.e., a sequence of digital count values), each representing the time length associated with the signal level transitions in the corresponding digital scan data signal as described above; time-division multiplexed signal processing operations are provided by selectively enabling the sampling function (and possibly the conversion function) of only one of the three analog to digital signal converters during the time slot assigned to photosensor $PD_{HST1}$, $PD_{HST2}$ or $PD_{VST1}$ (and laser scanning station HST1, HST2 or VST1) corresponding thereto.

Alternatively, such bar code detection operations can be carried out in the digital domain by digital signal processing circuitry as illustrated in FIGS. 9B and 9C. In such embodiments, analog-to-digital conversion circuitry samples/converts analog scan data signals derived from the output of three photosensors $PD_{HST1}$, $PD_{HST2}$, and $PD_{VST1}$ into digital scan data signals in response to the timing signals generated by the VLD control circuitry. Such operations are performed in a synchronous manner with the modulation enabled VLD drive circuitry such that, during a portion of a given time slot, the photosensor logically assigned thereto is operably coupled to analog-to-digital conversion circuitry that samples/converts the analog scan data signal from the photosensor to digital scan data signals. Such digital scan data signals are provided to digital signal processing circuitry that performs bar code detection operations on the digital scan data signals. Furthermore, during the given time slot, the other photosensors are operably decoupled (e.g., electrically isolated) from the analog-to-digital conversion circuitry, and the bar code detection digital signal processing circuitry operates on digital data signals derived from the output of the other photosensors during the previous time slots logically assigned thereto. One skilled in the art will understand that there are many different ways to realize such digital signal processing circuitry. Exemplary implementations of such digital signal processing circuitry is described below with respect to FIGS. 19A-19D.

Advantageously, such synchronous time-division multiplexed laser scanning and signal processing operations enable the illustrate bioptical laser scanning system to scan the scanning volume with a plurality of multi-dimensional laser scanning beams to detect and decode bar code symbols on surfaces disposed therein while avoiding optical crosstalk in addition to light interference from ambient light and unwanted reflections.

Modifications

The illustrative laser scanning systems described herein can be modified in various ways. For example, more (or less) groups of beam folding mirrors can be used in each laser scanning station within the system and/or more or less facets can be used for the rotating polygonal mirrors. Such modifications will add (or remove) scanning planes from the system.

Also more or less laser scanning stations might be employed within the system. Such modifications might be practiced in order to provide an omni-directional laser scanning pattern having scanning performance characteristics optimized for a specialized scanning application.

While the second rotating polygonal mirror of the illustrative embodiment employs facets having low and high elevation angle characteristics, it is understood that it might be desirable in particular applications to use scanning facets with different characteristics (such as varying angular reflection characteristics) so as to enable a compact scanner design in a particular application.

Also, it is contemplated that each laser scanning station may not have its own laser source (e.g., VLD). More specifically, as is well known in the scanning art, the laser light produced by a laser source (VLD) may be split into multiple beams (with a beam splitter) and directed to multiple laser scanning stations with mirrors, a light pipe or other light directing optical element.

Also, it is contemplated that the logical assignment of laser scanning stations (or laser scanning planes or laser scanning plane groups) to TDM time slots can be varied in accordance with the present invention.

TDM Timing Signal Generation

Figure 8A:
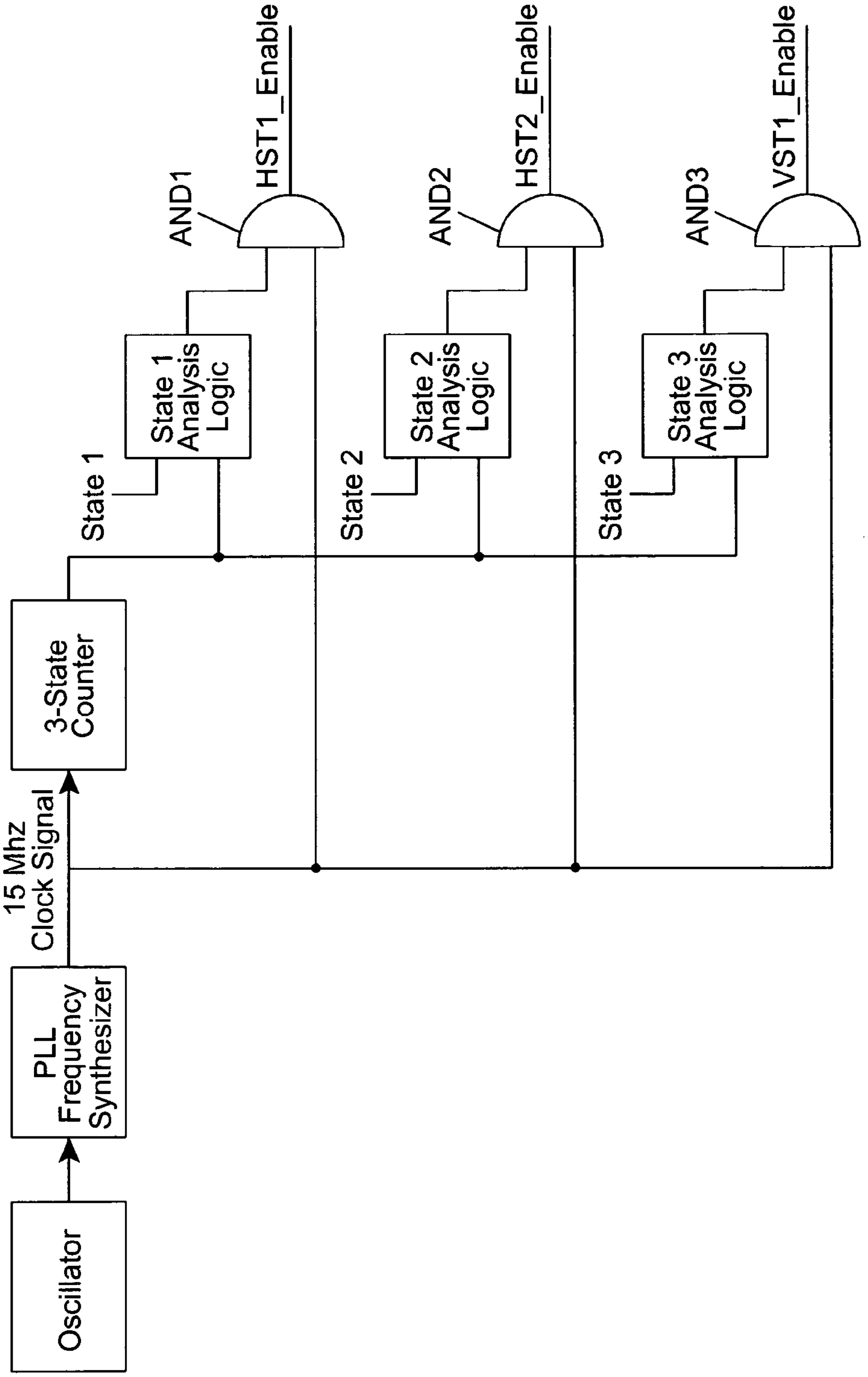
FIG. 8A is a functional block diagram of exemplary electronic circuitry that may be used to derive the timing signals that synchronize the time-division multiplexed laser scanning and signal processing operations performed by a laser scanning system in accordance with the present invention; for example, the electronic circuitry of FIG. 8A may be integrated as part of the VLD control module of the illustrative bioptical laser scanning system as shown in FIG. 7.

FIGS. 8A though 10 depict various aspects of mechanisms for performing time-division-multiplexed laser scanning operations and signal processing operations. Such mechanisms may be embodied in the above described embodiments of laser scanning systems in accordance with the present invention.

FIG. 8A is a functional block diagram of electronic circuitry that derives timing signals that synchronize the time-division multiplexed laser scanning and signal processing operations performed by a laser scanning system in accordance with the present invention. For example, the electronic circuitry of FIG. 8A may be integrated as part of the VLD control module of the illustrative bioptical laser scanning system as shown in FIG. 7. FIGS. 8B1 through 8B9 illustrate timing signals generated by the circuit elements of FIG. 8A.

In the illustrative embodiment of the present invention shown FIGS. 8A and 8B1 through 8B9, each time-division-multiplexed laser scanning beam scans the surface of articles disposed in the scanning volume at a sampling frequency that is at least two times the highest frequency component expected in the scan data signal, in accordance with the well known Nyquist criteria. It is well established that the highest frequency component expected in the scan data signal (sometimes referred to as "Nyquist frequency") can be approximated with a simplified model by dividing the maximum beam velocity over the width of minimum bar code width, where the maximum beam velocity is dependent on the maximum depth of field of the laser scanner, the angular velocity of the rotating polygonal mirror and the scan factor of the scanning mechanism (which defines the relationship between the angular velocity of the scanning beam and the angular velocity of the rotating polygonal mirror).

In the illustrative laser scanning mechanism described above, the Nyquist frequency of the expected scan data signal lies at approximately 1 MHz. In this scenario, each time-division-multiplexed laser scanning beam (from HST1, HST2 and VST1) and corresponding signal processing circuitry may operate at a frequency of approximately 5 MHz, which is greater than four times the Nyquist frequency. By operating the TDM laser scanning and signal processing (bar code detection) mechanisms at a high frequency (e.g., at a frequency greater than at least two times the Nyquist frequency of the laser scanning system, and preferably at a sampling frequency much greater than two times the Nyquist frequency of the laser scanning system, such as at a sampling frequency four to six times the Nyquist frequency of the laser scanning system), the TDM laser scanning and signal processing (bar code detection) of each scan line provides adequate scan resolution for reading high density bar code symbols disposed in the furthest focal zones of the system, while providing improved bandwidth (i.e., rate at which information is acquired by the laser scanning mechanism) as compared to other TDM-based laser scanning and signal processing operations that utilize a lower frequency and comparable mirror speeds.

Alternatively, each time-division-multiplexed laser scanning beam (from HST1, HST2 and VST1) and corresponding signal processing circuitry may operate at a lower frequency (e.g., at a frequency less than the 1 MHz Nyquist frequency, such as at a frequency corresponding to scan lines or scan line groups as described above). By operating the TDM laser scanning and signal processing (bar code detection) mechanisms at a lower frequency, cross-talk is avoided; yet the bandwidth (i.e., rate at which information is acquired by the laser scanning mechanism) of the scanning system is reduced as compared to other TDM-based laser scanning and signal processing operations that utilize a higher frequency and comparable mirror speeds.

The circuitry of FIG. 8A includes an oscillator and phase-lock loop synthesizer that cooperate to generate a 15 MHz clock signal as shown in FIG. 8B1. The 15 MHz clock signal is supplied to a 3-state counter, which cycles through its 3 states in response to positive pulses in the 15 MHz clock signal as shown in FIG. 8B2. The output of the 3-state counter, which identifies its current state (state1, state2, or state3), is supplied to state 1 analysis logic, state 2 analysis logic and state 3 analysis logic. The state 1 analysis logic outputs a first predetermined logic level signal (e.g., H logic level) in the event that the output of the 3-state counter identifies its current state as state 1, and otherwise outputs a second predetermined logic level (e.g., L logic level) as shown in FIG. 8B3. The state 2 analysis logic outputs a first predetermined logic level signal (e.g., H logic level) in the event that the output of the 3-state counter identifies its current state as state 2, and otherwise outputs a second predetermined logic level (e.g., L logic level) as shown in FIG. 8B4. The state 3 analysis logic outputs a first predetermined logic level signal (e.g., H logic level) in the event that the output of the 3-state counter identifies its current state as state 3, and otherwise outputs a second predetermined logic level (e.g., L logic level) as shown in 18B5. The output of the state 1 analysis logic and the 15 MHz signal is supplied to a first AND gate (AND1), which generates the HST1_ENABLE Signal as shown in FIG. 8B6, which is a pulse train whose positive pulses define time slots that are logically assigned to a unique laser light source and photosensor (for example, $VLD_{HST1}$ and $PD_{HST1}$ of the first laser scanning station HST1 in the illustrative bioptical laser scanning system described above). The output of the state 2 analysis logic and the 15 MHz signal is supplied to a second AND gate (AND2), which generates the HST2_ENABLE Signal as shown in FIG. 8B7, which is a pulse train whose positive pulses define time slots that are logically assigned to a unique laser light source and photosensor (for example, $VLD_{HST2}$ and $PD_{HST2}$ of the second laser scanning station HST2 in the illustrative bioptical laser scanning system described above). The output of the state 3 analysis logic and the 15 MHz signal is supplied to a third AND gate (AND3), which generates the VST1_ENABLE Signal as shown in FIG. 8B8, which is a pulse train whose positive pulses define time slots that are logically assigned to a unique laser light source and photosensor (for example, $VLD_{VST1}$ and $PD_{VST1}$ of the third laser scanning station VST1 in the illustrative bioptical laser scanning system described above).

Figure 10:
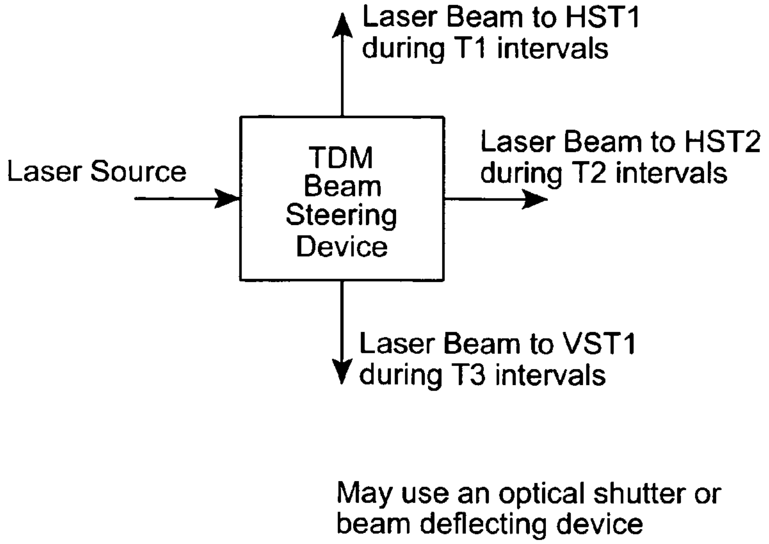
FIG. 10 is a schematic representation of an alternate embodiment of the present invention wherein a time division multiplexed beam steering device provides time-division multiplexed laser scanning beams to the three laser scanning stations HST1, HST2 and VST1 over time intervals T1, T2 and T3 assigned thereto.

During the time slots defined by the timing signals HST1_ENABLE, HST2_ENABLE and VST1_ENABLE, the laser scanning system performs time-division multiplexed laser scanning operations whereby, during each given time slot, the output optical power of the laser light sources of the system (e.g., HST1 VLD, HST2 VLD and VST1 VLD) are modulated such that the laser light source logically assigned thereto is turned ON and projected into the scanning volume while the other laser light sources (those not logically assigned to the given time slot) are turned substantially OFF. Alternatively, instead of modulating the power of multiple laser light sources, a shared laser light source may cooperate with an optical shutter or beam steering device to produce the time-division-multiplexed laser scanning beams as illustrated in FIG. 10. In addition, the signal processing circuitry that performs bar code detection and operations on the data signals derived from the photosensors of the system (e.g., $PD_{HST1}$, $PD_{HST2}$, and $PD_{VST1}$) operates synchronously in response to these timing signals such that, during each given time slot (or portion of the given time slot), the photosensor logically assigned thereto is operably coupled to the signal processing circuitry that performs bar code detection operations on the data signals derived therefrom while the other photosensors (those not logically assigned to the given time slot) are operably decoupled (e.g., electrically isolated) from such signal processing circuitry.

FIG. 8C is a table that describes time-division multiplexed laser scanning and signal processing operations performed by the illustrative bioptical laser scanning system described herein in accordance with the present invention; such time-division multiplexed laser scanning and signal processing operations are performed during time slots defined by the timing signals of FIGS. 8B1 through 8B9.

As summarized in the table of FIG. 8C, the following operations are performed during the "HST1" time slots when the HST1_Enable Signal is active:

i) during the "HST1" time slots, generation and/or projection of the scanning laser beam from HST1 into the scanning volume is enabled; and
ii) during a portion of the "HST1" time slots, photosensor $PD_{HST1}$ is operably coupled to signal processing circuitry that performs bar code detection and decoding operations on data signals derived from the output of photosensor $PD_{HST1}$.

Note that during the "HST1" time slots, the HST2_Enable Signal and the VST1_Enable Signal are inactive. As summarized in the table of FIG. 1D, the following operations are performed during the "HST1" time slots when the HST2_Enable Signal and VST1_Enable Signal are inactive:

i) generation and/or projection of the scanning laser beam from HST2 into the scanning volume is disabled;
ii) photosensor $PD_{HST2}$ is operably decoupled (e.g., electrically isolated) from bar code detection signal processing circuitry.
i) generation and/or projection of the scanning laser beam from VST1 into the scanning volume is disabled; and
ii) photosensor $PD_{VST1}$ is operably decoupled (e.g., electrically isolated) from bar code detection signal processing circuitry.

In the event that the time-division-multiplexed laser scanning operations of the scanning laser beams from HST2 and VST1 and corresponding signal processing operations performed on the output of photosensors $PD_{HST2}$ and $PD_{VST1}$ are performed at a high frequency (e.g., at a frequency greater than two times the Nyquist frequency and possibly greater than four times the Nyquist frequency as described herein), which is determined by the frequency of HST2_Enable Signal and VST1_Enable Signal, bar code detection signal processing circuitry operates on a sample of the data signals derived from the photosensors $PD_{HST2}$ and $PD_{VST1}$ during the previous "HST2" time slot and "VST1" time slot, respectively. Such operations are preferably provided by track and hold circuitry (or sample and hold circuitry which is well known in the electronic arts) which operably couples/decouples (e.g., electrically isolates) the output of a photosensors $PD_{HST2}$ and $PD_{VST1}$ from bar code detection signal processing circuitry, and stores a sample of the data signals derived from the photosensors $PD_{HST2}$ and $PD_{VST1}$ during the previous "HST2" and "VST1" time slots, respectively, on hold capacitors that are operably coupled to bar code detection signal processing circuitry when the HST2_Enable Signal and VST1_Enable Signal are inactive (which is during the "HST1" time slots).

In the event that the time-division-multiplexed laser scanning operations of the scanning laser beams from HST2 and VST1 and corresponding signal processing operations performed on the output of photosensors $PD_{HST2}$ and $PD_{VST1}$ are performed at a lower frequency (e.g., at a frequency much less than the Nyquist frequency as described herein), which is determined by the frequency of HST2_Enable Signal and VST1_Enable Signal, bar code detection signal processing circuitry does not operate on samples of data signals derived from the photosensors $PD_{HST2}$ and $PD_{VST1}$ during the "HST1" time slots. It should be noted that in such embodiments, the bar code detection signal processing circuitry operates at frequencies at least two times greater than the Nyquist frequency in sampling and processing the data signals derived from the photosensor $PD_{HST1}$ and supplied thereto during the "HST1" time slots in order to detect and decode bar code symbols therein.

Similar time-division multiplexed scanning and signal processing operations are performed by HST2 and the output of $PD_{HST2}$ during the "slot_2" time slots. More specifically, as summarized in the table of FIG. 8C, the following operations are performed during the "HST2" time slots when the HST2_Enable Signal is active:

i) during the "HST2" time slots, generation and/or projection of the scanning laser beam from HST2 into the scanning volume is enabled; and
ii) during a portion of the "HST2" time slots, photosensor $PD_{HST2}$ is operably coupled to signal processing circuitry that performs bar code detection and decoding operations on data signals derived from the output of photosensor $PD_{HST2}$.

Note that during the "HST2" time slots, the HST1_Enable Signal and the VST1_Enable Signal are inactive. As summarized in the table of FIG. 8C, the following operations are performed during the "HST2" time slots when the HST1_Enable Signal and VST1_Enable Signal are inactive:

i) generation and/or projection of the scanning laser beam from HST1 into the scanning volume is disabled;
ii) photosensor $PD_{HST1}$ is operably decoupled (e.g., electrically isolated) from bar code detection signal processing circuitry.
i) generation and/or projection of the scanning laser beam from VST1 into the scanning volume is disabled; and
ii) photosensor $PD_{VST1}$ is operably decoupled (e.g., electrically isolated) from bar code detection signal processing circuitry.

In the event that the time-division-multiplexed laser scanning operations of the scanning laser beams from HST1 and VST1 and corresponding signal processing operations performed on the output of photosensors $PD_{HST1}$ and $PD_{VST1}$ are carried out at a high frequency (e.g., at a frequency greater than two times the Nyquist frequency and possibly greater than four times the Nyquist frequency as described herein), which is determined by the frequency of HST1_Enable Signal and VST1_Enable Signal, bar code detection signal processing circuitry operates on a sample of the data signals derived from the photosensors $PD_{HST1}$ and $PD_{VST1}$ during the previous "HST1" time slot and "VST1" time slot, respectively. Such operations are preferably provided by track and hold circuitry (or sample and hold circuitry which is well known in the electronic arts) which operably couples/decouples (e.g., electrically isolates) the output of a photosensors $PD_{HST1}$ and $PD_{VST1}$ from bar code detection signal processing circuitry, and stores a sample of the data signals derived from the photosensors $PD_{HST1}$ and $PD_{VST1}$ during the previous "HST1" and "VST1" time slots, respectively, on hold capacitors that are operably coupled to bar code detection signal processing circuitry when the HST1_Enable Signal and VST1_Enable Signal are inactive (which is during the "HST1" time slots).

In the event that the time-division-multiplexed laser scanning operations of the scanning laser beams from HST1 and VST1 and corresponding signal processing operations performed on the output of photosensors $PD_{HST1}$ and $PD_{VST1}$ are carried out at a lower frequency (e.g., at a frequency much less than the Nyquist frequency as described herein), which is determined by the frequency of HST1_Enable Signal and VST1_Enable Signal, bar code detection signal processing circuitry does not operate on samples of data signals derived from the photosensors $PD_{HST1}$ and $PD_{VST1}$ during the "HST2" time slots. It should be noted that in such embodiments, the bar code detection signal processing circuitry operates at frequencies at least two times greater than the Nyquist frequency in sampling and processing the data signals derived from the photosensor $PD_{HST2}$ and supplied thereto during the "HST2" time slots in order to detect and decode bar code symbols therein.

Similar time-division multiplexed scanning and signal processing operations are performed by VST1 and the output of $PD_{VST1}$ during the "VST1" time slots. More specifically, as summarized in the table of FIG. 8C, the following operations are performed during the "VST1" time slots when the VST1_Enable Signal is active:

i) during the "VST1" time slots, generation and/or projection of the scanning laser beam from VST1 into the scanning volume is enabled; and
ii) during a portion of the "VST1" time slots, photosensor $PD_{VST1}$ is operably coupled to signal processing circuitry that performs bar code detection and decoding operations on data signals derived from the output of photosensor $PD_{VST1}$.

Note that during the "VST1" time slots, the HST1_Enable Signal and the HST2_Enable Signal are inactive. As summarized in the table of FIG. 8C, the following operations are performed during the "VST1" time slots when the HST1_Enable Signal and HST2_Enable Signal are inactive:

i) generation and/or projection of the scanning laser beam from HST1 into the scanning volume is disabled;
ii) photosensor $PD_{HST1}$ is operably decoupled (e.g., electrically isolated) from bar code detection signal processing circuitry.
i) generation and/or projection of the scanning laser beam from HST2 into the scanning volume is disabled; and
ii) photosensor $PD_{HST2}$ is operably decoupled (e.g., electrically isolated) from bar code detection signal processing circuitry.

In the event that the time-division-multiplexed laser scanning operations of the scanning laser beams from HST1 and HST2 and corresponding signal processing operations performed on the output of photosensors $PD_{HST1}$ and $PD_{HST2}$ are carried out at a high frequency (e.g., at a frequency greater than two times the Nyquist frequency and possibly greater than four times the Nyquist frequency as described herein), which is determined by the frequency of HST1_Enable Signal and HST2_Enable Signal, bar code detection signal processing circuitry operates on a sample of the data signals derived from the photosensors $PD_{HST1}$ and $PD_{HST2}$ during the previous "HST1" time slot and "HST2" time slot, respectively. Such operations are preferably provided by track and hold circuitry (or sample and hold circuitry which is well known in the electronic arts) which operably couples/decouples (e.g., electrically isolates) the output of a photosensors $PD_{HST1}$ and $PD_{HST2}$ from bar code detection signal processing circuitry, and stores a sample of the data signals derived from the photosensors $PD_{HST1}$ and $PD_{HST2}$ during the previous "HST1" and "HST2 time slots, respectively, on hold capacitors that are operably coupled to bar code detection signal processing circuitry when the HST1_Enable Signal and HST2_Enable Signal are inactive (which is during the "VST1" time slots).

In the event that the time-division-multiplexed laser scanning operations of the scanning laser beams from HST1 and HST2 and corresponding signal processing operations performed on the output of photosensors $PD_{HST1}$ and $PD_{HST2}$ are carried out a lower frequency (e.g., at a frequency much less than the Nyquist frequency as described herein), which is determined by the frequency of HST1_Enable Signal and HST2_Enable Signal, bar code detection signal processing circuitry does not operate on samples of data signals derived from the photosensors $PD_{HST1}$ and $PD_{HST2}$ during the "VST1" time slots. It should be noted that in such embodiments, the bar code detection signal processing circuitry operates at frequencies at least two times greater than the Nyquist frequency in sampling and processing the data signals derived from the photosensor $PD_{VST1}$ and supplied thereto during the "VST1" time slots in order to detect and decode bar code symbols therein.

TDM Laser Scanning Operations

Figure 8D:
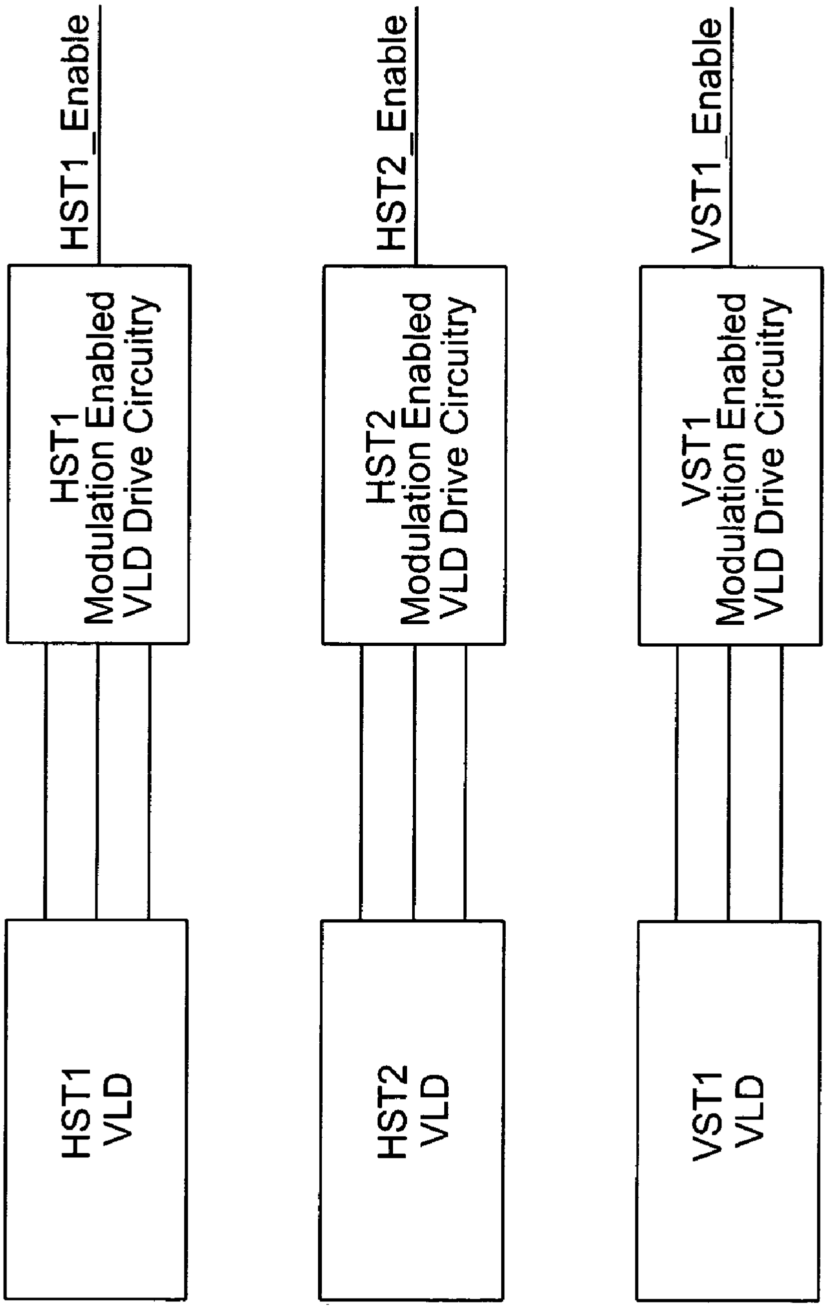
FIG. 8D is a high-level functional block diagram of electronic circuitry that performs time-division multiplexed laser scanning operations in response to the timing signals of FIGS. 8B6 through 8B9.

FIG. 8D is a high-level functional block diagram of electronic circuitry that performs time-division multiplexed laser scanning operations in response to the timing signals of FIGS. 8B6 through 8B8 in accordance with the present invention. For example, the electronic circuitry of FIG. 8D may be integrated as part of the VLD control module and modulation enabled VLD drive circuitry of the illustrative bioptical laser scanning system as shown in FIG. 7. The HST1 modulation enabled drive circuitry is operably coupled to a first VLD (HST1 VLD) and operates in response to the HST1_ENABLE signal to modulate the output optical power of the HST1 VLD such that: the HST1 VLD is turned ON and projected into the scanning volume during the time slots logically assigned to the HST1 VLD (as encoded by the pulses of the HST1_ENABLE signal) while the HST1 VLD is turned substantially OFF during time periods outside the time slots logically assigned to the HST1 VLD. Similarly, the HST2 modulation enabled drive circuitry is operably coupled to a second VLD (HST2 VLD) and operates in response to the HST2_ENABLE signal to modulate the output optical power of the HST2 VLD such that: the HST2 VLD is turned ON and projected into the scanning volume during the time slots logically assigned to the HST2 VLD (as encoded by the pulses of the HST2_ENABLE signal) while the HST2 VLD is turned substantially OFF during time periods outside the time slots logically assigned to the HST2 VLD. And the VST1 modulation enabled drive circuitry is operably coupled to a third VLD (VST1 VLD) and operates in response to the VST1_ENABLE signal to modulate the output optical power of the VST1 VLD such that: the VST1 VLD is turned ON and projected into the scanning volume during the time slots logically assigned to the VST1 VLD (as encoded by the pulses of the VST1_ENABLE signal) while the VST1 VLD is turned substantially OFF during time periods outside the time slots logically assigned to the VST1 VLD.

FIGS. 8E1-8G2 depict mechanisms for modulating the optical power of multiple VLD modules to provide multiple time-division-multiplexed laser scanning beams in accordance with the present invention.

As shown in FIG. 8E1, a monitor photodiode is provided for each laser scanning station HST1, HST2, VST1 (preferably as an integral part of the corresponding VLD module as shown), and each VLD Drive Circuit (HST1 Drive Circuitry, HST2 Drive Circuitry and VST1 Drive Circuitry) includes automatic power control circuitry, a dynamic current source and modulation control circuitry. Generally, when the Enable Timing Signal for a given VLD Drive Circuit is ON (e.g., Logic Level=H), feedback from the monitor photodiode of the given VLD Drive Circuit is input to automatic power control circuitry operably coupled thereto—which controls the dynamic current source of the given VLD Drive Circuit to maintain the output optical power of the visible laser diode operably coupled thereto at a predetermined power level $P_{ON}$ to compensate for thermal drift and other forms of drift over the operating lifetime of the visible laser diode. The output power level $P_{ON}$ is substantially greater than zero, e.g., on the order of 1 to 5 mW for typical VLDs used in bar code reading applications. Yet, when the Enable Timing Signal for a given VLD Drive Circuit is OFF (e.g., Logic Level=L), the modulation control circuit of the given VLD Drive Circuit controls the dynamic current source to maintain the output optical power of the visible laser diode operably coupled thereto at a predetermined level $P_{OFF}$, which is substantially less than $P_{ON}$ (and preferably at or near zero). The table of FIG. 8E2 summarizes these operations for the HST1 VLD Drive Circuitry. Analogous operations are carried out by the HST2 VLD Drive Circuitry and the VST1 VLD Drive Circuitry in order to provide multiple time-division-multiplexed laser scanning beams in accordance with the present invention.

The graphical representation of FIG. 8E3 illustrates the optical power characteristics output from an exemplary visible laser diode in response to current supplied thereto. In addition the graphical representation shows the output power levels $P_{ON}$ and $P_{OFF}$ of the exemplary visible laser diode in response to the logic levels H and L, respectively, of the enable timing signal (e.g., HST1_ENABLE) during the time-division multiplexed laser scanning operations of FIG. 8E2.

FIG. 8F1 is a functional block diagram of an illustrative embodiment of HST1 VLD Drive Circuitry and HST1 VLD Module of FIG. 8E1 in accordance with the present invention. Such circuitry carries out time-division multiplexed laser scanning operations for HST1 in response to the timing signals of FIGS. 8B6 through 8B8 accordance with the table of FIG. 8E2 and graph of FIG. 8E3. Analogous circuitry may be embodied as part of the HST2 Drive Circuitry and HST2 VLD Module as well as the VST1 Drive Circuitry and VST1 VLD Module, which carries out time-division multiplexed laser scanning operations for HST2 and VST1, respectively, in response to the timing signals of FIGS. 8B6 through 8B8.

The HST1 VLD Drive Circuitry of FIG. 8F1 operates the visible laser diode in the "OFF" state (by controlling a dynamic current source) whereby the output optical power level range ($P_{OFF}$) of the visible laser diode is significantly less than the threshold output optical power level ($P_{TH}$) of the visible laser diode.

FIG. 8F2 is a graphical representation of the optical power characteristics output from an exemplary visible laser diode (which is part of the HST1 VLD Module shown in FIG. 8F1) in response to current supplied thereto. In addition, the graph shows the output power levels $P_{ON}$ and $P_{OFF}$ of the visible laser diode in response to the logic levels H and L, respectively, of the corresponding HST1_ENABLE signal during time-division multiplexed laser scanning operations. Note that in the illustrative embodiment of FIG. 8F1 and 8F2, the current level $I_{Laser}$ that is supplied to the visible laser diode is near zero ($I_{Laser}=I_{MOD}=I_{off}\approx 0$) in response to the "L" logic level of the enable timing signal in order to produce the $P_{OFF}$ output power level (e.g., near zero output power level). In contrast, the current level $I_{Laser}$ that is supplied to the visible laser diode is substantially greater than the threshold current $I_{TH}$ ($I_{Laser}=I_{MOD}=I_{ON}>>I_{TH}$) in response to the "H" logic level of the enable timing signal in order to produce the $P_{ON}$ output power level (which is substantially greater than near zero, e.g., on the order of 1 to 5 mW for typical visible laser diodes utilized in bar code reading applications).

In the illustrative circuit embodiment of FIG. 8F1, a dynamic current source (realized by transistor Q1, Op-Amp O and resistor $R_{MOD}$) provides the drive current $I_{Laser}$ that is adjusted by the automatic power control circuitry (which may be a difference amplifier that amplifies the difference between voltage levels provided by the monitor photodiode/resistor $R_{MON}$ and a reference as shown) so that the optical power of the visible laser diode is maintained at a predetermined level $P_{ON}$ in the ON State, which compensates for variations in laser current over temperature and lifetime of the system. The modulation control circuit (which may be a FET transistor as shown) activates the dynamic current source in response to the respective modulation control signal (HST1_ENABLE SIGNAL, HST2_ENABLE SIGNAL, VST1_ENABLE SIGNAL) being turned "ON" (in the H Logic Level State).

FIG. 8G1 is a functional block diagram of an alternate embodiment of the HST1 VLD Drive Circuitry and HST1 VLD Module of FIG. 8E1 in accordance with the present invention. Such circuitry carries out time-division multiplexed laser scanning operations for HST1 in response to the timing signals of FIGS. 8B6 through 8B8, in accordance with the table of FIG. 8E2. Analogous circuitry may be embodied as part of the HST2 Drive Circuitry and HST2 VLD Module as well as the VST1 Drive Circuitry and VST1 VLD Module, which carries out time-division multiplexed laser scanning operations for HST2 and VST1, respectively, in response to the timing signals of FIGS. 8B6 through 8B8.

The HST1 VLD Drive Circuitry of FIG. 8G1 operates the visible laser diode in the "OFF" state (by controlling a dynamic current source) whereby the output optical power level range ($P_{OFF}$) of the visible laser diode is near the threshold output optical power level ($P_{TH}$) of the visible laser diode. This second technique is preferably in many applications because it avoids delays in bringing the output optical power of the visible laser diode from the OFF state to the ON state in response to the respective modulation control signal (HST1_ENABLE SIGNAL, HST2_ENABLE SIGNAL, VST1_ENABLE SIGNAL).

FIG. 8G2 is a graphical representation of the optical power characteristics output from an exemplary visible laser diode (which is part of the HST1 VLD Module shown in FIG. 8G1) in response to current supplied thereto. In addition, the graph shows the output power levels $P_{ON}$ and $P_{OFF}$ of the visible laser diode in response to the logic levels H and L, respectively, of the corresponding HST1_ENABLE signal during time-division multiplexed laser scanning operations. Note that in the illustrative embodiment of FIG. 8G1 and 8G2, the current level $I_{Laser}$ that is supplied to the visible laser diode is near the threshold current $I_{TH}$ ($I_{Laser}=I_{BIAS}=I_{Off}\approx I_{TH}$) in response to the "L" logic level of the HST1_Enable timing signal in order to produce the $P_{OFF}$ output power level (e.g., near zero output power level). In contrast, the current level $I_{Laser}$ that is supplied to the visible laser diode is substantially greater than the threshold current $I_{TH}$ ($I_{Laser}=(I_{BIAS}+I_{MOD})=I_{ON}>>I_{TH}$) in response to the "H" logic level of the HST1_Enable timing signal in order to produce the $P_{ON}$ output power level (which is substantially greater than near zero, e.g., on the order of 1 to 5 mW for typical visible laser diodes used in bar code reading applications).

In the illustrative circuit embodiment of FIG. 8G1, a dynamic current source (realized by resistor $R_{BIAS}$, transistor Q1, Op-Amp O and resistor $R_{MOD}$) provides the drive current $I_{Laser}$ that is adjusted by the automatic power control circuitry (which may be a difference amplifier that amplifies the difference between voltage levels provided by the monitor photodiode/resistor $R_{MON}$ and a reference as shown) so that the optical power of the visible laser diode is maintained at a predetermined level $P_{ON}$ in the ON State, which compensates for variations in laser current over temperature and lifetime of the system. The resistor $R_{BIAS}$ provides static current that is at (or near) the threshold current $I_{TH}$ of the visible laser diode. The modulation control circuit (which may be a FET transistor as shown) activates the dynamic current source in response to the respective modulation control signal (HST1_ENABLE SIGNAL, HST2_ENABLE SIGNAL, VST1_ENABLE SIGNAL) being turned "ON" (in the H Logic Level State). In this configuration, The HST1 VLD Drive Circuitry operates the visible laser diode in the "OFF" state (by providing a static current $I_{TH}$) such that the output optical power level range ($P_{OFF}$) of the visible laser diode is near its threshold output optical power level ($P_{TH}$), which avoids delays in bringing the output optical power of the visible laser diode from the OFF state to the ON state in response to the respective modulation control signal (HST1_ENABLE SIGNAL, HST2_ENABLE SIGNAL, VST1_ENABLE SIGNAL).

Advantageously, such time-division multiplexed laser scanning operations enable the laser scanning system of the present invention to scan the scanning volume with a plurality of multi-dimensional laser scanning beams to detect and decode bar code symbols on surfaces disposed therein while avoiding optical crosstalk that might otherwise occur and degrade performance of the laser scanning system.

TDM Signal Processing Operations

FIG. 9A is a functional block diagram of exemplary electronic circuitry that performs time-division multiplexed signal processing operations in response to the timing signals of FIGS. 8B6 through 8B8, which is suitable for use in the illustrative bioptical laser scanning system whose system architecture is shown in FIG. 7. In this illustrative embodiment, time-division-multiplexed laser scanning operations and corresponding signal processing operations are carried out at a high frequency (e.g., at a frequency greater than two times the Nyquist frequency and possibly greater than four times the Nyquist frequency as described herein). As shown, track and hold circuitry operates in response to the timing signals of FIGS. 8B6 through 8B8 to operably couple/decouple the photosensors $PD_{HST1}$, $PD_{HST2}$ and $PD_{VST1}$ to/from signal processing circuitry that performs bar code detection and decoding on data signals derived from the output of the photosensors $PD_{HST1}$, $PD_{HST2}$ and $PD_{VST1}$ during the time slots (or a portion of the time slots) assigned to photosensor $PD_{HST1}$, $PD_{HST2}$ or $PD_{VST1}$ (and laser scanning station HST1, HST2 or VST1) corresponding thereto.

More specifically, during the time slots assigned to photosensor $PD_{HST1}$ (or a portion of the time slots assigned to photosensor $PD_{HST1}$), the switch (switch_HST1) of track and hold circuit 1 is closed to operably couple photosensor $PD_{HST1}$ to the signal processing circuitry that performs bar code detection and decoding on data signals derived from the output of the photosensor $PD_{HST1}$. With switch_HST1 closed (i.e., "track mode), the voltage levels at the output of track and hold circuit 1 track changes in the voltage levels at its input (which correspond to the output of photosensor $PD_{HST1}$). The output of the track and hold circuit 1 is preferably supplied to filter circuitry (which filters out unwanted noise components) and the resultant signal is supplied to bar code detection signal processing circuitry. Outside the time slots (or time slot portions) assigned to photosensor $PD_{HST1}$, switch_HST1 remains open to operably decouple (e.g., electrically isolate) photosensor $PD_{HST1}$ from the filter circuitry and signal processing circuitry. With switch_HST1 open (i.e., "hold mode"), the hold capacitor C_hold1 stores a sample of the data signals derived from the photosensor $PD_{HST1}$ during the previous time slot assigned to $PD_{HST1}$, and the voltage level at the output of track and hold circuit 1 corresponds to the sampled voltage level stored on the hold capacitor C_hold1. The output of the track and hold circuit 1 is supplied to filter circuitry (which filters out unwanted noise components) and the resultant signal is supplied to bar code detection signal processing circuitry. In this manner, during the "hold mode", bar code detection signal processing circuitry operates on a sample of the data signals derived from the photosensor $PD_{HST1}$ during the previous time slot assigned thereto.

Similarly, during the time slots assigned to photosensor $PD_{HST2}$ (or a portion of the time slots assigned to photosensor $PD_{HST2}$), the switch (switch_HST2) of track and hold circuit 2 is closed to operably couple photosensor $PD_{HST2}$ to the signal processing circuitry that performs bar code detection and decoding on data signals derived from the output of the photosensor $PD_{HST2}$. With switch_HST2 closed (i.e., "track" mode), the voltage levels at the output of track and hold circuit 2 track changes in the voltage levels at its input (which correspond to the output of photosensor $PD_{HST2}$). The output of the track and hold circuit 2 is preferably supplied to filter circuitry (which filters out unwanted noise components) and the resultant signal is supplied to bar code detection signal processing circuitry. Outside the time slots (or time slot portions) assigned to photosensor $PD_{HST2}$, switch_HST2 remains open to operably decouple (e.g., electrically isolate) photosensor $PD_{HST2}$ from the filter circuitry and signal processing circuitry. With switch_HST2 open (i.e., "hold mode"), the hold capacitor C_hold2 stores a sample of the data signals derived from the photosensor $PD_{HST2}$ during the previous time slot assigned to $PD_{HST2}$, and the voltage level at the output of track and hold circuit 2 corresponds to the sampled voltage level stored on the hold capacitor C_hold2. The output of the track and hold circuit 2 is supplied to filter circuitry (which filters out unwanted noise components) and the resultant signal is supplied to bar code detection signal processing circuitry. In this manner, during the "hold mode", bar code detection signal processing circuitry operates on a sample of the data signals derived from the photosensor $PD_{HST2}$ during the previous time slot assigned thereto.

Similarly, during the time slots assigned to photosensor $PD_{VST1}$ (or a portion of the time slots assigned to photosensor $PD_{VST1}$), the switch (switch_VST1) of track and hold circuit 3 is closed to operably couple photosensor $PD_{VST1}$ to the signal processing circuitry that performs bar code detection and decoding on data signals derived from the output of the photosensor $PD_{VST1}$. With switch_VST1 closed (i.e., "track mode), the voltage levels at the output of track and hold circuit 3 track changes in the voltage levels at its input (which correspond to the output of photosensor $PD_{VST1}$). The output of the track and hold circuit 3 is preferably supplied to filter circuitry (which filters out unwanted noise components) and the resultant signal is supplied to bar code detection signal processing circuitry. Outside the time slots (or time slot portions) assigned to photosensor $PD_{VST1}$, switch_VST1 remains open to operably decouple (e.g., electrically isolate) photosensor $PD_{VST1}$ from the filter circuitry and signal processing circuitry. With switch_VST1 open (i.e., "hold mode"), the hold capacitor C_hold3 stores a sample of the data signals derived from the photosensor $PD_{VST1}$ during the previous time slot assigned to $PD_{VST1}$, and the voltage level at the output of track and hold circuit 3 corresponds to the sampled voltage level stored on the hold capacitor C_hold3. The output of the track and hold circuit 3 is supplied to filter circuitry (which filters out unwanted noise components) and the resultant signal is supplied to bar code detection signal processing circuitry. In this manner, during the "hold mode", bar code detection signal processing circuitry operates on a sample of the data signals derived from the photosensor $PD_{VST1}$ during the previous time slot assigned thereto.

FIG. 9B is a circuit diagram of an exemplary track and hold circuit suitable for use in the time-division multiplexed signal processing circuitry of FIG. 9A. The track and hold circuit includes an input buffer (provided by a 0.01 uF capacitor and 5K ohm resistor for AC coupling, an op-amp configured as a voltage follower, and 10K ohm resistor coupled between the output node of the op-amp and ground), a FET switch whose source/drain is coupled between the output node of the input buffer and input node of an output buffer and whose gate is coupled to a signal line that carries the SourceX_enable signal (to switch between "track mode" and "hold mode"), a 470 pF hold capacitor coupled between the input node of the output buffer and ground, and the output buffer (provided an op-amp configured as a non-inverting amplifier with a gain of 3 (e.g. 1+300/150). When the FET switch is closed (i.e., "track mode), the voltage levels at the output of track and hold circuit track changes in the voltage levels at its input. Yet, when the FET switch is open (i.e., "hold mode"), the hold capacitor stores a sample of the voltage levels at the input of the track and hold circuit just prior to the FET switch being closed, and the voltage level at the output of track and hold circuit corresponds to the sampled voltage level stored on the hold capacitor.

In alternative embodiments, the TDM signal processing operations performed on the output of photosensors $PD_{HST1}$, $PD_{HST2}$, and $PD_{VST1}$ may be carried out a lower frequency (e.g., at a frequency much less than the Nyquist frequency, such as over scan lines or scan line groups as described herein), which is determined by the frequency of HST1_Enable Signal, HST2_Enable Signal and VST1_Enable Signal. In such embodiments, bar code detection signal processing circuitry does not operate on samples of data signals derived from the two photosensors that does not correspond to a given time slot; yet bar code detection signal processing circuitry does operate at frequencies at least two times greater than the Nyquist frequency in sampling and processing the data signals derived from the photosensor corresponding to the given time slot in order to detect and decode bar code symbols therein. In such embodiments, a multiplexing switch may be used (as a substitute for track and hold circuitry) to operably couple/decouple (e.g., electrically isolate) the output of a given photosensor from bar code detection signal processing circuitry, and there is no need to store (and process) a sample of the data signals derived from the given photosensor during the previous time slot logically assigned to the given photosensor.

FIG. 9C is a functional block diagram of exemplary electronic circuitry that performs time-division multiplexed signal processing operations in response to the timing signals of FIGS. 8B6 through 8B8, which is suitable for use in the illustrative bioptical laser scanning system described above. In this illustrative embodiment, three analog to digital signal converters are provided, each processing data signals derived from a different photosensor ($PD_{HST1}$, $PD_{HST2}$ or $PD_{VST1}$). The three analog to digital converters each sample the conditioned analog scan data signals at a sampling frequency at least two times the highest frequency component expected in the analog scan data signal (in accordance with the well known Nyquist criteria) and quantizes each time-sampled scan data signal value into a discrete signal level using a suitable length number representation (e.g. 8 bits) to produce a discrete scan data signal. One or more programmed processors (e.g., a digital signal processor and associated memory)

perform digital signal processing functions on the discrete signal levels to generate a sequence of digital words (i.e., a sequence of digital count values), each representing the time length associated with the signal level transitions in the corresponding digital scan data signal as described above. Time-division multiplexed signal processing operations are provided by selectively enabling the sampling function (and possibly the conversion function) of only one of the three analog to digital signal converters during the time slot assigned to photosensor $PD_{HST1}$, $PD_{HST2}$ or $PD_{VST1}$ (and laser scanning station HST1, HST2 or VST1) corresponding thereto. More specifically, during the time slots assigned to photosensor $PD_{HST1}$, the sampling function (and possibly the conversion function) of analog to digital signal converter $A/D_{HST1}$ is selectively activated, and it is disabled during time periods outside such time slots. Similarly, during the time slots assigned to photosensor $PD_{HST2}$, the sampling function (and possibly the conversion function) of analog to digital signal converter $A/D_{HST2}$ is selectively activated, and it is disabled during time periods outside such time slots. And during the time slots assigned to photosensor $PD_{VST1}$, the sampling function (and possibly the conversion function) of analog to digital signal converter $A/D_{VST1}$ is selectively activated, and it is disabled during time periods outside such time slots.

Figure 9D:
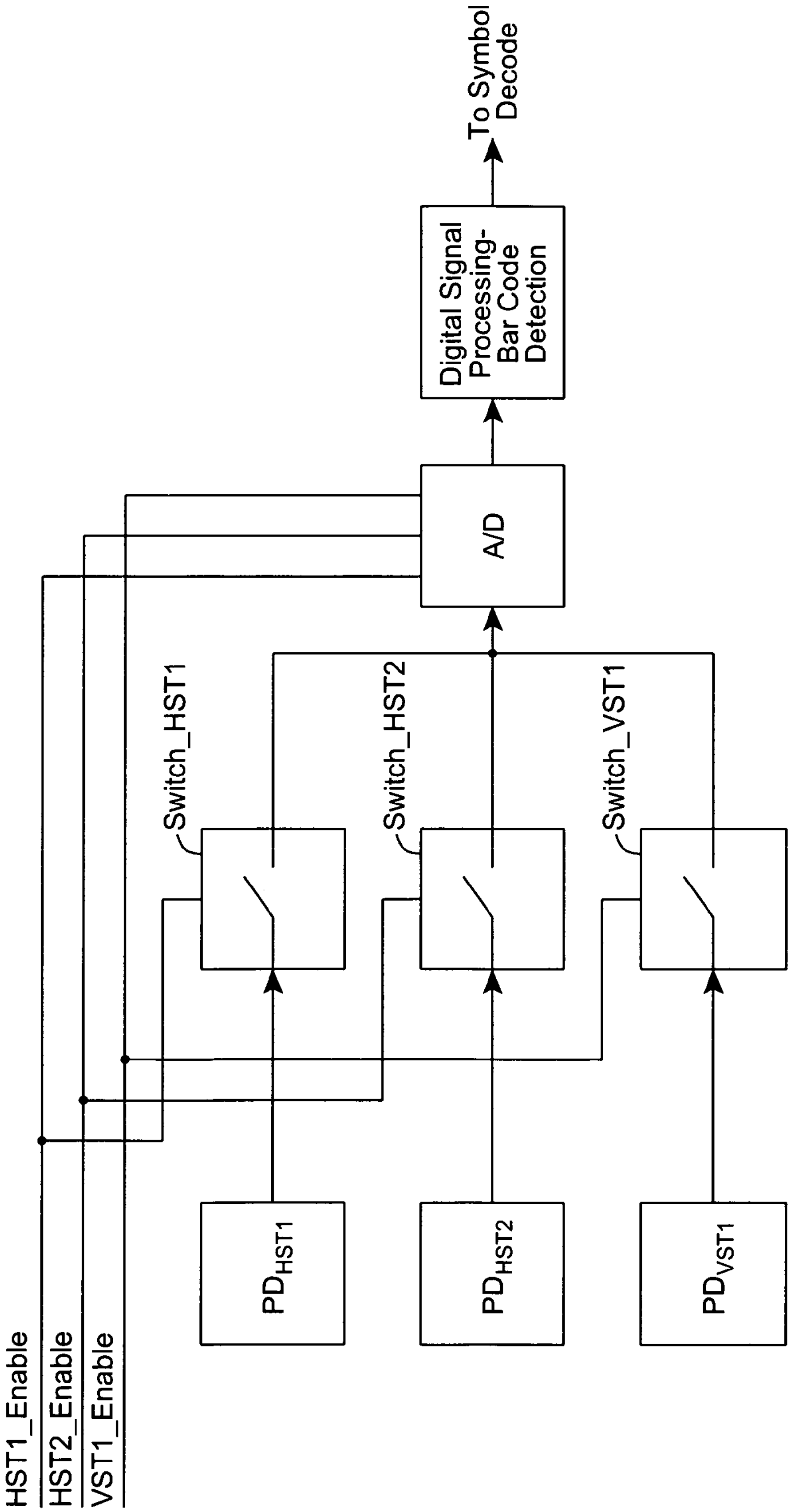
FIG. 9D is a functional block diagram of exemplary electronic circuitry that performs time-division multiplexed signal processing operations in response to the timing signals of FIGS. 18A6 through 18A8; in this illustrative embodiment, a shared analog to digital signal converter is provided that processes data signals derived from any one of the three photosensors $PD_{HST1}$, $PD_{HST2}$ and $PD_{VST1}$. Multiplexing switches operate in response to the timing signals of FIGS. 8B6 through 8B9 to operably couple/de-couple a given photosensor ($PD_{HST1}$, $PD_{HST2}$ or $PD_{VST1}$) to the shared analog to digital signal converter during each time slot assigned to the given photosensor ($PD_{HST1}$, $PD_{HST2}$ or $PD_{VST1}$ (and laser scanning station HST1, HST2 or VST1). The shared analog to digital converter samples the conditioned analog scan data signals at a sampling frequency at least two times the highest frequency component expected in the analog scan data signal (in accordance with the well known Nyquist criteria) and quantizes each time-sampled scan data signal value into a discrete signal level using a suitable length number representation (e.g. 8 bits) to produce a discrete scan data signal. One or more programmed processors (e.g., a digital signal processor and associated memory) perform digital signal processing functions on the discrete signal levels to generate a sequence of digital words (i.e., a sequence of digital count values), each representing the time length associated with the signal level transitions in the corresponding digital scan data signal as described above; time-division multiplexed signal processing operations are provided by selectively enabling the sampling function (and possibly the conversion function) of the shared analog to digital signal converter during the time slots assigned to the photosensors $PD_{HST1}$, $PD_{HST2}$ and $PD_{VST1}$ (and laser scanning station HST1, HST2 and VST1) corresponding thereto.

FIG. 9D is a functional block diagram of exemplary electronic circuitry that performs time-division multiplexed signal processing operations in response to the timing signals of FIGS. 8B6 through 8B8, which is suitable for use in the illustrative bioptical laser scanning system described above. In this illustrative embodiment, a shared analog to digital signal converter is provided that processes data signals derived from any one of the three photosensors $PD_{HST1}$, $PD_{HST2}$ and $PD_{VST1}$. Multiplexing switches operate in response to the timing signals of FIGS. 8B6 through 8B8 to operably couple/de-couple a given photosensor ($PD_{HST1}$, $PD_{HST2}$ or $PD_{VST1}$) to the shared analog to digital signal converter during each time slot assigned to the given photosensor ($PD_{HST1}$, $PD_{HST2}$ or $PD_{VST1}$ (and laser scanning station HST1, HST2 or VST1). The shared analog to digital converters samples the conditioned analog scan data signals at a sampling frequency at least two times the highest frequency component expected in the analog scan data signal (in accordance with the well known Nyquist criteria) and quantizes each time-sampled scan data signal value into a discrete signal level using a suitable length number representation (e.g. 8 bits) to produce a discrete scan data signal. One or more programmed processors (e.g., a digital signal processor and associated memory) perform digital signal processing functions on the discrete signal levels to generate a sequence of digital words (i.e., a sequence of digital count values), each representing the time length associated with the signal level transitions in the corresponding digital scan data signal as described above. The time-division multiplexed signal processing operations are provided by selectively enabling the shared analog to digital signal converter during the time slots assigned to the photosensors $PD_{HST1}$, $PD_{HST2}$ and $PD_{VST1}$ (and laser scanning station HST1, HST2 and VST1) corresponding thereto. More specifically, during the time slots assigned to photosensor $PD_{HST1}$, the switch (Switch_HST1) is closed to operably couple photosensor $PD_{HST1}$ to the shared analog to digital converter, and remains open during time periods outside these time slots to operably decouple (e.g., electrically isolate) photosensor $PD_{HST1}$ from the shared analog to digital converter. Similarly, during the time slots assigned to photosensor $PD_{HST2}$, the switch (Switch_HST2) is closed to operably couple photosensor $PD_{HST2}$ to the shared analog to digital converter, and remains open during time periods outside these time slots to operably decouple (e.g., electrically isolate) photosensor $PD_{HST2}$ from the shared analog to digital converter. And during the time slots assigned to photosensor $PD_{VST1}$, the switch (Switch_VST1) is closed to operably couple photosensor $PD_{VST1}$ to the shared analog to digital converter, and remains open during time periods outside these time slots to operably decouple (e.g., electrically isolate) photosensor $PD_{VST1}$ from the shared analog to digital converter. Moreover, during the time slots assigned to photosensors $PD_{HST1}$, $PD_{HST2}$ and $PD_{VST1}$, the analog to digital signal converter $A/D_{HST2}$ is selectively activated, and it is disabled during time periods outside such time slots.

Advantageously, such time-division multiplexed signal processing operations enable the laser scanning system of the present invention to scan the scanning volume with a plurality of multi-dimensional laser scanning beams to detect and decode bar code symbols on surfaces disposed therein while avoiding light interference from ambient light and unwanted reflections that might occur and degrade performance of the system.

Other Time-Division-Multiplexed Laser Scanning Mechanisms

FIG. 10 is a schematic representation of an alternate embodiment of the present invention wherein a time division multiplexed beam steering device provides time-division multiplexed laser scanning beams (for example, three shown) for scanning the scanning volume of the laser scanning system of the present invention. Such a device may embodied in the illustrative bioptical laser scanning system described above to provide three time-division multiplexed laser scanning beams to the three laser scanning stations HST1, HST2 and VST1 over time slots (e.g., time intervals) T1, T2 and T3 logically assigned thereto.

Multi-Path Scan Signal Processing

In any laser scanning system (including the various laser scanner systems described herein), the primary function of the laser scanning mechanism is to produce a laser scanning field (or volume) in which bar code symbols can be scanned in a reliable manner. In such systems, the speed of the laser beam spot (or cross-section) along the extent of the scanned laser beam will vary over the depth of the scanning range of the system. The further the laser beam spot is away from the laser scanning mechanism, the greater the laser beam spot speed with be, based on well known principles of physics. A useful measure of such beam spot speed variation is given by the ratio of (i) the maximum laser beam spot speed within the scanning field of the system, to (ii) the minimum laser beam spot speed in the scanning system. Hereinafter, this spot speed variation measure shall be referred to as the "Max/Min Beam Spot Speed Ratio" of a laser scanning system.

The substrate, usually paper, on which a bar code is printed reflects a signal of varying power when scanned with a focused laser beam within a given focal zone in the system. The laser light energy reflected (i.e. scattered) off the scanned code symbol is directed onto a photodetector by way of light collection and focusing optics. The photodetector converts these optical signals into corresponding electrical signals. The signal components produced by scanning the bar code substrate are unwanted and therefore are described as noise. Since the substrate is usually paper, consisting of fibers having a random spatial structure, such unwanted noise signals are commonly referred to as paper or substrate noise. A signal derived from the output of the photodetector (in analog or digital form) is referred to as a scan data signal $S_{analog}$ comprising the desired bar code signal component as well as the paper noise components.

As a bar code is scanned within a focal zone disposed further away from the scanner, the scan data signal is increasingly compressed on the time-domain by virtue of the fact that the laser beam speed increases as a function of distance away from the laser scanning mechanism. In accordance with Fourier Analysis principles, compression of the scan data signal (including its noise components) represented on the time-domain results in an increase in or shift of power to the higher spectral components of the scan data signal represented on the frequency-domain. Thus, the frequency spectra of the scan data signal (including its noise components) undergoes a positive frequency shift as the corresponding bar code symbol is scanned further away from the laser scanning system. This phenomenon is graphically illustrated in the analog scan data signal of FIGS. 11A and 11B.

When scanning bar code symbols in a multi-focal zone laser scanning system, filters and signal thresholding devices are useful for rejecting noise components in the scan data signal. However, such devices also limit the scan resolution of the system, potentially rendering the system incapable of reading low contrast and high resolution bar code symbols on surfaces placed in the scanning field. Thus, it is imperative that the bandwidth of the system be sufficient to support the spectral components of scan data signals at different focal zones of the system and to support the scanning of the desired resolution of bar code symbols on surfaces placed in the scanning field.

In accordance with teachings of the present invention, a laser scanning system (such as the illustrative bioptical laser scanning system described herein) includes a TDM-enabled multi-path scan data signal processor having multiple signal processing paths. Each signal processing path processes the same data signal (which is derived from the output of a photodetector) to detect bar code symbols therein and generate data representing the bar code symbols. And each signal processing path has different operational characteristics (such as low-pass filter cutoff frequencies, amplifier gain characteristics, and/or positive and negative signal thresholds). The varying operational characteristics of the paths are optimized to provide different signal processing functions (e.g., minimize paper noise, or maximize the scan resolution of the system). The data signal derived from laser scanning is supplied to each path of the multi-path scan data processor, where it is processed (preferably in parallel) to identify signal level transitions therein. A digital scan data signal that encodes such signal level transitions is provided to digitizing circuitry, which converts the digital scan data signal into a corresponding sequence of digital words (i.e. a sequence of digital count values) suitable for bar code symbol decoding as described above.

By virtue of this aspect of the present invention, it is now possible to identify signal level transitions in the scan data signal over a diverse range of operating conditions (e.g., operating conditions where paper noise is present in addition to operating conditions requiring high resolution scanning, such as the reading of low contrast or high resolution bar code symbols), which enables more reliable bar code reading over such diverse operating conditions. These and other advantages of the present invention will become apparent hereinafter.

Figure 11A:
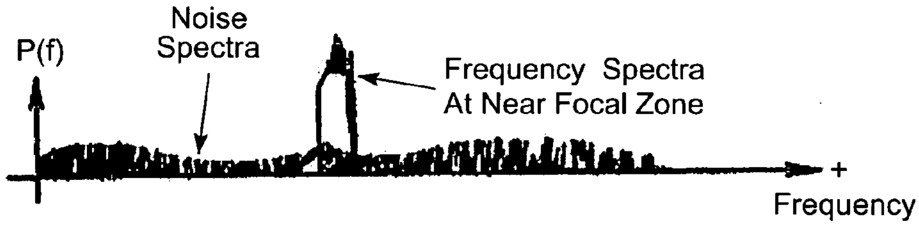
FIGS. 11A and 11B are graphical representations of the power spectrum of an exemplary analog scan data signal produced when laser scanning a bar code symbol within near and far focal zones of a laser scanning system, shown plotted along with the power density spectrum of the paper/substrate noise signal produced while laser scanning the bar code symbol on its substrate within such near and far focal zones.
Figure 11B:
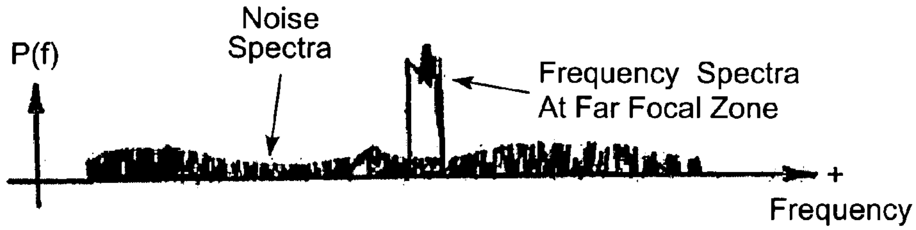
Figure 11C:
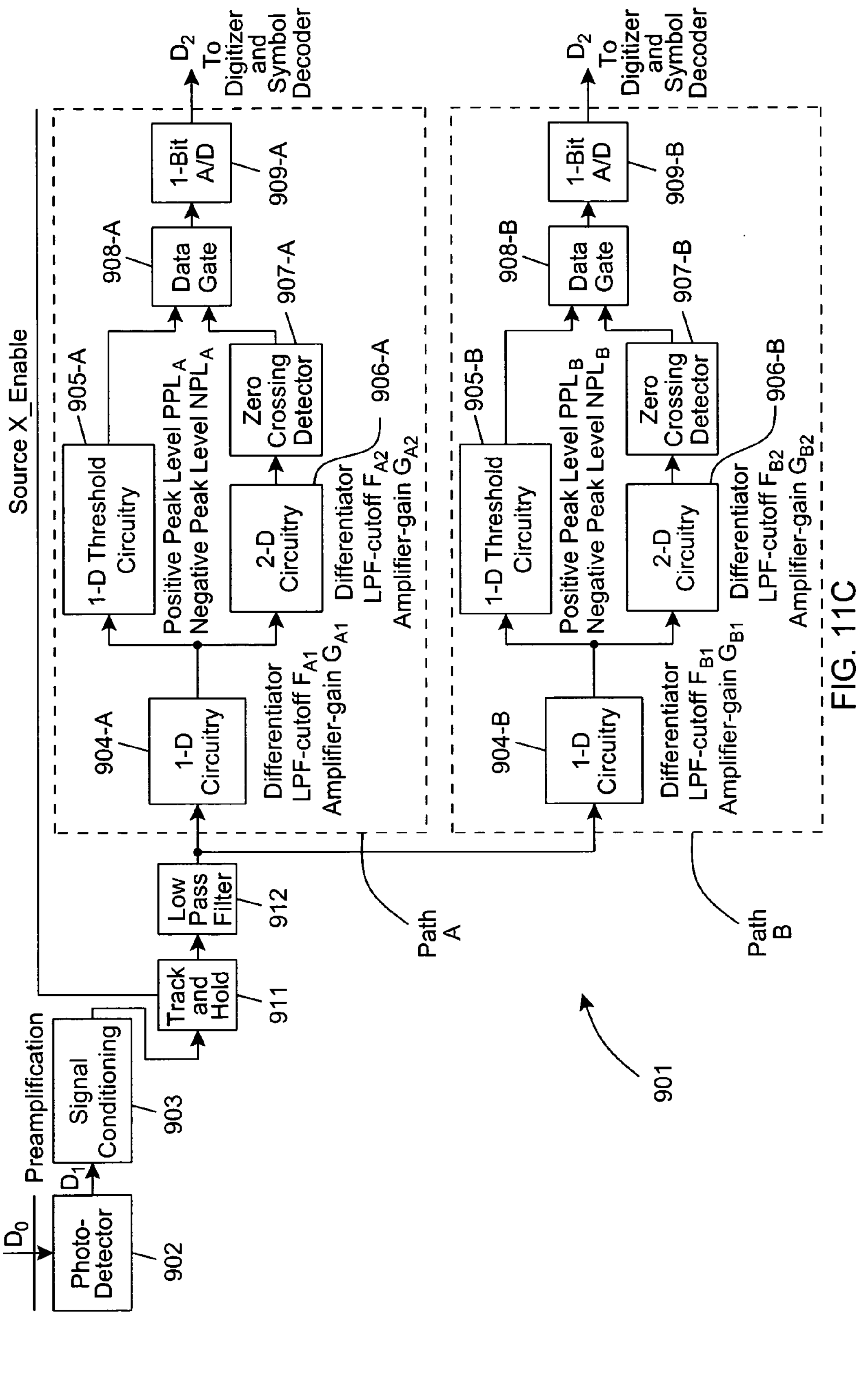
FIG. 11C is a functional block diagram of an illustrative embodiment of a TDM-enabled multi-path scan data signal processor according to the present invention, including: signal conditioning circuitry 903, track and hold circuitry 911, and low pass filter circuitry 912 operably coupled between a photodetector 902 and a plurality of signal processing paths (two shown as path A and path B); The signal conditioning circuitry 903 operates to amplify (and possible filter out unwanted noise components in) the scan data signal produced by the photodetector 902; The track and hold circuitry 911 operates in response to timing signal SourceX-Enable, which defines time slots logically assigned to the photodetector 902, to operably couple/decouple the output of the signal conditioning circuitry 903 to the low pass filter 912 in response to the timing signal SourceX-Enable; when the SourceX-Enable signal is active ("track" mode), the output of the signal conditioning circuitry 903 is operably coupled to the low pass filter 912; when the SourceX-Enable signal is inactive ("hold" mode), the output of the signal conditioning circuitry 903 is operably decoupled (e.g., electrically isolated) from the low pass filter 912; in addition, in the "hold" mode, the hold capacitor of the track and hold circuit 911 stores a sample of the data signals derived from the photosensor 902 during the previous time slot assigned to photosensor 902, and the voltage level at the output of track and hold circuit 911 corresponds to the sampled voltage level stored on the hold capacitor; the low pass filter 912 operates to smooth out or otherwise filter the data signal supplied the track and hold circuit 911; the output of the low pass filter 912 is provided to the plurality of signal processing paths for processing in parallel; each signal processing path includes: a first derivative signal generation circuit 904 having a differentiator, low pass filter and amplifier therein; a second derivative signal generation circuit 906 having a differentiator therein; a first derivative signal threshold-level generation circuit 905; and a zero crossing detector 907, data gate 908, and binary-type A/D signal conversion circuitry 909; each signal processing path has different operational characteristics (such as different cutoff frequencies in the filtering stages of the first and second derivative signal generation circuits of the respective paths, different gain characteristics in amplifier stages of the first and second derivative signal generation circuits of the respective paths, and/or different positive and negative signal thresholds in the first derivative threshold circuitry of the respective paths); the varying operational characteristics of the paths provide different signal processing functions.

Analog Scan Data Signal Processor of the Illustrative Embodiment of the Present Invention As shown in FIG. 11C, a TDM-enabled multi-path scan data signal processor 901 according to the present invention comprises a number of subcomponents, namely: signal conditioning circuitry 903, track and hold circuitry 911 and low pass filter 912 operably coupled between a photodetector 902 and a plurality of signal processing paths (two shown as path A and path B). The signal conditioning circuitry 903 operates to amplify (and possible filter out unwanted noise components in) the scan data signal produced by the photodetector 902. The track and hold circuitry 911 operates in response to timing signal SourceX-Enable, which defines time slots logically assigned to the photodetector 902, to operably couple/decouple the output of the signal conditioning circuitry 903 to the low pass filter 912 in response to the timing signal SourceX-Enable. When the SourceX-Enable signal is active ("track" mode), the output of the signal conditioning circuitry 903 is operably coupled to the low pass filter 912. When the SourceX-Enable signal is inactive ("hold" mode), the output of the signal conditioning circuitry 903 is operably decoupled (e.g., electrically isolated) from the low pass filter 912. In addition, in the "hold" mod, the hold capacitor of the track and hold circuit 911 stores a sample of the data signals derived from the photosensor 902 during the previous time slot assigned to photosensor 902, and the voltage level at the output of track and hold circuit 911 corresponds to the sampled voltage level stored on the hold capacitor. The low pass filter 912 operates to smooth out or otherwise filter the data signal supplied the track and hold circuit 911. An illustrative implementation of the signal conditioning circuitry 903, track and hold circuit 911, and low pass filter circuitry is described below with respect to FIGS. 13A and 13B.

The output of the low pass filter 912 is supplied to a plurality of signal processing paths, which process the output of the low pass filter 912 in parallel. Each signal processing path includes: a first derivative signal generation circuit 904 having a differentiator, low pass filter and amplifier therein; a second derivative signal generation circuit 906 having a differentiator therein; a first derivative signal threshold-level generation circuit 905; and a zero crossing detector 907, data gate 908, and binary-type A/D signal conversion circuitry 909.

The first derivative signal generation circuitry 904 in each respective path (labeled 904-A and 904-B in as shown) includes a differentiator, low pass filter and amplifier that generate a signal approximating the first derivative of the analog scan data signal (with unwanted noise components removed). The low pass filter may be implemented with passive elements (such as resistors, capacitors and inductors) or may be implemented with active elements (such as an operational amplifier). Preferably, the low-pass filter implements one of a Butterworth-type, Chebsychev-type, MFTD-type, or elliptical-type low pass filtering transfer function, which are well known in the filtering art. Details of the design of such filters is set forth in the book entitled "Electrical Filter Design Handbook," Third Edition, by A. Williams et al., McGraw-Hill, 1996, herein incorporated by reference in its entirety. An illustrative implementation of the first derivative signal generation circuitry 904 for two different paths is described below with respect to FIG. 14.

The "first derivative signal" is supplied to second derivative signal generation circuit 906 and to first derivative threshold circuitry 905 in the respective path. The second derivative signal generation circuitry in each respective path (labeled 906-A and 906-B as shown) includes a differentiator that generates a signal approximating the second derivative of the scan data signal (with unwanted noise components removed). An example of the second derivative signal generation circuitry is described below with respect to FIG. 15.

The "second derivative signal" is supplied to a zero crossing detector 907 that produces output signal(s) ("zero crossing signal") identifying zero crossings in the second derivative signal. An illustrative implementation of the zero crossing detector in each respective path (labeled 907-A and 907-B) is described below with respect to FIG. 17.

The first derivative threshold circuitry in each respective path (labeled 905-A and 905-B) operates as a positive and negative peak detector to provide output signals that indicate the approximate time periods when the positive and negative peaks of the first derivative signal provided thereto exceed predetermined thresholds (i.e., a positive peak level PPL and a negative peak level NPL). An illustrative implementation of such first derivative threshold circuitry 905 for the two different paths is described below with respect to FIGS. 16A through 16D.

In the absence of noise, the occurrence of each second derivative zero-crossing indicates that the "first derivative signal" is undergoing a (positive or negative) peak which corresponds to the point in the scan data signal where a signal level transition (e.g., indicative of a transition between a space and a bar in a bar code symbol) has occurred. However, in the real-world, noise is notorious for producing false zero-crossing detections within the second derivative zero-crossing detection circuit. To reduce the number of "falsely detected" zero-crossings produced by noise, data gating circuit 908 is provided, which functions to gate to the binary-type A/D signal conversion circuitry 909, only detected second derivative zero-crossings which occur substantially concurrent to a positive or negative peak detected in the "first derivative signal" (as identified by the outputs signals of the first derivative threshold circuitry 905). An example of the data gate circuitry and binary-type A/D signal conversion circuitry is described below with respect to FIG. 18.

The output of the binary-type A/D conversion circuitry 909 is a digital scan data signal $D_2$ having first and second (i.e. binary) signal levels which correspond to the bars and spaces of the bar code symbol being scanned. Thus, the digital scan data signal $D_2$ appears as a pulse-width modulated type signal as the first and second signal levels vary in proportion to the width of bars and spaces in the scanned bar code symbol.

The digital scan data signal $D_2$ is supplied to digitizing circuitry, which converts the digital scan data signal $D_2$, associated with each scanned bar code symbol, into a corresponding sequence of digital words (i.e. a sequence of digital count values) $D_3$. Notably, in the digital word sequence $D_3$, each digital word represents the time length associated with each first or second signal level in the corresponding digital scan data signal $D_2$. Preferably, these digital count values are in a suitable digital format for use in carrying out various symbol decoding operations which, like the scanning pattern and volume of the present invention, will be determined primarily by the particular scanning application at hand. Reference is made to U.S. Pat. No. 5,343,027 to Knowles, incorporated herein by reference, as it provides technical details regarding the design and construction of microelectronic digitizing circuits suitable for use in the laser scanner of the present invention.

Bar code symbol decoding circuitry (which is typically implemented with a programmed microprocessor/microcontroller) receive each digital word sequence $D_3$ produced from the digitizing circuit, and subject it to one or more bar code symbol decoding algorithms in order to determine which bar code symbol is indicated (i.e. represented) by the digital word sequence $D_3$, originally derived from corresponding scan data signal $D_1$ detected by the photodetector associated therewith.

More than one multi-path data signal processor 901 may be employed by a laser scanning system in accordance with the present invention. For example, the bioptical laser scanning system of FIG. 7 may include three multi-path data signal processors 901 as part of the analog signal processing circuitry operably coupled to the three photodetectors shown therein.

The operation of the multi-path scan data signal processor 901 is illustrated by the signal diagrams of FIGS. 12A through 12I. FIG. 12A depicts the TDM scanning laser beam moving across bar and spaces of a bar code. FIG. 12B1 depicts the light level received at the photodetector 902. FIG. 12B2 depicts the light level received at the photodetector at high resolution in time, which shows the effect of TDM laser scanning. FIG. 12C1 depicts the voltage level produced at the output node of the track and hold circuit at a high resolution in time, which shows the effect of TDM signal processing operations. FIG. 12C2 depicts the voltage level of the scan data signal produced at the output of filter 912. And FIGS. 12D through 12I depict the processing performed in one of the respective paths of the multi-path scan data signal processor 901. Similar processing operations with different operations characteristics are performed in other paths of the multi-path scan data signal processor 901.

More specifically, each signal processing path has different operational characteristics (such as different cutoff frequencies in the filtering stages of the first and second derivative signal generation circuits of the respective paths, different gain characteristics in amplifier stages of the first and second derivative signal generation circuits of the respective paths, and/or different positive and negative signal thresholds in the first derivative threshold circuitry of the respective paths). The varying operational characteristics of the paths are optimized to provide different signal processing functions.

For example, the cut-off frequencies in the filtering stages of the first and second derivative signal generation circuits of the respective paths can vary such that different paths minimize the paper noise originating from different focal zones of the system. Alternatively, such cut-off frequencies can vary such that one or more paths maximize the scan resolution of the system (i.e., a path with higher cutoff frequencies may be able to detect high resolution bar code symbols) while other paths minimize paper noise (i.e., a path with lower cutoff frequencies will reject paper noise from a larger frequency band above the selected cutoff frequencies).

In another example, the gain characteristics in the amplifier stages of the first and second derivative signal generation circuits of the paths and/or the positive and negative signal thresholds in the first derivative threshold circuitry of the paths can vary such that one or more paths maximize the scan resolution of the system (i.e., a path with higher gain and/or smaller positive and negative signal thresholds may be able to detect low bar code symbols) while other paths minimize paper noise (i.e., a path with lower gain and/or larger positive and negative signal thresholds will reject paper noise that falls below such thresholds).

The different signal processing functions of each path of the multi-path scan data processor as described above are preferably performed in parallel. Alternatively, the processing along each path may be performed sequentially. In this case, a programmable microcomputer may be programmed to dynamically activate the processing of a given path based upon the operation of the scanner (for example, based upon the focal distance of the scanning plane from which the scan data signal is derived, which is described in detail in U.S. application Ser. No. (108-045USA000), or based upon results of previous scan processing of the system).

By virtue of this improved architecture, the multi-path scan data signal processor is able to identify signal level transitions (corresponding to transitions between a space and a bar in a bar code symbol) in the scan data signal over a diverse range of operating conditions (e.g., operating conditions where paper noise is present in addition to operating conditions requiring high resolution scanning, such as the reading of low contrast or high resolution bar code symbols), which enables more reliable bar code reading over such diverse operating conditions.

Signal Conditioning Circuitry/Track and Hold Circuitry/Low Pass Filter

Figure 13A:
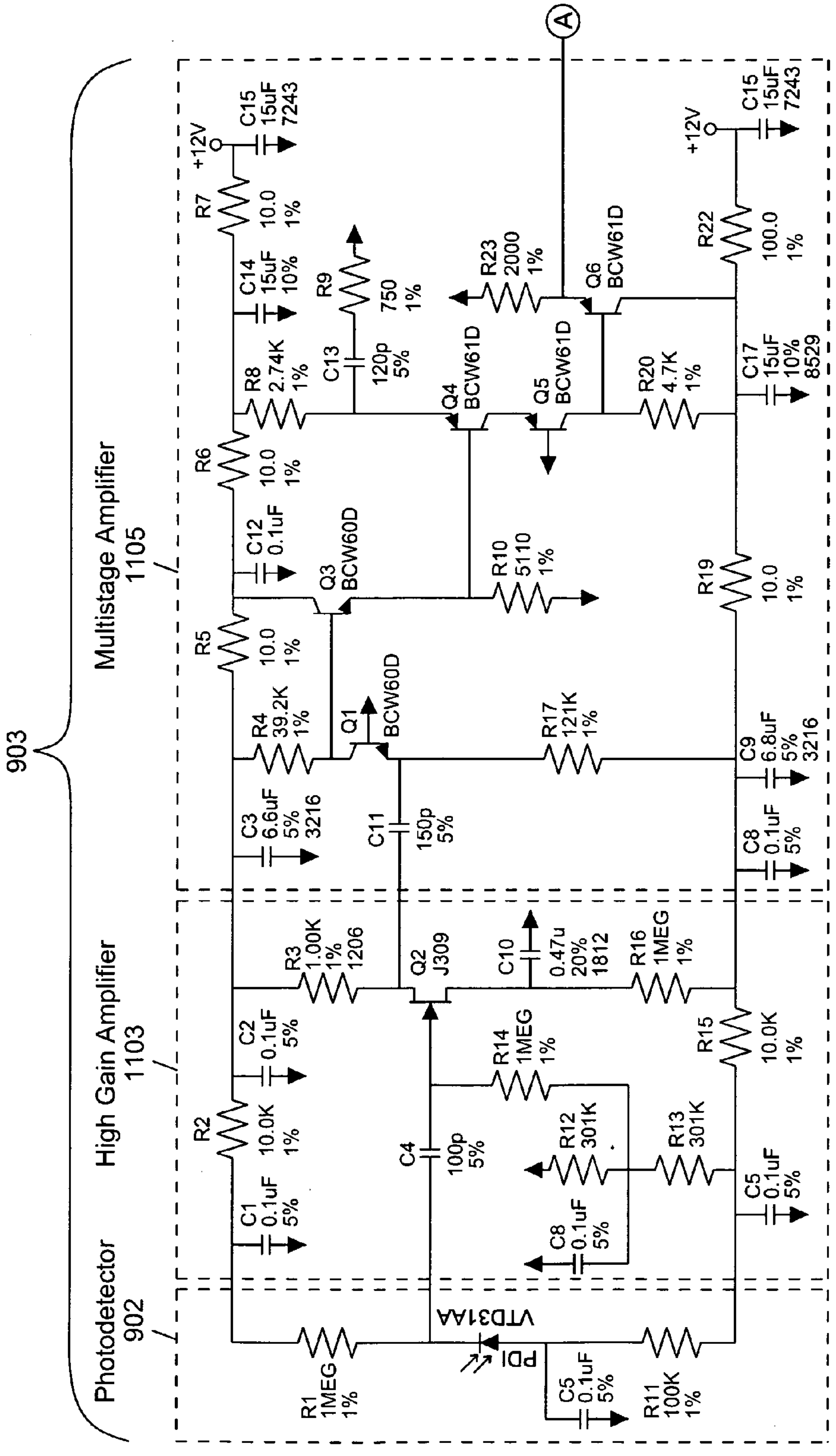
FIGS. 13A and 13B, taken together, illustrate an exemplary embodiment of the signal conditioning circuitry 903, track and hold circuit 911 and low pass filter 912 of FIG. 11C, which performs TDM signal processing operations that amplify and smooth out or otherwise filter the scan data signal produced by the photodetector 902 to remove unwanted noise components therein over time slots defined by the SourceX_ Enable timing signal provided thereto.
Figure 13B:
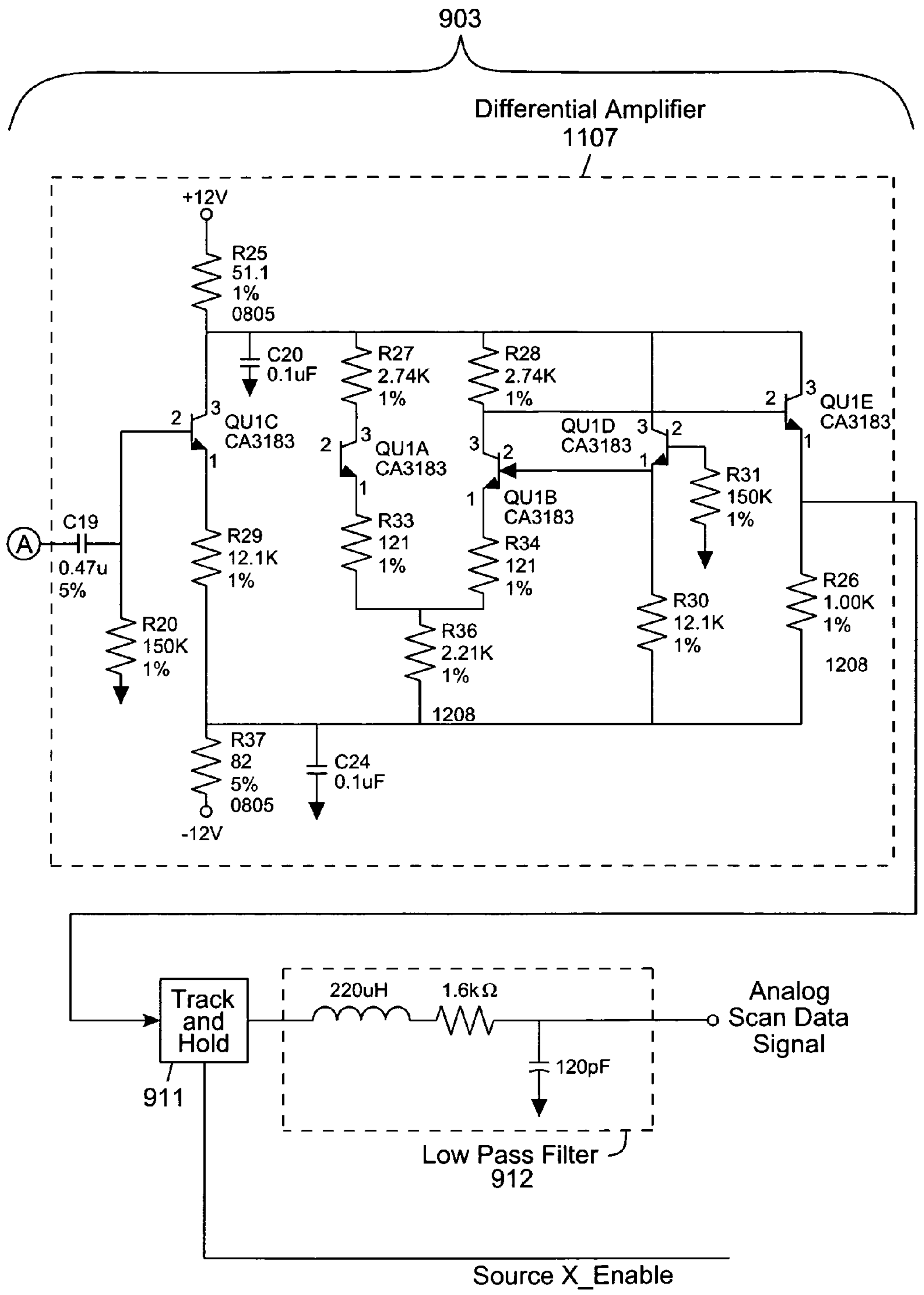

FIGS. 13A and 13B illustrate an exemplary embodiment of the signal conditioning circuitry 903, track and hold circuit 911 and low pass filter 912 of FIG. 11C, which performs TDM signal processing operations that amplify and smooth out or otherwise filter the scan data signal produced by the photodetector 902 to remove unwanted noise components therein over time slots defined by the SourceX_Enable timing signal provided thereto. The circuitry 903 comprises, a number of subcomponents arranged in a serial manner, namely: a high gain amplifier stage 1103, a multistage amplifier stage 1105, and a differential amplifier stage 1107. The amplifier stages 1103, 1105 and 1109 amplify the voltage of the analog scan data signal produced by the photodetector 902 with gains of 90, 3.0 and 7.1, respectively, to provide a total gain of about 1900. In addition, the amplifier stages preferably operate to filter out unwanted noise components in the scan data signal produced therefrom. The track and hold circuitry 911 operates in response to timing signal SourceX-Enable, which defines time slots logically assigned to the photodetector 902, to operably couple/decouple the output of the signal conditioning circuitry 903 to the low pass filter 912 in response to the timing signal SourceX-Enable. When the SourceX-Enable signal is active ("track" mode), the output of the signal conditioning circuitry 903 is operably coupled to the low pass filter 912. When the SourceX-Enable signal is inactive ("hold" mode), the output of the signal conditioning circuitry 903 is operably decoupled (e.g., electrically isolated) from the low pass filter 912. In addition, in the "hold" mode, the hold capacitor of the track and hold circuit 911 stores a sample of the data signals derived from the photosensor 902 during the previous time slot assigned to photosensor 902, and the voltage level at the output of track and hold circuit 911 corresponds to the sampled voltage level stored on the hold capacitor. The low pass filter circuitry 912 operates to filter out unwanted noise in the amplified signal produced by the amplifier stages 1103, 1105 and 1109. The low pass filter 912 shown is designed to filter out unwanted high frequency noise (e.g., noise which lies above the expected maximum signal frequency of 540 kHz).

The First Derivative Signal Generation Circuitry

Figure 14:
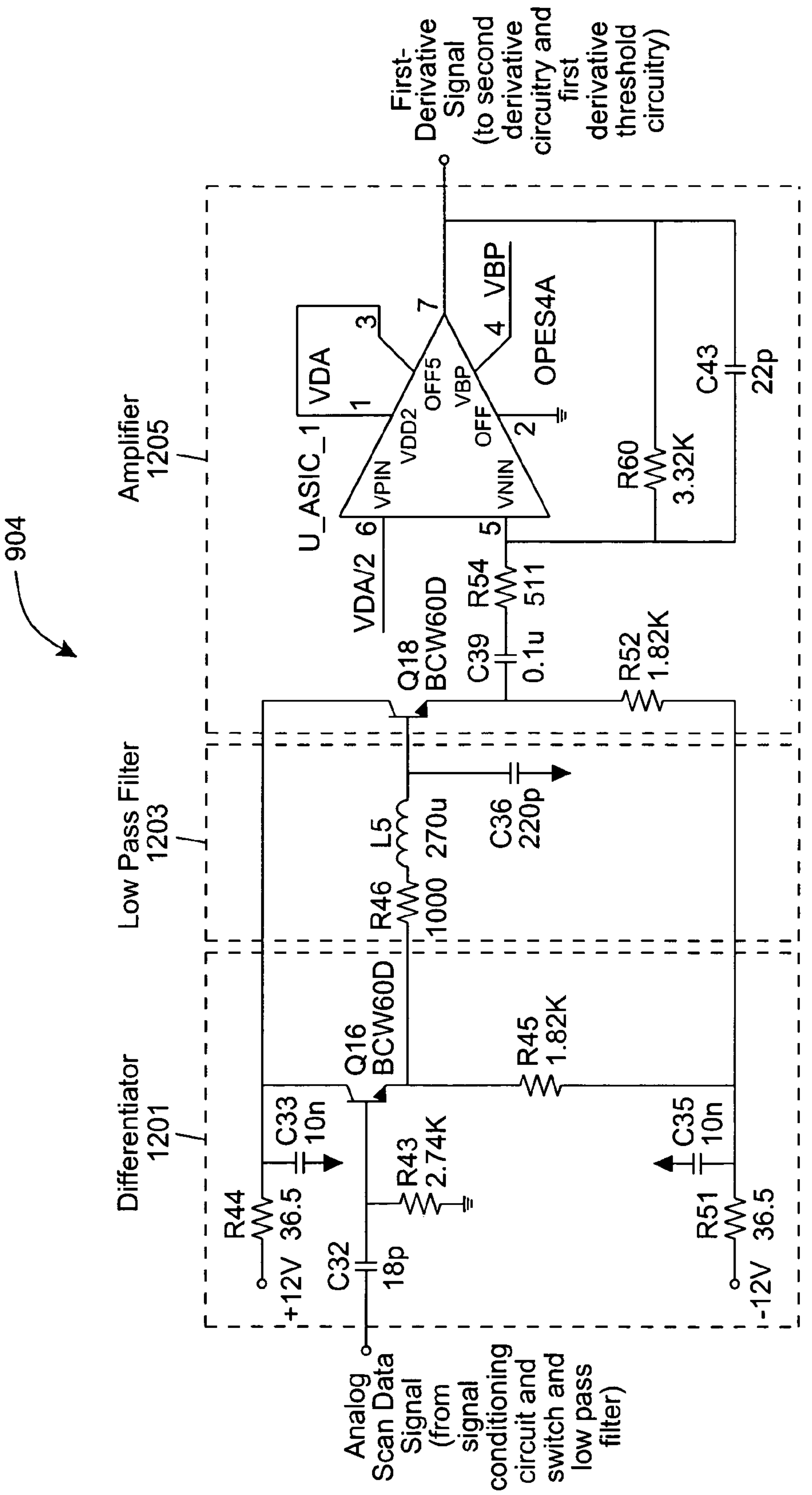
FIG. 14 is a schematic diagram illustrating an exemplary implementation of the first derivative signal generation circuitry 904, which is suitable for use in the two different paths of the scan data signal processor of FIG. 11C, including a number of subcomponents arranged in a serial manner that process the analog scan data signal produced by the signal conditioning circuitry 903, namely: a differentiator stage 1201, a low-pass filter (LPF) stage 1203, and an amplifier stage 1205.

FIG. 14 illustrates an exemplary implementation of the first derivative signal generation circuitry 904, which is suitable for use in the two different paths of the scan data signal processor of FIG. 9C. As shown in FIG. 14, the first derivative signal generation circuitry 904 includes a number of subcomponents arranged in a serial manner that process the analog scan data signal produced by the signal conditioning circuitry 903, namely: a differentiator stage 1201, a low-pass filter (LPF) stage 1203, and an amplifier stage 1205.

The differentiator stage 1201 generates an signal whose voltage level is proportional to the first derivative of the analog scan data signal for those frequencies less than the cutoff frequency of the differentiator stage 1201, which is set by the values of R43 and C32, respectively, and can be approximated by the expression:

$$f_c = \frac{1}{2*\pi*R43*C32},$$

which is approximately 3.226 MHz for the circuit elements shown.

The low pass filter stage 1203 operates to filter out unwanted noise in the output signal produced by the differentiator stage 1201. The 3 dB cutoff frequency of the low pass filter shown (which is a maximally flat Butterworth type filter) is set by the values of L5 and C36, respectively, and can be approximated by the expression:

$$f_c = \frac{1}{2*\pi*\sqrt{L5*C36}},$$

which is approximately 650 kHz for the circuit elements shown.

The amplifier stage 1205 operates to amplify the voltage levels of the output signal produced by the LPF stage for frequencies in a predetermined frequency band. More specifically, for frequencies between $f_1$ and $f_2$, the amplifier produces a gain that is approximately proportional to R60/R54 (which is approximately 6.5 for the circuit elements shown) where:

$$f_1 = \frac{1}{2*\pi*R54*C39},$$

which is approximately 3 kHz for the circuit elements shown.

$$f_2 = \frac{1}{2*\pi*R60*C43},$$

which is approximately 2 MHz for the circuit elements shown.

Outside the predetermined frequency band between $f_1$ and $f_2$, the amplifier stage 1205 attenuates such frequency components.

It should be noted that although the first derivative signal generation circuitry of the two paths (labeled 904-A and 904-B in FIG. 11C) share a common function—to generate a signal approximating the first derivative of the analog scan data signal—they may have different operational characteristics that are optimized for bar code scanning and reading in diverse operating conditions.

For example, the cut-off frequencies in the differentiator stage 1201, the LPF stage 1203 and the amplifier stage 1205 of the first derivative signal generation circuits of the respective paths (labeled 904-A and 904-B) can vary (by selecting different values for the appropriate circuit elements as set forth above) such that different paths minimize the paper noise originating from different focal zones of the system. Techniques for selecting the appropriate cutoff frequencies that correspond to the different focal zones of the laser scanning system are described in detail in U.S. patent application Ser. No. (108-045USA000), commonly assigned to the assignee of the present application, incorporated by reference above in its entirety. Alternatively, such cut-off frequencies can vary such that one or more paths maximize the scan resolution of the system (i.e., a path with higher cutoff frequencies may be able to detect high resolution bar code symbols) while other paths minimize paper noise (i.e., a path with lower cutoff frequencies will reject paper noise from a larger frequency band above the selected cutoff frequencies).

In another example, the gain characteristics in the amplifier stage 1205 of the first derivative signal generation circuits of the respective paths (labeled 904-A and 904B) can vary such that one path maximizes the scan resolution of the system (i.e., a path with higher gain may be able to detect low bar code symbols) while the other path minimize paper noise (i.e., a path with lower gain will reject paper noise that might trigger scan errors when amplified by the high gain path).

The Second Derivative Signal Generation Circuitry

Figure 15:
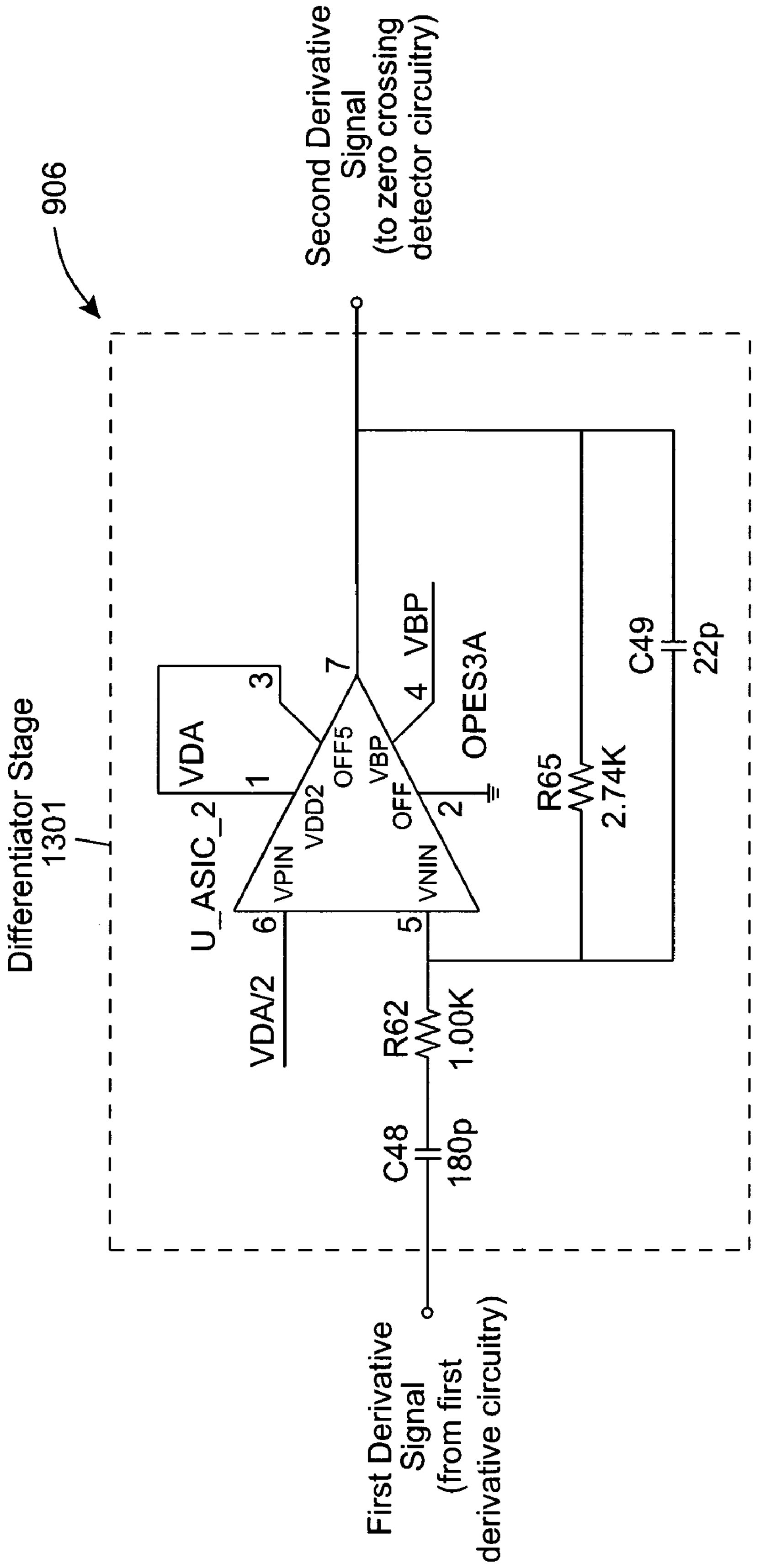
FIG. 15 is a schematic diagram illustrating an exemplary implementation of the second derivative signal generation circuitry 906, which is suitable for use in the two different paths of the scan data signal processor of FIG. 11C, including: a differentiator stage 1301 that generates a signal whose voltage level is proportional to the derivative of the first derivative signal produced by the first derivative generation circuitry 904 (thus proportional to the second derivative of the analog scan data signal produced by the signal conditioning circuitry 903) for frequencies in a predetermined frequency band.
Figure 16A:
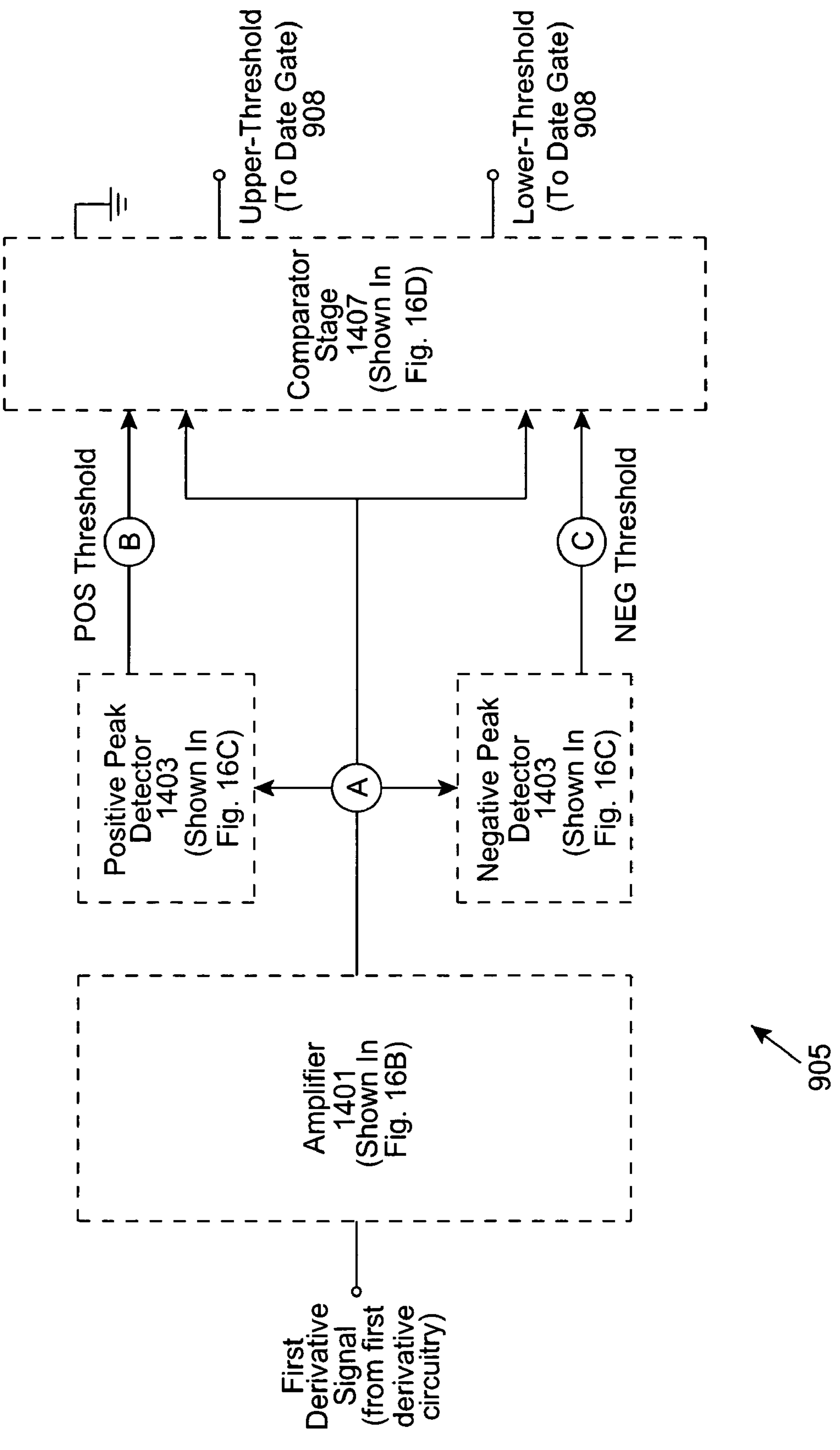
FIGS. 16A through 16D, taken all together, set forth a schematic diagram illustrating an exemplary implementation of the first derivative signal threshold circuitry 905, which is suitable for use in the two different paths of the scan data signal processor of FIG. 11C, including: an amplifier stage 1401 that amplifies the voltage levels of the first derivative signal produced by the first derivative signal generation circuitry 904, positive and negative peak detectors 1403 and 1405, and a comparator stage 1407 that generates output signals (e.g., the Upper_Threshold Signal and Lower_ Threshold Signal) that indicate the time period when the positive and negative peaks of the amplified first derivative signal produced by the amplifier stage exceed predetermined thresholds (i.e., a positive peak level PPL and a negative peak level NPL).
Figure 16B:
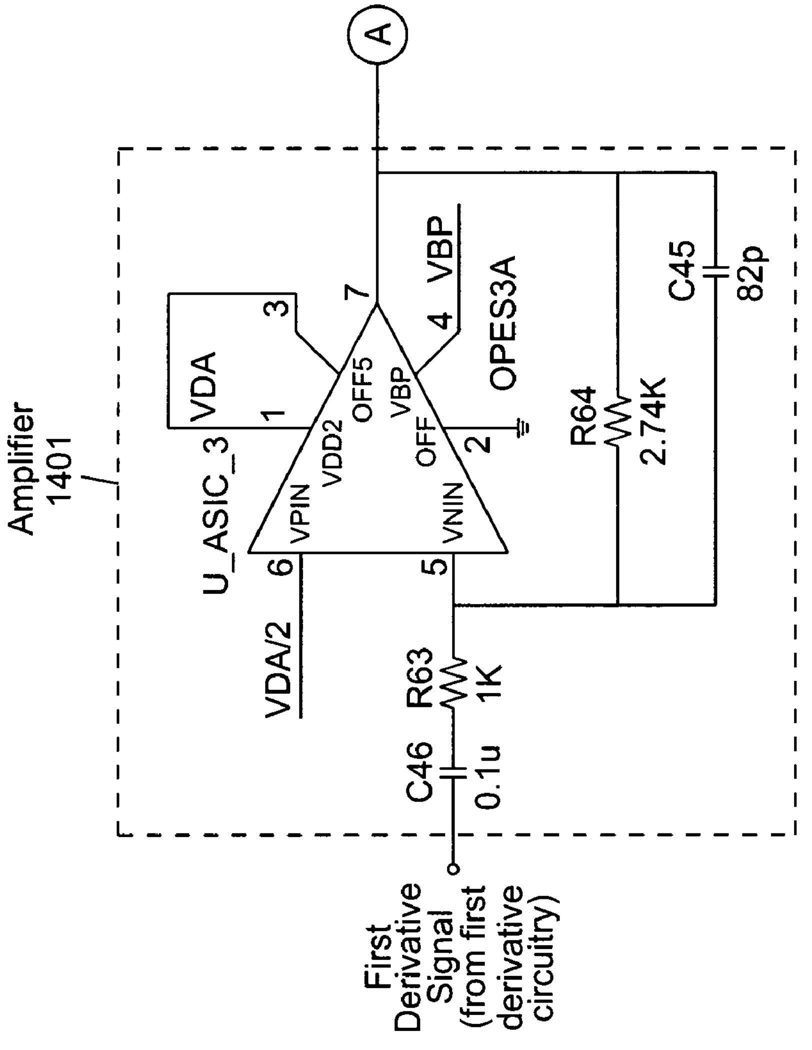
Figure 16C:
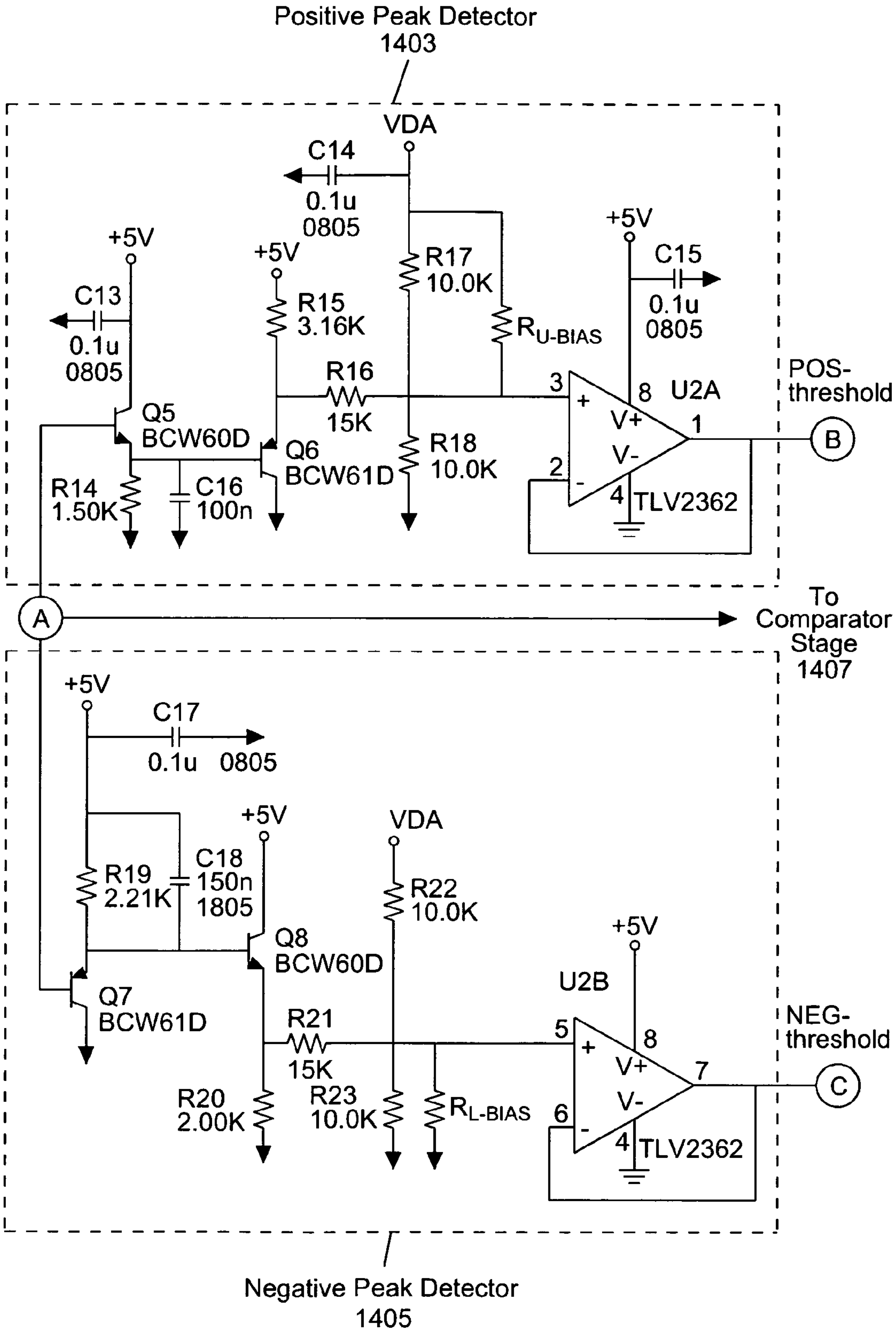
Figure 16D:
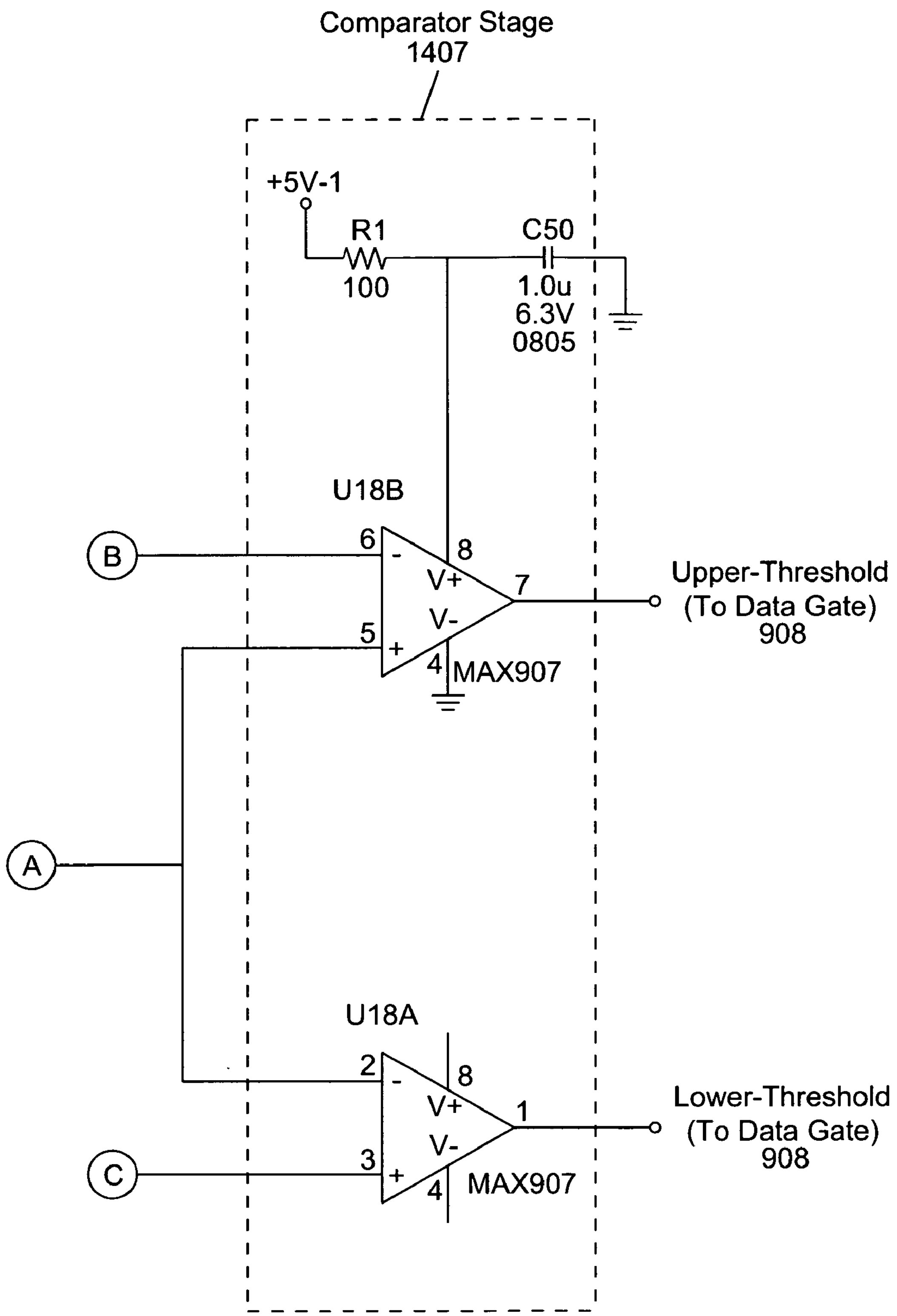

FIG. 15 illustrate an exemplary implementation of the second derivative signal generation circuitry 906, which is suitable for use in the two different paths of the scan data signal processor of FIG. 11C. As shown in FIG. 15, the second derivative signal generation circuitry 906 includes a differentiator stage 1301 that generates a signal whose voltage level is proportional to the derivative of the first derivative signal produced by the first derivative generation circuitry 904 (thus proportional to the second derivative of the analog scan data signal produced by the signal conditioning circuitry 903) for frequencies in a predetermined frequency band. More specifically, the differentiator stage 1301 operates substantially as a differentiator (producing a signal whose voltage level is proportional to the derivative of the first derivative signal produced by the first derivative generation circuitry 904) for frequencies less than $f_1$ where:

$$f_1 = \frac{1}{2*\pi*R62*C48},$$

which is approximately 884 kHz for the circuit elements shown.

Moreover, the feedback elements of the differentiator stage 1301 operate substantially as a low pass filter with a 3 dB cutoff frequency which is set by the values of R65 and C49, respectively, and can be approximated by the expression:

$$f_c = \frac{1}{2*\pi*R65*C49},$$

which is approximately 2.15 Mhz for the circuit elements shown.

For frequencies above this predetermined 3 dB cutoff frequency $f_c$, the differentiator stage 1301 attenuates such frequency components.

It should be noted that although the second derivative signal generation circuitry of the two paths (labeled 906-A and 906-B in FIG. 11C) share a common function—to generate a signal approximating the second derivative of the analog scan data signal—they may have different operational characteristics that are optimized for bar code scanning and reading in diverse operating conditions.

For example, the cut-off frequencies in the differentiator stage 1301 of the second derivative signal generation circuits of the respective paths (labeled 906-A and 906-B) can vary (by selecting different values for the appropriate circuit elements as set forth above) such that different paths minimize the paper noise originating from different focal zones of the system. Techniques for selecting the appropriate cutoff frequencies that correspond to the different focal zones of the laser scanning system are described in detail in U.S. patent application Ser. No. (108-045USA000), commonly assigned to the assignee of the present application, incorporated by reference above in its entirety. Alternatively, such cut-off frequencies can vary such that one or more paths maximize the scan resolution of the system (i.e., a path with higher cutoff frequencies may be able to detect high resolution bar code symbols) while other paths minimize paper noise (i.e., a path with lower cutoff frequencies will reject paper noise from a larger frequency band above the selected cutoff frequencies).

Zero Crossing Detector

Figure 17:
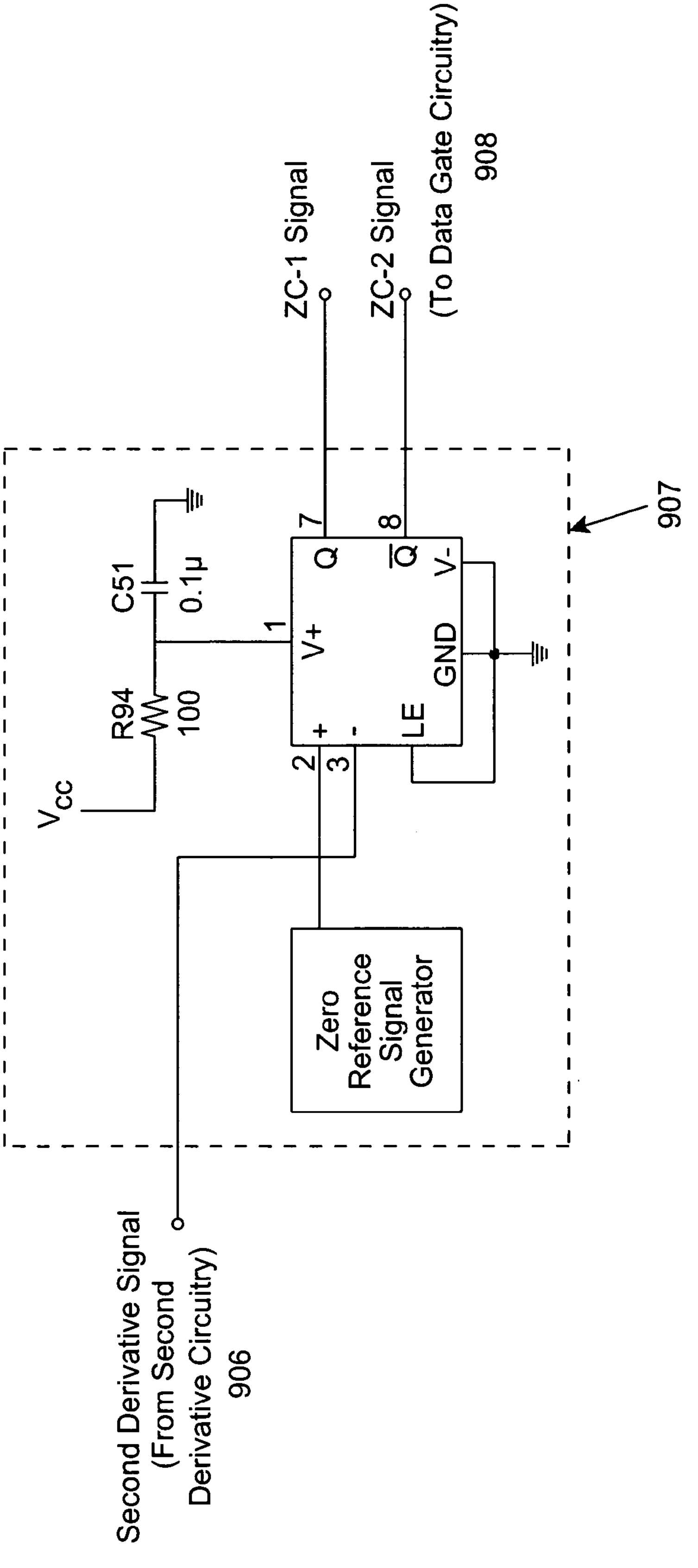
FIG. 17 illustrates an exemplary implementation of a zero crossing detector 907, which is suitable for use in the two different paths of the scan data signal processor of FIG. 11C, including a comparator circuit that compares the second derivative signal produced from the second derivative generation circuit in its respective path with a zero voltage reference (i.e. the AC ground level) provided by the zero reference signal generator, in order to detect the occurrence of each zero-crossing in the second derivative signal, and provide output signals (ZC_1 and ZC_2 signals) identifying zero crossings in the second derivative signal.

FIG. 17 illustrates an exemplary implementation of a zero crossing detector 907, which is suitable for use in the two different paths of the scan data signal processor of FIG. 11C. As shown in FIG. 15, the zero-crossing detector 907 includes a comparator circuit that compares the second derivative signal produced from the second derivative generation circuit in its respective path with a zero voltage reference (i.e. the AC ground level) provided by the zero reference signal generator, in order to detect the occurrence of each zero-crossing in the second derivative signal, and provide output signals (ZC_1 and ZC_2 signals) identifying zero crossings in the second derivative signal.

First Derivative Signal Threshold Level Generation Circuit

FIGS. 16A through 16D illustrate exemplary implementation of the first derivative signal threshold circuitry 905, which is suitable for use in the two different paths of the scan data signal processor of FIG. 11C. As shown in FIGS. 16A through 16D, the first derivative signal threshold circuitry 905 includes an amplifier stage 1401 that amplifies the voltage levels of the first derivative signal produced by the first derivative signal generation circuitry 904, positive and negative peak detectors 1403 and 1405, and a comparator stage 1407 that generates output signals (e.g., the Upper_Threshold Signal and Lower_Threshold Signal) that indicate the time period when the positive and negative peaks of the amplified first derivative signal produced by the amplifier stage exceed predetermined thresholds (i.e., a positive peak level PPL and a negative peak level NPL). Preferably, the positive peak level PPL and negative peak level NPL are dynamic thresholds (e.g., these levels change as the amplified analog signal changes over time) based upon a DC bias level and a percentage (portion) of the amplified first derivative signal produced by the amplifier stage 1401. In the illustrative embodiment shown in FIGS. 16A through 16D, capacitors C16 and C18 are configured as peak detectors (with a decay time constant proportional to the values of R14/C16 and R19/C18, respectively); and the positive peak level PPL is set by the resistance values of the resistor network R16,R17,R18 and $R_{U\_BIAS}$, while the negative peak level NPL is set by the values of the resistor network R21,R22,R23 and $R_{L\_BIAS}$.

It should be noted that although the first derivative signal threshold circuitry of the two paths (labeled 905-A and 905-B in FIG. 11C) share a common function—to generate output signals that indicate the time period when the positive and negative peaks of the amplified first derivative signal exceed predetermined thresholds—they may have different operational characteristics that are optimized for bar code scanning and reading in diverse operating conditions.

For example, the positive and negative peak levels in the positive and negative peak detectors 1403 and 1405, respectively, (which are set by the resistance values of the resistor networks therein) can vary such that one path maximizes the scan resolution of the system (i.e., a path with lower positive peak and negative peak level may be able to detect low bar code symbols) while the other path minimize paper noise (i.e., a path with a higher positive peak and negative peak level will reject paper noise that that falls below such thresholds).

For example, the positive and negative peak detectors 1403 and 1405 in the first derivative signal threshold circuitry 905-A of the first path A may utilize a 91 kilo-ohm resistor for $R_{U\_BIAS}$ and $R_{L\_BIAS}$ of FIGS. 16A through 16D. Such resistor values produce a dynamic PPL threshold which approximates 2.079 mV DC bias level plus 24% of the amplified first derivative signal, and produce a dynamic NPL threshold which approximates a 1.921 mV DC bias level less 24% of the amplified first derivative signal. In another example, the positive and negative peak detectors 1403 and 1405 in the first derivative signal threshold circuitry 905-B of the second path B may utilize a 20 kilo-ohm resistor for $R_{U\_BIAS}$ and $R_{L\_BIAS}$ of FIGS. 16A through 16D. Such resistor values produce a dynamic PPL threshold which approximates a 2.316 mV DC bias level plus 21% of the amplified first derivative signal, and produce a dynamic NPL threshold which approximates 1.684 mV DC bias level less 21% of the amplified first derivative signal. Note that path A has "lower" positive peak and negative peak levels—it may be able to detect high resolution bar code symbols than path B. While path B has "higher" positive peak and negative peak levels—it will reject paper noise that might trigger scan errors in the path A).

Data Gating Circuitry and 1-Bit A/D Conversion Circuitry

Figure 18:
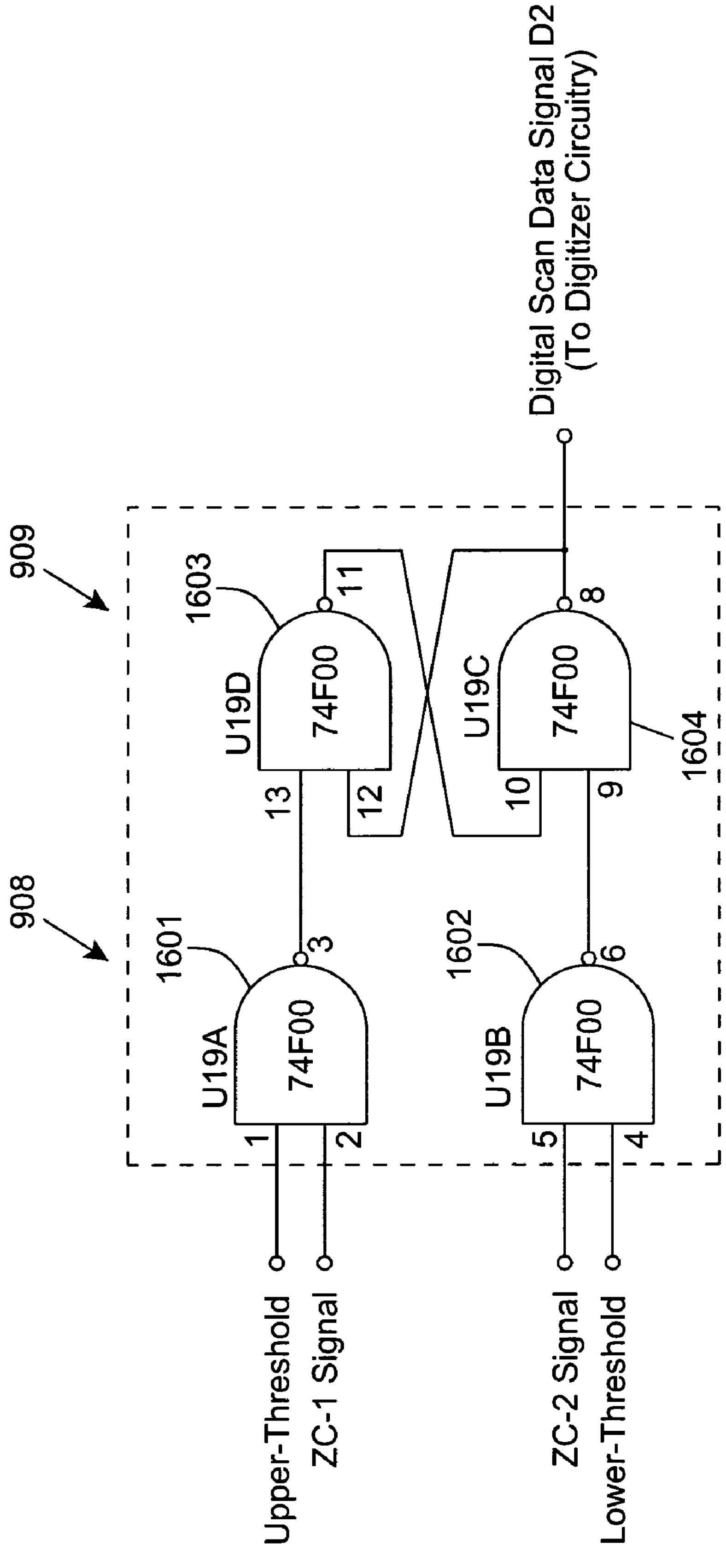
FIG. 18 is a schematic diagram illustrating an exemplary implementation of the data gating circuitry 908 and 1-Bit A/D conversion circuitry 909, which is suitable for use in the two different paths of the scan data signal processor of FIG. 11C.

FIG. 18 illustrates an exemplary implementation of the data gating circuitry 908 and 1-Bit A/D conversion circuitry 909, which is suitable for use in the two different paths of the scan data signal processor of FIG. 11C. In each respective path, the data gating circuit 908 functions to gate to the binary-type A/D signal conversion circuitry 909, only detected second derivative zero-crossings (identified by the outputs signals ZC_1 and ZC_2 of the zero crossing detector 907 in the respective path) which occur substantially concurrent to a positive or negative peaks detected in the "first derivative signal" (as identified by the output signals—Upper_Threshold and Lower_Threshold—of the first derivative threshold circuitry 905). As shown in FIG. 18, the data gate circuit 908 and the 1 bit D/A conversion circuitry 909 in each path is realized by four NAND gates (labeled 601 through 1604) configured as a set/reset latch circuit. The operation of the data gating circuitry and 1 bit D/A conversion circuitry of FIG. 18 is illustrated in the signal plot of FIG. 12I.

Having described illustrative embodiments of the present invention, it is understood that there a number of alternative ways to practice the present invention. Several different modes for carrying out the present invention will be described below.

For example, rather than using "analog-type" circuit technology for realizing the signal processing subcomponents of the TDM-enabled multi-path scan data signal processor (e.g., the differentiators, low-pass filter, amplifiers, peak detectors, data gate, etc.), it is understood that the scan data signal processing method and apparatus of the present invention can be implemented using digital signal processing techniques carried out either within a programmed microcomputer or using one or more custom or commercially available digital signal processing (DSP) chips known in the digital signal processing art. Examples of system architectures utilizing digital signal processing technology for bar code detection and decoding is described above with respect to FIGS. 9B and 9C.

Figure 19A:
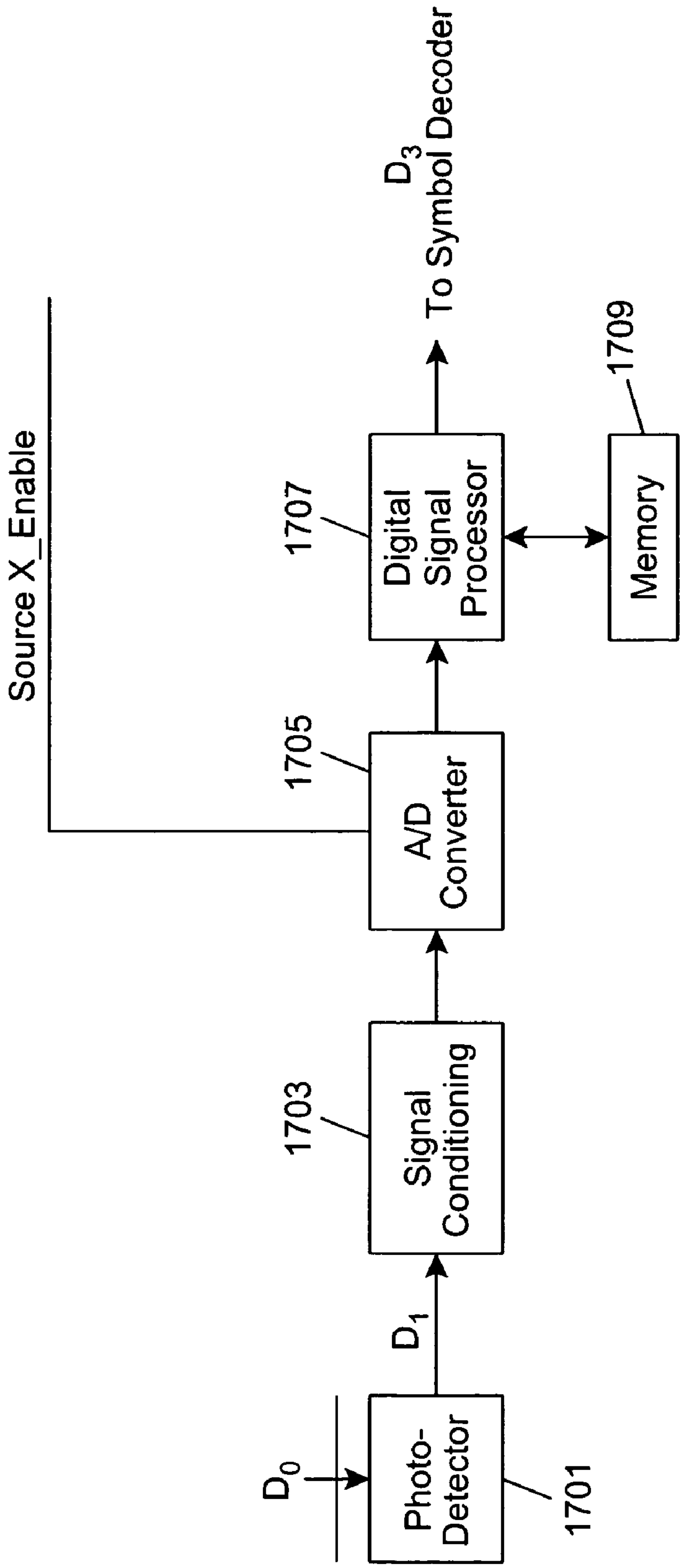
FIG. 19A is a functional block diagram of a system architecture suitable for a digital implementation of the TDM-enabled scan data signal processor of the present invention.

As illustrated in FIG. 19A, when carrying out a digital implementation of the scan data signal processor of the present invention, the analog scan data signal $D_1$ is provided to signal conditioning circuitry 1703 (which amplifies and filters the signal to remove unwanted noise components as described above), whose output is provided to analog-to-digital conversion circuitry 1705. The sampling function (and possibly the conversion function) of analog-to-digital conversion circuitry 1705 in selectively enabled in response to timing signal SourceX-Enable that defines time slots logically assigned to the photodetector 1701 to thereby enable sampling and conversion of the analog scan data signals produced by the signal conditioning circuitry 1703 to digital scan data signals during such time slots, and disable such sampling/conversion operations during time periods outside such time slots. During such time slots, the analog-to-digital conversion circuitry 1705 samples the conditioned analog scan data signals at a sampling frequency at least two times the highest frequency component expected in the analog scan data signal, in accordance with the well known Nyquist criteria, and quantizes each time-sampled scan data signal value into a discrete signal level using a suitable length number representation (e.g. 8 bits) to produce a discrete scan data signal. A suitable quantization level can be selected in view of expected noise levels in the signal. Thereafter, the discrete scan data signal is processed by the programmed processor (e.g., a digital signal processor 1707 and associated memory 1709 as shown) to generate a sequence of digital words (i.e. a sequence of digital count values) $D_3$, each representing the time length associated with the signal level transitions in the corresponding digital scan data signal as described above. Preferably, these digital count values are in a suitable digital format for use in carrying out various symbol decoding operations which, like the scanning pattern and volume of the present invention, will be determined primarily by the particular scanning application at hand.

Figure 19B:
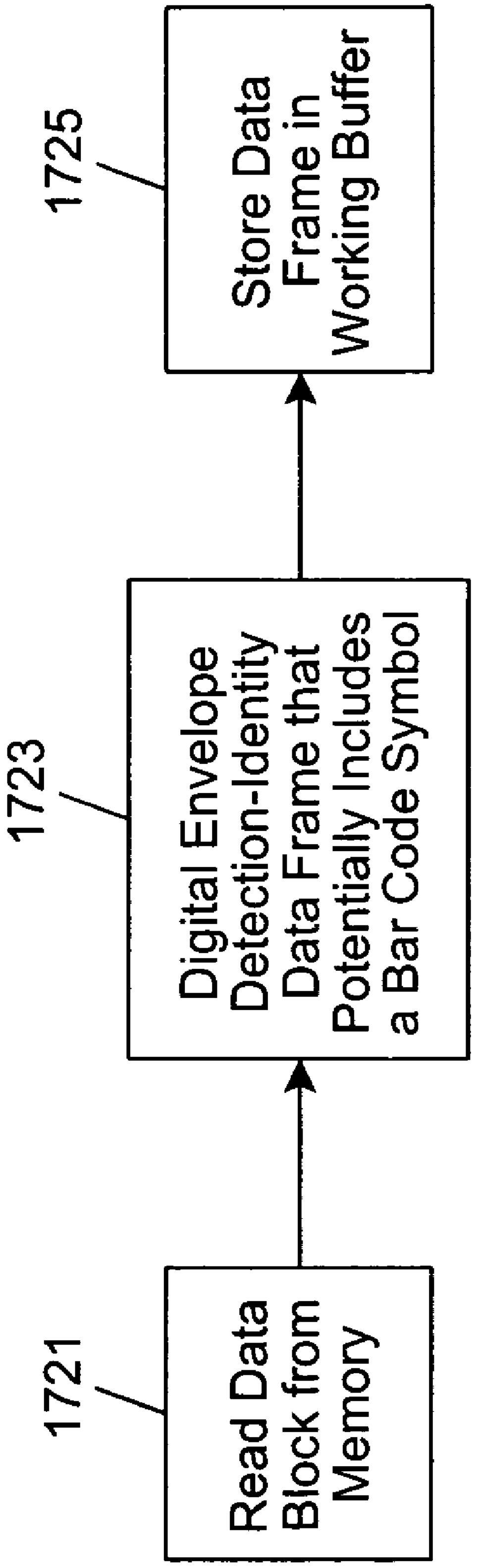
FIGS. 19B through 19D are functional block diagrams that illustrate exemplary digital implementations of the TDM-enabled multi-path scan data processing according to the present invention, wherein digital signal processing operations are preferably carried out on the discrete scan data signal levels generated by the A/D converter 1705 and stored in the memory 1709 of FIG. 19A.
Figure 19C:
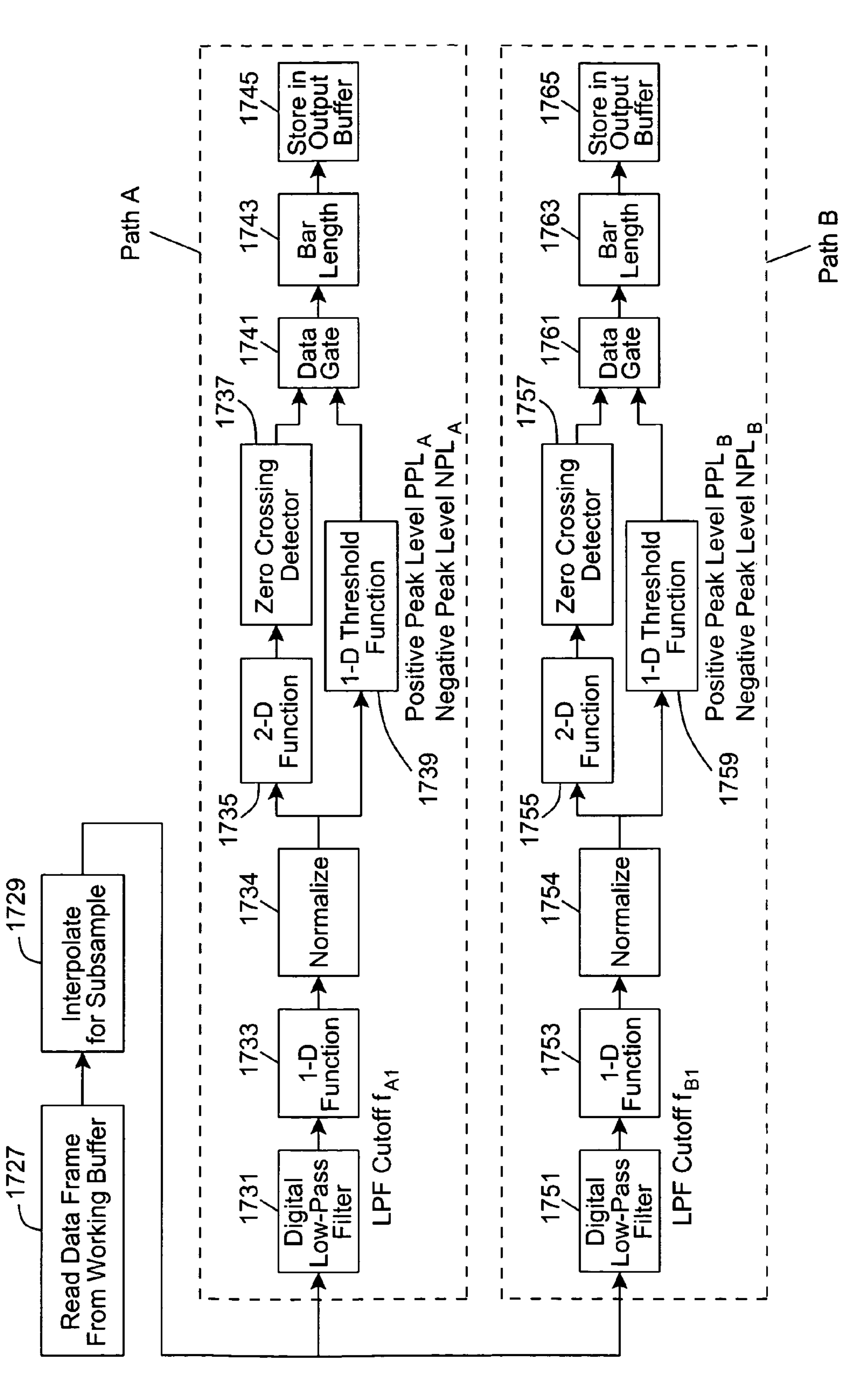
Figure 19D:
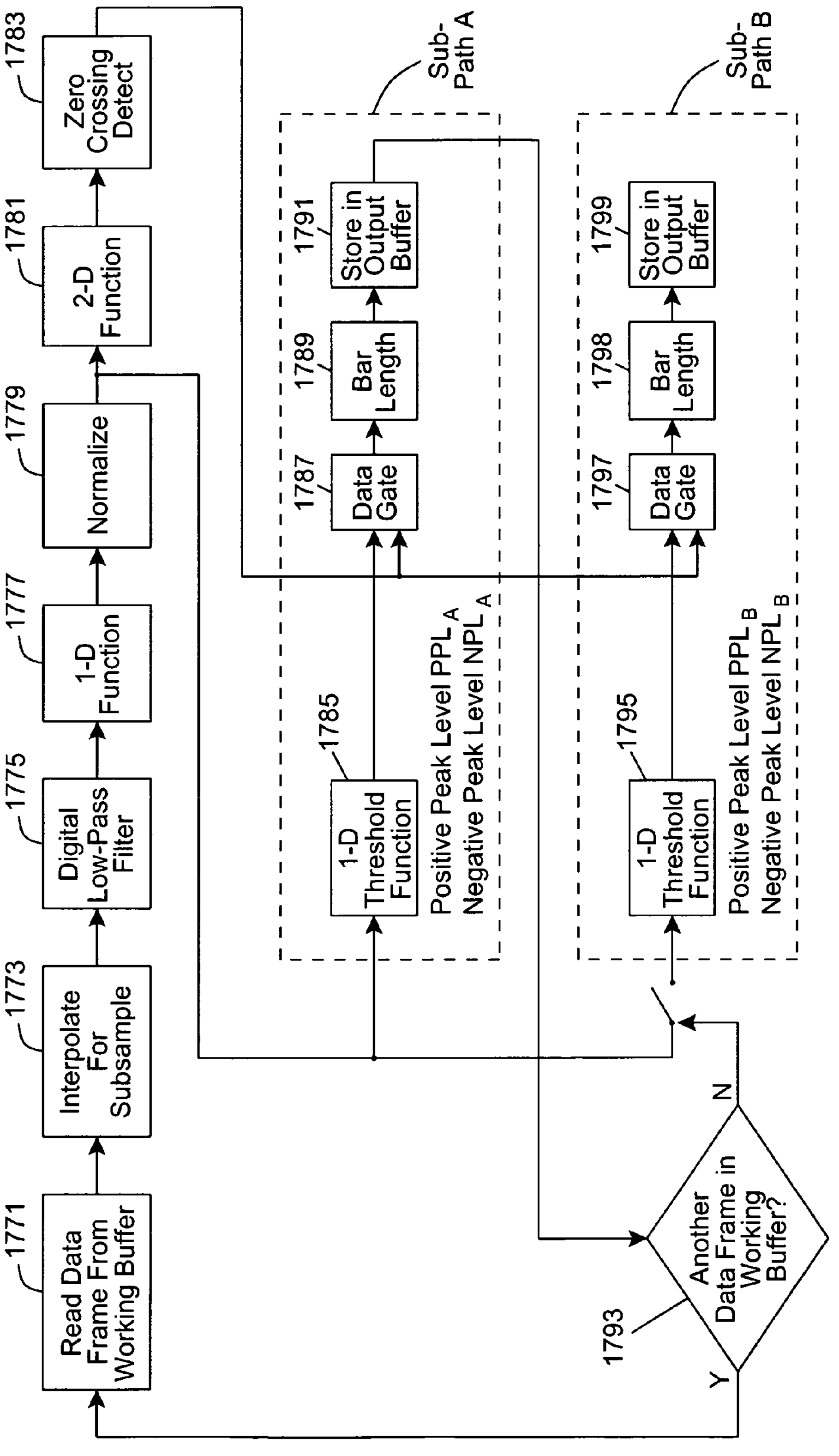

FIGS. 19B through 19D illustrate exemplary digital implementations of the TDM-enabled multi-path scan data processing according to the present invention. The digital signal processing operations therein are preferably carried out on the discrete scan data signal levels generated by the A/D converter 1705 during the time periods logically assigned to the photodetector 1701 and stored in the memory 1709 of FIG. 19A.

FIG. 19B illustrates exemplary digital signal processing operations that identify a data frame (e.g., a portion of the discrete scan data signal levels stored in memory 1709) that potentially represents a bar code symbol (block 1723) and stores the data frame in a working buffer (block 1725). Signal processing techniques that identify a data frame (within the discrete signal levels stored in the memory 1709) that potentially represents a bar code symbol (block 1723) are well know in the art.

FIG. 19C illustrates exemplary digital signal processing operations that carry out multi-path scan data signal processing according to the present invention. More specifically, in block 1727, a data frame is read from the working buffer. Preferably, the data frame read from the working buffer in block 1727 was stored therein in block 1725 of FIG. 19B. Alternatively, the data frame may be a block of the discrete scan data signals levels generated by the A/D converter 1705 and stored in memory 1709 of FIG. 19A (or discrete scan data signals derived therefrom). The data values of the data frame are then processed by a sequence of signal processing blocks (blocks 1729, 1731-1745 and 1751-1765).

In block 1729, such data values are optionally interpolated (or sub-sampled). Interpolation increases the effective sampling rate of the system by adding data values that are derived from existing data values. Interpolation is a technique well known in the digital signal processing arts, and is discussed in great detail in Russ, "Image Processing Handbook," Third Edition, IEEE Press, 1999, pg. 219-220, herein incorporated by reference in its entirety. Sub-sampling (or decimation) decreases the effective sampling rate of the system. Sub-sampling is typically accomplished by averaging data values. Sub-sampling is a technique well known in the digital signal processing arts, and is discussed in great detail in Russ, "Image Processing Handbook," Third Edition, IEEE Press, 1999, pg. 166-174, herein incorporated by reference in its entirety. The resulting block of data values are provided to at least two processing paths (for example, two paths A and B as shown). The different digital signal processing functions of each path are preferably performed in parallel (for example, by separated threads in a multi-threaded processing system or by separate processors in a multi-processor system). Alternatively, the processing along each path may be performed sequentially.

In each respective processing path, the block of data values are subject to a digital low pass filter (blocks 1731 and blocks 1753) that filter out unwanted noise. Such digital low-pass filters preferably implement one of a Butterworth-type, Chebsychev-type, MFTD-type, or elliptical-type low pass filtering transfer function, which are well known in the filtering art. Details of the design of such digital filters is set forth in the book entitled "Electrical Filter Design Handbook," Third Edition, by A. Williams et al. McGraw-Hill, 1996, incorporated by reference above in its entirety. The output of the digital low pass filter (blocks 1731, 1751) is supplied to a first derivative processing function (blocks 1733, and 1753) which differentiate the filtered digital scan data signals supplied thereto. The output of the first derivative processing function (blocks 1733, 1753) is normalized (blocks 1734, 1754) and supplied to a first derivative thresholding function (blocks 1739 and 1759) and a second derivative processing function (blocks 1735 and 1755).

The second derivative processing function (blocks 1735, 1755) differentiates the data supplied thereto to generate data representing the second derivative of the data values read from the working buffer. Such data is supplied to a zero crossing detector function (blocks 1737, 1757), which produces output data ("zero crossing data") identifying zero crossings in the second derivative data generated by the second derivative function (blocks 1735, 1755).

The first derivative thresholding function (blocks 1739, 1759) operates as a positive and negative peak detector to provide output data that identifies time periods when the positive and negative peaks of the data supplied thereto exceed predetermined thresholds (i.e., a positive peak level PPL and a negative peak level NPL). Preferably, the positive peak level PPL and negative peak level NPL are dynamic thresholds (e.g., these levels change as the digital scan data values read from the working buffer change over time) based upon a predetermined digital value and a percentage (portion) of the corresponding normalized first derivative signal supplied thereto.

The data output of the zero crossing detector function (blocks 1737, 1757) and the first derivative thresholding function (blocks 1739, 1759) are supplied to a data gate function (blocks 1741, 1761), which functions to output only zero crossing data which corresponds to detected zero-crossings which occur substantially concurrent with the positive or negative peaks detected in the normalized first derivative data (as identified by the output data of the first derivative threshold function). Thereafter, the data output by the data gate function (which represents a discrete binary-level scan data signal) is supplied to a bar length function (blocks 1743, 1763), which produce a digital "time" count value for each of the first and second signal levels in the discrete binary scan data signal. Such digital count values form a sequence of digital word $D_3$, each representing the time length associated with the signal level transitions in the corresponding digital scan data signal as described above. These digital words are stored in an output buffer (blocks 1745, 1765), for supply to a programmed decoder for decoding the scan data signal and producing symbol character data string representative of the corresponding laser-scanned bar code symbol. Alternatively, the generated discrete binary-level scan data signal can be converted back into a continuous-type binary-level scan data signal so that it may be "digitized" using a digital signal processor of the type taught in U.S. Pat. No. 5,828,049, incorporated herein by reference.

Each digital signal processing path has different operational characteristics (such as different cutoff frequencies in the low pass filters (blocks 1731 and 1751) and/or different positive and negative signal thresholds in the first derivative threshold function (blocks 1739, 1759) of the respective paths). The varying operational characteristics of the paths are optimized to provide different digital signal processing functions.

For example, the cut-off frequencies in the low pass filters (blocks 1731 and 1751) of the respective paths can vary such that different paths minimize the paper noise originating from different focal zones of the system. Alternatively, such cut-off frequencies can such that vary such that one or more paths maximize the scan resolution of the system (i.e., a path with higher cutoff frequencies may be able to detect high resolution bar code symbols) while other paths minimize paper noise (i.e., a path with lower cutoff frequencies will reject paper noise from a larger frequency band above the selected cutoff frequencies).

In another example, the positive and negative signal thresholds in the first derivative threshold functions (blocks 1739, 1759) of the respective paths can vary such that one or more paths maximize the scan resolution of the system (i.e., a path with "smaller" positive and negative signal thresholds may be able to detect low contrast bar code symbols) while other paths minimize paper noise (i.e., a path with a "larger" positive and negative signal thresholds will reject paper noise that falls below such thresholds.

The different digital signal processing functions of each path as described above are preferably performed in parallel (for example, by separated threads in a multi-threaded processing system or by separate processors in a multi-processor system). Alternatively, the processing along each path may be performed sequentially. In this case, the programmable microcomputer (e.g., digital signal processing system) may be programmed to dynamically activate the processing of a given path based upon the operation of the scanner (for example, based upon the focal distance of the scanning plane from which the scan data signal is derived, which is described in detail in U.S. application Ser. No. (108-045USA000), or based upon results of previous scan processing of the system.

FIG. 19D illustrates alternative digital signal processing operations that carry out multi-path scan data signal processing according to the present invention. More specifically, in block 1771, a data frame is read from the working buffer.

Preferably, the data frame read from the working buffer in block 1727 was stored therein in block 1725 of FIG. 19B. Alternatively, the data frame may be a block of the discrete scan data signals levels generated by the A/D converter 1705 and stored in memory 1709 of FIG. 19A (or discrete scan data signals derived therefrom). In block 1773, such data values are optionally interpolated (or sub-sampled). Interpolation increases the effective sampling rate of the system by adding data values that are derived from existing data values.

In block 1775, the resulting block of data values are subject to a digital low pass filter that filters out unwanted noise. Such digital low-pass filter preferably implements one of a Butterworth-type, Chebsychev-type, MFTD-type, or elliptical-type low pass filtering transfer function, which are well known in the filtering art. Details of the design of such digital filters is set forth in the book entitled "Electrical Filter Design Handbook," Third Edition, by A. Williams et al. McGraw-Hill, 1996, incorporated by reference above in its entirety. The output of the digital low pass filter (block 1775) is supplied to a first derivative processing function (block 1777) which differentiates the filtered digital scan data signals supplied thereto. The output of the first derivative processing function (block 1777) is normalized (block 1779) and supplied to a second derivative processing function (block 1781).

The second derivative processing function (block 1781) differentiates the data supplied thereto to generate data representing the second derivative of the data values read from the working buffer. Such data is supplied to a zero crossing detector function (block 1783), which produces output data ("zero crossing data") identifying zero crossings in the second derivative data generated by the second derivative function.

The normalized output of the first derivative processing function (block 1779) is also supplied to at least one processing sub-path (for example, sub-path A as shown). In the illustrative embodiment shown in FIG. 19D, the execution of the signal processing of the second sub-path B is contingent upon a status condition of the working buffer (e.g., whether it has (or has not) received another full data frame. Alternatively, the different digital signal processing functions of each sub-path may be performed in parallel (for example, by separated threads in a multi-threaded processing system or by separate processors in a multi-processor system).

Each processing sub-path includes a first derivative thresholding function (blocks 1785, 1795), which operates as a positive and negative peak detector to provide output data that identifies time periods when the positive and negative peaks of the data supplied thereto exceed predetermined thresholds (i.e., a positive peak level PPL and a negative peak level NPL). Preferably, the positive peak level PPL and negative peak level NPL are dynamic thresholds (e.g., these levels change as the digital scan data values read from the working buffer change over time) based upon a predetermined digital value and a percentage (portion) of the corresponding normalized first derivative signal supplied thereto.

The data output of the zero crossing detector function (block 1783) and the first derivative thresholding function of the respective path (block 1785, 1795) are supplied to a data gate function (blocks 1787, 1797), which functions to output only zero crossing data which corresponds to detected zero-crossings which occur substantially concurrent with the positive or negative peaks detected in the normalized first derivative data (as identified by the output data of the first derivative threshold function). Thereafter, the data output by the data gate function (which represents a discrete binary-level scan data signal) is supplied to a bar length function (blocks 1789, 1798), which produce a digital "time" count value for each of the first and second signal levels in the discrete binary scan data signal. Such digital count values form a sequence of digital word $D_3$, each representing the time length associated with the signal level transitions in the corresponding digital scan data signal as described above. These digital words are stored in an output buffer (blocks 1791, 1799), for supply to a programmed decoder for decoding the scan data signal and producing symbol character data string representative of the corresponding laser-scanned bar code symbol. Alternatively, the generated discrete binary-level scan data signal can be converted back into a continuous-type binary-level scan data signal so that it may be "digitized" using a digital signal processor of the type taught in U.S. Pat. No. 5,828,049, incorporated herein by reference.

Each digital signal processing sub-path of FIG. 19D has different operational characteristics (such as different positive and negative signal thresholds in the first derivative threshold function (blocks 1785, 1795) of the respective sub-paths). The varying operational characteristics of the sub-paths are optimized to provide different digital signal processing functions.

For example, the positive and negative signal thresholds in the first derivative threshold functions (blocks 1785, 1795) of the respective sub-paths can vary such that one or more sub-paths maximize the scan resolution of the system (i.e., a sub-path with "smaller" positive and negative signal thresholds may be able to detect low bar code symbols) while other sub-paths minimize paper noise (i.e., a sub-path with a "larger" positive and negative signal thresholds will reject paper noise that falls below such thresholds.

Note that the illustrative embodiments set forth above provide a TDM-enabled multi-path scan data signal processor with two signal processing paths (or sub-paths) with different operational characteristics. It is contemplated that the TDM-enabled multi-path scan data signal processor of the present invention includes more than two signal processing paths (or sub-paths) with different operational characteristics as described above.

Advantageously, the improved TDM-enabled scan data signal processor of the present invention has an improved signal-to-noise ratio (SNR) and dynamic range, which effectively increases the length of each focal zone in the laser scanning system. This allows the system designer to provide more overlap between adjacent focal zones or produce a laser scanning system with a larger overall depth of field. In addition, it produces a laser scanning system capable of scanning/resolving bar code symbols having narrower element widths and/or printed on substrates whose normal vector is disposed at large angles from the projection axis of laser scanning system.

While the various embodiments of the laser scanner hereof have been described in connection with linear (1-D) bar code symbol scanning applications, it should be clear, however, that the scanning apparatus and methods of the present invention are equally suited for scanning 2-D bar code symbols, as well as alphanumeric characters (e.g. textual information) in optical character recognition (OCR) applications, as well as scanning graphical images in graphical scanning arts.

Several modifications to the illustrative embodiments have been described above. It is understood, however, that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. A bar code symbol scanning system comprising:

at least one laser light source for generating a plurality of laser scanning beams;

optical elements for projecting said plurality of laser scanning beams into a scanning volume at different orientations for scanning one or more bar code symbols on objects within the scanning volume, collecting light reflections from said laser scanning beams, and directing these light reflections to a plurality of photosensors corresponding in number to the plurality of laser scanning beams and producing electrical signals corresponding to light reflections from the scanned bar code symbols;

signal processing circuitry operably, coupled to the output of said photosensors, for processing said electrical signals and detecting and decoding the bar code symbols scanned by the laser scanning beams;

timing signal generation circuitry for generating timing signals that correspond to successive non-overlapping time slots, wherein each said laser scanning beam and corresponding photosensor is logically assigned to one of said successive non-overlapping time slots;

a laser light source control mechanism for operating, during a given time slot, in response to the timing signals generated by said timing signal generation circuitry, so as to selectively enable one said laser scanning beam, logically assigned to the given time slot, to be generated and/or projected into said scanning volume; and a signal processing control mechanism for operating, during the given time slot, in response to the timing signals generated by said timing signal generation circuitry, so as to selectively enable one said photosensor, logically assigned to the given time slot, to be operably coupled to said signal processing circuitry.

2. The bar code symbol scanning system of claim 1, wherein a subset of said multiple scanning beams are substantially coincident to one another.

3. The bar code symbol scanning system of claim 1, wherein said at least one light source comprises a plurality of visible laser diodes, and wherein said laser light source control mechanism selectively disables generation of the scanning laser beam by a given visible laser diode by controlling power supplied to the given visible laser diode.

4. The bar code symbol scanning system of claim 1, wherein each pair of non-overlapping time slots in bounded by a null period;

wherein said laser light source control mechanism that operates, in response to the timing signals generated by said timing signal generation circuitry, to disable generation and/or projection of said plurality of laser scanning beams into said scanning volume during each null period; and wherein the signal processing control mechanism operates, in response to the timing signals generated by said timing signal generation circuitry, so as to operably decouple said plurality of photosensors from said signal processing circuitry during each null period.

5. The bar code symbol scanning system of claim 1, including at least a horizontal housing portion with a first scanning window disposed therein, wherein said multiple laser scanning beams are projected at different orientations through said first scanning window into a scanning volume disposed above the horizontal window.

6. The bar code symbol scanning system of claim 1, including at least a horizontal housing portion with a first scanning window disposed therein and a vertical housing portion with a second scanning window disposed therein, wherein said multiple laser scanning beams are projected at different orientations through said first and second scanning windows into a scanning volume disposed adjacent the first and second scanning windows.

7. The bar code symbol scanning system of claim 1, wherein said timing signal generator includes an oscillator and multi-state counter.

8. The bar code symbol scanning system of claim 1, wherein said at least one laser light source includes a plurality of visible laser diodes, and said laser light source control mechanism selectively disables said generation of the laser scanning beam by a given visible laser diode by controlling supply of power to the given visible laser diode.

9. The bar code symbol scanning system of claim 1, wherein said at least one laser light source includes a visible laser diode, and said laser light source control mechanism selectively disables projection of the laser scanning beam generated by the visible laser diode with an optical shutter.

10. The bar code symbol scanning system of claim 1, wherein said at least one laser light source includes a visible laser diode, and said laser light source control mechanism selectively disables projection of the laser scanning beam generated by the visible laser diode with a beam deflector.

11. The bar code symbol scanning system of claim 1, wherein said signal processing control mechanism includes multiplexing circuitry coupled between said plurality of photosensors and said signal processing circuitry, and wherein said multiplexing circuitry is controlled to selectively couple signal processing circuitry to a given photosensors during a time slot corresponding thereto.

12. The bar code symbol scanning system of claim 11, wherein said signal processing circuitry includes shared analog to digital signal conversion circuitry that processes signals derived from any one of said plurality of photosensors when operably coupled to said signal processing circuitry via said multiplexing circuitry.

13. The bar code symbol scanning system of claim 12, wherein said signal processing control mechanism selectively enables said shared analog to digital signal conversion circuitry during time slots when any one of said plurality of photosensors is operably coupled to said signal processing circuitry via said multiplexing circuitry.

14. The bar code symbol scanning system of claim 1, wherein said signal processing circuitry includes a plurality of analog to digital signal converters each processing signals derived from a unique one of said plurality of photosensors, and wherein said signal processing control mechanism selectively enables one of said plurality of analog to digital signal converters during a time slot corresponding thereto.

15. The bar code symbol scanning system of claim 1, wherein said laser light source control mechanism turns on a given laser scanning beam by operating a visible laser diode module that produces such laser scanning beam at an optical power level much greater than its threshold optical power level.

16. The bar code symbol scanning system of claim 1, said laser light source control mechanism turns substantially off a given laser scanning beam by operating a visible laser diode module that produces such laser scanning beam at an optical power level less than its threshold optical power level.

17. The bar code symbol scanning system of claim 1, said laser light source control mechanism turns substantially off a given laser scanning beam by operating a visible laser diode module that produces such laser scanning beam at an optical power level near its threshold optical power level, thereby enabling quick turn on of the visible laser diode module.

18. The bar code symbol scanning system of claim 1, wherein said laser light source control mechanism turns on a given laser scanning beam by supplying current to a visible laser diode module that produces such laser scanning beam a current level much greater than threshold current for said visible laser diode module.

19. The bar code symbol scanning system of claim 18, wherein said laser light source control mechanism controls said current level provided to said visible laser diode module by modulating a dynamic current source.

20. The bar code symbol scanning system of claim 19, wherein said dynamic current source is directly coupled to said visible laser diode module.

21. The bar code symbol scanning system of claim 1, wherein said laser light source control mechanism turns substantially off a given laser scanning beam by supplying current to a visible laser diode module that produces such laser scanning beam at a current level near or less than threshold current for said visible laser diode module.

22. The bar code symbol scanning system of claim 21, wherein said laser light source control mechanism controls current level provided to said visible laser diode module by modulating a dynamic current source.

23. The bar code symbol scanning system of claim 22, wherein said dynamic current source is directly coupled to said visible laser diode module.

24. The bar code symbol scanning system of claim 1, wherein frequency of time slots logically assigned to a given laser scanning beam and corresponding photosensor is greater than at least two times the highest frequency component expected in the scan data signal received at said photosensor.

25. The bar code symbol scanning system of claim 1, wherein time slots logically assigned to a given laser scanning beam and corresponding photosensor correspond to scanning planes generated by the given laser scanning beam during revolution of at least one rotating polygonal mirror.

26. The bar code symbol scanning system of claim 1, wherein time slots logically assigned to a given laser scanning beam and corresponding photosensor correspond to scanning plane groups generated by the given laser scanning beam during revolution of at least one rotating polygonal mirror.

* * * * *